(12) United States Patent
Sumi et al.

(10) Patent No.: US 10,043,118 B2
(45) Date of Patent: Aug. 7, 2018

(54) IMAGE PROCESSING APPARATUS, IMAGE PROCESSING METHOD, PRINTING MEDIUM AND STORAGE MEDIUM

(71) Applicant: CANON KABUSHIKI KAISHA, Tokyo (JP)

(72) Inventors: Naoki Sumi, Kawasaki (JP); Akitoshi Yamada, Yokohama (JP); Shinichi Miyazaki, Kawasaki (JP); Masao Kato, Kawasaki (JP); Hisashi Ishikawa, Urayasu (JP); Akihiro Fujimoto, Yokohama (JP); Yusuke Yamamoto, Tokyo (JP); Yuji Hara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/750,128

(22) Filed: Jun. 25, 2015

(65) Prior Publication Data
US 2016/0004942 A1     Jan. 7, 2016

(30) Foreign Application Priority Data

Jul. 1, 2014 (JP) ................................. 2014-136278
Jul. 1, 2014 (JP) ................................. 2014-136281

(51) Int. Cl.
*H04N 1/60*     (2006.01)
*H04N 1/46*     (2006.01)
(Continued)

(52) U.S. Cl.
CPC ..... *G06K 15/1881* (2013.01); *G06K 15/1822* (2013.01); *G06K 15/1877* (2013.01); *H04N 1/4051* (2013.01); *H04N 1/58* (2013.01)

(58) Field of Classification Search
None
See application file for complete search history.

(56) References Cited

U.S. PATENT DOCUMENTS 4,873,570 A * 10/1989 Suzuki ................... G06F 3/033
                                                358/515
4,958,218 A * 9/1990 Katayama ............ H04N 1/4052
                                               358/3.06
(Continued)

FOREIGN PATENT DOCUMENTS

CN     102685367 A     9/2012
CN     103339920 A     10/2013
(Continued)

OTHER PUBLICATIONS

Extended European Search Report issued in corresponding application No. EP 15001813.3 dated Nov. 5, 2015.
(Continued)

*Primary Examiner* — Madelein Nguyen
(74) *Attorney, Agent, or Firm* — Carter, DeLuca, Farrell & Schmidt, LLP

(57) ABSTRACT

An image processing apparatus that generates a halftone image by quantizing an input image includes: a holding unit configured to hold a threshold value matrix in which different threshold values are arranged; a pixel position determination unit configured to determine a candidate of a pixel position whose threshold value is to be rewritten based on each pixel value of a plurality of pixels included in a predetermined area for the predetermined area in the input image; and a threshold value determination unit configured to determine a threshold value of the pixel position determined to be the candidate by using at least one threshold value of a plurality of threshold values corresponding to the predetermined area.

35 Claims, 89 Drawing Sheets

(51) Int. Cl.
   *H04N 1/56*      (2006.01)
   *G06K 15/02*     (2006.01)
   *H04N 1/405*     (2006.01)
   *H04N 1/58*      (2006.01)

(56) References Cited

U.S. PATENT DOCUMENTS

| | | | | |
|---|---|---|---|---|
| 4,980,760 A * | 12/1990 | Hiratsuka | G03G 15/01 | 348/614 |
| 5,111,194 A * | 5/1992 | Oneda | H04N 1/4055 | 345/566 |
| 5,140,413 A * | 8/1992 | Suzuki | H04N 1/401 | 358/500 |
| 5,313,287 A * | 5/1994 | Barton | H04N 1/4055 | 382/252 |
| 5,371,515 A * | 12/1994 | Wells | H04N 1/40 | 345/596 |
| 5,444,551 A * | 8/1995 | Miller | H04N 1/40087 | 358/3.14 |
| 5,586,203 A * | 12/1996 | Spaulding | H04N 1/40087 | 358/3.22 |
| 5,818,604 A * | 10/1998 | Delabastita | H04N 1/407 | 358/3.19 |
| 5,880,702 A * | 3/1999 | Morimoto | G09G 3/2092 | 345/1.1 |
| 5,892,596 A * | 4/1999 | Nonaka | H04N 1/626 | 358/296 |
| 5,898,505 A * | 4/1999 | Lin | H04N 1/4053 | 358/1.9 |
| 5,949,964 A * | 9/1999 | Clouthier | G06K 15/02 | 358/2.1 |
| 6,002,385 A * | 12/1999 | Silverbrook | G09G 3/3607 | 345/100 |
| 6,089,691 A * | 7/2000 | Kakutani | H04N 1/40087 | 347/15 |
| 6,099,105 A * | 8/2000 | Kakutani | H04N 1/40087 | 347/15 |
| 6,148,101 A * | 11/2000 | Tanaka | G06T 1/20 | 382/156 |
| 6,215,561 B1 * | 4/2001 | Kakutani | H04N 1/6019 | 358/1.1 |
| 6,222,950 B1 * | 4/2001 | Sugiura | G06T 1/0007 | 358/1.9 |
| 6,272,248 B1 * | 8/2001 | Saitoh | G06K 9/46 | 382/218 |
| 6,356,363 B1 * | 3/2002 | Cooper | G06K 15/00 | 358/1.8 |
| 6,427,025 B1 * | 7/2002 | Shimomura | G06T 9/00 | 375/E7.077 |
| 6,474,768 B1 * | 11/2002 | Yano | H04N 1/6033 | 347/19 |
| 6,563,957 B1 * | 5/2003 | Li | H04N 1/4052 | 358/3.03 |
| 6,731,398 B1 * | 5/2004 | Yoshizawa | G06K 15/02 | 358/1.1 |
| 6,867,884 B1 | 3/2005 | Rozzi | | |
| 6,993,148 B1 * | 1/2006 | Miyashita | G06T 1/0028 | 382/100 |
| 7,245,396 B2 * | 7/2007 | Sakamoto | H04N 1/41 | 358/1.9 |
| 7,372,594 B1 * | 5/2008 | Kusakabe | G06T 1/0028 | 358/1.9 |
| 8,049,930 B2 * | 11/2011 | Guo | G06T 1/0028 | 358/3.03 |
| 8,982,421 B2 * | 3/2015 | Mizutani | H04N 1/4051 | 358/3.22 |
| 9,578,207 B1 * | 2/2017 | Andree | H04N 1/4052 | |
| 9,876,940 B2 * | 1/2018 | Yamada | H04N 1/52 | |
| 9,939,754 B2 * | 4/2018 | Haruta | G03G 15/043 | |
| 2003/0035673 A1 * | 2/2003 | Yamakawa | H04N 1/40062 | 400/76 |
| 2003/0081228 A1 * | 5/2003 | Spaulding | H04N 1/40087 | 358/1.9 |
| 2003/0210210 A1 * | 11/2003 | Ide | G02B 6/0043 | 345/30 |
| 2004/0174569 A1 | 9/2004 | Karito | | |
| 2004/0190092 A1 * | 9/2004 | Silverbrook | G06F 3/03545 | 358/539 |
| 2005/0105114 A1 * | 5/2005 | Hoshi | G06T 5/003 | 358/1.9 |
| 2005/0105115 A1 * | 5/2005 | Hoshi | G06T 5/009 | 358/1.9 |
| 2005/0105818 A1 * | 5/2005 | Hoshi | G06T 5/003 | 382/254 |
| 2005/0152610 A1 * | 7/2005 | Hagiwara | H04N 1/4105 | 382/239 |
| 2005/0237575 A1 * | 10/2005 | Yamazaki | H04N 1/52 | 358/3.03 |
| 2006/0023957 A1 * | 2/2006 | Ito | H04N 19/172 | 382/232 |
| 2006/0109512 A1 * | 5/2006 | Kuno | H04N 1/40087 | 358/3.06 |
| 2006/0129969 A1 * | 6/2006 | Kuno | B41J 2/2135 | 717/100 |
| 2006/0214971 A1 * | 9/2006 | Yamazaki | G06K 15/02 | 347/15 |
| 2007/0133060 A1 * | 6/2007 | Cittadini | H04N 1/4053 | 358/3.06 |
| 2008/0018940 A1 | 1/2008 | Toura | | |
| 2008/0079960 A1 * | 4/2008 | Yamazaki | B41J 29/393 | 358/1.8 |
| 2008/0123146 A1 * | 5/2008 | Ike | H04N 1/4051 | 358/3.13 |
| 2008/0144052 A1 * | 6/2008 | Sakai | H04N 1/32144 | 358/1.5 |
| 2008/0285069 A1 * | 11/2008 | Yasuda | H04N 1/32101 | 358/1.15 |
| 2009/0034007 A1 * | 2/2009 | Sano | G03G 15/326 | 358/3.13 |
| 2009/0097083 A1 * | 4/2009 | Utsunomiya | G03G 15/011 | 358/518 |
| 2009/0316214 A1 * | 12/2009 | Kashibuchi | H04N 1/40087 | 358/3.14 |
| 2010/0054593 A1 * | 3/2010 | Matsushita | G06K 9/4671 | 382/167 |
| 2011/0243429 A1 * | 10/2011 | Yao | H04N 1/58 | 382/162 |
| 2012/0195650 A1 * | 8/2012 | Ogawa | G03G 15/0189 | 399/301 |
| 2012/0229549 A1 * | 9/2012 | Shibata | B41J 2/04508 | 347/15 |
| 2013/0120610 A1 * | 5/2013 | Tsubaki | H04N 5/235 | 348/229.1 |
| 2013/0201501 A1 * | 8/2013 | Nishikawa | G03G 15/0126 | 358/1.9 |
| 2013/0258414 A1 * | 10/2013 | Kikuta | G06K 15/1876 | 358/3.14 |
| 2013/0300790 A1 * | 11/2013 | Ojiro | H04N 1/4053 | 347/14 |
| 2015/0049366 A1 * | 2/2015 | Shibata | H04N 1/40 | 358/3.07 |
| 2015/0181076 A1 * | 6/2015 | Mita | H04N 1/401 | 358/1.2 |
| 2015/0286905 A1 * | 10/2015 | Kikuta | G06K 15/1881 | 358/1.8 |
| 2015/0286908 A1 * | 10/2015 | Shibata | H04N 1/52 | 358/3.06 |
| 2016/0004942 A1 * | 1/2016 | Sumi | H04N 1/4051 | 358/3.06 |
| 2016/0248933 A1 * | 8/2016 | Yamada | H04N 1/52 | |

FOREIGN PATENT DOCUMENTS

| | | |
|---|---|---|
| EP | 2544443 A2 | 1/2013 |
| JP | H11-345327 A | 12/1999 |
| JP | 2006-333431 A | 12/2006 |
| JP | 2008-022239 A | 1/2008 |

(56) References Cited

FOREIGN PATENT DOCUMENTS

| JP | 2012-157998 A | 8/2012 |
|----|---------------|--------|
| JP | 2012-182651 A | 9/2012 |

OTHER PUBLICATIONS

Chinese Office Action dated Sep. 4, 2017 in corresponding Chinese Patent Application No. 2015-10379810.7 with English translation, 10 pages.
Japanese Office Action for corresponding Application No. JP2014136281 dated Jan. 16, 2018, with English Translation (8 pages).
Japanese Office Action dated Feb. 20, 2018 in corresponding Japanese Patent Application No. 2014136278 with English translation, 7 pages.
Chinese Office Action dated Apr. 19, 2018 in corresponding Chinese Patent Application No. 201510379810.7, together with English translation.

\* cited by examiner

FIG.8A

| 24 | 138 | 55 | 230 | 183 | 66 | 238 | 189 | 75 | 25 |
|---|---|---|---|---|---|---|---|---|---|
| 215 | 180 | 12 | 158 | 88 | 207 | 115 | 4 | 155 | 215 |
| 121 | 71 | 248 | 79 | 45 | 26 | 168 | 59 | 250 | 43 |
| 157 | 33 | 134 | 189 | 220 | 143 | 229 | 93 | 135 | 109 |
| 196 | 224 | 84 | 7 | 120 | 71 | 183 | 16 | 204 | 66 |
| 17 | 60 | 164 | 209 | 53 | 246 | 105 | 39 | 162 | 244 |
| 112 | 251 | 98 | 145 | 31 | 172 | 139 | 215 | 80 | 121 |
| 215 | 175 | 23 | 199 | 235 | 88 | 10 | 190 | 54 | 224 |
| 77 | 50 | 133 | 106 | 116 | 59 | 126 | 232 | 26 | 145 |
| 157 | 192 | 228 | 0 | 178 | 208 | 151 | 99 | 169 | 86 |

| 24 | 138 | 55 | 230 | 183 | 66 | 238 | 189 | 75 | 25 |
|---|---|---|---|---|---|---|---|---|---|
| 215 | 180 | 12 | 158 | 88 | 207 | 115 | 4 | 155 | 215 |
| 121 | 71 | 79 | 79 | 45 | 26 | 168 | 59 | 250 | 43 |
| 157 | 33 | 134 | 189 | 220 | 143 | 229 | 93 | 135 | 109 |
| 196 | 224 | 7 | 7 | 120 | 71 | 183 | 16 | 204 | 66 |
| 17 | 60 | 164 | 209 | 53 | 246 | 105 | 39 | 162 | 244 |
| 112 | 251 | 98 | 145 | 31 | 172 | 139 | 215 | 80 | 121 |
| 215 | 175 | 23 | 199 | 235 | 88 | 10 | 190 | 54 | 224 |
| 77 | 50 | 106 | 106 | 116 | 59 | 126 | 232 | 26 | 145 |
| 157 | 192 | 0 | 0 | 178 | 208 | 151 | 99 | 169 | 86 |

801

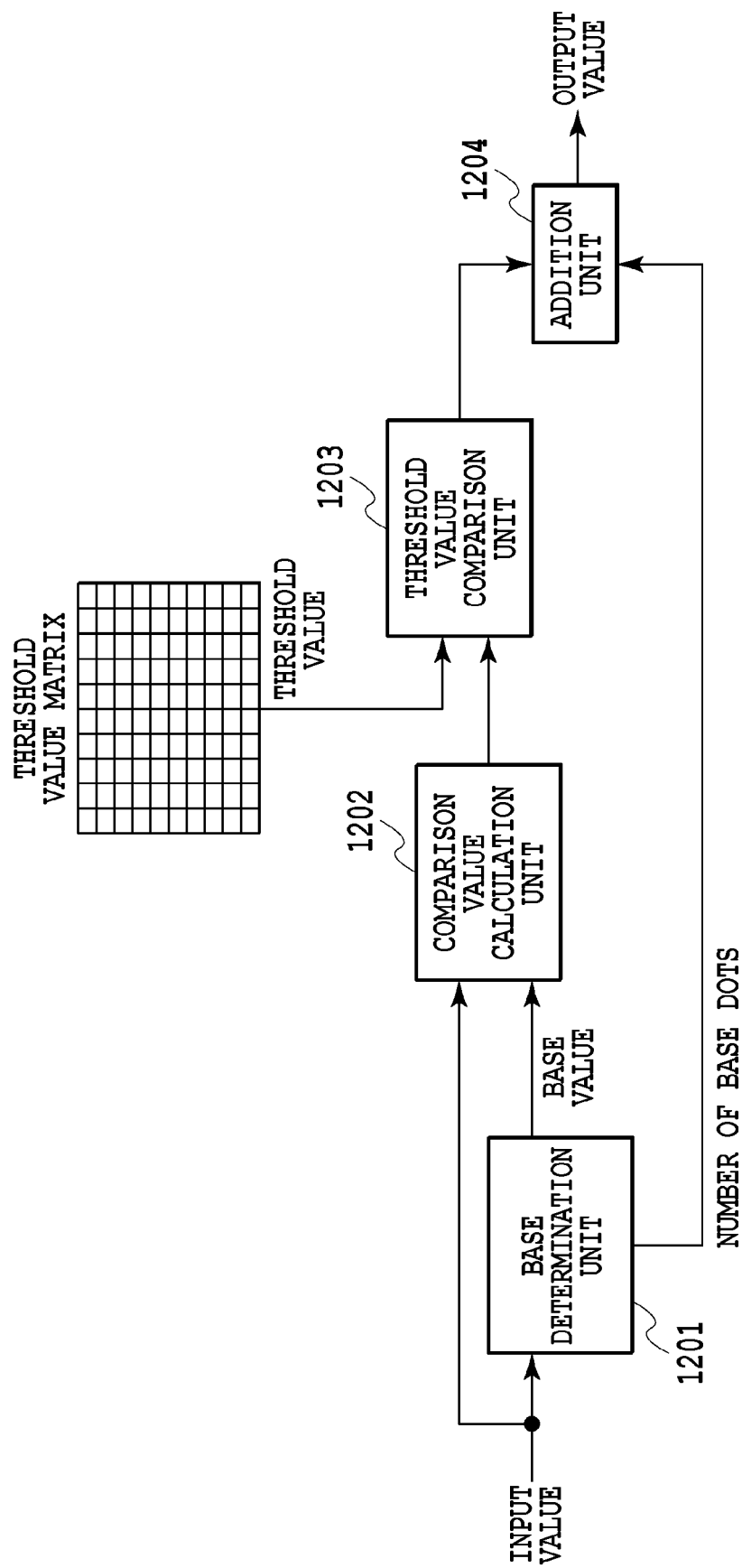

FIG.19
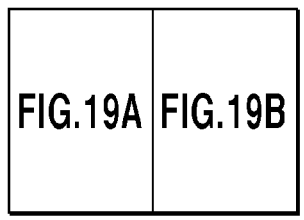
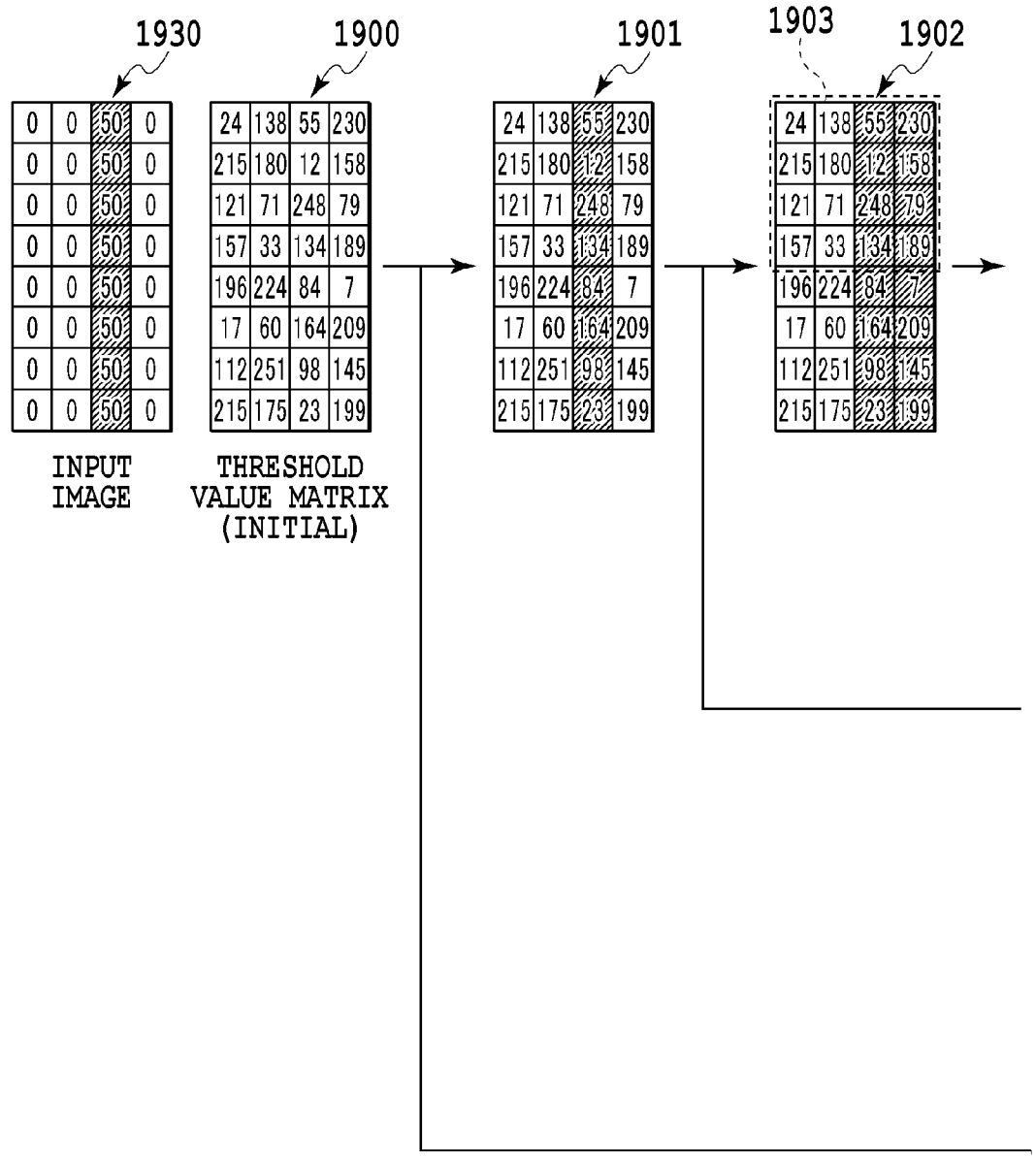
FIG.19A

FIG.22

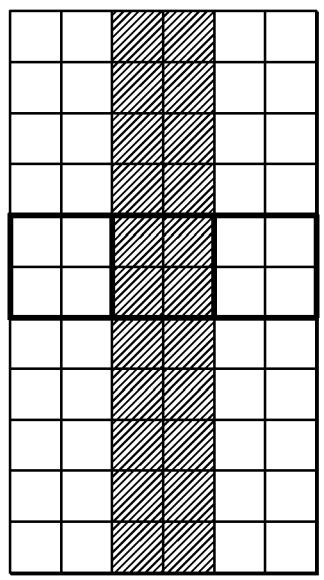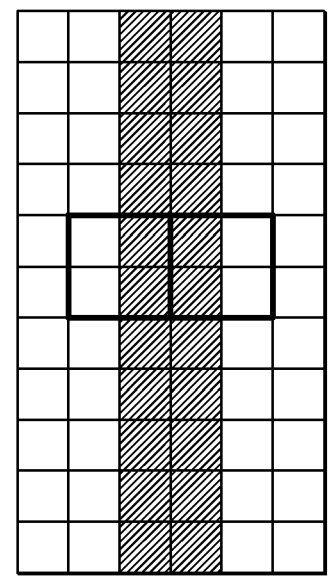
FIG.23A  FIG.23B

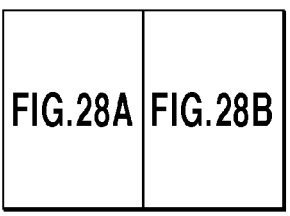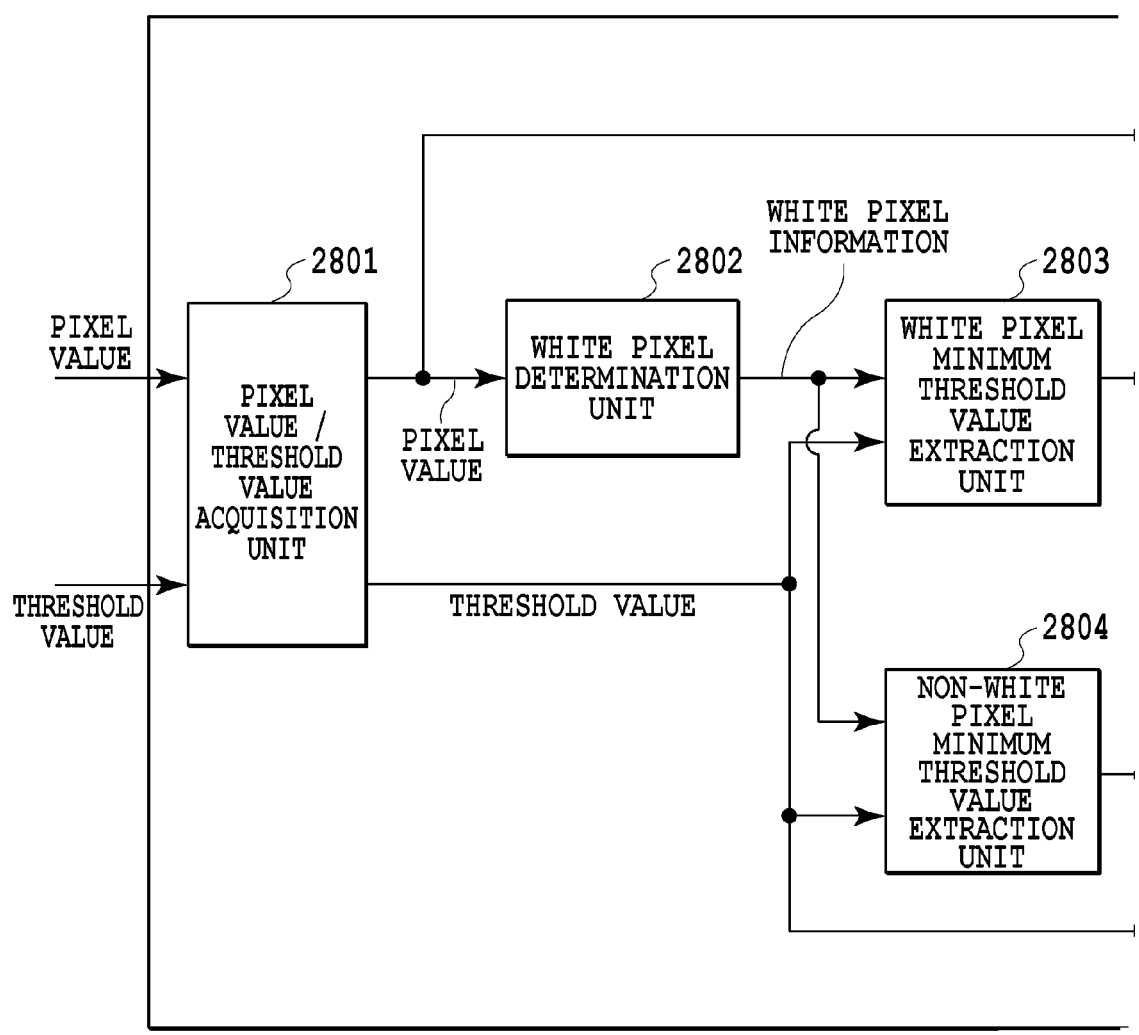
FIG.28A

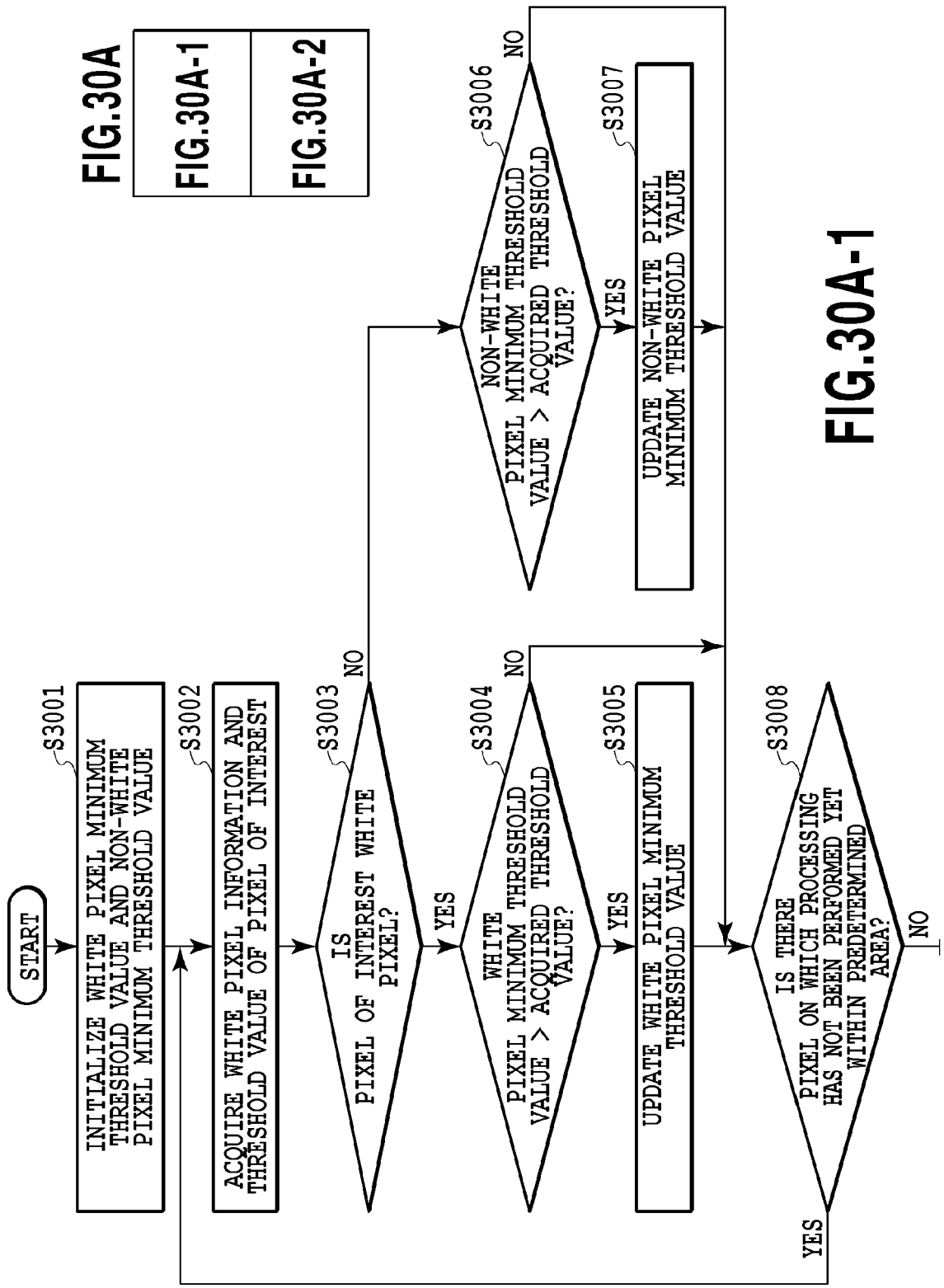

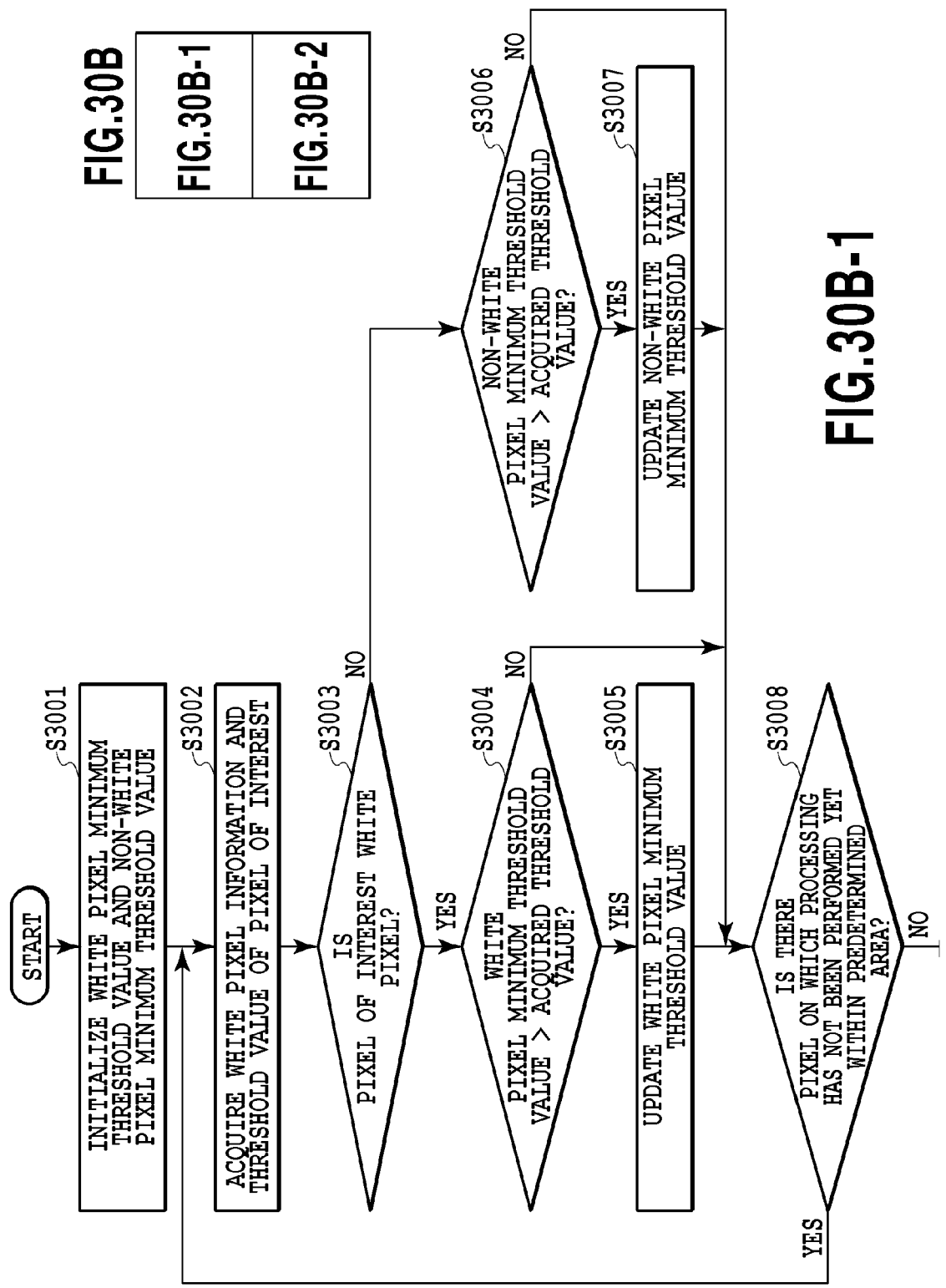

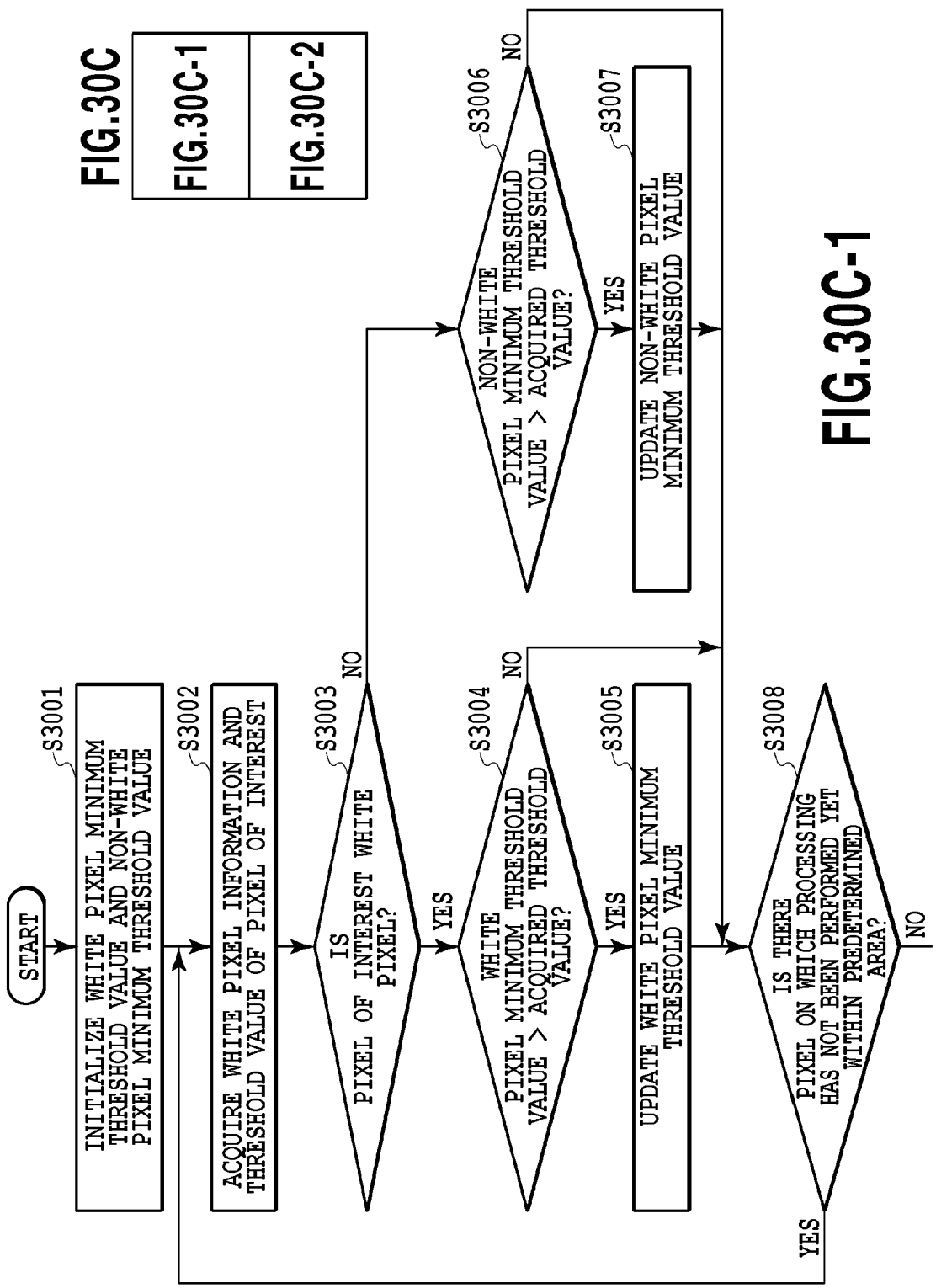

FIG.31
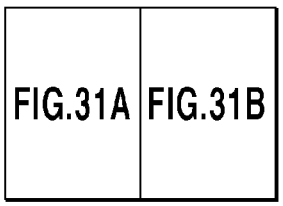
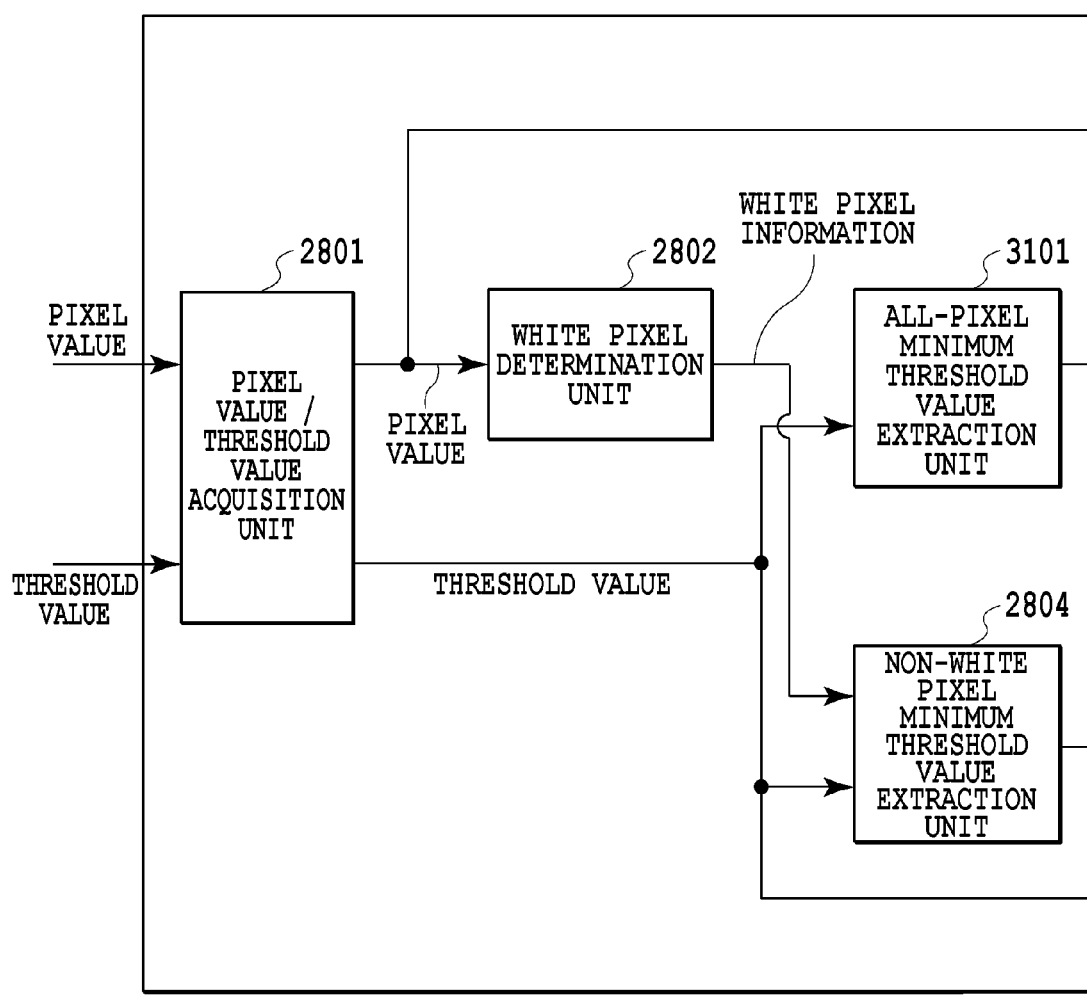
FIG.31A

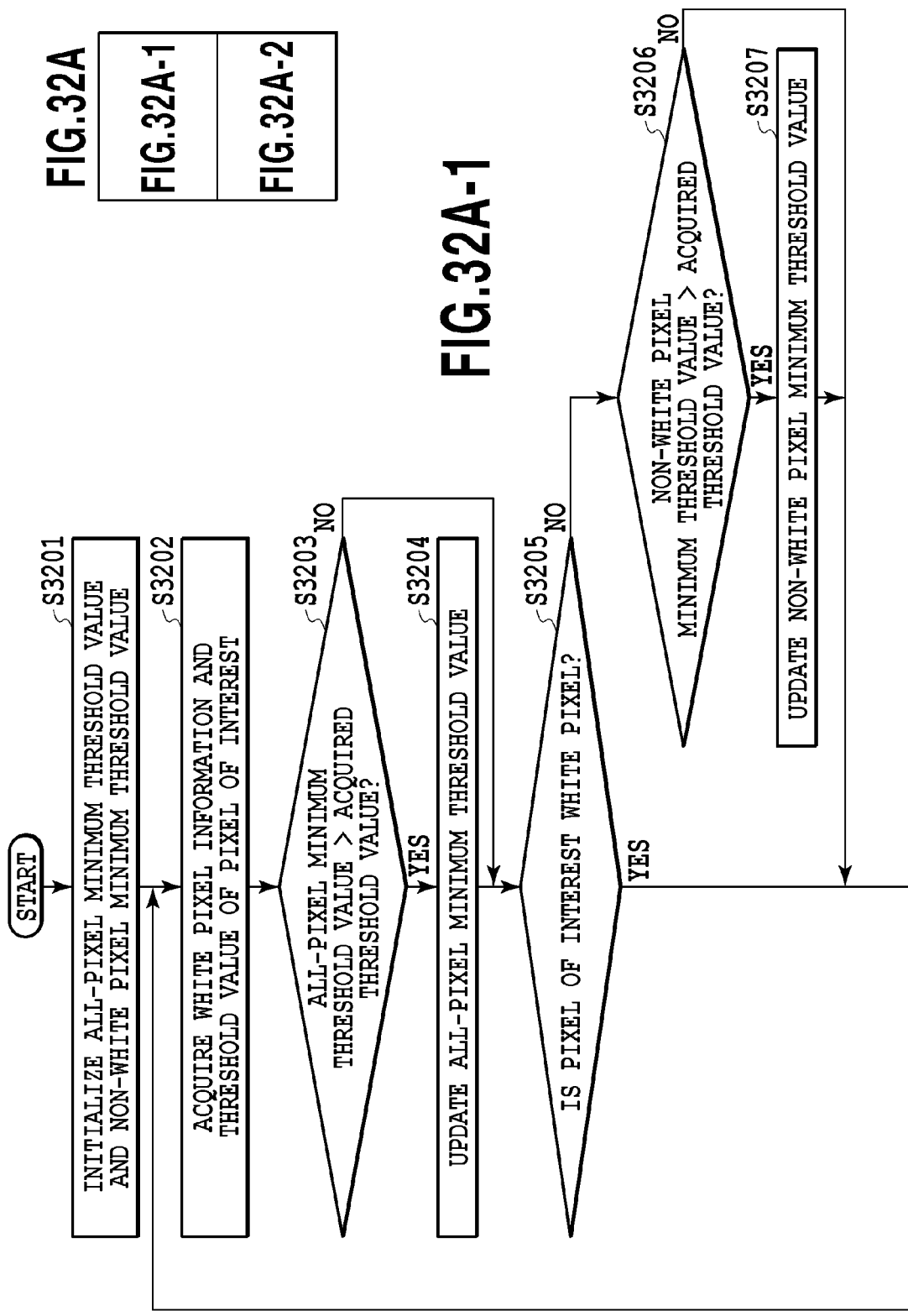

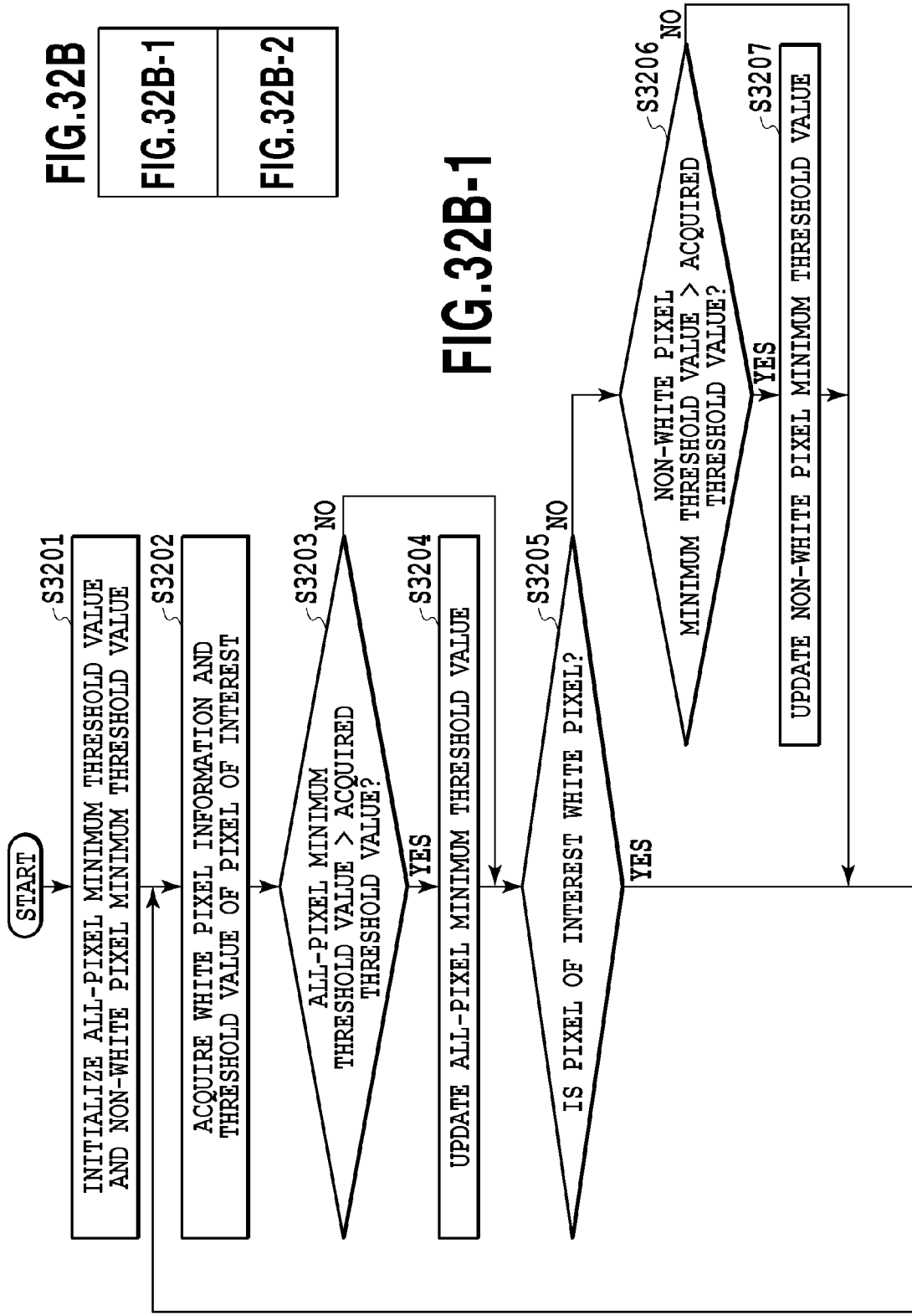

FIG.33
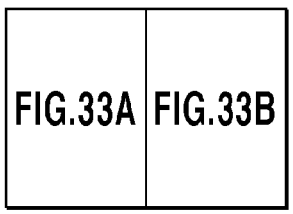
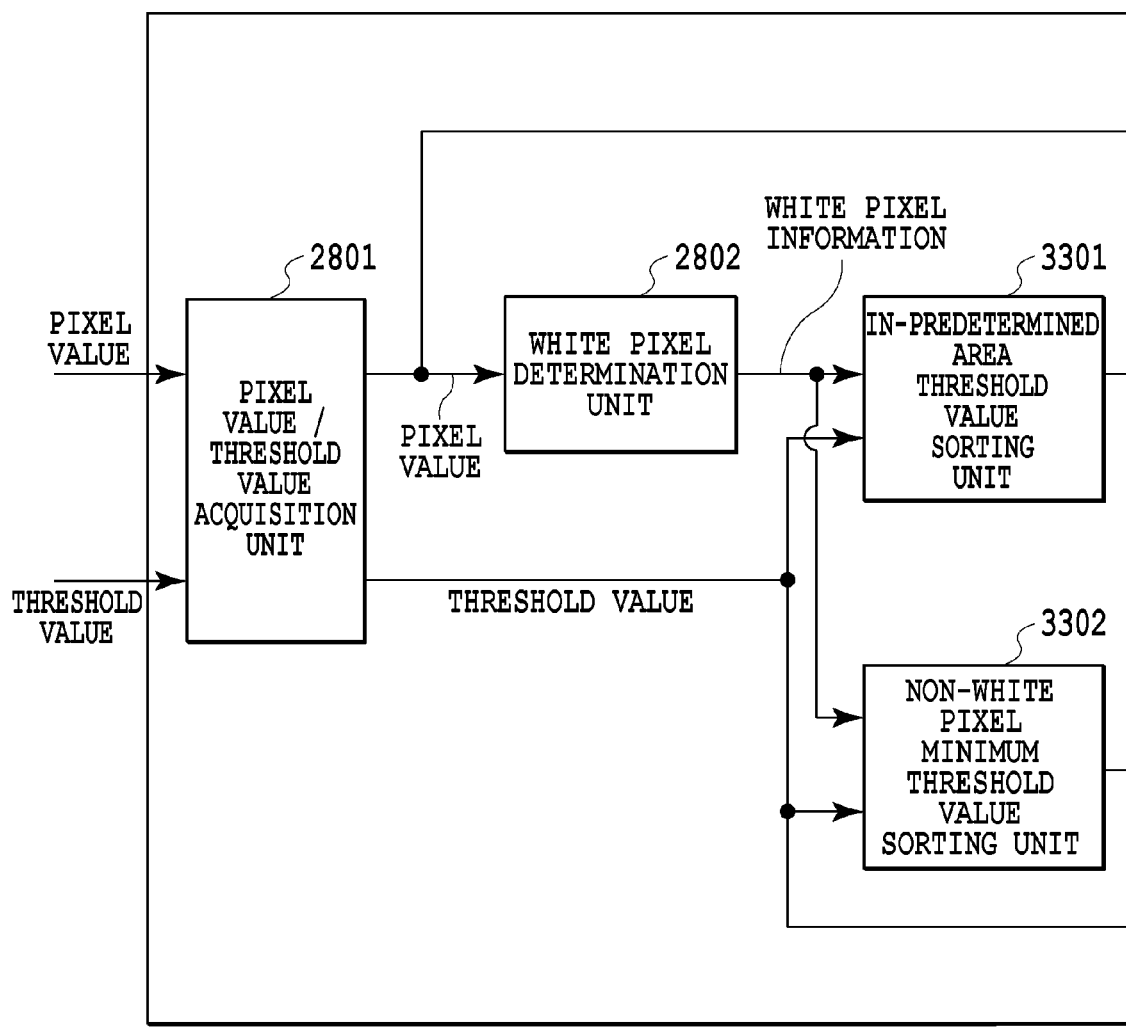
FIG.33A

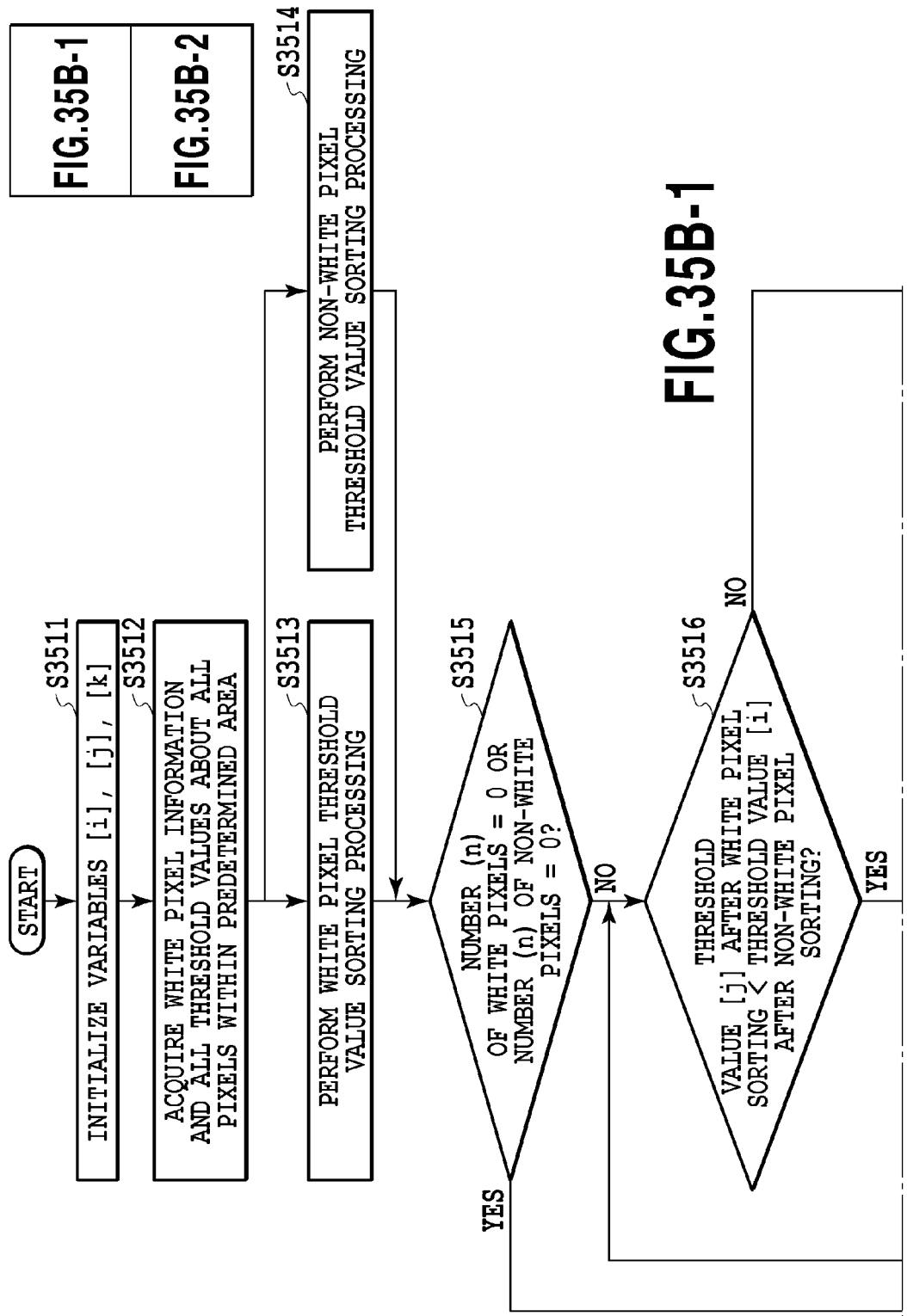

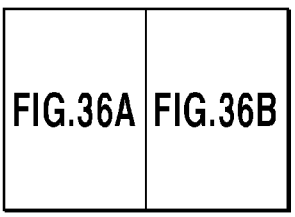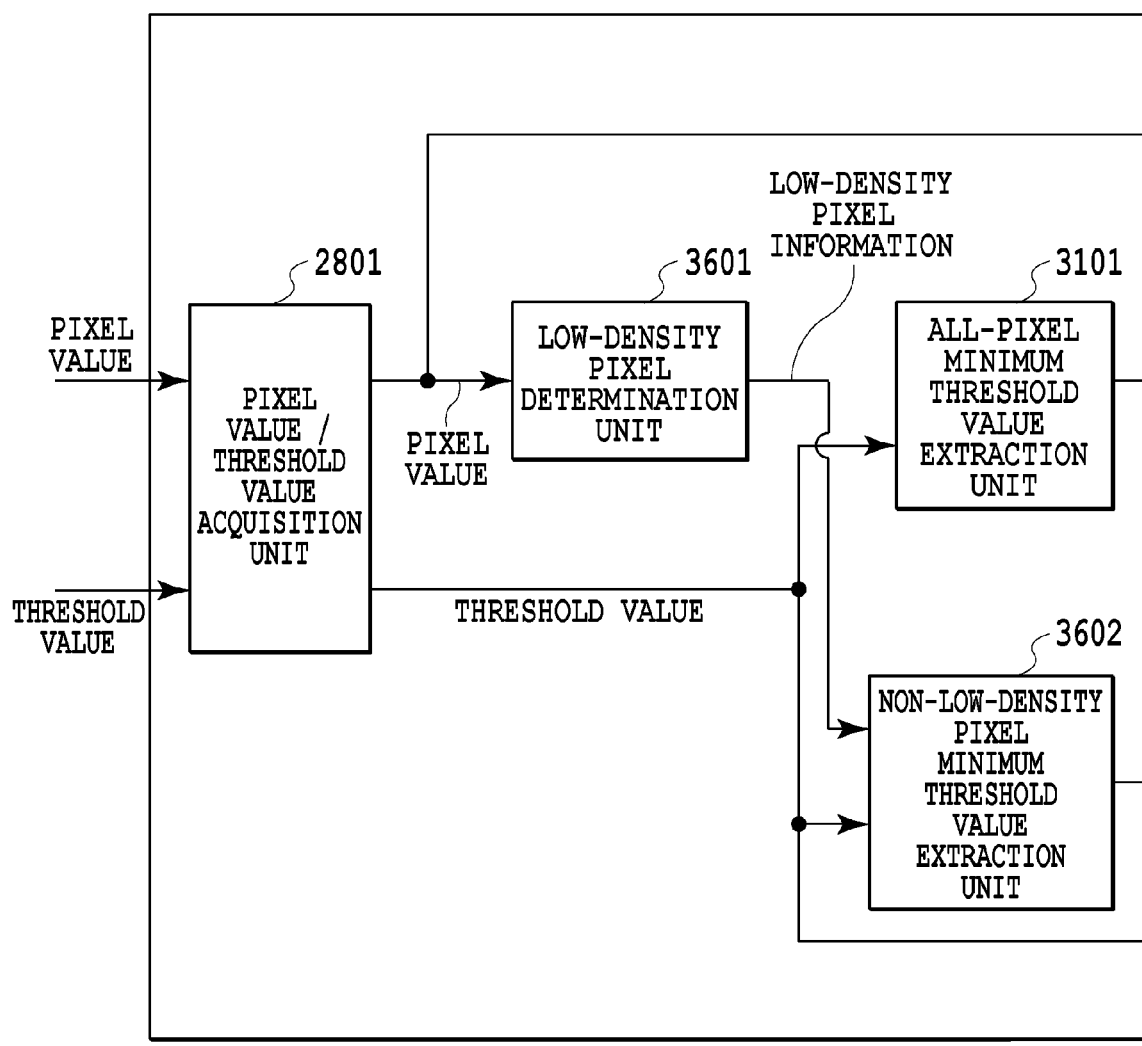
FIG.36A

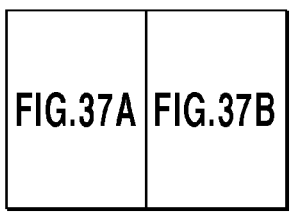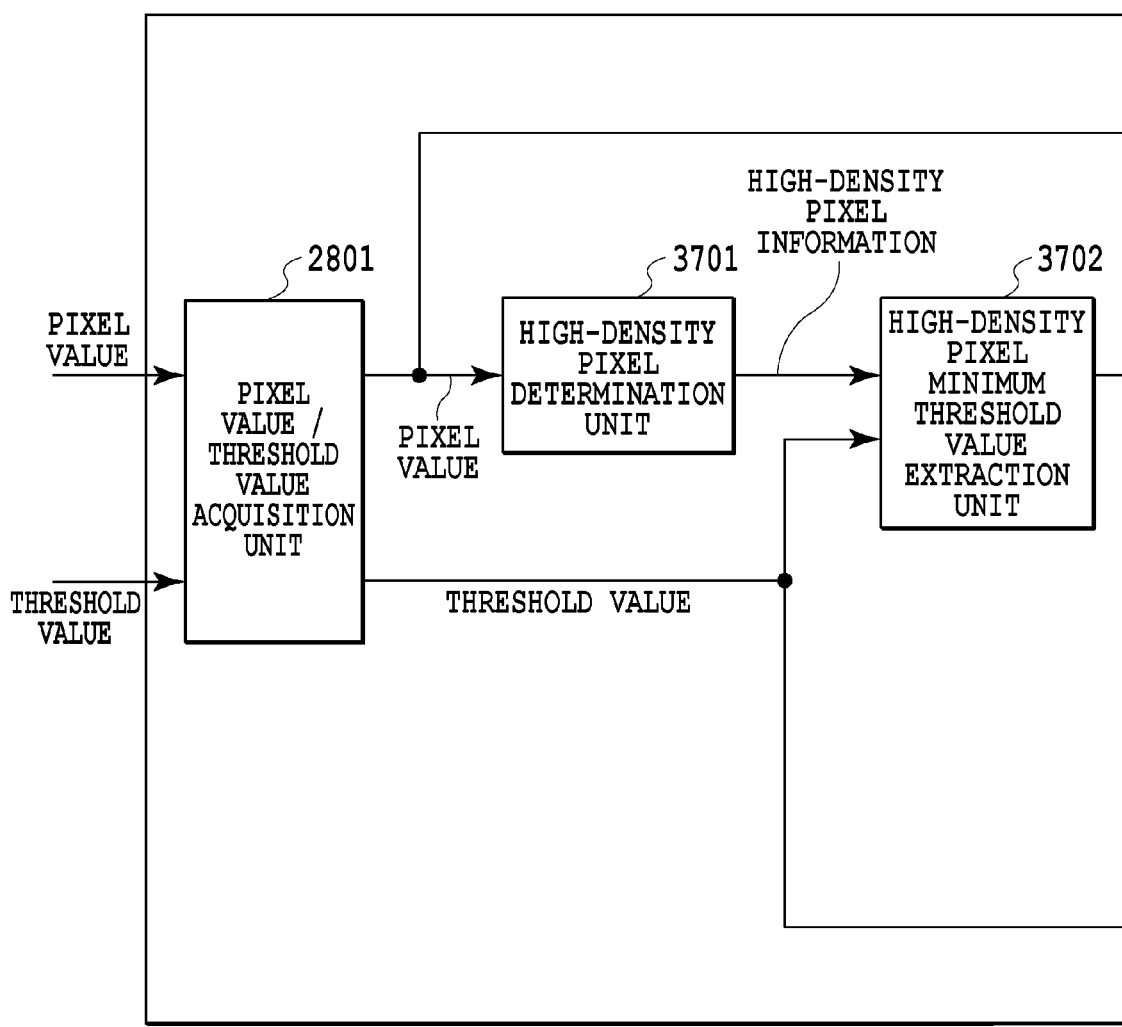
FIG.37A

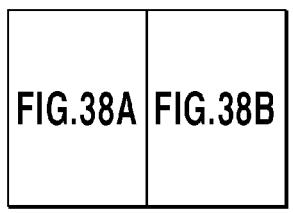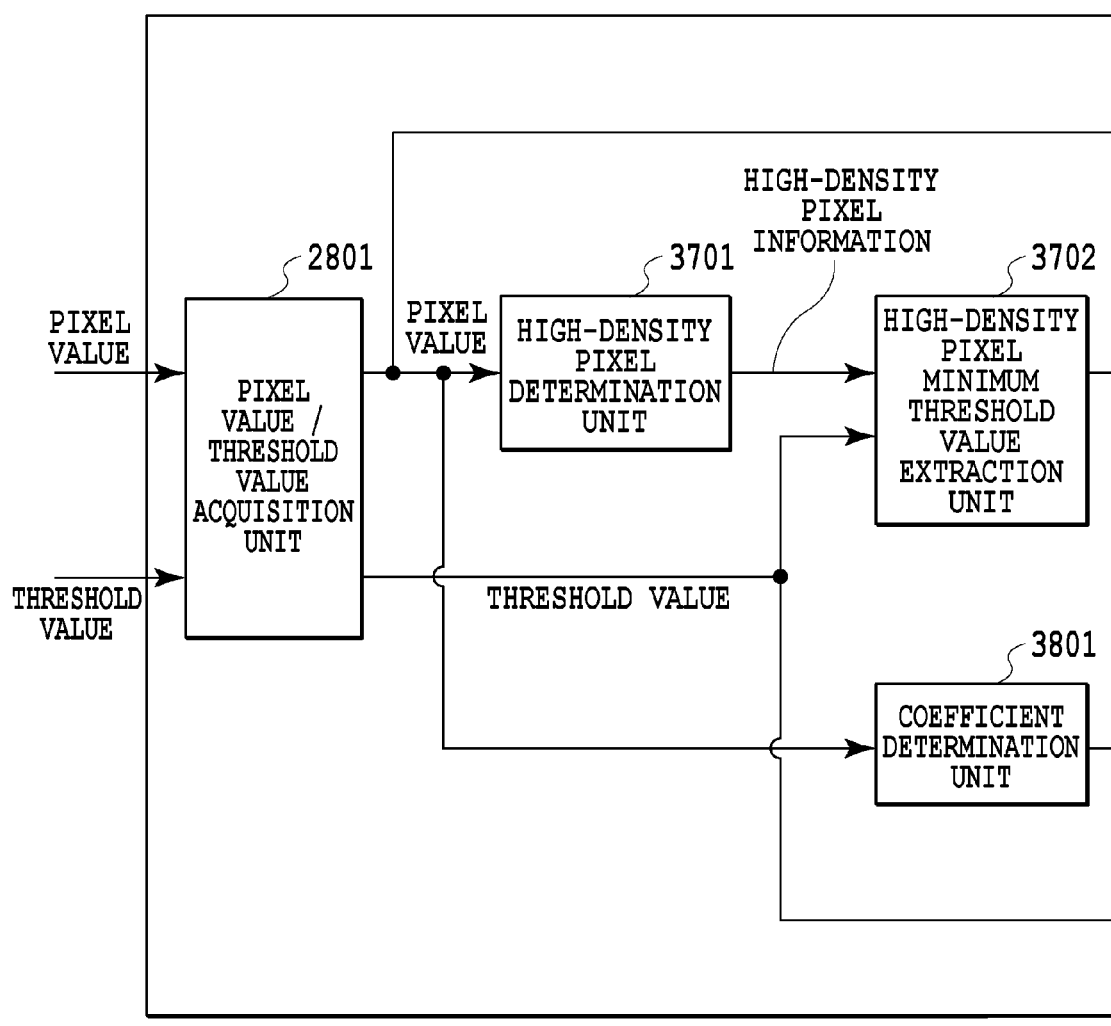
FIG.38A

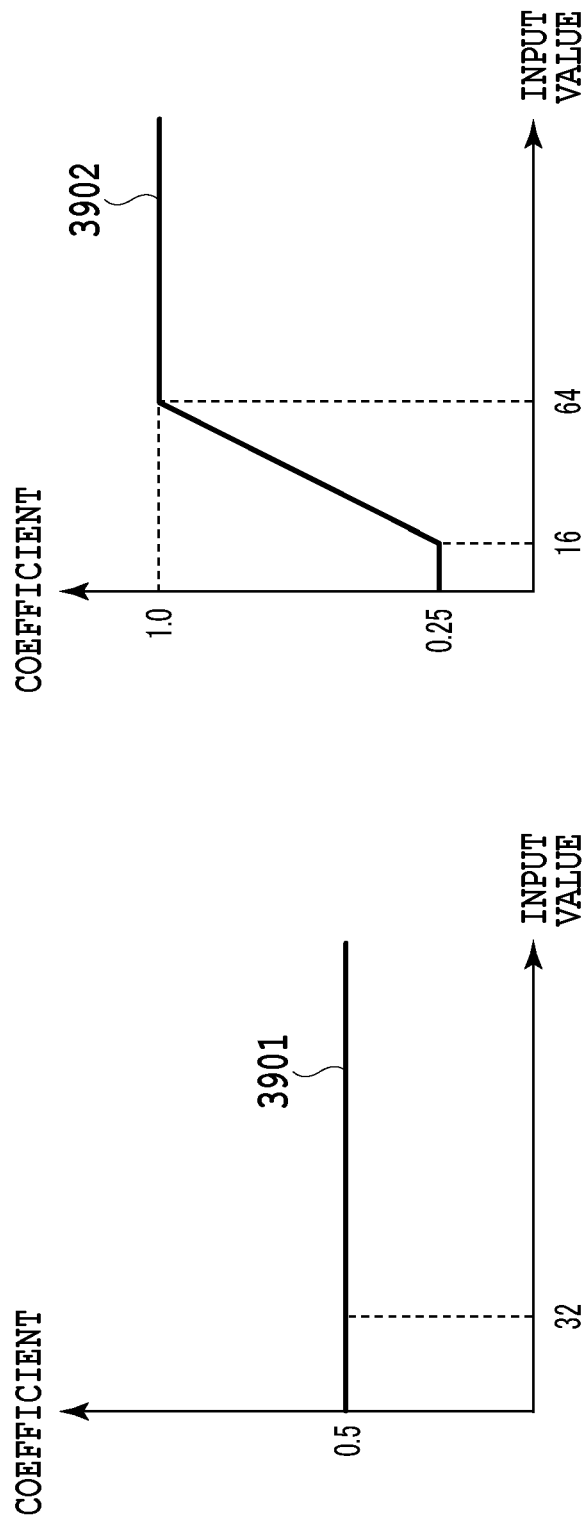

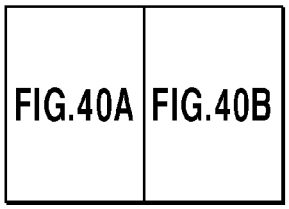
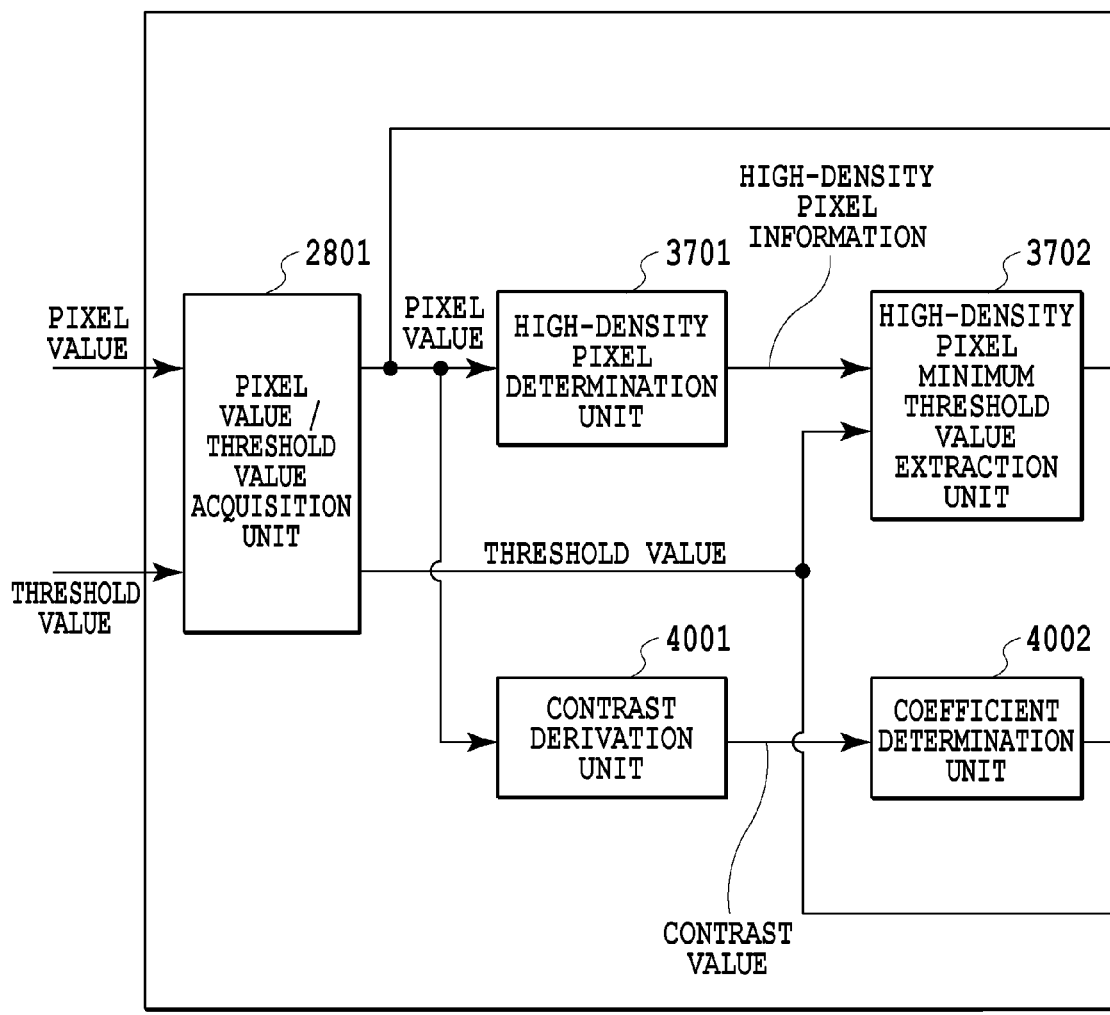
FIG.40A

FIG.44
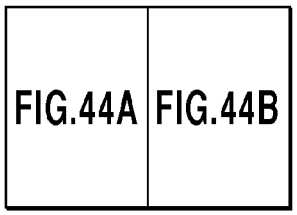
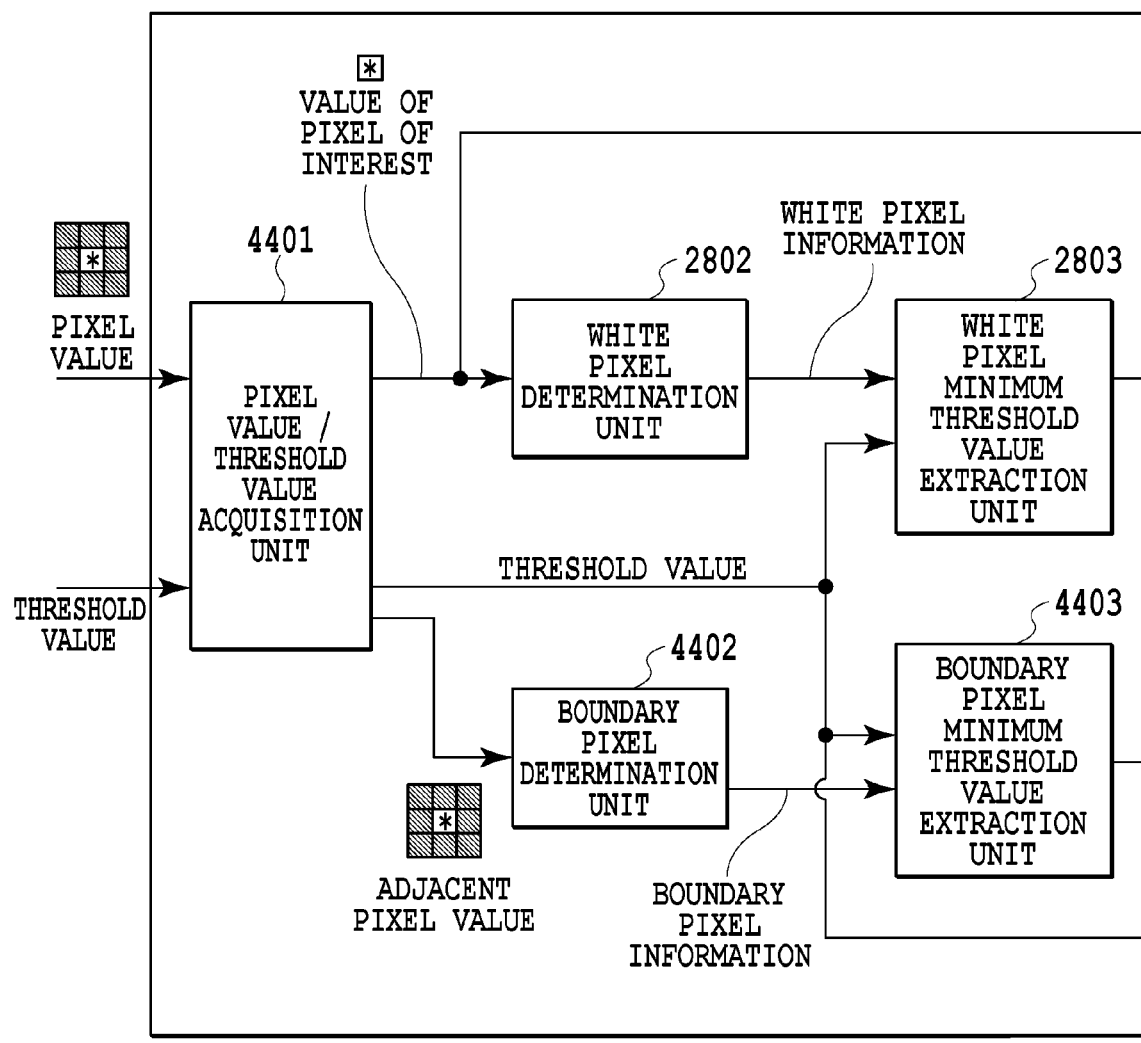
FIG.44A

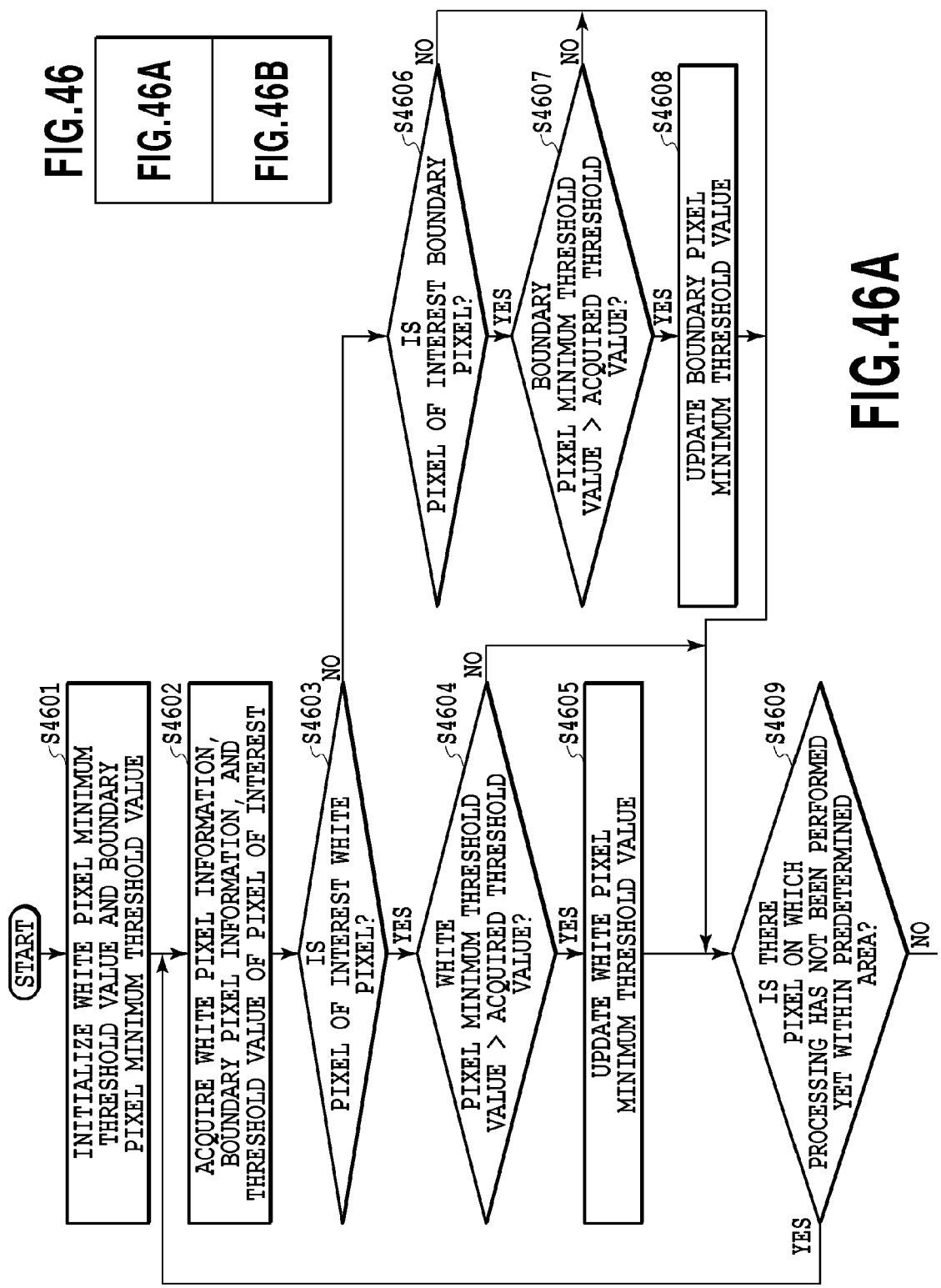

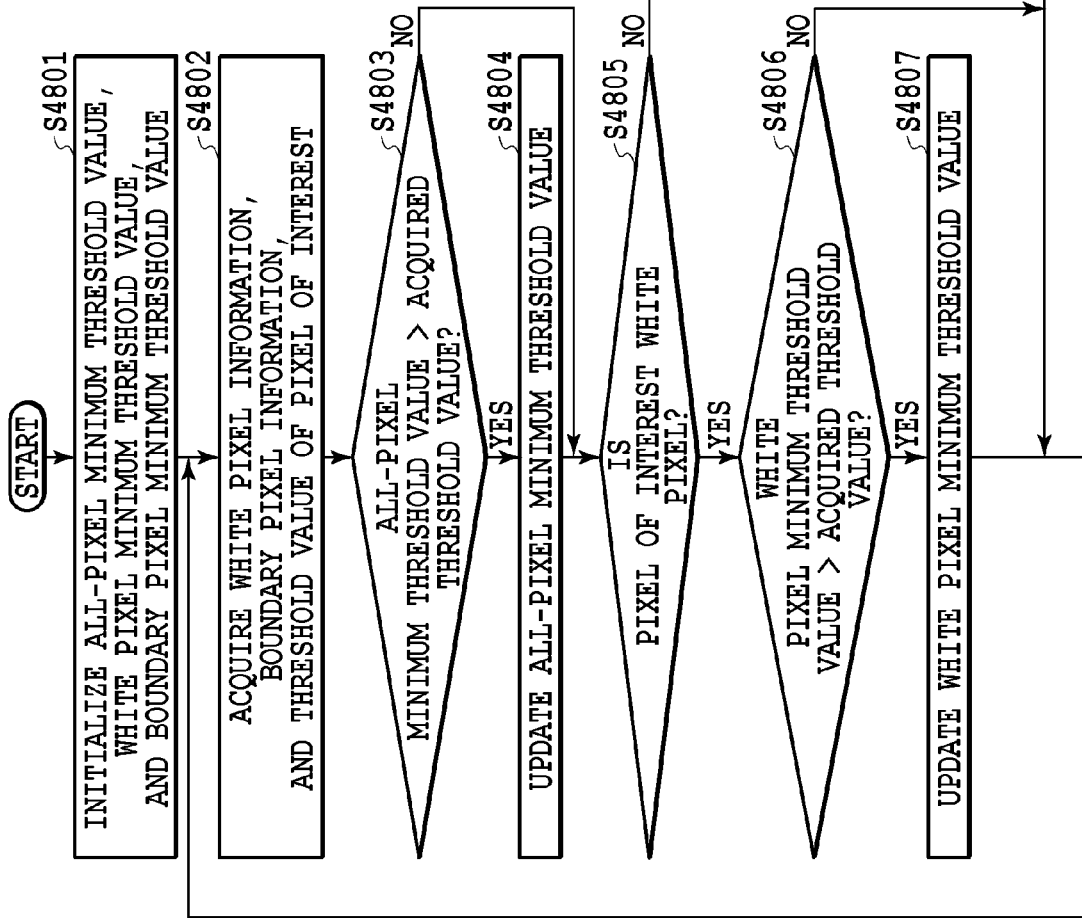

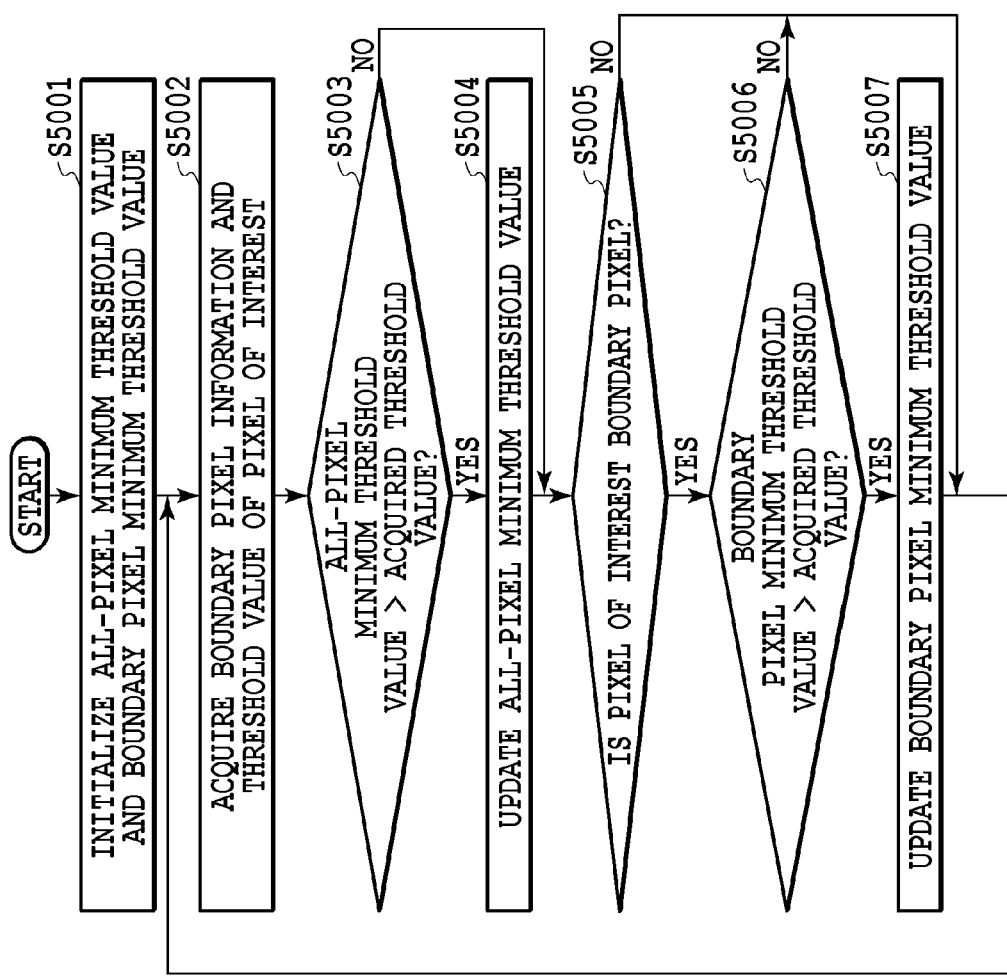

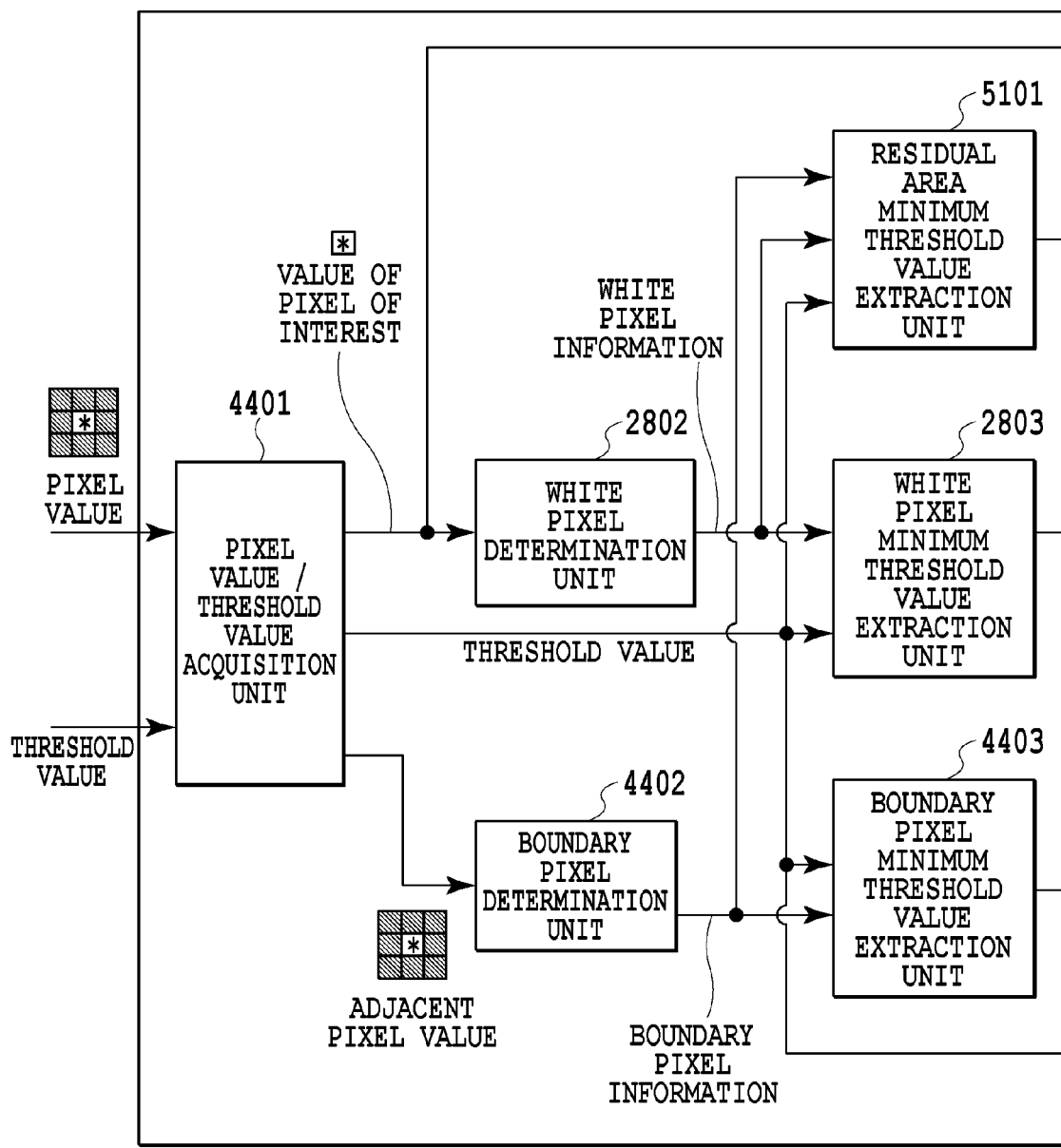

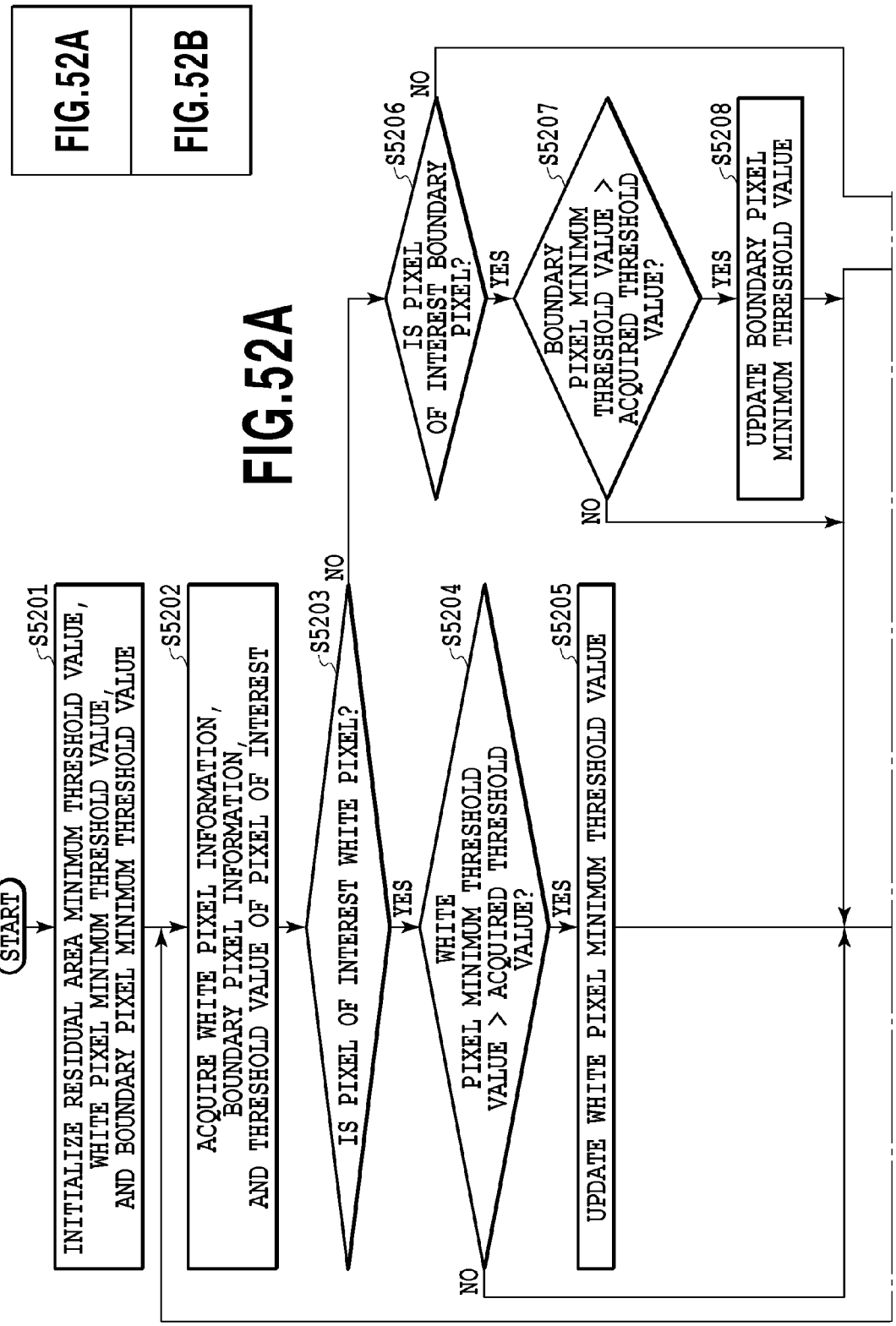

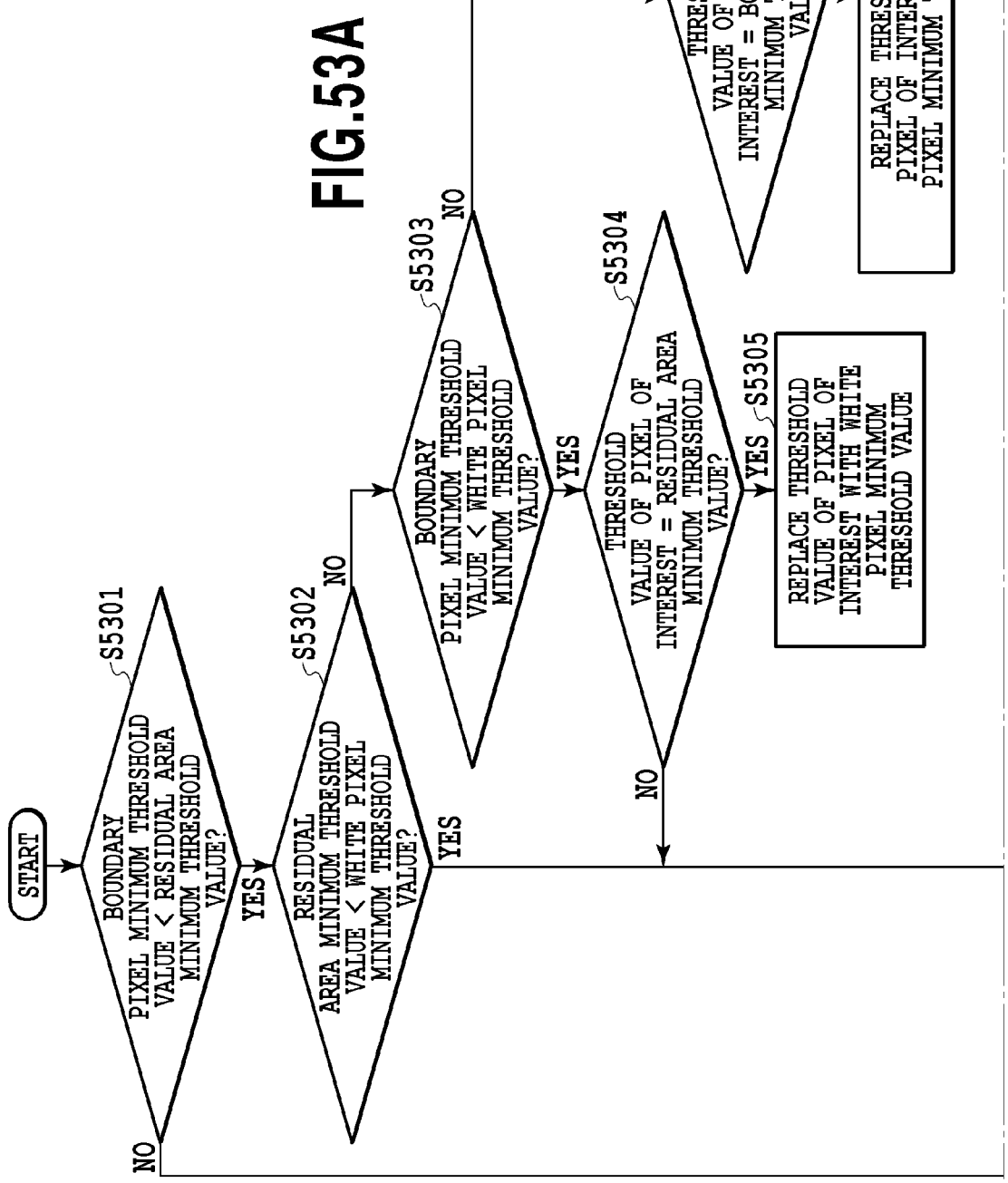

| e | f | g | e | f | g |
|---|---|---|---|---|---|
| d | a | h | d | a | h |
| c | b | i | c | b | i |
| e | f | g | e | f | g |
| d | a | h | d | a | h |
| c | b | i | c | b | i |

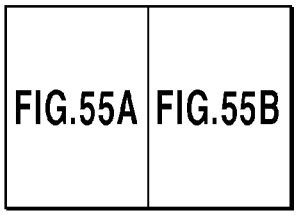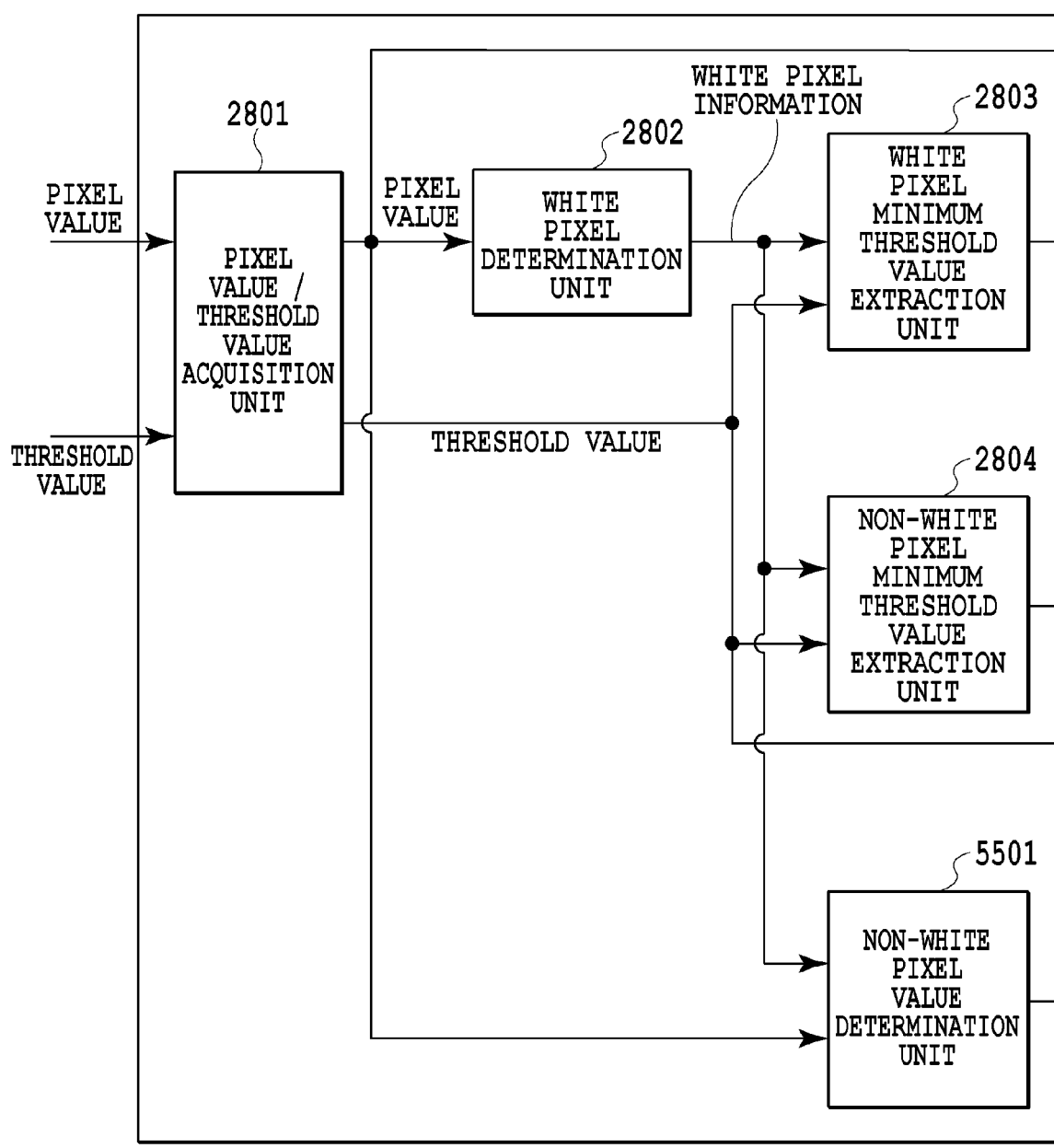
FIG.55A

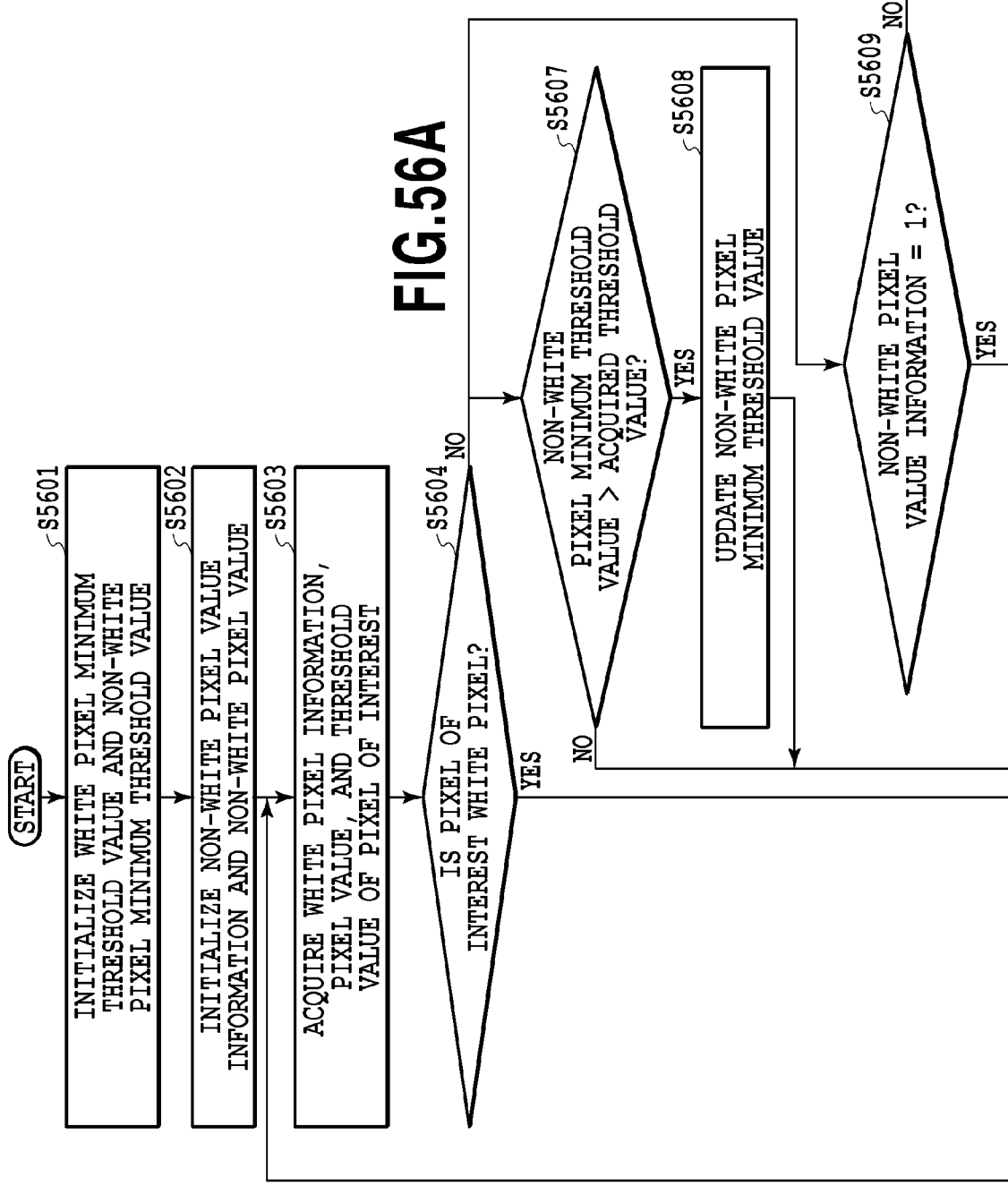

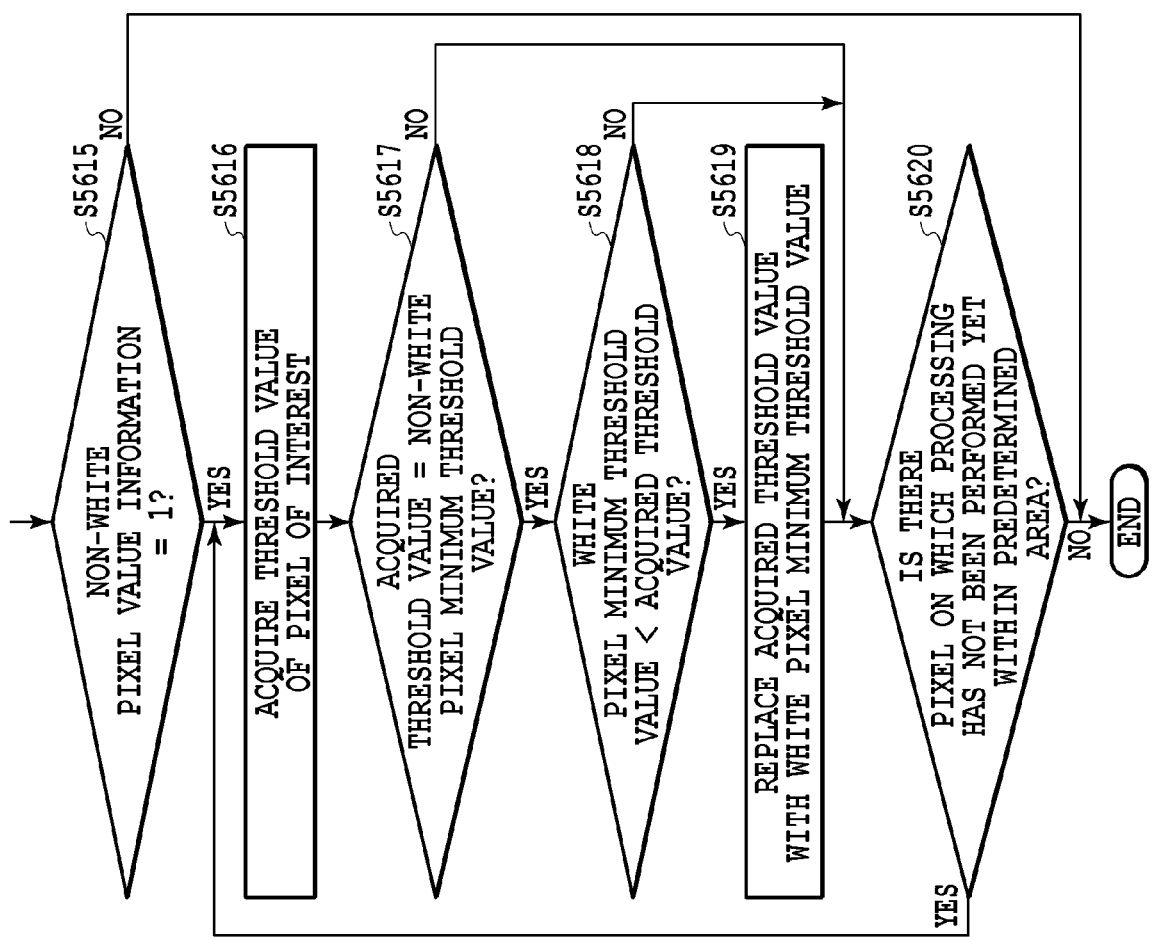

(12) United States Patent
US 10,043,118 B2

IMAGE PROCESSING APPARATUS, IMAGE PROCESSING METHOD, PRINTING MEDIUM AND STORAGE MEDIUM

BACKGROUND OF THE INVENTION

Field of the Invention

The present invention relates to an image processing technique to perform halftone processing on an input image by using a threshold value matrix.

Description of the Related Art

Conventionally, there has been such a problem that, in the case where a thin line whose color is bright is output by using a printing apparatus, the thin line is output in a broken state. In the case of an ink jet printer, by separating colors of an input image and performing halftone processing, a dot image indicating whether or not a dot of a color material (ink) is printed is generated. Ink is ejected from print nozzles based on the dot image and thus an image is formed. Such a printer uses area coverage modulation that represents gradation in a pseudo manner by the number of dots of ink printed in a unit area on a sheet instead of representing gradation by one dot. Then, the number of dots to be printed is determined by the halftone processing and in the case where one color ink is considered, generally, a small number of dots will result in a bright sheet (density is low) and a large number of dots will result in a dark sheet (density is high).

In the case of the dot image that represents an image by using the above-described pseudo gradation, a thin line whose color is bright is represented by a tone level with a small number of dots as a result. Because of this, the number of blanks between dots increases, and therefore, there is such a problem that the line seems to be broken to the human eye.

The general method of halftone processing is roughly divided into the error diffusion method and the dither method, and the dither method is more likely to bring about a problem of such breaks of a line. FIG. 1 shows an example in which a thin line is subjected to processing using the error diffusion method (ED) and the dither method, respectively. In FIG. 1, a thin line 10 is a thin line obtained by applying the error diffusion method and a thin line 11 is a thin line obtained by applying the dither method by using a threshold value matrix caused to have blue noise characteristics. Both the thin line 10 and the thin line 11 are obtained by performing the processing on the same input image and the number of dots in the output results is also substantially the same. However, breaks of the thin line 10 in which the dots and blanks are located substantially at uniform intervals are unlikely to be recognized, but breaks of the thin line in which dots and blanks are partially located densely and partially located sparsely are likely to be recognized. The reason is that blanks 12 appear here and there in the thin line, and therefore, there exist many areas in which dots are located sparsely.

To deal with the problem such as described above, for example, there is a technique that detects the position of a thin line within input image data and in the case where no dot is formed in the position of the thin line by the normal screen processing, changes the threshold value of the position of the thin line into a threshold value that causes a dot to be formed, and then performs the screen processing again. This technique prevents breaks of a thin line by changing the threshold value of the thin line position where no dot is formed into a threshold value that causes a dot to be formed so as to increase the number of positions where a dot is formed (Japanese Patent Laid-Open No. 2012-157998).

However, in the processing to detect the thin line that is performed in Japanese Patent Laid-Open No. 2012-157998, the analysis is performed by using pixel values of the image, and therefore, there is such a problem that the load to the system is high and that the processing takes time.

SUMMARY OF THE INVENTION

An image processing apparatus according to the present invention is an image processing apparatus that generates a halftone image by quantizing an input image and includes a holding unit configured to hold a threshold value matrix in which different threshold values are arrayed, a pixel position determination unit configured to determine a candidate of a pixel position whose threshold value is rewritten based on each pixel value of a plurality of pixels included in a predetermine area for the predetermined area in the input image, and a threshold value determination unit configured to determine a threshold value of the position of the pixel determined to be the candidate by using at least one threshold value of the plurality of threshold values corresponding to the predetermined area.

Further features of the present invention will become apparent from the following description of exemplary embodiments (with reference to the attached drawings).

BRIEF DESCRIPTION OF THE DRAWINGS

FIGS. 8A and 8B are diagrams explaining the way new threshold values of a threshold value matrix are determined.

FIG. 12 is a function block diagram showing a configuration for implementing three-valued quantization processing;

FIG. 22 is a diagram explaining how to create a threshold value matrix by using a sub matrix;

FIGS. 23A and 23B are diagrams explaining the reason that unevenness occurs in an increase in density;

FIGS. 39A and 39B are graphs each representing an example of input/output characteristics of an LUT that is referred to by a coefficient determination unit according to the twelfth embodiment;

FIG. 54 is a diagram showing a relationship between a predetermined area of an input image and a threshold value matrix;

DESCRIPTION OF THE EMBODIMENTS

Hereinafter, embodiments for embodying the present invention are explained by using the drawings. Configurations shown in the following embodiments are just examples and the present invention is not limited to the embodiments shown schematically.

[First Embodiment]

Figure 2:
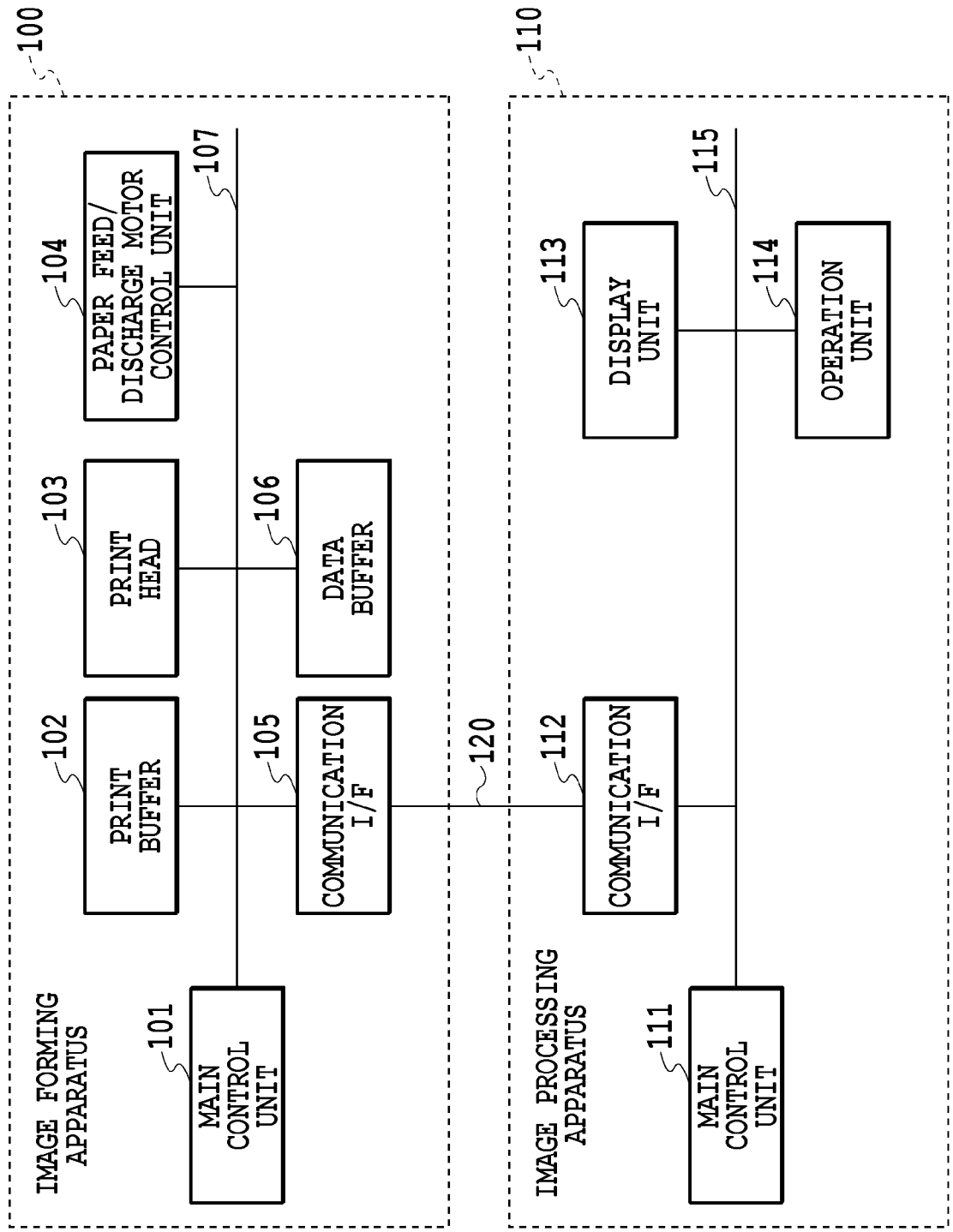
FIG. 2 is a diagram showing an example of a printing system configuration.

FIG. 2 is a diagram showing an example of a printing system configuration that can be applied to the present embodiment. The printing system in the present embodiment includes an image forming apparatus 100 adopting the ink jet printing system and an image forming apparatus 110. The image forming apparatus 100 and the image forming apparatus 110 are connected by a signal line 120 and as the signal line, it is possible to use, for example, a Centronics printer cable.

First, the image forming apparatus 100 is explained.

The image forming apparatus 100 includes a main control unit 101, a print buffer 102, a print head 103, a paper feed/discharge motor control unit 104, a communication I/F 105, and a data buffer 106.

The main control unit 101 includes a CPU (MPU), a ROM, a RAM, etc., and controls the whole of the image forming apparatus 100.

The print buffer 102 stores image data before being transferred to the print head 103 as raster data.

The print head 103 is a print head adopting the ink jet system, having a plurality of print elements capable of ejecting ink droplets, and ejects ink from each print element in accordance with image data stored in the print buffer 102.

The paper feed/discharge motor control unit 104 conveys a printing medium, such as paper, and controls paper feed/discharge.

The communication I/F 105 is an interface for transmitting and receiving data signals to and from the image processing apparatus 110.

The data buffer 106 is a buffer for temporarily storing image data received from the image processing apparatus 110.

A system bus 107 is a bus that connects each unit within the image forming apparatus 100.

Next, the image processing apparatus 100 is explained.

A main control unit 111 includes a CPU (MPU), a ROM, a RAM, etc., and controls the whole of the image processing apparatus 110.

A communication I/F 112 is an interface for transmitting and receiving data signals to and from the image forming apparatus 100.

A display unit 113 is, for example, a CRT and displays various pieces of information to a user.

An operation unit 114 is, for example, a keyboard, a mouse, or the like, and a user uses this to perform various operations.

A system bus 115 is a bus that connects each unit within the image processing apparatus 110.

Figure 3:
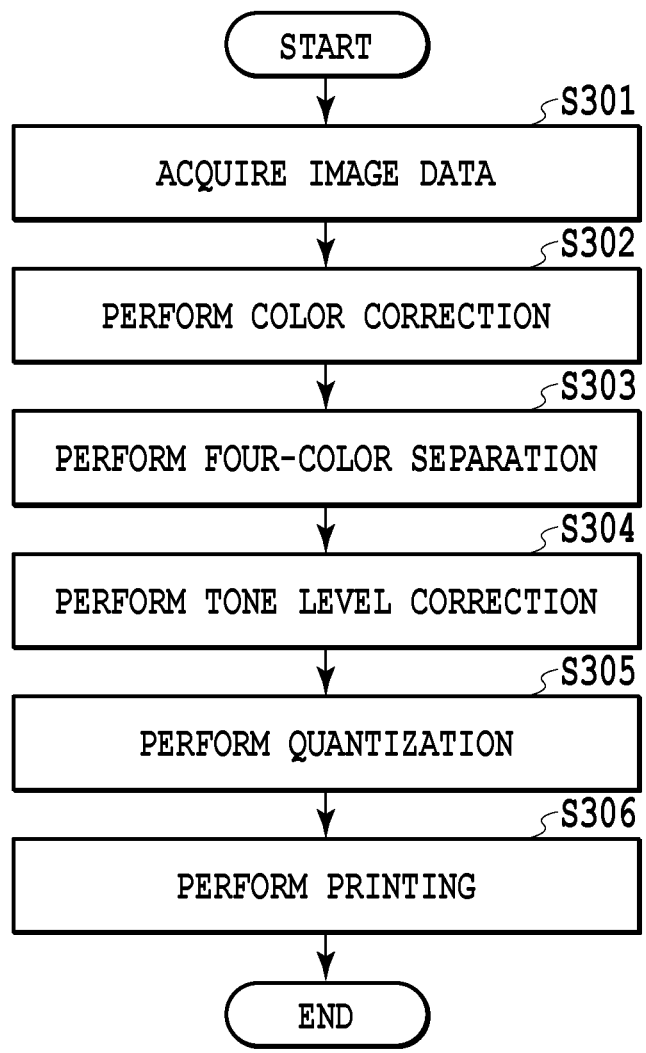
FIG. 3 is a flowchart showing an outline flow from acquisition of image data to printing processing in a printing system according to a first embodiment.

FIG. 3 is a flowchart showing an outline flow from acquisition of image data to printing processing in a printing system according to the present embodiment.

At step 301, image data on which printing processing is to be performed is acquired. Image data specified by a user is developed onto a memory via an application or the like. It is assumed that image data in the present embodiment is held in an 8-bit data format that is represented by R (red), G (green), and B (blue).

At step 302, color correction is performed. In color correction, an acquired RGB image is corrected and transformed into image data of device RGB (8-bit), which is a color space inherent in the image forming apparatus. For example, this transformation is carried out by a method, such as by referring to a lookup table (LUT) stored in advance in the memory.

At step 303, four-color separation is performed. In four-color separation, the RGB data after transformation is separated into 8-bit image data represented by four colors of C (cyan), M (magenta), Y (yellow), and K (black). Due to this, images for the four colors are generated. Like the color correction, the four-color separation is performed by a method, such as by using a lookup table (LUT) stored in advance in the memory. In the case where the input image acquired at step 301 is CMYK image data, the processing at each of step 302 and step 303 described above is skipped.

At step 304, tone level correction is performed for the CMYK image data. In the case where color material dots are formed on the paper surface by application, printing, or the like, generally, an increase in the number of dots will increase the density. However, the change in density, luminance, and saturation for the number of dots and the amount of color material is not fixed. Because of this, in the tone level correction, the correction is performed so that the relationship between the density value in the CMYK image data after the color separation, and the density, luminance, and saturation on the paper surface becomes substantially linear. The tone level correction is performed by using a one-dimensional LUT or the like for the density value for each plane of CMYK, which is stored in advance in the memory.

At step 305, quantization processing is performed on the CMYK image data for which the tone level correction has been performed and thus a halftone image is generated. Details of the quantization processing will be described later. The quantization level may be a binary or multivalued (two or more values) level. Here, in the case where the quantization level is a multivalued level, the data is further developed into binary data by performing index development. It is possible to perform the index development by using an already-known technique and, for example, it is sufficient to determine dot arrangement (binary, i.e., a dot is printed or not) based on the quantization level by storing in advance dot arrangement in accordance with the quantization level as a table. In this manner, the data is transformed into halftone image (binary image) data for each color, which a print head can print.

At step 306, printing processing is performed by using the binary image data obtained by the quantization processing. In the case of the ink jet printing system of the present embodiment, ink is ejected onto the paper surface in accordance with the coordinates of the on-dot in the image after the quantization and dots are formed.

The above is the outline flow from the acquisition of image data to the printing processing.

The processes at respective steps (except for step 306) described above are not divided definitely in particular, such as that the image processing apparatus 110 performs the processes up to a certain process and the image processing apparatus 100 performs the subsequent processes. For example, in the case where the image processing apparatus 110 performs the processes up to the quantization inclusive, it is sufficient for the image processing apparatus 110 to transfer the binary image data after the quantization to the image forming apparatus 100, and for the main control unit 101 of the image forming apparatus 100 to perform the index development by using an index pattern stored in the data buffer 106 and control printing. Further, depending on the performance of the image forming apparatus 100, it is also possible to directly receive multivalued RGB and to perform all the processes up to that at step 306 inclusive.

The number of bits of the image data that is handled at each step is not limited to 8 bits and, for example, it may also be possible to perform a setting so that the number of bits at the time of output is larger than that at the time of input in order to maintain accuracy. Further, the number of colors of the image forming apparatus is set to four, i.e., C, M, Y, and K, but it may also be possible to include spot colors, such as LC (light cyan), LM (light magenta), and further, G (green) and Gy (gray), and it is needless to say that the processing is performed by using the number of planes corresponding to the number of colors in this case.

(Quantization Processing)

Figure 4:
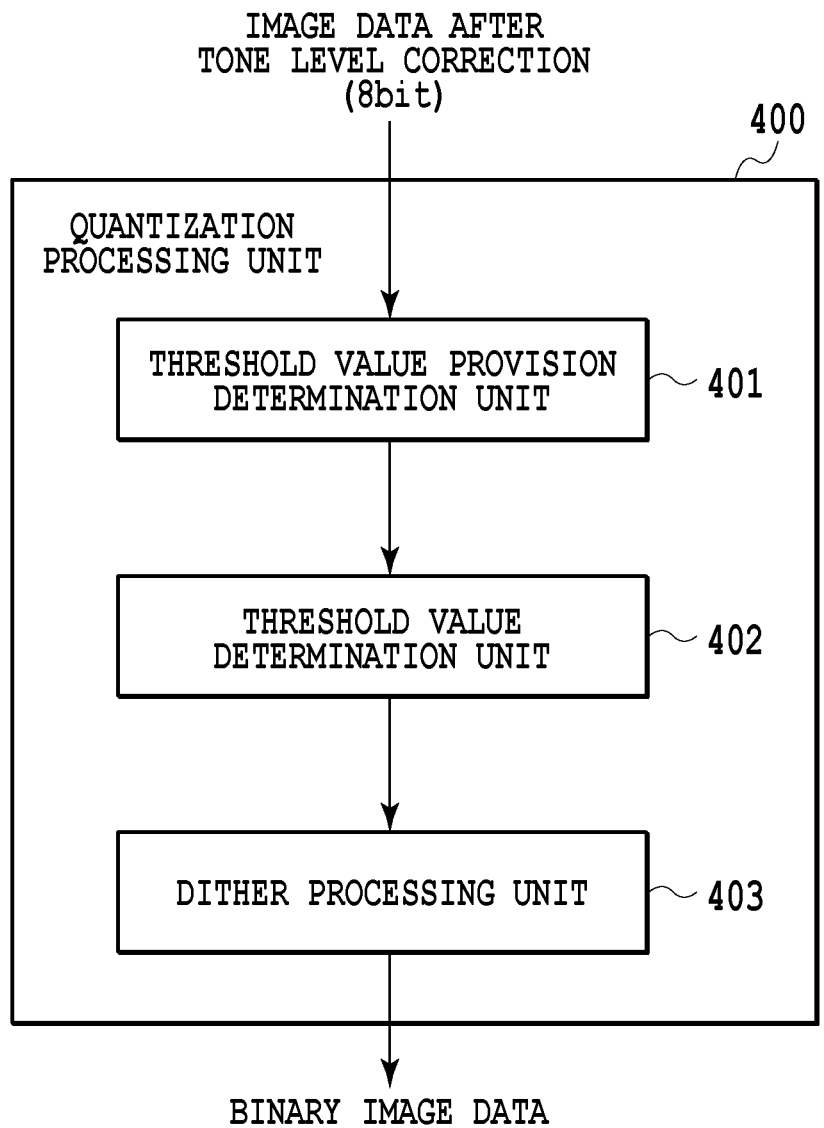
FIG. 4 is a block diagram showing an internal configuration of a quantization processing unit.
Figure 5:
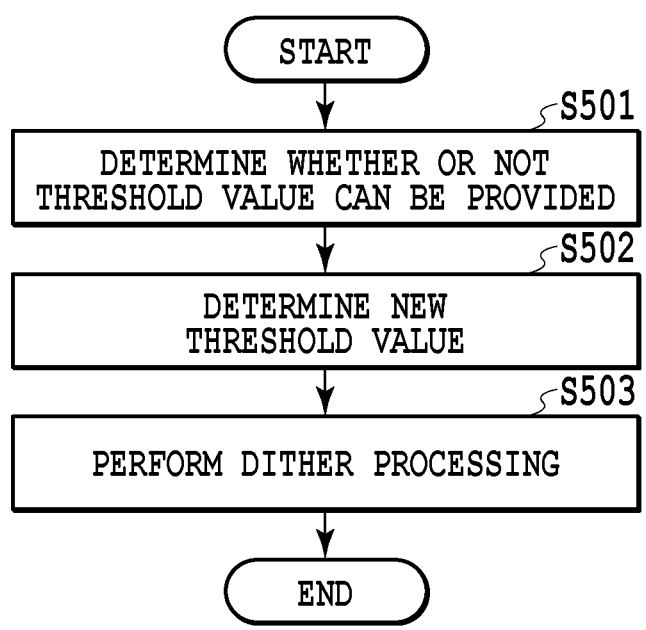
FIG. 5 is a flowchart showing a flow of quantization processing according to the first embodiment.

Following the above, the quantization processing at step 305 described above is explained in detail by with reference to FIG. 4 and FIG. 5. FIG. 4 is a block diagram showing an internal configuration of a quantization processing unit 400 as a function unit included in the image processing apparatus 110 (or the image forming apparatus 100). The quantization processing unit 400 includes a threshold value provision determination unit 401, a threshold value determination unit 402, and a dither processing unit 403. FIG. 5 is a flowchart showing a flow of the quantization processing in the quantization processing unit 400. The series of processing is performed by the CPU executing computer-executable programs in which the procedures shown below are described after reading the programs from the ROM or the like onto the RAM.

In the present embodiment, the dither processing unit 403 quantizes the pixel value of each pixel constituting an input image by using a threshold value matrix. A threshold value matrix in which various threshold values are arranged in advance is held. However, the threshold value determination unit 402 changes part of threshold values in the threshold value matrix based on the pixel values of the input image and the threshold values of the threshold value matrix. In particular, the threshold value of a pixel position, which is allocated by the threshold value matrix set in advance, is changed into the threshold value allocated to another pixel position within a predetermined area. In the following, details of this are explained.

Figure 6A:
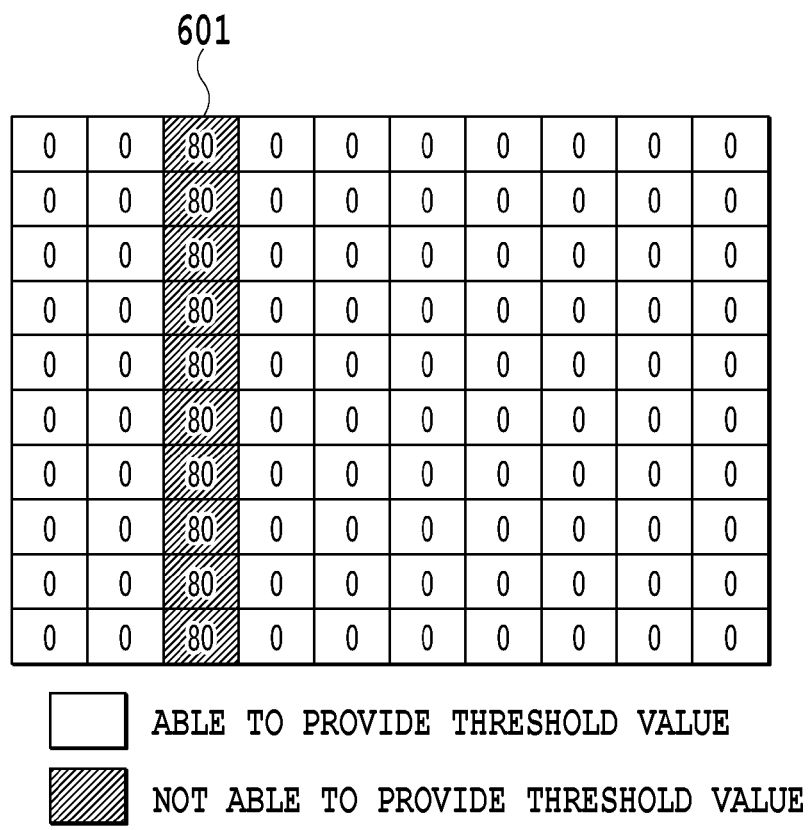
FIGS. 6A and 6B are diagrams showing an example of the results of threshold value provision possibility/impossibility determination processing according to the first embodiment.
Figure 6B:
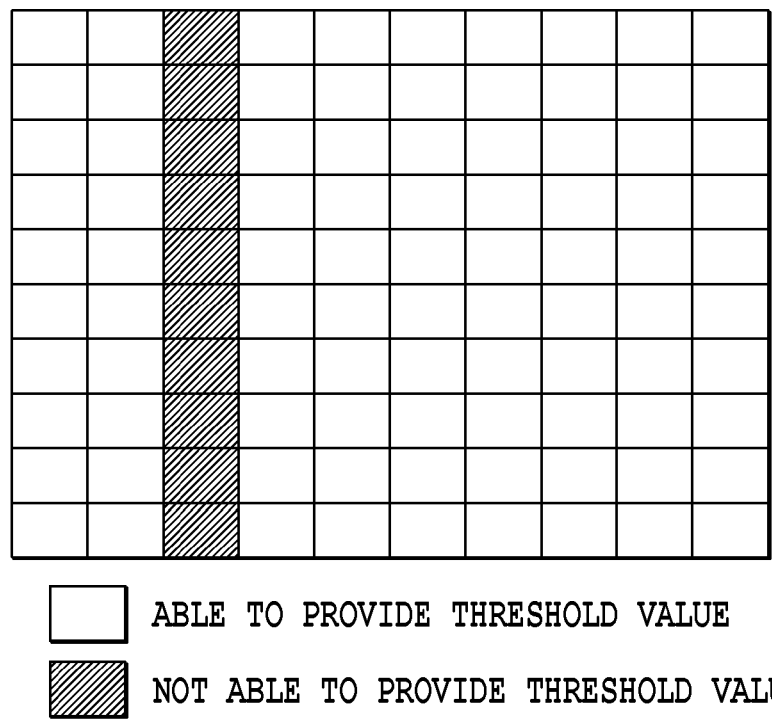

At step 501, the threshold value provision determination unit 401 performs processing (hereinafter, threshold value provision possibility/impossibility determination processing) to determine whether each pixel in the image data (hereinafter, input image) after the tone level correction, which is input from a tone level correction unit, not shown, can provide the threshold value that is allocated to the position to another pixel. In the present embodiment, each pixel of the input image has any of values between 0 and 255. It is assumed that a white pixel (pixel whose value is 0) is determined to be a pixel that can provide a threshold value and a non-white pixel (pixel whose value is other than 0) is determined to be a pixel that cannot provided a threshold value among the pixels constituting the input image. This means that any white pixel can provide the allocated threshold value to another pixel position regardless of the magnitude of the threshold value. FIGS. 6A and 6B are diagrams showing an example of the results of the threshold value provision possibility/impossibility determination processing according to the present embodiment. FIG. 6A shows part of a K-plane image of the CMYK image after the tone level correction as the input image and there exists a thin line 601 including pixels whose density value is 80 and having a width of one pixel. FIG. 6B shows the results of the threshold value provision possibility/impossibility determination for the input image in FIG. 6A and each cell corresponds to the same position of each pixel of the input image. In FIG. 6B, each white cell indicates that it is determined that a threshold value corresponding to the pixel position can be provided and each gray cell indicates that it is determined that a threshold value corresponding to the pixel position cannot be provided.

Here, it is assumed that a threshold value can be provided in the case where the pixel value is 0, but it may also be possible to determine that a threshold value can be provided in the case where, for example, the pixel value is equal to or less than a predetermined value. For example, in the case where the minimum value of the threshold values in the threshold value matrix is 10, even on a condition that a pixel whose pixel value is equal to or less than 10 is determined to be a pixel that can provide a threshold value, it is possible to obtain the same effect.

The determination of threshold value provision possibility/impossibility such as this is performed sequentially for all the pixels within the input image by performing the processing in the order, for example, from the pixel in the top-left corner of the input image to the rightward pixels in the same row and after the processing is completed for the row, then, performing the processing from the leftmost pixel in the next row to the rightmost pixel, and so on. In this case, it may be possible to appropriately perform a setting so that the processing is performed for each predetermined band, for each predetermined area, etc., and the processing is performed in a certain order.

In the present embodiment, in order to simplify explanation, explanation of each plane of C, M, and Y is omitted.

Explanation is returned to the flowchart in FIG. 5.

At step 502, the threshold value determination unit 402 performs processing (new threshold value determination processing) to determine a threshold value that is used for quantization of each pixel for each predetermined processing area based on the results of the threshold value provision possibility/impossibility determination processing at step 501 by using threshold values in an initial threshold value matrix set in advance. Each threshold value in the threshold value matrix is used so as to correspond to each pixel constituting the input image. In the case where the threshold value matrix is smaller than the input image, the threshold value matrixes are arranged so as to correspond to each tile included in the input image. At step 502, part of the threshold values corresponding to each pixel are set to new values based on the positions of the pixels determined to be a pixel that can provide a threshold value and the pixel value of each pixel.

Figure 7:
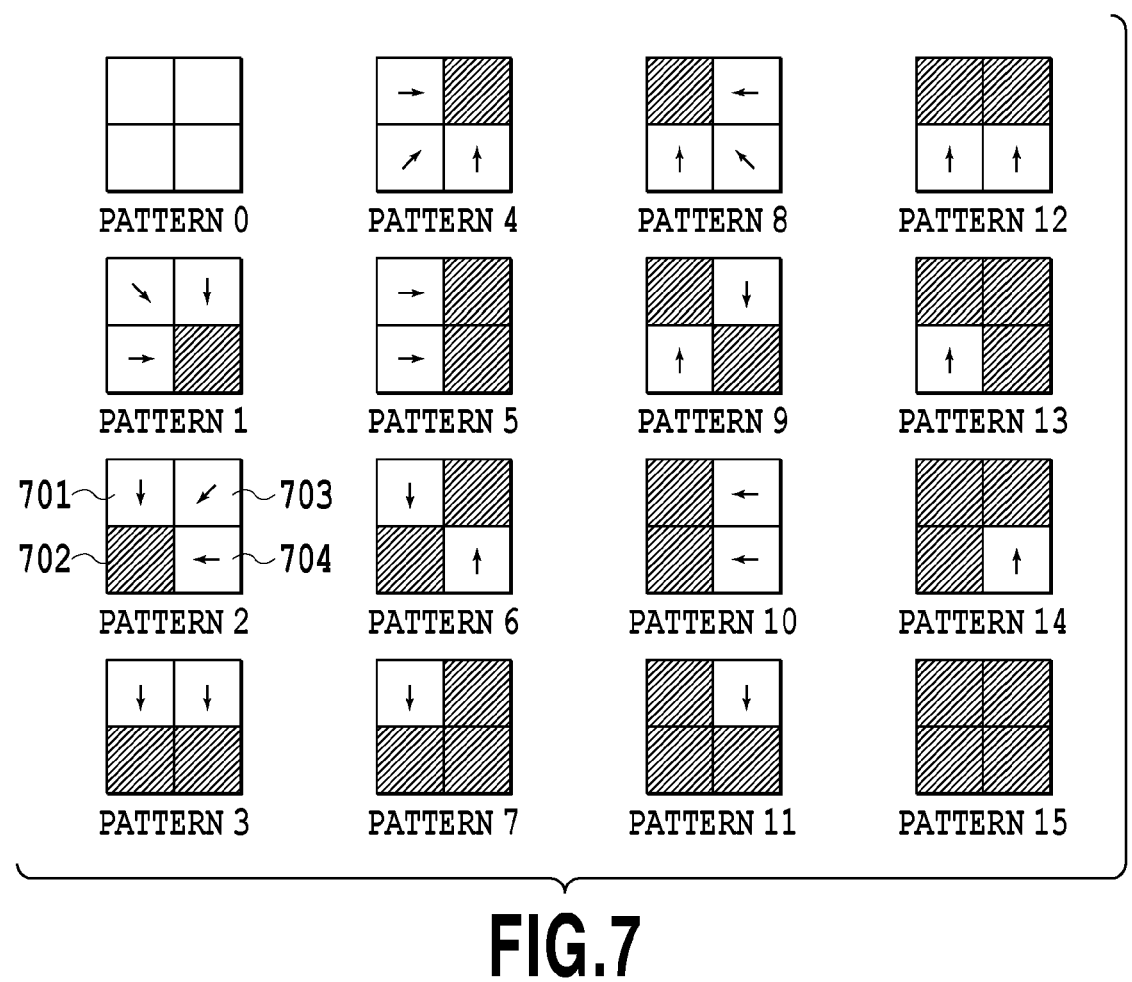
FIG. 7 is a diagram showing an example of reference patterns indicating the relationship between a provider and a receiver, which are used at the time of determining a new threshold value.

FIG. 7 shows an example of reference patterns representing a relationship between a provider and a receiver, which are used at the time of the determination of a threshold value of each pixel in the case where a predetermined processing area is taken to be a square area of 2×2 pixels. In the case where the processing area is taken to be a square area of 2×2 pixels, there exist 16 reference patterns (in FIG. 7, shown as patterns 0 to 15). The white cell in each pattern indicates a pixel determined to be a pixel that can provide a threshold value and the gray cell indicates a pixel determined to be a pixel that cannot provide a threshold value. Further, the arrow within each pattern indicates the direction in which a threshold value is provided. For example, in the case of pattern 2, a downward arrow exists in a top-left pixel 701. This means that, in the case where the threshold value of the top-left pixel 701 is smaller than the threshold value of a bottom-left pixel 702 (pixel of interest) represented in gray, the threshold value of the top-left pixel 701 is provided as a new threshold value of the bottom-left pixel 702 (the top-left pixel 701 becomes the reference pixel of the bottom-left pixel 702). In the case of pattern 2, arrows in a top-right pixel 703 and in a bottom-right pixel 704 also point at the bottom-left pixel 702, and therefore, the threshold values of these pixels may also be provided as a new threshold value of the bottom-left pixel 702, which is the pixel of interest. In the case where there is a plurality of reference pixels as in pattern 2, the minimum threshold value of the threshold values of all the reference pixels will be the new threshold value of the pixel of interest. In the case where the threshold value of the pixel of interest is smaller than the minimum threshold value in the reference pixel, it is not necessary to change the threshold value, and therefore, the threshold value remains the same without being changed into a new value.

There is no arrow in pattern 0 and pattern 15 among all the 16 patterns shown in FIG. 7. The case of pattern 15 means that the pixel values of all the four pixels are 1 or greater and a pixel that can provide a threshold value does not exist within the processing area of 2×2 pixels, and therefore, referring to the threshold value and changing into a new threshold value are not performed. The case of pattern 0 means that all the pixels are pixels that can provide a threshold value and a pixel (whose pixel value is 1 or greater) that receives a threshold value does not exist within the processing area of 2×2 pixels, and therefore, referring to the threshold value and changing into a new threshold value are not performed. The patterns shown in FIG. 7 are just an example and the number of patterns and the directions of arrows are not limited to those in FIG. 7.

FIGS. 8A and 8B are diagrams explaining the way new threshold values of a threshold value matrix are determined by the reference patterns shown in FIG. 7 based on the threshold value provision possibility/impossibility determination results shown in FIG. 6B. FIG. 8A shows an initial threshold value matrix prepared in advance and a threshold value is associated with each pixel. FIG. 8B shows a threshold value matrix after part of threshold values are changed into new threshold values by the new threshold value determination processing. In FIG. 8A, an area 801 surrounded by a thick line is a square area of 2×2 pixels, which is the unit of processing, and in this case, the square area corresponds to pattern 10 in FIG. 7. Then, in pattern 10, in the case where the top-left pixel is the pixel of interest, the top-right pixel is the reference pixel, and in the case where the bottom-left pixel is the pixel of interest, the bottom-right pixel is the reference pixel. As a result of this, among the threshold values within the square area 801, the threshold value of the top-left pixel is changed from 248 into 79. The threshold value of the bottom-left pixel, which is 134, is smaller than 189, which is the threshold value of the bottom-right pixel, and therefore, the threshold value is not changed. As a result of repeating the processing such as this for each predetermined processing area (here, the square area of 2×2 pixels), a new threshold value matrix as shown in FIG. 8B is obtained. From the threshold values in the third column corresponding to the thin line portion in FIG. 8B, it is known that part of the threshold values are changed in accordance with pattern 10 as follows.

Before change: "55, 12, 248, 134, 84, 164, 98, 23, 133, 228"

After change: "55, 12, 79, 134, 7, 164, 98, 23, 106, 0"

In this manner, the threshold value of the pixel (reference pixel) determined to be a pixel that can provide a threshold value is determined to be a new threshold value in the pixel of interest.

Explanation is returned to the flowchart in FIG. 5.

Figure 9:
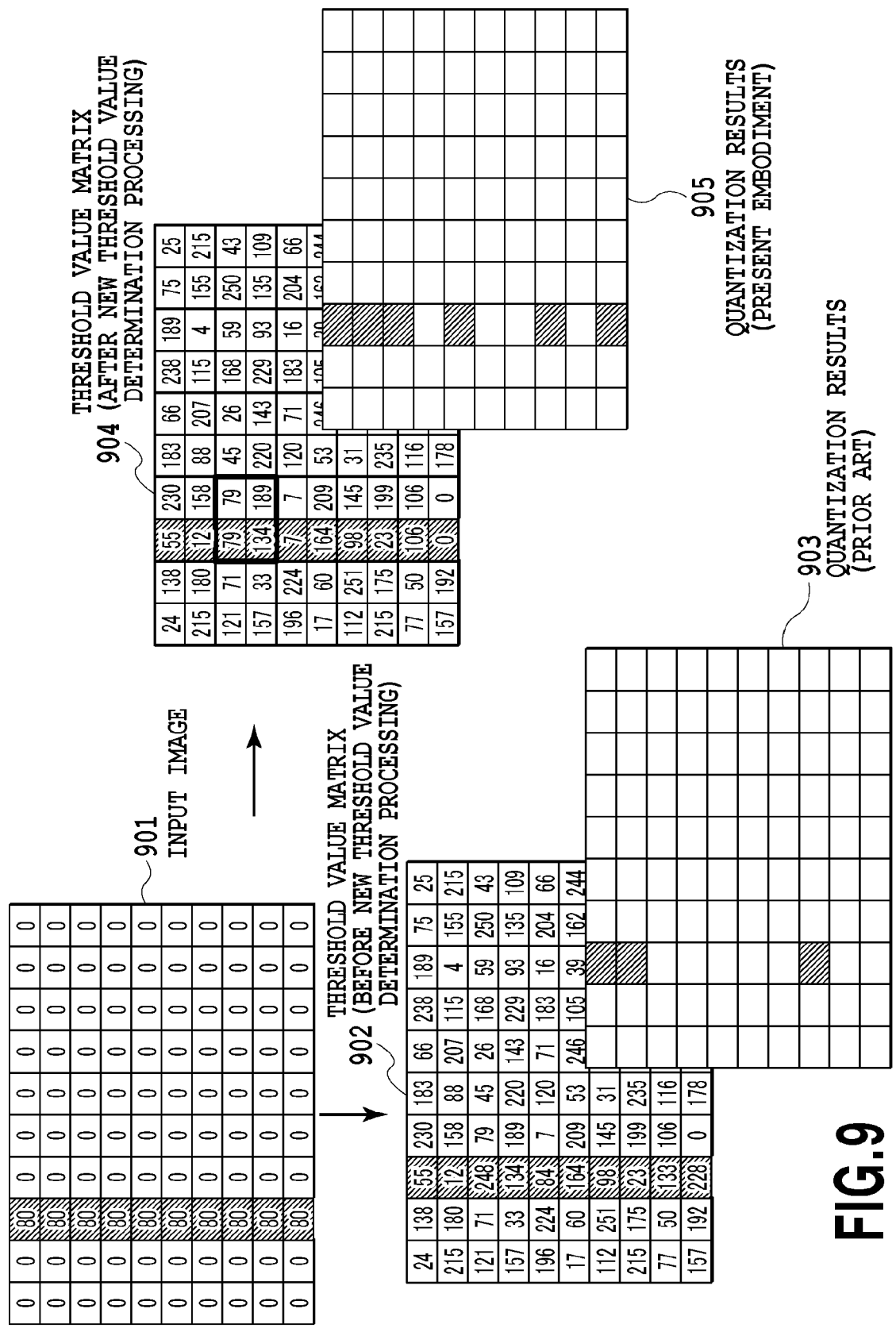
FIG. 9 is a diagram showing an example of the quantization results obtained by applying the first embodiment in comparison with the quantization results obtained by the prior art.

At step 503, the dither processing unit 403 performs halftone processing based on the dither method by using the threshold value matrix in which the new threshold values determined by the new threshold value determination processing are reflected. In the dither method (in the case of binary), the pixel value of each pixel of the input image is compared with each corresponding threshold value of the threshold value matrix. In the case where the pixel value of the pixel exceeds the threshold value, the dot is an on-dot (the dot is formed) and in the case where the pixel value of the pixel does not exceed the threshold value, the dot is an off-dot (the dot is not formed). FIG. 9 is a diagram showing an example of the quantization results obtained by applying the present embodiment in comparison with the quantization results obtained by applying the prior art.

First, the quantization results obtained by applying the prior art are explained. In FIG. 9, an image 901 is an input image after performing the threshold value provision possibility/impossibility determination processing and the white pixel (pixel whose value is 0) represents a pixel that can provide a threshold value and the gray pixel (pixel whose value is 80) represents a pixel that cannot provide a threshold value. A threshold value matrix 902 is an initial threshold value matrix prepared in advance and left as it is, i.e., on which the new threshold value determination processing has not been performed (see FIG. 8A), and each threshold value is allocated to each cell whose coordinates correspond to the same coordinates of each pixel in the input image 901. Then, quantization results 903 show the results obtained by performing the dither processing on the input image 901 by using the threshold value matrix 902 and the portion of the pixel whose threshold value corresponds to a threshold value smaller than the pixel value 80 is shown in gray, indicating the on-dot. From the quantization results 903, it is known that a large blank (break of the line) is produced in the thin line portion where there is no break in the input image 901. This line with a large blank is unlikely to be recognized as a line by the human eye, and therefore, may be problematic. In particular, in the case where a portion that should be originally continuous as in an electric circuit diagram seems to be a break of a line, a serious problem will be brought about.

Next, the quantization results obtained by applying the present embodiment are explained. In FIG. 9, a threshold value matrix 904 is a threshold value matrix after part of the threshold values of the threshold value matrix set in advance are changed by the above-described new threshold value determination processing (see FIG. 8B). Then, quantization results 905 show the results obtained by performing the dither processing on the input image 901 by using the threshold value matrix 904 and the portion of the pixel whose threshold value corresponds to a threshold value smaller than the pixel value 80 is shown in gray, indicating the on-dot. In comparison with the quantization results 903 according to the prior art, the number of on-dots increased by three and a large blank is not produced.

As a result of this, it is possible to implement printed matter characterized in that the dot reproduction probability of a second pixel whose pixel value in the input image data is the same as that of a first pixel and which is surrounded by blanks is higher than that of the first pixel surrounded by pixels that are not blanks. In other words, it is known that the effect of improving reproducibility of a thin line is obtained by applying the present embodiment. As described above, according to the present embodiment, it is possible to increase the number of on-dots by utilizing the threshold value of another pixel and to reduce breaks of a thin line.

Further, according to the present embodiment, it is possible to recognize features that 1) the effect for a bright portion is significant, 2) the influence on the inner area of such as a square is slight, 3) the shape of an original image is easy to maintain, and 4) the characteristics of a threshold value matrix are not disturbed from a macroscopic standpoint, in addition to the feature that breaks of a thin line are reduced. Hereinafter, detailed explanation is given.

(Effect for Bright Portion is Significant)

Figure 10:
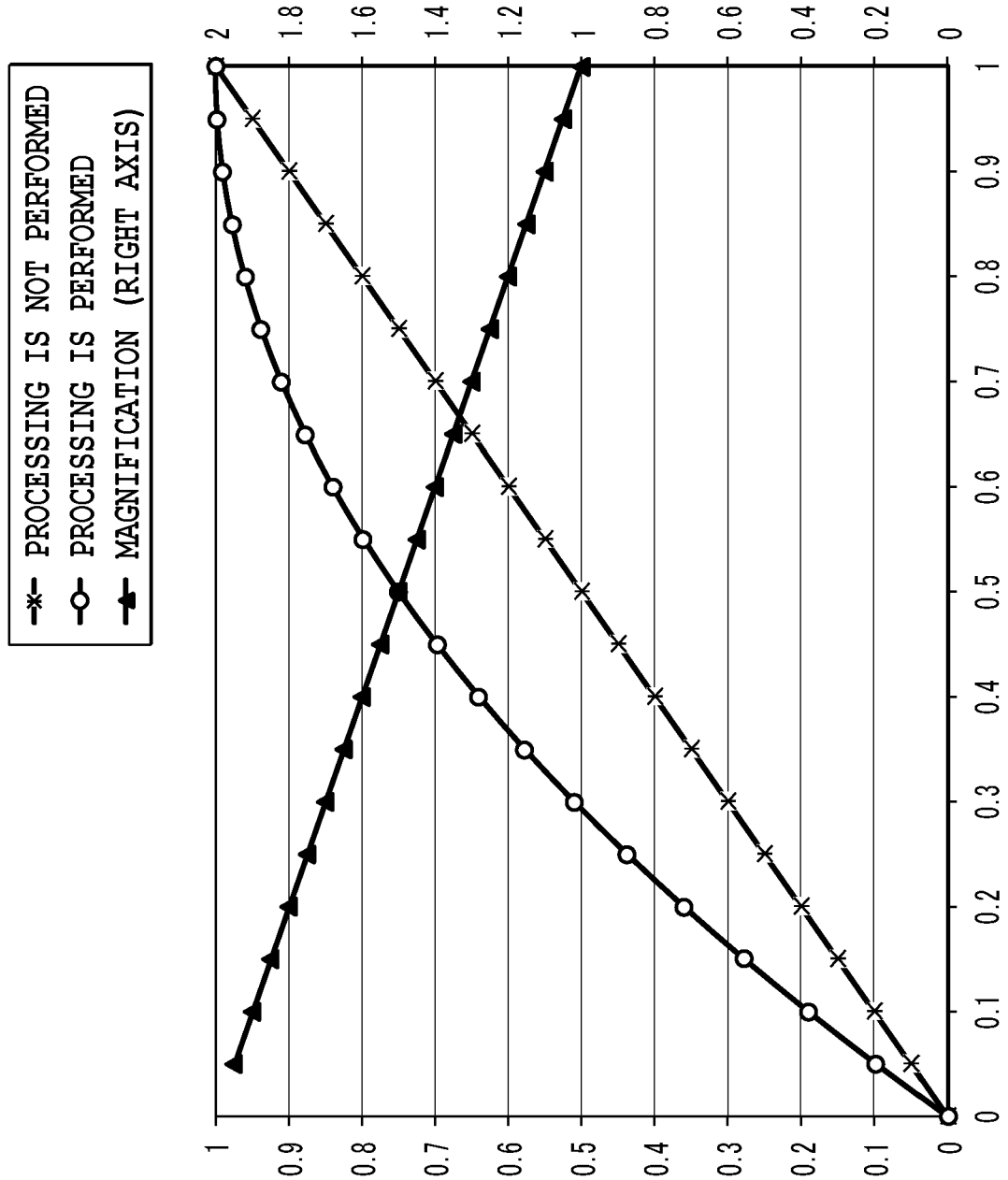
FIG. 10 is a graph representing a comparison between the number of dots that are formed in the case where the present embodiment is applied and that in the case where the present embodiment is not applied.

FIG. 10 is a graph representing a comparison of the number of dots that are formed by printing an input image in which a thin line having a width of one pixel is drawn using only a black color material between the case where the present embodiment is applied (processing is performed) and the case where the present embodiment is not applied (processing is not performed). In FIG. 10, the horizontal axis of the graph represents the tone level and the leftmost end (0) corresponds to white and the rightmost end (1) corresponds to black. The vertical axis on the left side represents the number of black ink dots and [1] indicates the maximum number of dots in the image forming apparatus that has performed printing. Then, the vertical axis on the right side represents the magnification and indicates a ratio of the number of dots in the case where the "processing is performed (○ mark)" to the number of dots in the case where the "processing is not performed (* mark)" (magnification=number in the case where the processing is performed÷number in the case where the processing is not performed). From the magnification (black triangular mark, right axis), it is known that the magnification becomes higher as the tone level comes closer to white and becomes lower as the tone level comes closer to black and eventually converges to "1". This indicates that the effect of preventing breaks of dots is more significant for a brighter thin line (having a lower density) and the influence of the processing is slighter on a darker thin line (having a higher density). The higher the density, the greater the pixel value is, and therefore, the probability that the threshold value will be exceeded increases. In other words, the number of pixels in which a dot is formed is originally large in the portion whose density is high even in the case where threshold values are not provided from adjacent pixels. The pixel having a possibility of stochastically increasing the number of dots in the case where the present embodiment is applied is the pixel in which a dot is not formed in the case where the "processing is not performed". In the area closer to black (density is higher), the number of pixels in which a dot is not formed is small, and therefore, it can be said that the increase in the number of dots due to the application of the present embodiment is small. In a dark (dense) thin line belonging to the side closer to black, breaks are less originally and it is not necessary to increase the number of dots, and therefore, it is preferable for the influence of the application of the present embodiment to be slight.

(Influence on Inner Area of Such as Square is Slight)

Figure 11A:
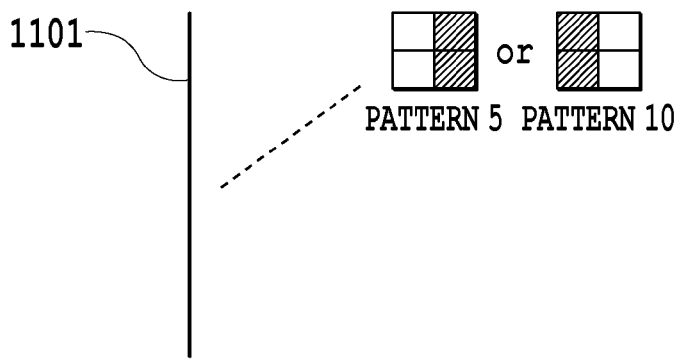
FIGS. 11A and 11B are diagrams explaining influences on a thin line and a square.
Figure 11B:
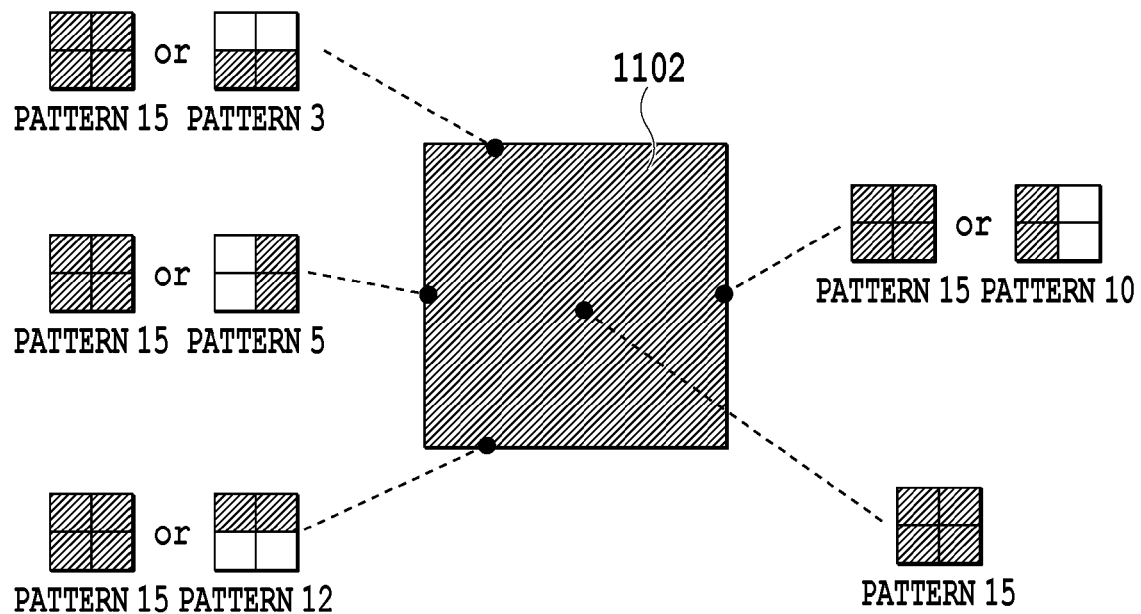

FIGS. 11A and 11B are diagrams explaining the influence on a thin line and a square in the case where the present embodiment is applied. In FIGS. 11A and 11B, it is assumed that both a thin line 1101 having a width of one pixel and a square 1102 are images drawn in pale gray such as R, G, B=192, 192, 192. Among the 16 patterns shown in FIG. 7, patterns 1 to 14 are patterns whose density may increase stochastically by being provided with a threshold value from a pixel (white pixel portion in FIG. 7) that can provide a threshold value within the area. With reference to FIG. 11A, the thin line 1101 corresponds to either pattern 5 or pattern 10 except for the end parts of the thin line. These patterns include a pixel that can provide a threshold value, and therefore, the density of the thin line increases stochastically. On the other hand, in the colored square 1102 as shown in FIG. 11B, almost all the area corresponds to pattern 15. The portions corresponding to a pattern other than pattern 15 are the boundary portions of the top end portion, the bottom end portion, the left end portion, and the right end portion of the square 1102 and each of these portions corresponds to either of the two kinds of patterns as shown in FIG. 11B, respectively. The inside of the square other than the boundaries corresponds only to pattern 15, and therefore, as described above, pattern 15 has no pixel that can provide a threshold value and does not act to increase the density. In other words, the density of the inside that accounts for almost the entire area of the square does not increase. Because the length and the width of a large object are great and even in the case where several pixels are blanks, the blanks are not recognized as breaks, it is not necessary to increase the density, and therefore, it is desirable that the influence on the inner area of a square or the like be slight. This also applies to, for example, a thick line other than a large object. The reason is that the area occupied by pattern 15 is large in the case of a thick line. As described above, in the case of the present embodiment, the effect on the edge portion of a thin line or the like is significant and the influence on the inner area of a square or the like where it is not necessary to increase the density is slight, and therefore, the present embodiment is efficient.

(Shape of Original Image is Easy to Maintain)

As described above, in the present embodiment, the significant effect is obtained for a thin line having a width of one pixel. In addition, it is possible to obtain a more significant effect for a dot consisting of one pixel (isolated dot). The reason is that an isolated dot surrounded by white pixels corresponds to one of patterns 1, 2, 4, and 8 among the sixteen patterns shown in FIG. 7 and is provided with a threshold value from the surrounding three pixels adjacent to the pixel of interest, and therefore, the probability that the threshold value will be reduced is high. Then, in the case where a horizontal or vertical thin line having a width of one pixel is considered, the thin line corresponds to one of patterns 3, 5, 10, and 12 except for the end portions, and therefore, there are two pixels that can provide a threshold value in this case. In other words, in the present embodiment, in the case where a pixel surrounded by white pixels is taken to be A and a pixel around which a non-white pixel exists is taken to be B, on a condition that the pixel value of A and B is the same (the tone level is the same), the probability of dot reproduction of the A pixel is higher than that of the B pixel. Stochastically, the effect of increasing the density in the order of an isolated point, a thin line having a width of one pixel, a thin line having a width of two pixels, and so on, can be expected. As described above, in the present embodiment, for example, even for a portion consisting of isolated dots, such as hatching, the effect of increasing the density and improving the dot reproducibility of an original image, i.e., the effect that the shape of an original image is easy to maintain is obtained.

(Characteristics of Threshold Value Matrix are not Disturbed from Macroscopic Standpoint)

It is possible to cause the threshold value matrix to have characteristics and by using a threshold value matrix caused to have, for example, the publicly-known blue noise characteristics, it is possible to keep low the level of graininess at the time of achieving pseudo gradation by using the dither method. According to the present embodiment, the effect of reducing breaks of a thin line while maintaining such characteristics is obtained. Hereinafter, detailed explanation is given.

In the present embodiment, threshold values are exchanged within a square area of 2×2 pixels. In the case of a threshold value matrix with the blue noise characteristics in a printer that prints one pixel at 1,200 dpi, on a condition that the image is evaluated in units of 1,200 dpi, the blue noise characteristics are disturbed. This is because the characteristics of the threshold value matrix are disturbed by using a threshold value different from a threshold value prepared in the original position. However, in the case where the image is evaluated in units of 600 dpi by taking the 2×2 pixels at 1,200 dpi to be one pixel, the characteristics of the threshold value are maintained. This is because replacement of threshold values within the area of 2×2 pixels only increases the probability of dot formation in units of 600 dpi. In other words, in the above-described example, the influence of dot formation does not affect the units of 600 dip or higher, and therefore, the effect of reducing breaks by increasing the density of a thin line while maintaining the blue noise characteristics in units of 600 dpi is obtained as a result.

In the case where the processing area is taken to be 4×4 pixels in the above-described example, the characteristics of the threshold value matrix are maintained in units of 300 dpi as a result. The larger that processing area, the more significant the effect of increasing the density becomes, but the characteristics of the threshold value matrix are disturbed, and therefore, at the time of determining the processing area, it is necessary to take into consideration both the effect of increasing the density and the resolution at which the characteristics of the threshold value matrix are desired to be maintained. Empirically, almost favorable results may be obtained in the case where the processing area is taken to be 4×4 pixels in the threshold value matrix with the blue noise characteristics and the characteristics are maintained at 150 dpi or higher. Further, it should be noted that the characteristics of the threshold value matrix are disturbed in the case where the processing area is taken to be an area whose size is larger than that of the threshold value matrix. In the case where it is desired to maintain the characteristics of the threshold value matrix, it is desirable that the size of the processing area be smaller than the size of the threshold value matrix.

As above, the threshold value matrix with the blue noise characteristics is explained, but this also applies to a threshold value matrix with other characteristics, for example, such as the Bayer characteristics.

<First Modification Example>

In the first embodiment, the quantization that outputs two values, i.e., a dot is formed and a dot is not formed, is explained, but quantization processing to output multiple values may also be accepted. As a modification example, the case of multivalued quantization processing is explained.

The multivalued quantization processing is used for an output unit capable of producing a multivalued tone level representation and can be applied to any tone level with three or more values and here, explanation is given by using three-valued quantization processing as an example. The three values referred to here indicate three tone levels in the case where the number of dots that form one pixel is 0, 1, and 2.

Figure 13:
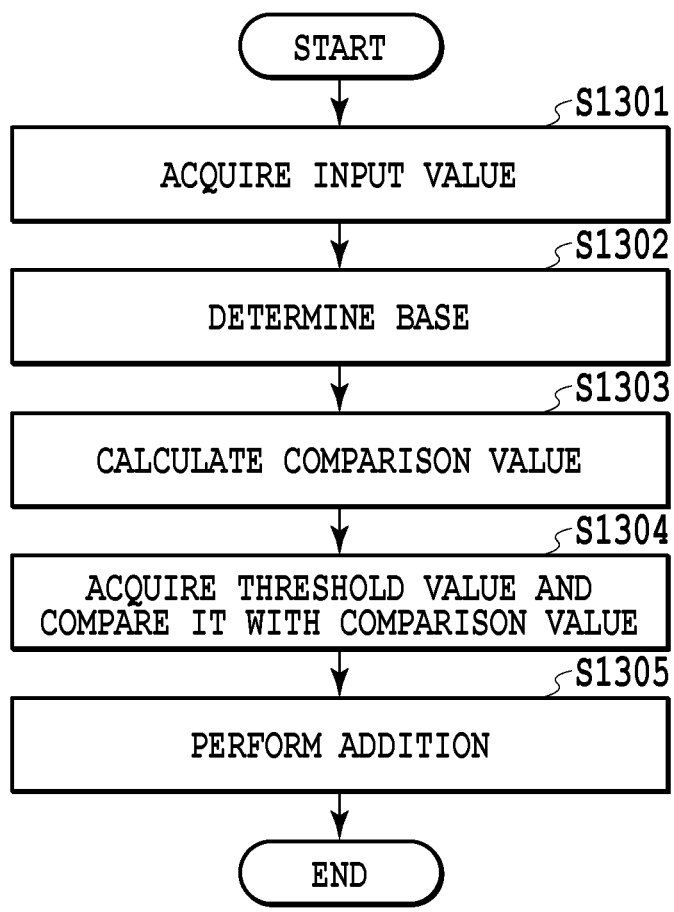
FIG. 13 is a flowchart showing a procedure of the three-valued quantization processing.

FIG. 12 is a function block diagram showing a configuration for implementing three-valued quantization processing and FIG. 13 is a flowchart showing a procedure of the three-valued quantization processing. In the following, explanation is given on the assumption that the input value is between 0 and 255, the value of the threshold value matrix is between 0 and 254, and the number of dots, which is the output value, is 0, 1, and 2, providing three tone levels.

At step 1301, a base determination unit 1201 and a comparison value calculation unit 1202 acquire an input value (a pixel value in an input image).

At step 1302, the base determination unit 1201 performs base determination based on the acquired input value. The base determination refers to determining whether the output value belongs to between zero and one dot or to between one and two dots. Specifically, the input value is compared with a value of 128, which is a reference value, and in the case where the input value is smaller, the base value is determined to be "0" and the number of base dots to be "0", and in the case where the input value is not smaller, the base value is determined to be "128" and the number of base dots to be "1". The determined base value is sent to the comparison value calculation unit 1202 and the number of base dots is sent to an addition unit 1204.

At step 1303, the comparison value calculation unit 1202 calculates a comparison value by using the acquired input value and the base value received from the base determination unit 1201. Specifically, the base value is subtracted from the input value and the value is normalized so as to have a value between 0 and 255 in accordance with the threshold value matrix. Comparison values are obtained by expressions below, respectively, depending on the base value.
In the case where the base value is 0:

comparison value=(input value−base value)/128×255.

In the case where the base value is 128:

comparison value=(input value−base value)/127×255.

At step 1304, a threshold value comparison unit 1203 acquires a threshold value corresponding to the pixel position of the input value from the threshold value matrix within the memory and compares the threshold value with the comparison value obtained at step 1303. In the case where the results of the comparison indicate that the comparison value is greater than the threshold value, "1" is output to the addition unit 1204 and in the case where the comparison value is not greater than the threshold value, "0" is output to the addition unit 1204.

At step 1305, the addition unit 1204 determines the number of dots by adding the value output from the threshold value comparison unit 1203 to the number of base dots output from the base determination unit 1201, and determines the number of dots to be an output value of quantization.

The above is the contents of the three-valued quantization processing. Similarly, it is possible to configure N-valued quantization processing.

In the case where the first embodiment is applied to the multivalued quantization as described above, it is sufficient to modify the first embodiment so that, for example, only the pixel whose base value is "0" is provided with a threshold value. In other words, at step 501 in the flow in FIG. 5 described previously, the threshold value provision possibility/impossibility determination processing is performed and at the same time, whether or not the base value is "0" is determined. The determination results are stored in a buffer prepared in the memory, which stores the results of the determination of whether or not the base value is "0" for each pixel. Then, in the case where the input value is smaller than "128", "true" is determined and in the case where the input value is not smaller than "128", "false" is determined and at step 502, only the pixel whose results are "true" is provided with a threshold value and the pixel whose results are "false" is not. The pixel whose base value is not "0" (pixel whose base value is 128) is a pixel in which at least one dot is formed. In a thin line consisting of these pixels, breaks do not occur even in the case where the processing to increase the density is not performed, and therefore, it is not necessary to receive a threshold value. By increasing the density by providing a threshold value only to the pixel whose base value is "0" (pixel that may cause breaks of dots), it is possible to suppress the influence on the high-density portions while obtaining the effect only for the portions that need the provision of a threshold value.

Here, only the pixel whose base value is "0" provided with a threshold value, but it may also be possible to make adjustment in accordance with the image forming apparatus. For example, in a system in which data is developed into data with a resolution higher than that at the time of quantization by performing publicly-known processing after the multivalued quantization processing is performed, there is a case where a blank is produced between dots forming a thin line. Further, in the case of a system in which a line having a width of one pixel is not recognized as a line because of a pale ink, it is necessary to form a line by using a plurality of dots. In such a case, it is sufficient to provide a threshold value also to a pixel having a predetermined base value other than zero, not limiting the pixel that is provided with a threshold value to a pixel whose base value is the first value of the multivalued quantization (whose base value is "0"). Further, it may also be possible to change the predetermined base value in accordance with a color material.

In the above, the example of the tone level represented by the number of dots 0, 1, or 2 as the N value is explained, but there is another example. For example, there is a case where a plurality of tone levels is represented by the size of the dot (the size of droplet in the ink jet printer), such as the case where three tone levels are represented by no dot, a small dot, and a large dot. Further, there is also a case where a plurality of tone levels is represented by the density of the dot, such as the case where three tone levels are represented by no dot, a pale ink dot, and a dense ink dot, or there is a case where a plurality of tone levels is represented by a combination thereof.

As above, in the quantization with multivalued (N-valued) outputs, it is also possible to reduce breaks of a thin line by increasing the number of on-dots by making use of a threshold value of another pixel.

<Second Modification Example>

In the first embodiment, whether or not a threshold value can be provided to another pixel is determined and a new threshold value of the pixel of interest is determined based on the determination results, but it may also be possible to simultaneously determine whether or not a threshold value can be provided and a threshold value in the pixel of interest. Hereinafter, a specific example is explained.

Here, it is assumed that the coordinates of the position of the pixel of interest are [x, y], the pixel value (image signal value) of the pixel of interest is V[x, y], and the threshold value of the position of the pixel of interest is Th[x, y]. Then, it is also assumed that the coordinates of the position of a candidate pixel that provides a threshold value is [v, w], the pixel value thereof is V[v, w], and the threshold value of the position is Th[v, w]. Each value is a positive integer including 0.

First, a program example in the case where the processing is performed in two stages is shown below, i.e., 1) whether or not a threshold value can be provided to another pixel is determined, and 2) the threshold value of a pixel that can provide a threshold value is compared with the threshold value of the pixel of interest, explained in the first embodiment.

<Program example (two-stage processing)>

```
01:     if (V[v, w] ! = 0) {
02:         if (Th[v, w] < Th[x, y]) {
03:             Th[x, y] = Th[v, w];
```

| <Program example (two-stage processing)> |
|---|
| 04:           } |
| 05:      } |

Here, the numeral at the top, such as [01:], is the row number for explanation. In the 01 row, whether or not the pixel value of the candidate pixel [v, w] that provides a threshold value is 0. In the case where the pixel value is not 0, the program proceeds to the 02 row and in the case where the pixel value is 0, the program proceeds to the 05 and subsequent rows. In the 02 row, the threshold value (Th[v, w]) of the candidate pixel that provides a threshold value is compared with the threshold value (Th[x, y]) of the pixel of interest and in the case where Th[v, w] is smaller, the threshold value (Th[x, y]) of the pixel of interest is updated to Th[v, w] in the 03 row. In the case of the program example, the 01 row corresponds to the processing of 1) described above and the 02 row corresponds to the processing 2) described above.

Next, a program example is shown below in the case where batch processing is performed instead of performing the processing of 1) and processing of 2) described above separately.

| <Program example (batch processing)> |
|---|
| 01:    if (Th[v, w] + V[v, w] * ThMax) < Th[x, y]) { |
| 02:        Th[x, y] = Th[v, w]; |
| 03:    } |

Here, "*" indicates multiplication. In the 01 row, the product of V[v, w] and ThMax is added to Th[v, w] and whether the value is smaller than Th[x, y] is determined. ThMax is the maximum value of the threshold values within the threshold value matrix, for example, 255. In the case where the results of the batch processing indicate that the value is smaller than Th[x, y], the threshold value (Th[x, y]) of the pixel of interest is updated to Th[v, w] in the 02 row. The expression in the 01 row means that the candidate pixel that provides a threshold value is a white pixel, i.e., V[v, w]*ThMax will be 0 in the case where V[v, w] is 0. Consequently, the expression is equivalent to if (Th[v, w]<Th[x, y]) and plays the same role as that of the 02 row of the program example of the two-stage processing described above. Then, in the case where V[v, w] is not 0 but equal to or greater than 1, V[v, w] is multiplied by the maximum threshold value ThMax. At this time, even in the case where Th[x, y] is the same value as ThMax, which is the upper limit, (V[v, w]*ThMax)<Th[x, y]) is never satisfied. Even in the case where V[v, w]=1, ThMax=255, and Th[x, y]=255, (1*255)<255 will be false. As described above, the expression in the 01 row simultaneously performs the processing to determine whether or not V[v, w] is a white pixel, i.e., the processing to determine whether or not the pixel is a pixel that can provide a threshold value of 1) described above. Because of this, it is possible to conclude that the above-described two program examples are equivalent.

As above, it may also be possible to perform batch processing instead of performing the processing in two stages separately.

<Third Modification Example>

In the first embodiment, the processing is performed on the whole of the input image, but there is a case where it is possible to receive information about whether or not the pixel is a pixel (hereinafter, line pixel) constituting a line for each pixel from an application, for example, such as CAD software. Further, in the case of an image having vector data, it is also possible to determine whether or not the pixel is a line pixel for each pixel. In the case such as this, it may also be possible to receive information (hereinafter, line information) indicating whether or not a certain pixel is a line pixel and to perform the new threshold value determination processing to increase the density of only the line pixel based on the line information.

Figure 14:
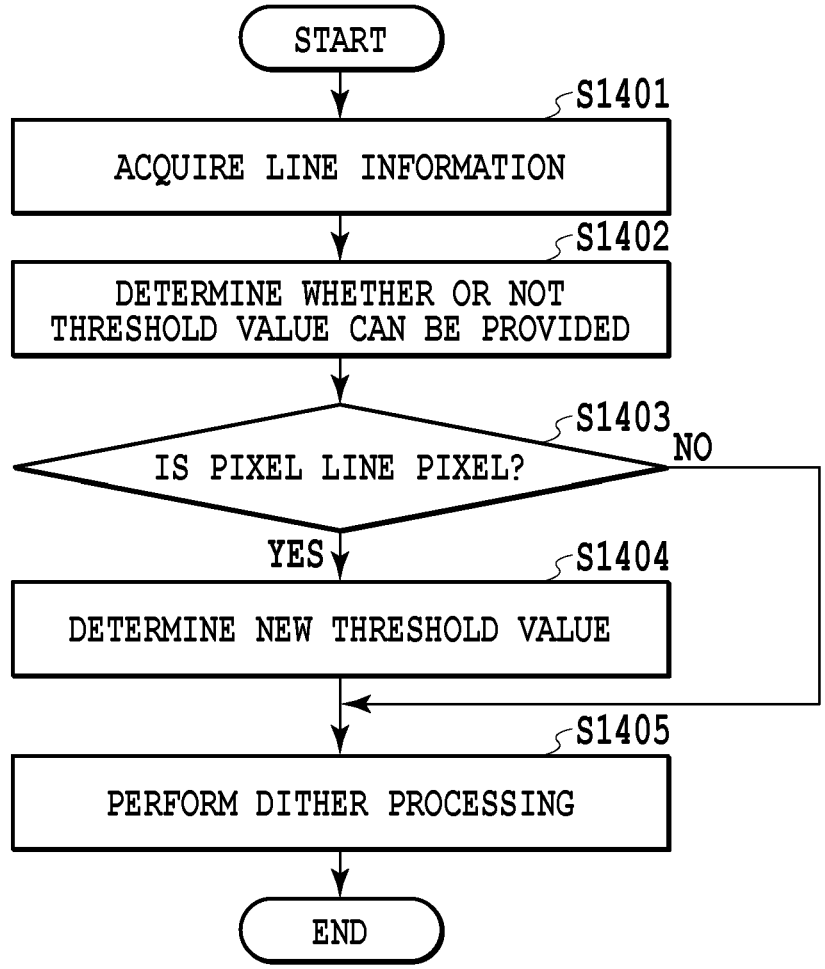
FIG. 14 is a flowchart showing a flow of quantization processing according to a third modification example.

FIG. 14 is a flowchart showing a flow of the quantization processing according to the present modification example.

At step 1401, line information is acquired from an application. Then, in accordance with the acquired line information, for example, buffers in the number corresponding to the number of pixels of an input image are prepared and 1 is input in the case of a line pixel and 0 is input in the case of a non-line pixel. Due to this, line pixels are specified.

At step 1402, the threshold value provision possibility/impossibility determination processing (see step 501 in the flow in FIG. 5) is performed.

At step 1403, whether or not the pixel of interest is a line pixel is determined by referring to the above-described buffer. In the case where the results of the determination indicate that the pixel of interest is a line pixel, the processing proceeds to step 1404. On the other hand, in the case where the pixel of interest is not a line pixel, the processing skips the new threshold value determination processing and proceeds to step 1405.

At step 1404, the new threshold value determination processing is performed (see step 502 in the flow in FIG. 5). In other words, the threshold value of the pixel of interest determined to be a line pixel is compared with the threshold value of the pixel determined to be a pixel that can provide a threshold value and in the case where the threshold value of the pixel determined to be a pixel that can provide a threshold value is smaller, the threshold value is determined to be a new threshold value of the pixel of interest.

At step 1405, the dither processing is performed (see step 503 in the flow in FIG. 5).

The above is the contents of the quantization processing according to the present modification example.

As described above, it is possible to reduce breaks of a thin line by making use of a threshold value of another pixel to increase the number of on-dots.

According to the present modification example, it is possible to eliminate the influence on pixels not constituting a line because the threshold value of only the line pixel is changed.

<Fourth Modification Example>

Further, the first embodiment is effective also in the case where a plurality of color materials uses one threshold value matrix in order to control overlaps of CMYK dots (see U.S. Pat. No. 6,867,884). Here, the control of overlaps of dots between CMYK color materials is called color-to-color separation. The color-to-color separation has the effect of reducing breaks of a thin line.

Figure 15:
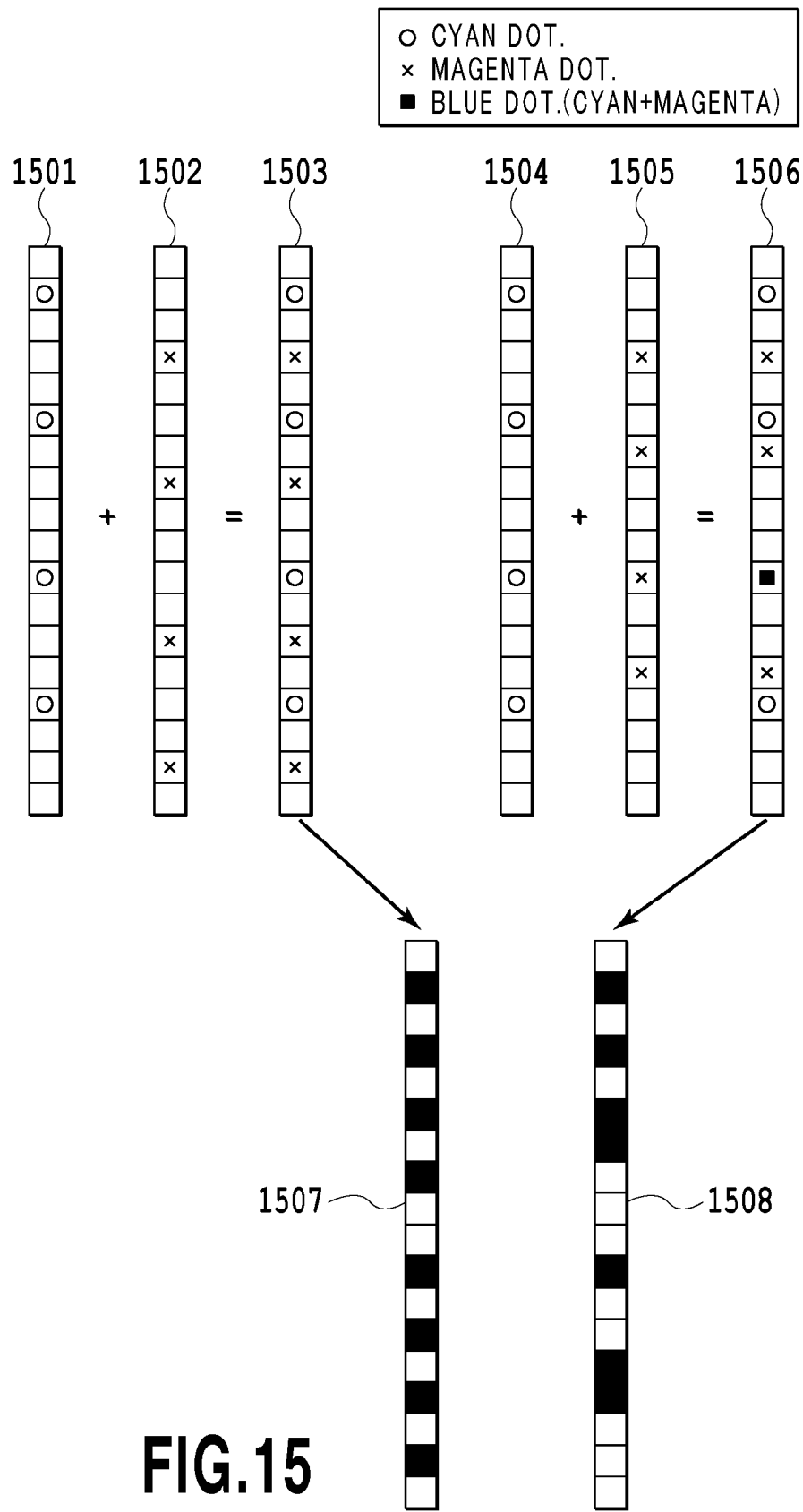
FIG. 15 is a diagram explaining reproducibility of a thin line in a color-to-color separation method.

FIG. 15 is a diagram explaining reproducibility of a thin line in the color-to-color separation method. In FIG. 15, 1501 represents the position where a C dot is formed on 18 pixels located vertically by ○ and similarly, 1502 represents the position where an M dot is formed by x. 1503 is a combination of 1501 and 1502 representing the relationship between the position where a C dot is formed and the position where an M dot is formed. In the color-to-color separation method such as this, the arrangement of C dots and M dots is controlled so as to prevent the C dot and the M dot from overlapping each other as much as possible. On the other hand, 1504 to 1506 represent the positions where C dots and M dots are formed on 18 pixels located vertically. C dots and M dots are quantized by using different dither matrixes with no correlation therebetween, and therefore, a portion (black square) appears where a C dot and an M dot overlap to turn the color of the portion into blue (see 1506).

Then, 1507 and 1508 represent strings of pixels in which the pixel is represented by a black cell in the case where either C or M dot is formed and by a white cell in the case where no dot is formed, and 1507 corresponds to 1503 described above and 1508 corresponds to 1506 described above, respectively. By a comparison between 1507 and 1508, it is known that the total number of dots is the same, but in 1508 there is a portion where dots are continuous and a large blank portion (portion where white pixels are continuous) is produced accordingly. Consequently, the large blank portion is regarded as a break of the line by the human eye.

As described above, it is known that reproducibility of a thin line improves by adopting the color-to-color separation method.

Figure 16:
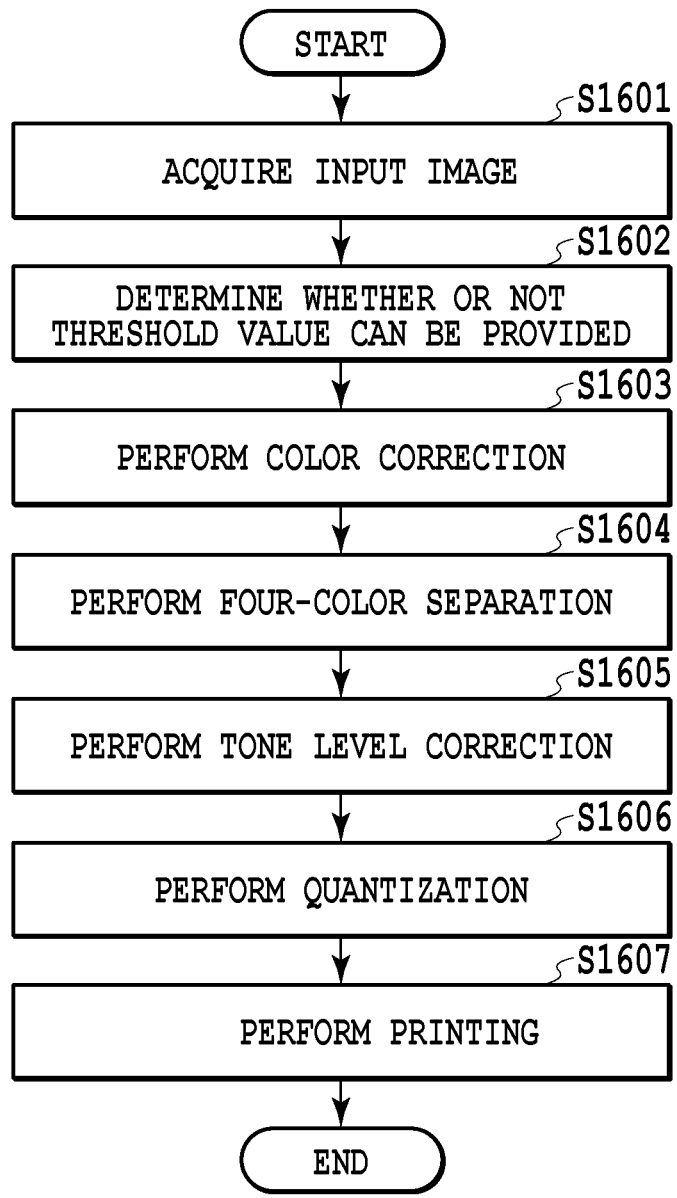
FIG. 16 is a flowchart showing an outline flow from acquisition of an input image to printing processing in a printing system according to a fourth modification example.

FIG. 16 is a flowchart showing an outline flow from acquisition of an input image to printing processing in the printing system according to the present modification example.

At step 1601, an input image is acquired (see step 301 in the flow in FIG. 3).

At step 1602, the threshold value provision possibility/impossibility determination processing is performed. Specifically, whether each pixel of the input image is a white pixel is determined. In the case where the input image is, for example, an 8-bit RGB image, only the pixel whose (R, G, B)=(255, 255, 255) is determined to be a pixel that can provide a threshold value and the other pixels are each determined to be a pixel that cannot provide a threshold value. The reason is that (R, G, B)=(255, 255, 255) indicates white and in this case, the values of all the color planes of CMYK after the color separation processing will be 0. The determination results are stored in the memory.

Step 1603 to step 1605 correspond to step 302 to step 304, respectively, in the flow in FIG. 3 described previously, and therefore, explanation is omitted.

At step 1606, the quantization processing is performed. The threshold value provision possibility/impossibility determination processing is completed at step 1602, and therefore, here, the new threshold value determination processing based on the results of the threshold value provision possibility/impossibility determination processing and the dither processing are performed. First, in the new threshold value determination processing, which of the 16 patterns shown in FIG. 7 corresponds to, for example, each processing area of 2×2 pixels is determined based on the determination results stored in the memory at step 1602 and thereby, a provider and a receiver of a threshold value are determined, and a new threshold value of the pixel of interest is determined. Then, the dither processing is performed by the method as described in the U.S. Pat. No. 6,867,884. Specifically, for a color material (e.g., K) having the highest priority, the pixel value of each pixel within the input image is compared with the threshold value and the results of the quantization of K are obtained. Next, for a color material (e.g., C) having the second highest priority, the pixel value of C to which the above-mentioned pixel value of K is added is compared with the threshold value. The threshold value matrix that is used at this time is the same. Then, for a color material (e.g., M) having the third highest priority, a threshold value comparison is performed by using the pixel value of M to which the above-described pixel value of K and the pixel value of C are added. In this manner, quantization is performed for each pixel in the order from the color material having the highest priority and quantization is performed by using the cumulative value obtained by adding the pixel value(s) of the color material(s) having higher priority value(s) (priorities). In the case where the cumulative value exceeds the maximum threshold value, quantization is performed by using a value obtained by subtracting the maximum threshold value from the cumulative value. As described above, in the present embodiment, in the stage before the color separation processing, the threshold value provision possibility/impossibility determination processing is performed and the quantization based on the color-to-color separation method is performed so that a plurality of color material dots is arranged so as to be dispersed as much as possible and dots are formed so that they do not overlap.

At step 1607, printing processing is performed by using the binary image data obtained by the quantization processing as step 1606 (see step 306 in the flow in FIG. 3).

The above is the outline flow from acquisition of an input image to printing processing in the printing system according to the present modification example.

In the example described above, whether or not a threshold value can be provided is determined by using RGB values at the time of dispersedly arranging a plurality of color material dots, but it may also be possible to, for example, perform the threshold value provision possibility/impossibility determination and the new threshold value determination processing for each color material by using the same threshold value matrix and to update the threshold value matrix for each color material. In this case, it is sufficient to compare the pixel value to which the pixel value(s) of a color material(s) having higher priority (priorities) is added at the time of the quantization of the color material having the next highest priority with the threshold value by using the updated threshold value matrix. The flow in this case is the same as the flows in FIG. 3 and FIG. 5 according to the first embodiment. By performing determination for each color material and increasing the density, it is also possible to reduce breaks of a thin line in an image whose RGB values of the background are not (255, 255, 255).

Further, it may also be possible to perform the processing by using a combination of color materials that use the same threshold value matrix. For example, in the case where separation between C dots and M dots is desired, the same threshold value matrix is used for both C and M. In this case, after the color separation processing, whether or not the pixel value is 0 is determined for both C and M, and in the case where both the pixel values are 0, it is determined that a threshold value can be provided and in the case where at least one of the pixel values is not 0, it is determined that a threshold value cannot be provided.

As described above, it is possible to reduce breaks by increasing the number of on-dots by utilizing a threshold value of another pixel.

As above, according to the present modification example, it is possible to implement a thin line with less breaks by performing the processing to stochastically increase the density of the thin line, in addition to the effect of reducing breaks of a thin line, which is provided by the color-to-color separation.

<Fifth Modification Example>

The threshold value provision possibility/impossibility determination to determine whether each pixel of an input image is a white pixel is also effective in the case where the color-to-color separation is not performed.

The flow from acquisition of an input image to printing processing in a printing system according to the present modification example is basically the same as that of the flowchart in FIG. 16 explained in the above-described fourth modification example.

Step 1601 to step 1605 are the same. At step 1602 also, as in the above-described fourth modification example, whether each pixel of the input image is a white pixel is determined. In the case where the input image is, for example, an 8-bit RGB image, only the pixel whose (R, G, B)=(255, 255, 255) is determined to be a pixel that can provide a threshold value and the other pixels are each determined to be a pixel that cannot provide a threshold value. The reason is that (R, G, B)=(255, 255, 255) indicates white and the values of all the color planes of CMYK after the color separation processing will be 0 in this case.

The color separation processing is not performed in the quantization at step 1606 and processing is performed by using a different threshold value matrix for each color of CMYK. At this time, whether or not a threshold value can be provided is determined by using the results of the threshold value provision possibility/impossibility determination performed at step S1602.

At step 1607, printing processing is performed by using the binary image data obtained by the quantization processing at step 1606 (see step 306 in the flow in FIG. 3).

In the above-described first embodiment, the threshold value provision possibility/impossibility determination is performed four times for each pixel (for each of CMYK), but according to the present modification example, it is necessary to perform the threshold value provision possibility/impossibility determination only once, and therefore, high-speed processing is enabled.

As described above, it is possible to reduce breaks of a thin line by increasing the number of on-dots by utilizing a threshold value of another pixel.

[Second Embodiment]

In the first embodiment, the aspect is explained in which part of the threshold values are changed by referring to the pattern of the position of the pixel that provides a threshold value within the processing area of 2×2 pixels and the number of formed dots of a thin line is increased stochastically. Next, a case is supposed where the increased number of dots by the aspect of the first embodiment is not sufficient, and an aspect is explained as a second embodiment in which the number of formed dots can be more increased. Explanation of the portions in common to those of the first embodiment is omitted or simplified and in the following, different points are explained mainly.

In the present embodiment, the number of formed dots is further increased by performing multistage processing in the quantization processing, i.e., processing to temporarily determine a new threshold value in a processing area of, for example, 4×4 pixels, and then, to finally determine a new threshold value in a processing area of a smaller size (e.g., 2×2 pixels). It is assumed that the internal configuration of the quantization processing unit as a function unit that implements the quantization processing includes the threshold value provision determination unit 401, the threshold value determination unit 402, and the dither processing unit 403, which are the same as those of the quantization processing unit 400 shown in FIG. 4 of the first embodiment.

Figure 17:
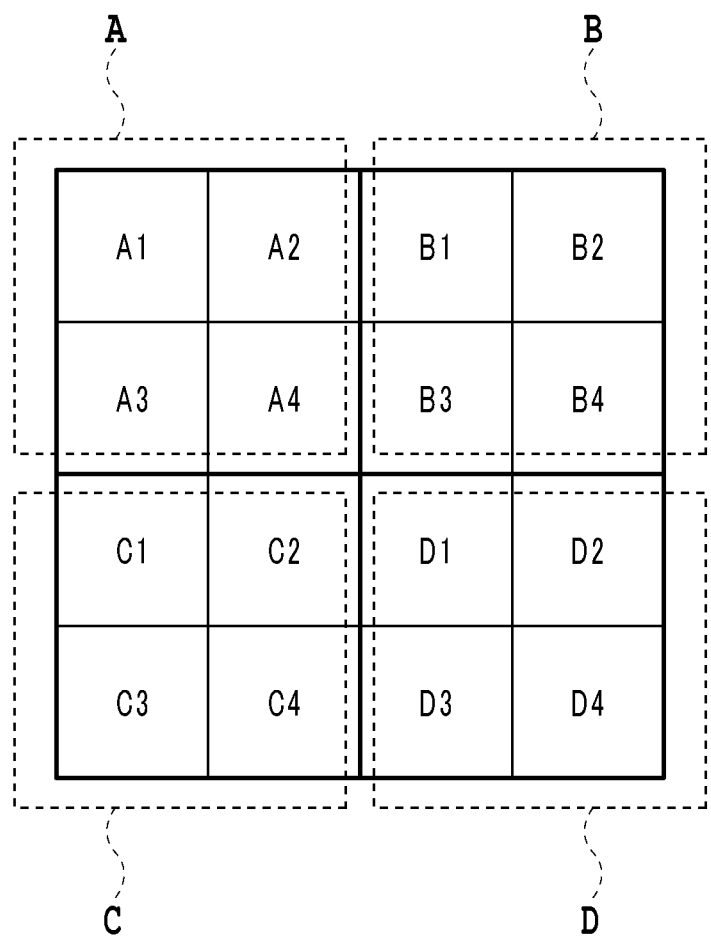
FIG. 17 is a diagram explaining a processing area at the time of temporary determination of a new threshold value in a second embodiment.

FIG. 17 is a diagram explaining an area of 4×4 pixels as a processing area at the time of temporarily determining a new threshold value in the present embodiment. For convenience, 2×2 pixels at the top-left within the 4×4 pixels are referred to as A area, those at the top-right as B area, those at the bottom-left as C area, and those at the bottom-right as D area. In each of A to D areas also, the pixel at the top-left is referred to as 1, that at the top-right as 2, that at the bottom-left as 3, and that at the bottom-right as 4, and, for example, the pixel at the top-left in A area is referred to as A1, and so on.

Figure 18:
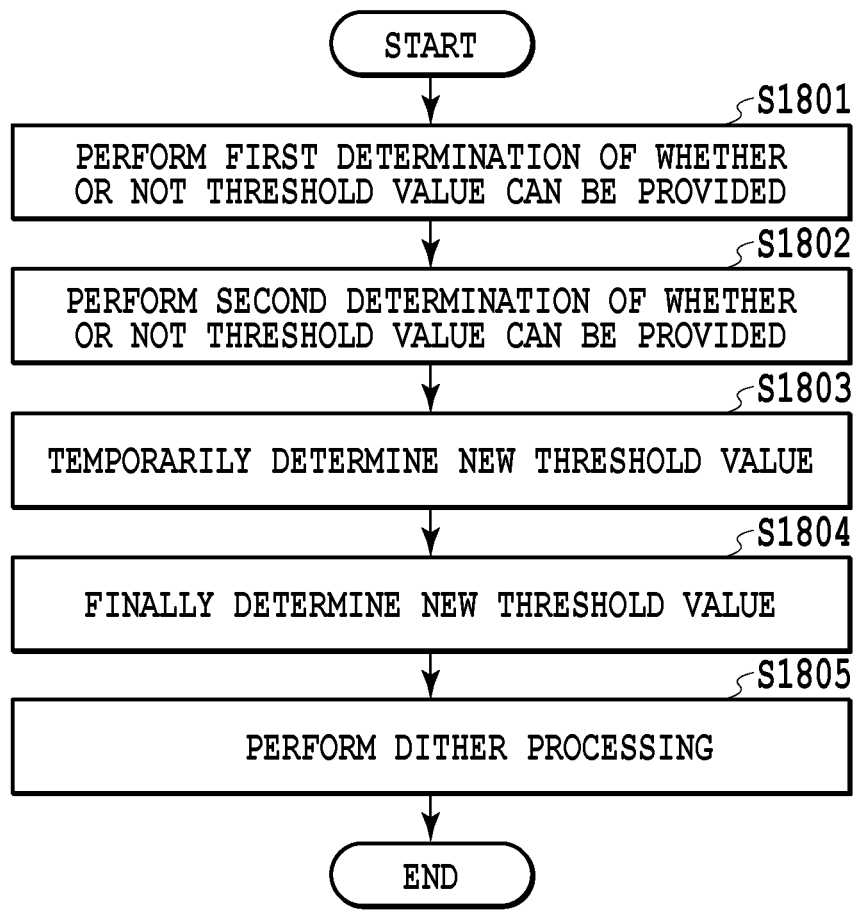
FIG. 18 is a flowchart showing a flow of quantization processing according to the second embodiment.
Figure 19B:
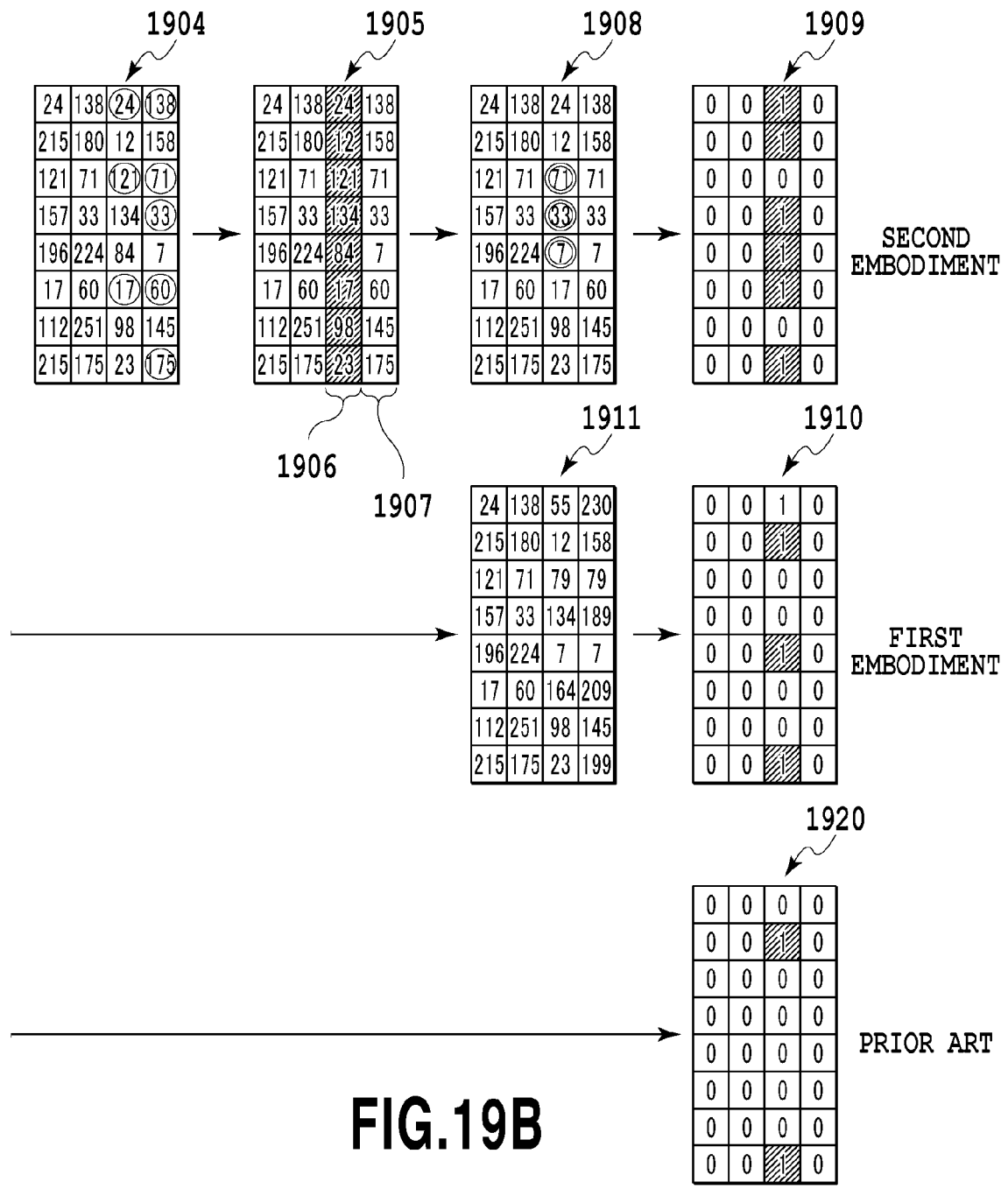
FIG. 19 is a diagram showing a relationship between FIGS. 19A and 19B, and FIGS. 19A and 19B are diagrams explaining how the quantization processing progresses in the second embodiment.
Figure 20:
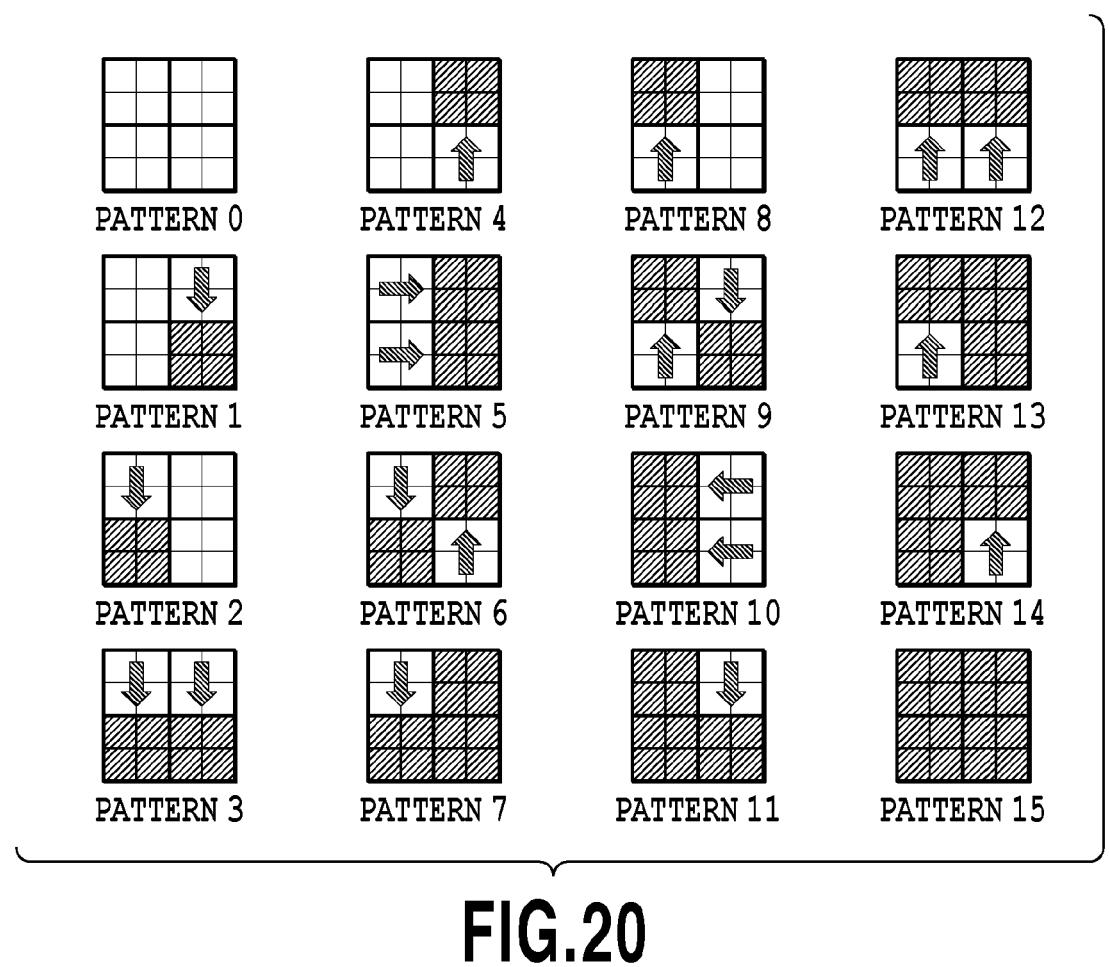
FIG. 20 is a diagram showing reference patterns used at the time of temporary determination of a new threshold value.

The outline flow from acquisition of an input image to printing processing is the same as that in the first embodiment, and therefore, in the following, the quantization processing that characterizes the present embodiment is explained with reference to FIG. 18 to FIG. 20. FIG. 18 is a flowchart showing a flow of the quantization processing according to the present embodiment. FIGS. 19A and 19B are diagrams explaining how the process of the quantization processing progresses in the present embodiment. FIG. 20 is a diagram showing reference patterns that are used at the time of temporarily determine a new threshold value according to the present embodiment.

At step 1801, the threshold value provision determination unit 401 performs the threshold value provision possibility/impossibility determination processing to determine whether each pixel in the image data after the tone level correction, which is input from a tone level correction unit, not shown, can provide a threshold value to another pixel. The processing at this step is the same as the processing at step 501 in the flow in FIG. 5 in the first embodiment, i.e., first-stage threshold value provision possibility/impossibility determination processing. In FIG. 19A, a threshold value matrix 1901 is a threshold value matrix obtained by reflecting the results of the first-stage threshold value provision possibility/impossibility determination processing in an initial threshold value matrix 1900. A portion corresponding to a thin line having a width of one pixel in the input image is represented in gray indicating that the portion cannot provide a threshold value and the other portions are represented in white indicating that the portions can provide a threshold value.

At step 1802, the threshold value provision determination unit 401 divides the input image into predetermined areas (here, areas of 4×4 pixels) and the threshold value provision possibility/impossibility determination processing is performed again on a predetermined area (here, an area of 2×2 pixels) in the area of 4×4 pixels (second-stage threshold value provision possibility/impossibility determination processing). For example, it is assumed that A area in FIG. 17 described above is the area to be subjected to the second-stage threshold value provision possibility/impossibility determination processing. In this case, all the pixel values in A1 to A4 are checked. Then, in the case where the pixel values of all the pixels are 0, A area is determined to be an area that can provide a threshold value. On the other hand, in the case where there is at least one pixel having a pixel value other than 0 among A1 to A4 pixels, A area is determined to be an area that cannot provide a threshold value. Then, the second-stage threshold value provision possibility/impossibility determination processing is performed similarly on other B to D areas. In FIG. 19A, a threshold value matrix 1902 is a threshold value matrix obtained by reflecting the results of the second-stage threshold value provision possibility/impossibility determination processing in the initial threshold value matrix 1900. In the case where a portion 1903 surrounded by a broken line in the threshold value matrix 1902 is taken to be the area of 4×4 pixels shown in FIG. 7, in A area and C area, all the pixel values of the four pixels (A1 to A4, C1 to C4) therein are 0, and therefore both areas are areas (white) that can provide a threshold value. In contrast to this, the pixel values of B1 and B3 in B area and of D1 and D3 in D area are 50, and therefore, B area and D area are areas (gray) that cannot provide a threshold value.

At step 1803, the threshold value determination unit 402 performs processing (new threshold value temporary determination processing) to temporarily determine a new threshold value for each 4×4 pixels by using the initial threshold value matrix 1900 in accordance with the results of the second-stage threshold value provision possibility/impossibility determination processing. In FIG. 20, the area of 2×2 pixels represented in white within each pattern indicates an area determined to be an area that can provide a threshold value and the area of 2×2 pixels represented in gray indicates an area determined to be an area that cannot provide a threshold value. Then, an arrow within each pattern indicates the direction in which a threshold value is provided. For example, the area of 4×4 pixels of the portion 1903 surrounded by the broken line in the above-described threshold value matrix 1902 corresponds to pattern 5 in FIG. 20. In this case, a threshold value is provided from A area to B area and a threshold value is provided from C area to D area as a result. Specifically, the threshold value of A1 and the threshold value of B1 are compared and the smaller threshold value is temporarily determined to be a new threshold value of B1. Then, the same processing is performed for A2 and B2, A3 and B3, and A4 and B4, and new threshold values are determined temporarily in B area. Further, the same processing is performed for C area and D area and new threshold values in D area are determined temporarily. A threshold value matrix 1904 in FIG. 19B is a threshold value matrix in which the results of the new threshold value temporary determination processing are reflected and numerical values surrounded by ○ indicate new threshold values determined temporarily.

At step 1804, the threshold value determination unit 402 performs processing (new threshold value final determination processing) to finally determine a new threshold value for each 2×2 pixels by using the threshold value matrix in which the new threshold values temporarily determined at step 1803 are reflected. In FIG. 19B, a threshold value matrix 1905 is a threshold value matrix obtained by reflecting the results of the first-stage threshold value provision possibility/impossibility determination processing at step 1081 in the threshold value matrix 1904 in which the temporarily determined new threshold values are reflected (the threshold value matrix 1905 is provided for convenience of explanation and such a threshold value matrix is not generated separately by some processing). In this case, in accordance with pattern 10 in FIG. 7, the threshold value in a column 1906 (gray) in the threshold value matrix 1905 and the threshold value in a column 1907 (white) are compared and in the case where the threshold value in the column 1907 is smaller, the threshold value in the column 1906 is replaced with this threshold value and thus a final new threshold value is obtained. In FIG. 19B, a threshold value matrix 1908 is a threshold value matrix in which the results of the new threshold value final determination processing are reflected and numerical values surrounded by ☉ indicate new threshold values replaced by the present processing.

At step 1805, the dither processing unit 403 performs halftone processing based on the dither method by using the threshold value matrix in which the new threshold values finally determined at step 1804 are reflected. In FIG. 19B, quantization results 1909 indicate the results of performing the dither processing on an input image 1930 by using the threshold value matrix 1908. In the quantization results 1909, the white pixel indicates a pixel in which a dot is not formed and the gray pixel indicates a pixel in which a dot is formed.

In FIG. 19B, quantization results 1910 are the results of performing the dither processing on the input image 1930 by using a threshold value matrix 1911 obtained by applying the first embodiment. Quantization results 1920 indicate the results of performing the dither processing by using the initial threshold value matrix 1900 on the input image 1930 without applying the present invention. From the comparison between these quantization results, it is known that the number of formed dots increases in the first embodiment, but in the second embodiment, the number of formed dots increases further.

In the present embodiment, in the case where there is a pixel having a pixel value other than 0 within the area of 2×2 pixels, a threshold value is provided within the area of 2×2 pixels and a threshold value is not provided to another area of 2×2 pixels (only in the case where there is not a pixel having a pixel value other than 0 within the area, a threshold value is provided to another area of 2×2 pixels). In other words, a threshold value is provided to a pixel as close as possible (within the area of 2×2 pixels) and in the case where there is not a pixel having a predetermined pixel value nearby, it is made possible to provide a threshold value to a distant pixel having a predetermined pixel value. Due to this, it is possible to maintain the macroscopic characteristics of a threshold value matrix while reducing breaks by stochastically increasing the density of a thin line more than in the case of the threshold value provision of the first embodiment (only the area of 2×2 pixels). The macroscopic characteristics of a threshold value matrix mean, for example, the capability of maintaining the characteristics at ¼×¼ resolution (in the case of quantization at 1,200 dpi, 300 dpi) in the case of the processing area of 4×4 pixels.

In the present embodiment, the threshold values of the pixel of interest and the reference pixel are compared and the smaller threshold value is determined to be a new threshold value of the pixel of interest, but there is a case where this will result in a density too high. In the case such as this, it is sufficient to multiply the threshold value of the reference pixel by a coefficient. For example, the threshold value of the pixel of interest and the threshold value of the reference pixel, which is multiplied by a coefficient greater than 1.0, are compared and the smaller threshold value is determined to be a new threshold value of the pixel of interest, and so on. Due to this, it is made possible to prevent the number of formed dots from increasing too much and to stochastically control the density that increases by a setting of the value of the coefficient. Further, by setting the coefficient to a value less than 1.0, the threshold value is reduced, and therefore, it is possible to further increase the density.

As described above, it is possible to reduce breaks by increasing the number of on-dots by utilizing a threshold value of another pixel.

[Third Embodiment]

In the first and second embodiments, a threshold value is provided between the pixels determined by the image pattern within the processing area. Next, as a method of changing a threshold value by using the value of another threshold value in an predetermined area, an aspect is explained as a third embodiment in which a pixel that provides a threshold value and a pixel that is provided with a threshold value are determined dynamically by the image pattern in an input image and arrangement of threshold values in a threshold value matrix. As in the second embodiment, the outline flow from acquisition of an input image to printing processing is the same as that of the first embodiment, and therefore, in the following, the quantization processing that characterizes the present embodiment is explained.

Figure 21:
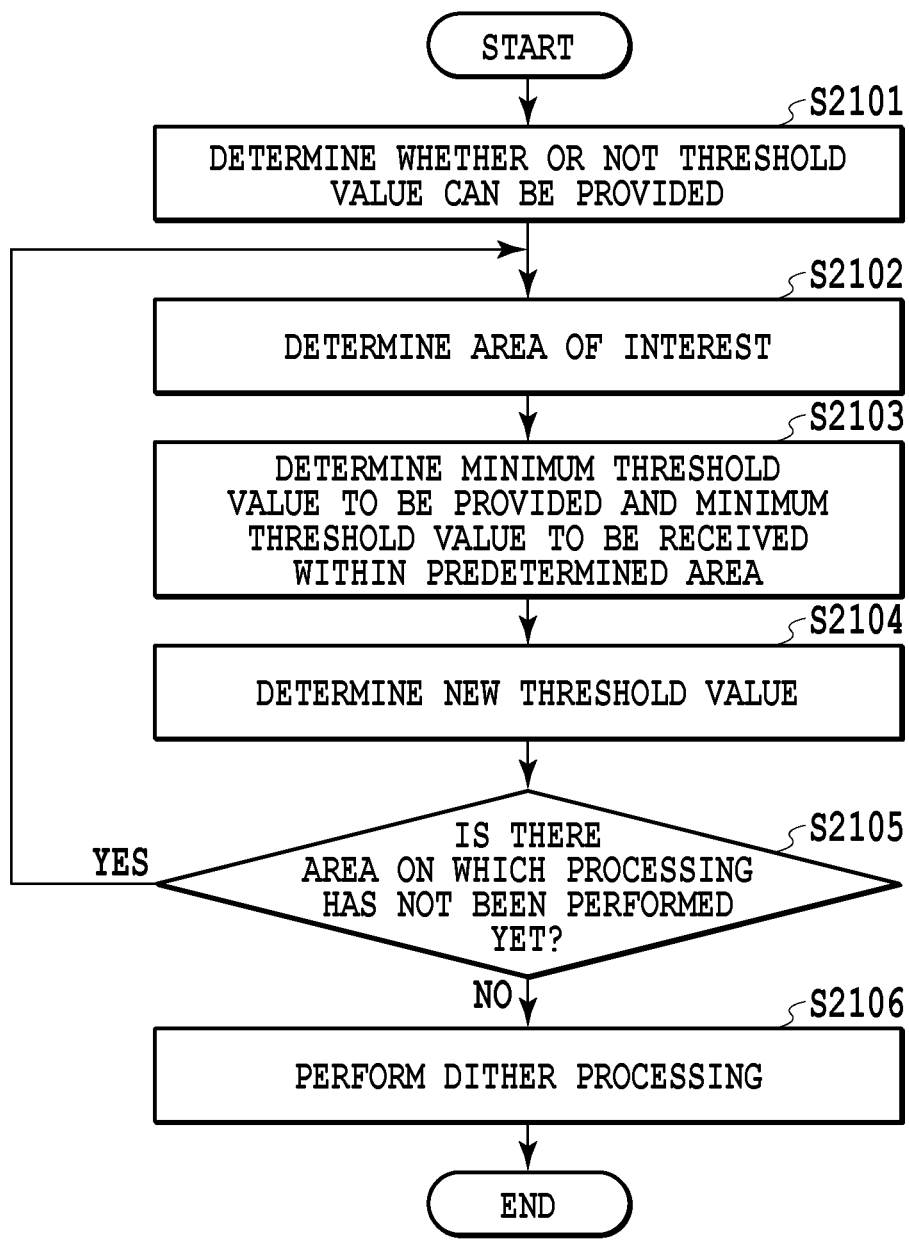
FIG. 21 is a flowchart showing a flow of quantization processing according to a third embodiment.

FIG. 21 is a flowchart showing a flow of quantization processing according to the present embodiment. It is assumed that the internal configuration of the quantization processing unit as a function unit that implements the quantization processing includes the threshold value provision determination unit 401, the threshold value determination unit 402, and the dither processing unit 403, which are the same as those of the quantization processing unit 400 shown in FIG. 4 of the first embodiment.

At step 2101, the threshold value provision determination unit 401 performs the threshold value provision possibility/impossibility determination processing for each pixel of an input image. As in the first embodiment, each pixel of the input image has a value of any of 0 to 255 and a white pixel whose value is 0 is determined to be a pixel that can provide a threshold value and a non-white pixel whose value is other than 0 is determined to be a pixel that cannot provide a threshold value.

At step 2102, the threshold value provision determination unit 401 determines an arbitrary processing area in the input image to be an area of interest. Here, the processing area is, for example, an area of 4×4 pixels and it is sufficient to determine the area of interest, for example, in the order from the leftmost corner in the input image.

At step 2103, the threshold value provision determination unit 401 extracts the minimum value (minimum threshold value to be provided) from among the threshold values corresponding to the pixels determined to be a pixel that can provide a threshold value and the minimum value (minimum threshold value to be received) from among the threshold values corresponding to the pixels determined to be a pixel that cannot provide a threshold value. The minimum threshold value to be provided and the minimum threshold value to be received extracted from the area of interest and information on the pixel positions corresponding to those threshold values are stored in the RAM.

At step 2104, the threshold value determination unit 402 compares the extracted minimum threshold value to be provided and the extracted minimum threshold value to be received and in the case where the minimum threshold value to be provided is smaller, the value of the minimum threshold value to be received is replaced with the value of the minimum threshold value to be provided. In other words, the minimum threshold value to be provided is taken to be a new threshold value in the pixel position of the minimum threshold value to be received. Here, the pixel corresponding to the minimum threshold value to be provided is a white pixel and its pixel value is 0, and therefore, a dot is not formed even in the case where the threshold value takes any small threshold value. By providing the minimum threshold value that is most likely to cause a dot to be formed among the threshold values that are not used to another pixel whose pixel value is other than 0, it is possible to stochastically increase the number of formed dots. Then, the pixel corresponding to the minimum threshold value to be received is the pixel that is most likely to cause a dot to be formed among the pixels having a pixel value other than 0. In other words, the pixel corresponding to the minimum threshold value to be received is the pixel in which a dot is formed first within the area of interest in the case where the density value of the image data is increased gradually from the lowest density value. By making the pixel more likely to cause a dot to be formed, it is possible to increase the density of a thin line without disturbing the characteristics such as blue noise of the original threshold value matrix.

At step 2105, the threshold value determination unit 402 determines whether there is an area on which the processing has not been performed yet within the input image. In the case where there is an area on which the processing has not been performed yet, the processing returns to step 2102 and the next area of interest is determined. On the other hand, in the case where there is not an area on which the processing has not been performed yet, the processing proceeds to step 2106.

At step 2106, the dither processing unit 403 performs halftone processing based on the dither method by using the threshold value matrix in which the new threshold values are reflected.

The above is the contents of the quantization processing in the present embodiment.

In the above-described example, a threshold value of one pixel is provided within the area of interest, but it may also be possible to provide threshold values of a plurality of pixels. For example, it may also be possible to provide the minimum threshold value on the provision side as a new threshold value of the pixel corresponding the minimum threshold value on the reception side, and further to provide the second minimum threshold value on the provision side as a new threshold value of the pixel corresponding to the second minimum threshold value on the reception side. In this case, it is possible to stochastically increase the density more than in the case where a threshold value of only one pixel is provided.

In the above-described example, the minimum threshold value on the provision side is provided as a new threshold value of the pixel corresponding to the minimum threshold value on the reception side, but it may also be possible to provide a threshold value as a new threshold value of a different pixel. For example, it is contemplated that a threshold value is provided as a new threshold value of the pixel corresponding to the maximum threshold value on the reception side. In this case, the pixel is the pixel corresponding to the threshold value that is most unlikely to cause a dot to be formed among the pixels having a pixel value other than 0 within the area of interest. By reducing the threshold value of the pixel such as this, it is possible to efficiently increase the density of a thin line.

Further, it is possible to suppress the degree in which the density is increased by setting the threshold value on the provision side to a threshold value other than the minimum threshold value (e.g., the second minimum threshold value). and therefore, it is also possible to make adjustment of density.

As described above, it is possible to reduce breaks of a thin line by increasing the number of on-dots by utilizing a threshold value of another pixel.

According to the present embodiment, by dynamically determining a pixel on the side that provides a threshold value and a pixel on the side that receives a threshold value, it is possible to keep the characteristics of the original threshold value matrix compared to the first and second embodiments while reducing breaks of a thin line.

[Fourth Embodiment]

Next, as a method of changing part of threshold values by using another threshold value in an predetermined area, an aspect is explained as a fourth embodiment in which a threshold value matrix is improved, specifically, in which the dither processing is performed by using a threshold value matrix created by using a sub matrix. Explanation of the portions in common to those of the first embodiment or the like is omitted or simplified and in the following, different points are explained mainly.

Figure 22:
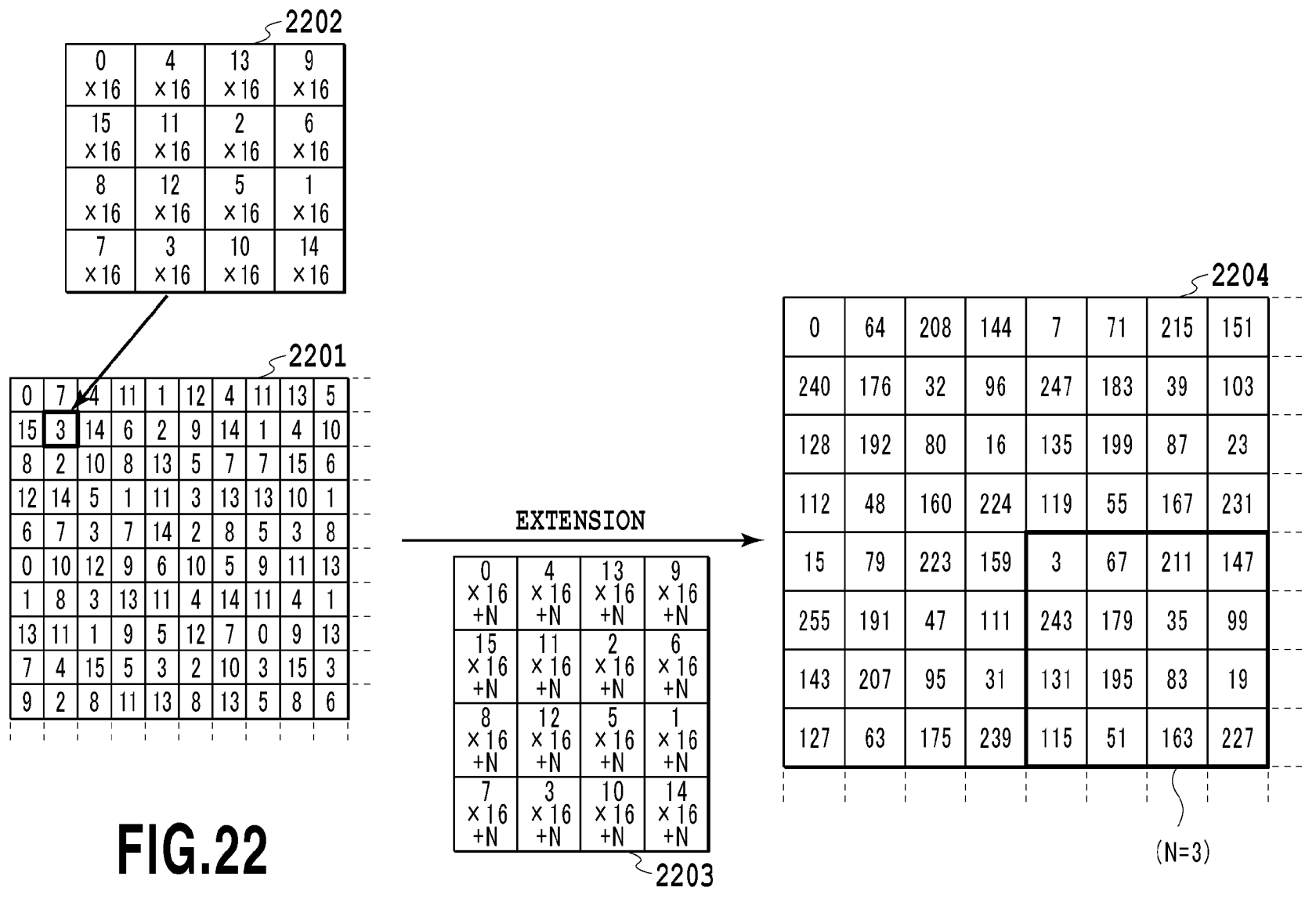

FIG. 22 is a diagram explaining how to create a threshold value matrix by using a sub matrix.

A matrix 2201 is a matrix (hereinafter, base matrix) including 64×64 pixels and serving as a base and a value between 0 and 15 is assigned to each cell. For example, by causing the base matrix 2201 to have the blue noise characteristics or the like, the base matrix 2201 exhibits the characteristics at a certain resolution as will be described later.

A matrix 2202 is a sub matrix including 4×4 pixels and a value between 0 and 240 (16 intervals) is assigned to each cell. At the time of creating the sub matrix, first 16 numerical values from 0 to 15 are arranged so as to be as even as possible. For example, the 16 numerical values are arranged so that the total of the values in the four pixels in the vertical direction, that in the horizontal direction, and that in the diagonal direction are substantially the same. In the case where the numerical values are arranged unevenly, there will occur such a problem that anisotropy in which dots of a horizontal or vertical thin line are easy to form but dots of a diagonal thin line are hard to form, or that graininess is worsened. Then, each value obtained by multiplying each of the numerical values between 0 and 15 arranged evenly by 16 is allocated to each cell of the sub matrix.

Then, one cell (=one pixel) of the base matrix 2201 is extended into 16 pixels (4 vertical pixels, 4 horizontal pixels) by sequentially allocating the sub matrix 2202 to each cell. Specifically, a numerical value (N) in one cell of the base matrix 2201 is added to each numerical value in the sub matrix 2202. In this manner, a threshold value matrix of 256×256 pixels is obtained. In FIG. 22, reference numeral 2203 represents the process of extension by allocating each numerical value of the sub matrix 2202 to the pixel having the numerical value N in the base matrix 2201. A matrix 2204 is a threshold value matrix of 256×256 pixels obtained by performing such extension. In the threshold value matrix 2204, the portion surrounded by a thick frame is the area corresponding to N=3 in the base matrix 2201 and it is known that each threshold value is a value obtained by adding N (=3) to each numerical value in the sub matrix 2202.

In the threshold value matrix created by using the sub matrix as described above, a threshold value equal to or less than 15 exists without exception in the area of 4×4 pixels. The reason is that the maximum value of the values in the main matrix 2201 is 15 and the minimum value of the values in the sub matrix 2202 is 0. Then, by causing the base matrix to have characteristics such as blue noise, the created threshold value matrix also has the macro blue noise characteristics in a macroscopic manner. For example, in the case where the threshold value matrix created by using a sub matrix of 4×4 pixels is used at a resolution of 1,200 dpi×1,200 dpi, it is possible to exhibit the characteristics that the base matrix is caused to have at a resolution of 300 dpi×300 dpi, which is ¼ of 1,200 dpi×1,200 dpi.

In the case where such a threshold value matrix is used and, for example, the method described in the third embodiment is applied, for the pixels of a thin line whose pixel value is 16 or greater, one or more dots are formed without exception in the 4×4 pixels as a result. The reason is that a threshold value equal to or less than 15 is used without exception for a pixel having a pixel value other than 0 for each processing area of 4×4 pixels.

In the above-described example, the size of the processing area and the size of the sub matrix are made the same (both have 4×4 pixels), but any size may be set. By setting the number of pixels in the vertical direction and that in the horizontal direction of the sub matrix equal to or less than the number of pixels in the vertical direction and that in the horizontal direction of the processing area, respectively, it is possible to guarantee dot formation of one or more dots in an arbitrary pixel in the image data having a density value equal to or higher than a certain density value.

As described above, it is possible to reduce breaks of a thin line by increasing the number of on-dots by utilizing a threshold value of another pixel.

According to the present embodiment, it is made possible to guarantee dot formation of one or more dots within a predetermined area for image data having a density value equal to or higher than a certain value.

[Fifth Embodiment]

In each embodiment described above, the shape of the processing area, in which processing to change a threshold value by providing a threshold value is performed, is rectangular (square) and each processing area does not overlap another, and one pixel does not belong to a plurality of processing areas. Because of this, in the case where the first embodiment is applied to an image including a thin line having a width of two pixels, there is a possibility that unevenness occurs in an increase in density because the processing area and the phase change depending on the position of the thin line and the effect of increasing the density is obtained sometimes and not obtained sometimes. FIGS. 23A and 23B are diagrams explaining the reason that unevenness occurs in an increase in density. Each cell represents a pixel, a white pixel represents a pixel whose pixel value is 0 and which can provide a threshold value, and a gray pixel represents a pixel whose pixel value is other than 0 and which cannot provide a threshold value. An area of 2×2 pixels surrounded by a thick line is a processing area. In FIG. 23A, the processing area of 2×2 pixels is located so as to overlap exactly with a thin line in the input image in which the thin line having a width of two pixels is drawn vertically. On the other hand, in FIG. 23B, the processing area of 2×2 pixels is located so as to overlap with the half of the 2-pixel width of the thin line in the same input image. The relative position relationship between the thin line having a width of two pixels and the processing area changes depending on the position of the thin line in the image as described above and as a result of this, the reference patterns that are used to determine a new threshold value change. In the case of FIG. 23A, the reference patterns are pattern 0 and pattern 15 in FIG. 7. In this case, the threshold value is not changed, and therefore, the output is the same as that in the case where the first embodiment is not applied. On the other hand, in the case of FIG. 23B, the reference patterns are pattern 5 and pattern 10 in FIG. 7. In this case, the threshold value may be changed by each of the patterns, and therefore, the density increases stochastically.

Consequently, an aspect is explained as a fifth embodiment in which the shape of the processing area is set to a circle with the pixel of interest as a center and processing is performed by shifting the pixel of interest one by one (i.e., one pixel belongs to a plurality of processing areas) in order to avoid the above-described problem. Explanation of the portions in common to those of the first embodiment or the like is omitted or simplified and in the following, different points are explained mainly.

Figure 24:
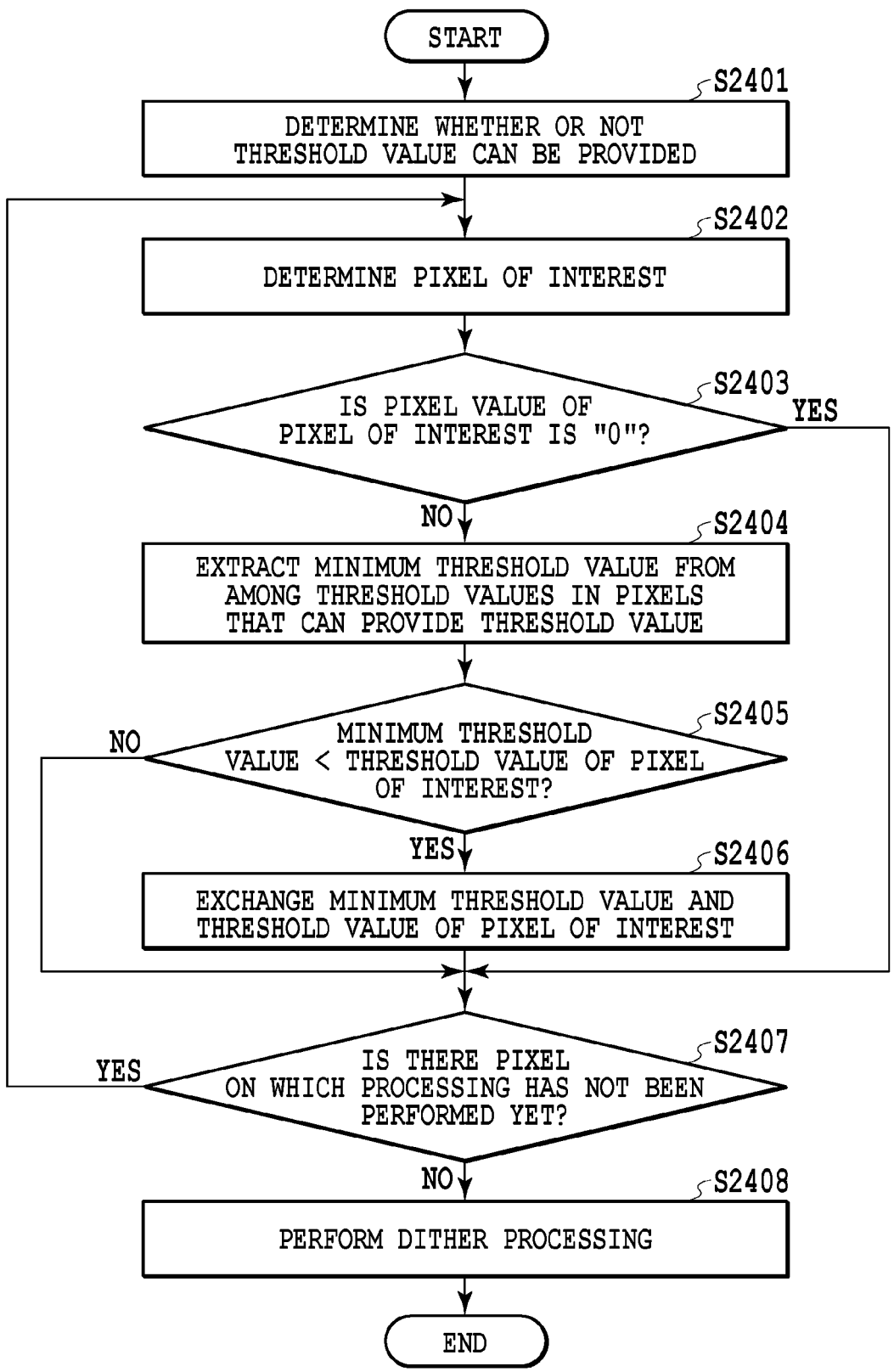
FIG. 24 is a flowchart showing a flow of quantization processing according to a fifth embodiment.

FIG. 24 is a flowchart showing a flow of quantization processing according to the present embodiment. It is assumed that the internal configuration of the quantization processing unit as a function unit that implements the quantization processing includes the threshold value provision determination unit 401, the threshold value determination unit 402, and the dither processing unit 403, which are the same as those of the quantization processing unit 400 shown in FIG. 4 of the first embodiment.

At step 2401, the threshold value provision determination unit 401 performs the threshold value provision possibility/impossibility determination processing for each pixel of the input image. For example, as in the first embodiment, in the case where each pixel of the input image has any of values between 0 and 255, a white pixel whose value is 0 is determined to be a pixel that can provide a threshold value and a non-white pixel whose value is other than 0 is determined to be a pixel that cannot provide a threshold value.

At step 2402, the threshold value determination unit 402 determines the pixel of interest. For example, a pixel at the top-left corner of the input image is determined to be the first pixel of interest and after the processing of the pixel is completed, the next pixel one to the right is determined to be the next pixel of interest, and after the processing of the rightmost pixel is completed, the processing of the leftmost pixel in the one lower row is performed, and in this manner, the processing is performed sequentially.

At step 2403, the threshold value determination unit 402 determines whether the pixel value of the pixel of interest is 0. The results of the determination indicate that the pixel value of the pixel of interest is 0, the processing proceeds to step 2407. On the other hand, in the case where the pixel value of the pixel of interest is other than 0, the processing proceeds to step 2404.

At step 2404, the threshold value determination unit 402 extracts the minimum value (hereinafter, minimum threshold value) within a predetermined processing area from among the threshold values of the pixels determined to be a pixel that can provide a threshold value at step 2401. The extracted minimum threshold value and information on the corresponding pixel position are stored in the RAM.

Figure 25:
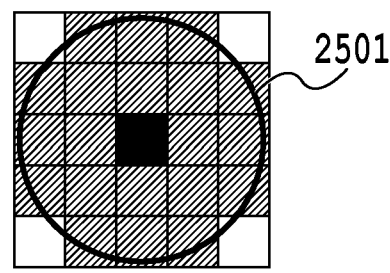
FIG. 25 is a diagram showing an example of a processing area in the fifth embodiment.

At step 2405, the threshold value determination unit 402 compares the threshold value of the pixel of interest with the minimum threshold value within the predetermined processing area and in the case where the minimum threshold value is smaller, the threshold value of the pixel of interest is exchanged with the threshold value of the pixel position of the minimum threshold value. FIG. 25 is a diagram showing an example of the processing area in the present embodiment. The area of the pixels represented in gray is the processing area and the pixel at the center represented in black corresponds to the pixel of interest. The shape of the processing area that is an aggregation of square pixels is set to, for example, such as one as shown in FIG. 25 in order to bring the shape of the processing area close to a circle 2501, but the shape of the processing area may be a square, a rectangle, an ellipse, or other various shapes. In the present embodiment, both the value of the minimum threshold value and the threshold value of the pixel of interest are exchanged without overwriting the threshold value of the pixel of interest by the value of the minimum threshold value. The reason is that the minimum threshold value that has used once is prevented from being used again in the case where another pixel is taken to be the pixel of interest because one pixel belongs to a plurality of areas in the present embodiment.

At step 2407, the threshold value determination unit 402 determines whether the processing has been completed for all the pixels within the input image. In the case where there is a pixel on which the processing has not been performed yet, the processing returns to step 2402 and the next pixel of interest is determined. On the other hand, in the case where the processing has been completed for all the pixels, the processing proceeds to step 2408.

At step 2408, the dither processing unit 403 performs halftone processing based on the dither method by using the threshold value matrix in which threshold values have been exchanged.

The above is the contents of the quantization processing in the present embodiment.

In the above-described example, the threshold value of the pixel of interest is compared with the minimum threshold value within the predetermined processing area, but this is not limited. For example, it may also be possible to multiply the threshold value of the pixel determined to be a pixel that can provide a threshold value within the predetermined processing area by a coefficient that is determined in accordance with the distance from the pixel of interest, and compare the multiplication result with the threshold value of the pixel of interest and exchange the threshold values in the case where the multiplication result is smaller. Due to this, it is made more unlikely that the threshold value of the pixel of interest is exchanged with the threshold value of a pixel distant from the pixel of interest, and therefore, it is possible to increase the density of a thin line while maintaining the characteristics of the threshold value matrix as much as possible.

Here, the effects of the present embodiment are explained in an easy-to-understand manner with reference to the drawings.

Figure 26A:
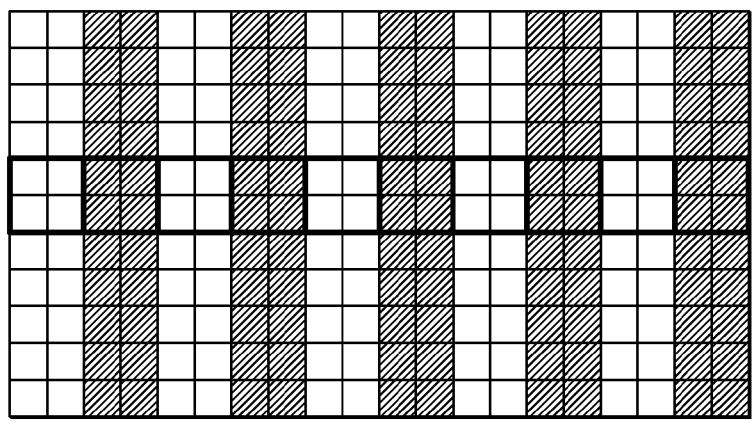
FIGS. 26A, 26B, and 26C are diagrams explaining a phase difference.
Figure 26B:
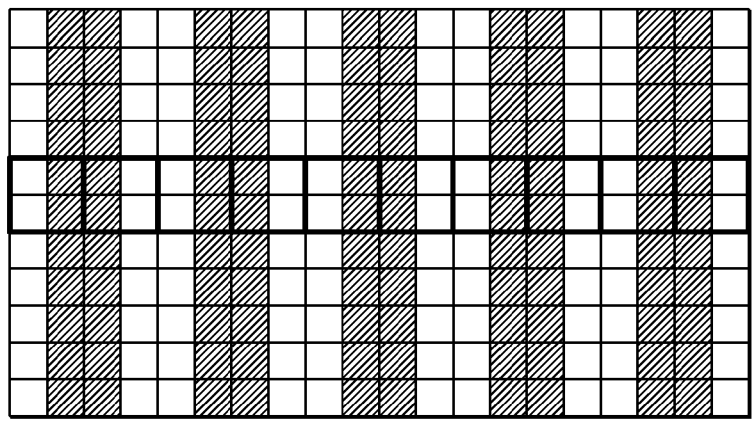
Figure 26C:
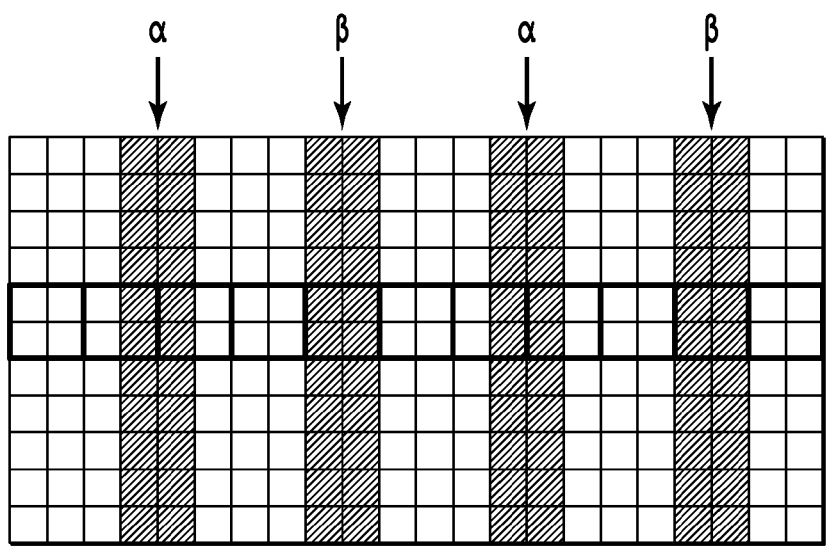

FIGS. 26A to 26C are diagrams explaining a phase difference that may occur in the case where the first embodiment is applied. In FIGS. 26A to 26C, the area of 2×2 pixels surrounded by a thick line represents the processing area and the white cell represents a pixel whose pixel value is 0 and which has been determined to be a pixel that can provide a threshold value and the gray cell represents a pixel whose pixel value is other than 0 and which has been determined to be a pixel that cannot provide a threshold value.

The input images in FIGS. 26A and 26B are both images in which a thin line having a width of two pixels and a space (blank) having a width of two pixels are repeated alternately, but the coordinates of the positions of the thin lines of both the image are different and there is a difference in phase between the processing area and the thin line. In FIG. 26A, as in FIG. 23A described previously, the reference patterns are pattern 0 and pattern 15 in FIG. 7, and therefore, even in the case where the first embodiment is applied, the density of the thin line does not change from that in the case where the first embodiment is not applied. On the other hand, in FIG. 26B, as in FIG. 23B described previously, the reference patterns are pattern 5 and pattern 10 in FIG. 7, and therefore, the density is increased stochastically by applying the first embodiment. In this manner, the density may vary depending on the coordinates of the position of the thin line in the input image. Then, the input image in FIG. 26C is an image in which the thin line having a width of two pixels and the space having a width of three pixels are repeated alternately. In the case where the first embodiment is applied to the input image, the reference patterns are different for different thin lines. First, as to a thin line α, as in FIG. 26B, the reference patterns are pattern 5 and pattern 10 in FIG. 7, and therefore, the density of the thin line increases. However, as to a thin line β, as in FIG. 26A, the reference patterns are pattern 0 and pattern 15 in FIG. 7, and therefore, the density of the thin line does not increase. In other words, in the case of the input image such as this, an output image in which the dark thin line (α) and the thin line (β) that is not dark repeatedly appear alternately is obtained. In other words, despite the fact that the thin lines have the same pixel value, there is brought about such a problem that unevenness in density occurs.

Figure 27A:
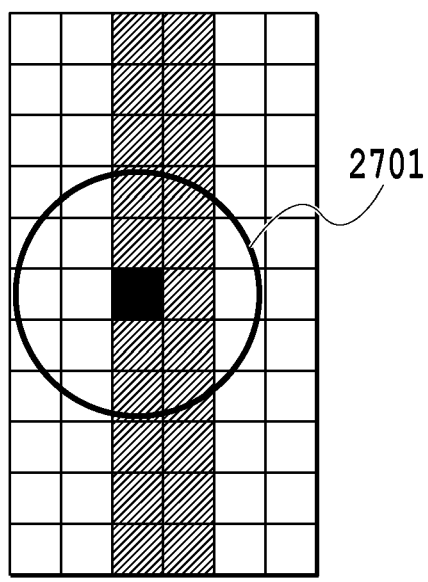
FIGS. 27A and 27B are diagrams explaining a position of the processing area in the fifth embodiment.
Figure 27B:
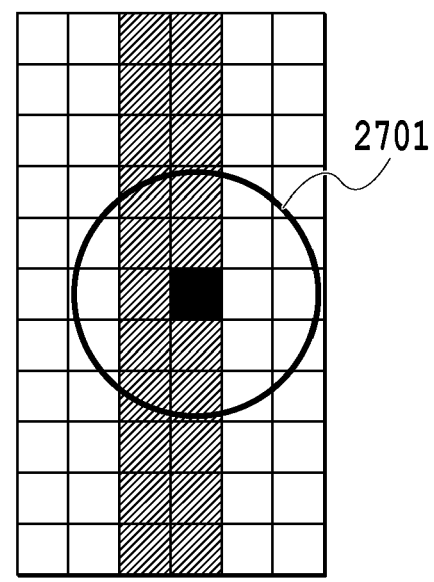

FIGS. 27A and 27B are diagrams showing the positions of the processing areas in the case where the present embodiment is applied to the input images including the thin line having a width of two pixels shown in FIGS. 23A and 23B. In FIGS. 27A and 27B, the black cell represents the pixel of interest and a circle 2701 represents an outline of the processing area. In the present embodiment, a new threshold value is determined by comparing the minimum threshold value within the processing area represented by the circle 2701 with the threshold value of the pixel of interest while shifting the pixel of interest one by one, and therefore, it is known that the problem of the difference in phase depending on the coordinates of the position of the thin line as described above may not occur.

As described above, it is possible to reduce breakages by increasing the number of on-dots by utilizing a threshold value of another pixel.

As above, in the present embodiment, it is possible to stochastically increase the density of a thin line to improve reproducibility of the thin line while preventing unevenness in an increase in density due to the phase. Further, as in the other embodiments, a large object such as one in which there is no pixel that can provide a threshold value within the processing area is not affected.

[Sixth Embodiment]

Figure 28B:
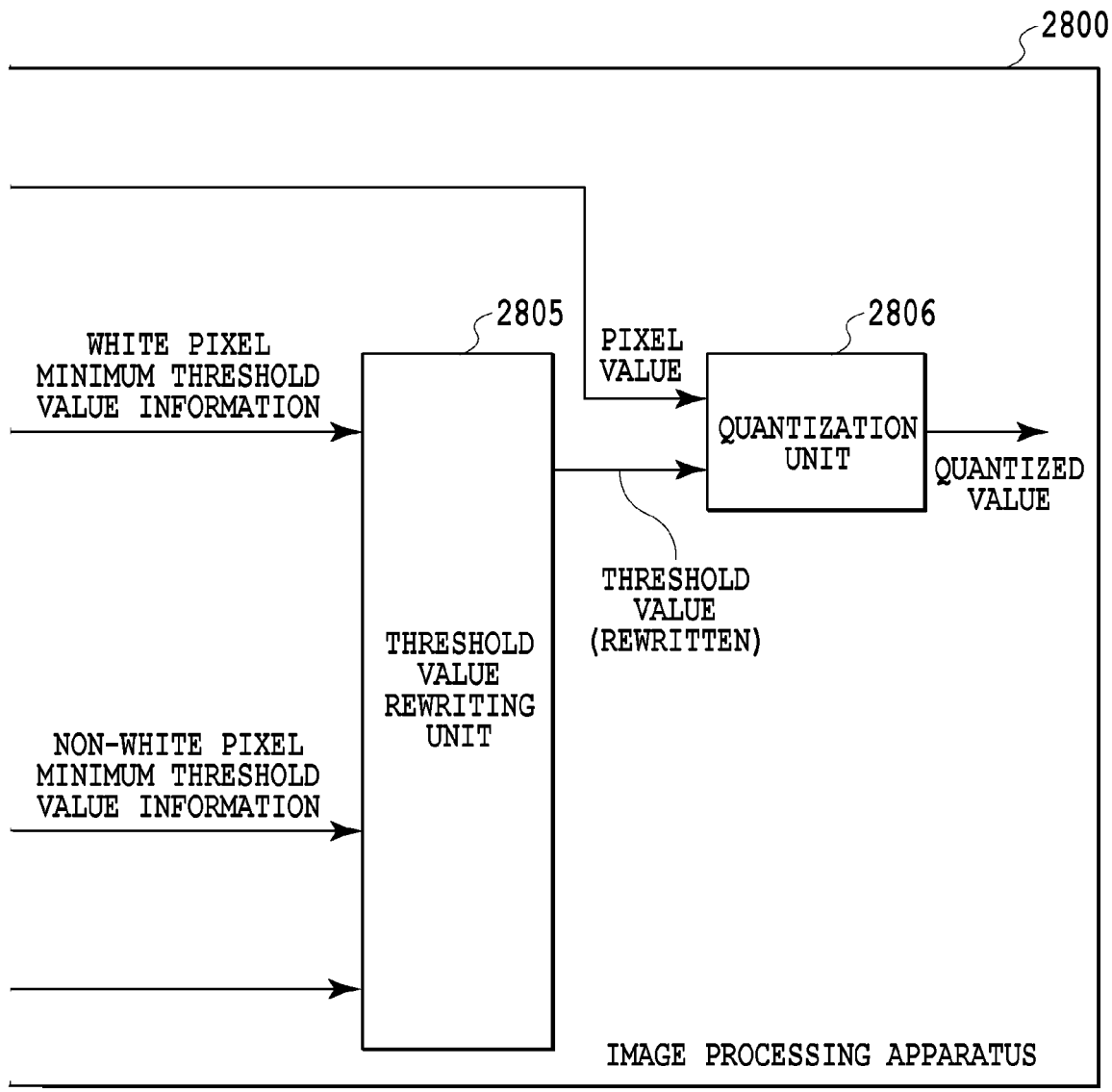
FIG. 28 is a diagram showing a relationship between FIGS. 28A and 28B, and FIGS. 28A and 28B are function block diagrams showing an internal configuration of an image processing apparatus that implements halftone processing according to a sixth embodiment.

In the embodiments described previously, the method of determining whether it is possible to provide an allocated threshold value to another pixel position for all the pixels within a predetermined area is explained mainly. In a sixth embodiment, as a method of changing part of threshold values by using another threshold value in a predetermined area, a method of determining a threshold value after dividing an area based on the pixel value is explained. Specifically, a method is explained in which, for each divided area, a pixel that can provide a threshold value to another pixel position and a candidate of the pixel position whose threshold value is rewritten into another threshold value are determined, and a threshold value of the pixel position determined to be a candidate is determined. FIGS. 28A and 28B are function block diagrams showing an internal configuration of an image processing apparatus that implements halftone processing according to the present embodiment.

A pixel value/threshold value acquisition unit 2801 acquires the pixel value of each pixel included in a predetermined area of input image data and the threshold value corresponding to each pixel position from the RAM or the like, not shown. Here, the predetermined area is set to a block area of 4 vertical pixels×4 horizontal pixels, but the shape and size of the predetermined area are not limited to those. The acquired pixel value is sent to a white pixel determination unit 2802 and a quantization unit 2806. Further, the acquired threshold value is sent to a white pixel minimum threshold value extraction unit 2803 and a non-white pixel minimum threshold value extraction unit 2804.

The white pixel determination unit 2802 determines, as a unit configured to divide the predetermined area into a plurality of areas according to density, whether each pixel in the predetermined area is a white pixel based on the pixel value received from the pixel value/threshold value acquisition unit 2801. For example, in the case where the pixel value "0" indicates a white pixel, whether each pixel is a white pixel is determined by determining whether the input pixel value is "0", and thereby, the above-described predetermined area is divided into an area including white pixels and an area including pixels (non-white pixels) other than the white pixel. Then, information specifying the white pixels within the predetermined area (information specifying the white pixel area and non-white pixel area, hereinafter, "white pixel information") is sent to the white pixel minimum threshold value extraction unit 2803 and the non-white pixel minimum threshold value extraction unit 2804. It may also be possible to use attribute information generated by an RIP (Raster Image Processor) device or the like in place of the white pixel determination unit 2802.

The white pixel minimum threshold value extraction unit 2803 refers to the threshold values of the white pixel group including the white pixels within the predetermined area by using the white pixel information received from the white pixel determination unit 2802 and the threshold value received from the pixel value/threshold value acquisition unit 2801. The white pixel minimum threshold value extraction unit 2803 extracts the minimum threshold value (hereinafter, white pixel minimum threshold value) from among the threshold values corresponding to the white pixel positions. Information on the extracted white pixel minimum threshold value is sent to a threshold value rewriting unit 2805.

The non-white pixel minimum threshold value extraction unit 2804 refers to the threshold values of the non-white pixel group including non-white pixels (pixels other than the white pixel) within the predetermined area by using the white pixel information received from the white pixel determination unit 2802 and the threshold value received from the pixel value/threshold value acquisition unit 2801. The non-white pixel minimum threshold value extraction unit 2804 extracts the minimum threshold value (hereinafter, non-white pixel minimum threshold value) from among the threshold values corresponding to the non-white pixel positions. Information on the extracted non-white pixel minimum threshold value is sent to the threshold value rewriting unit 2805.

The threshold value rewriting unit 2805 performs processing to rewrite the non-white pixel minimum threshold value into the white pixel minimum threshold value for the threshold value matrix corresponding to the input image. Specifically, the white pixel minimum threshold value is compared with the non-white pixel minimum threshold value and in the case where the white pixel minimum threshold value is the smaller value (threshold value with a high probability that a dot will be formed), the processing to replace the non-white pixel minimum threshold value with the white pixel minimum threshold value is performed.

As described previously, in the area coverage modulation, the tone level is represented by the number of dots that are formed within a predetermined area. However, in the case where a pixel is a white pixel, a dot is not formed even in the case where the threshold value corresponding to the pixel takes any value. While, in the case where a threshold value is high value, a dot is not easily formed even in the case where the pixel value corresponding to the threshold value takes any value. As a result of this, there is a possibility that the number of dots that are formed within the predetermined area will decrease or a dot will disappear even if there is a threshold value which is small in the predetermined area. Because of this, in the present embodiment, in the case where the minimum threshold value among the threshold values corresponding to the white pixel group is a threshold value with a high probability that a dot will be formed (threshold value having a comparatively small value), the minimum threshold value among the threshold values corresponding to the non-white pixel group is replaced with the minimum threshold value of the white pixel group. Due to this, it becomes more likely that a dot is formed in the position of the non-white pixel where the probability that a dot will be formed is lower than that of the other pixels within the predetermined area because the value of the corresponding threshold value is comparatively great. As a result of this, it is possible to form a dot in the position of the pixel other than the white pixel of the input image data without the need to change the threshold value or the pixel value within the predetermined area defined by the area coverage modulation. The minimum threshold value of the non-white pixel is changed into the minimum threshold value of the white pixel, but by regarding this as that the minimum threshold value of the non-white pixel is exchanged with the minimum threshold value of the white pixel, the combination of threshold values within the predetermined area remains the same. In the present embodiment, in view of the fact that a dot is not formed in the white pixel position even in the case where the threshold value of the white pixel position takes any value, the replacement of the minimum threshold value of the white pixel is not performed.

The quantization unit 2806 quantizes the input pixel value by using the threshold value matrix in which the pixel value that is input (input pixel value) has already been rewritten.

Although not shown schematically, an image processing apparatus 2800 includes a hardware configuration for implementing each of the above-described units, i.e., an HDD, a ROM, and a RAM for storing various programs and data, and a CPU that comprehensively controls each unit by executing programs, etc.

Figure 29:
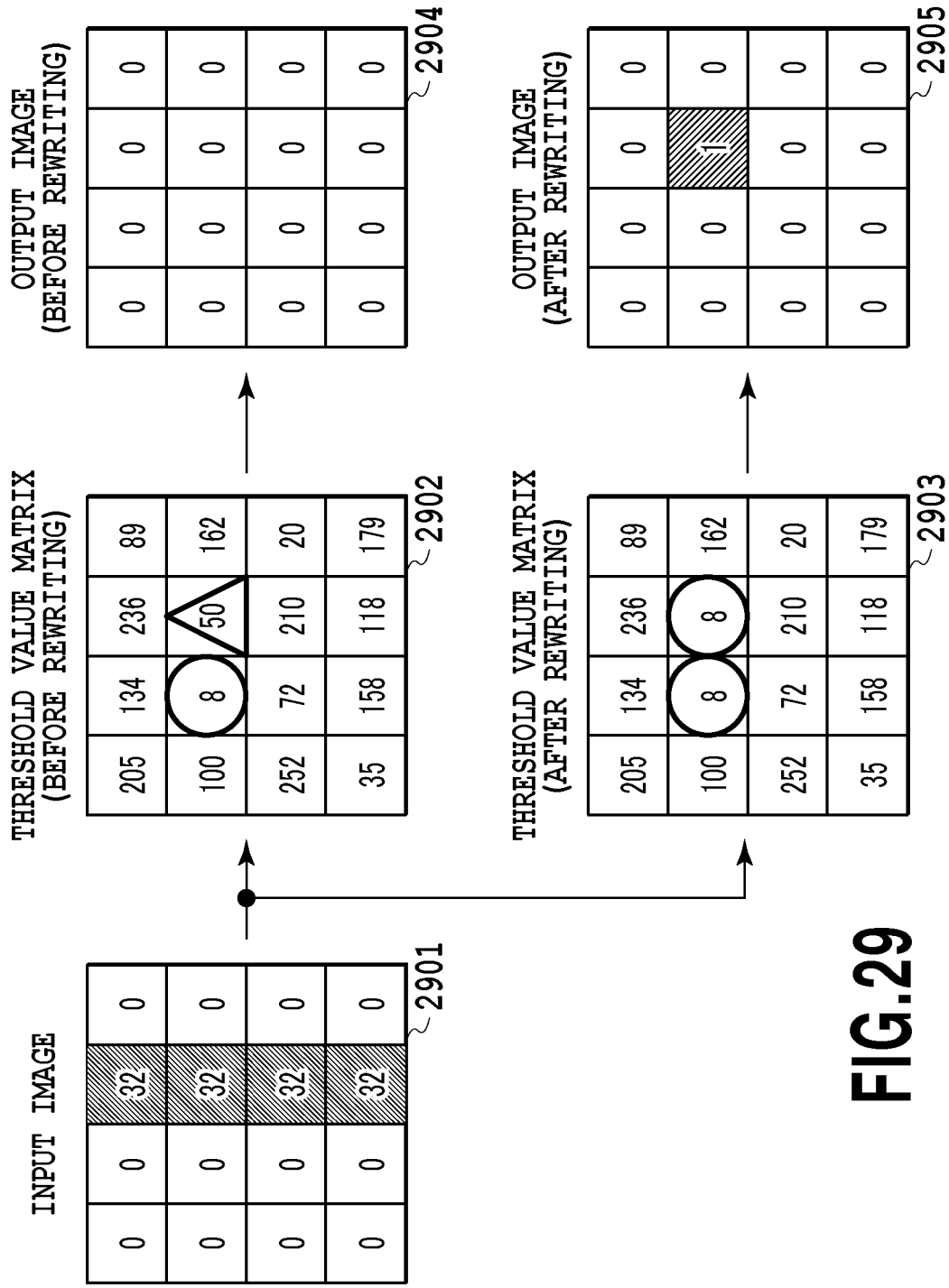
FIG. 29 is a diagram explaining a difference in an output image between the case where threshold value rewriting processing is performed and the case where threshold value rewriting processing is not performed according to the sixth embodiment.

FIG. 29 is a diagram explaining a difference in the output image between the case where the threshold value rewriting processing according to the present embodiment is performed and the case where the threshold value rewriting processing is not performed.

An input image 2901 having 4 vertical pixels×4 horizontal pixels is image data in which the pixel value in the third column is "32" and the pixel value in the other columns is "0". A threshold value matrix 2902 is a threshold value matrix before the threshold value rewriting processing is performed, corresponding to the input image 2901. In the threshold value matrix 2902, the position having a smaller threshold value means a position with a higher probability that a dot will be formed. For example, the pixel corresponding to a threshold value of "8" is quantized into an on-dot in the case where the input pixel value is "9" or greater among input pixel values of 0 to 255. In other words, the pixel has the highest probability that a dot will be formed in the predetermined area. On the other hand, the pixel having a threshold value of 252 is quantized into an on-dot only in the case where the pixel value is "253", "254", or "255" among the input pixel values of 0 to 255. Consequently, the pixel corresponding to the threshold value "252" means a pixel with the lowest probability that a dot will be formed.

A screen image 2904 is an output image that is obtained in the case where the input image 2901 is quantized by using the threshold value matrix 2902. While the pixel value in the third column of the input image 2901 is "32", the minimum value of the threshold values in the third column of the threshold value matrix 2902 is "50" (Δ in FIG. 29), and therefore, no dot exists in the screen image 2904 (dot disappearance).

A threshold value matrix 2903 is a threshold value matrix after the threshold value rewriting processing is performed, corresponding to the input image 2901. In the threshold value matrix 2903, it is known that the non-white pixel minimum threshold value "50" is replaced with the value of the white pixel minimum threshold value "8" (○ in FIG. 29) in the threshold value matrix 2902. A screen image 2905 is an output image that is obtained in the case where the input image 2901 is quantized by using the threshold value matrix 2903 after the threshold value rewriting. In the screen image 2905, the dot that has not been present (has disappeared) in the screen image 2904 is reproduced.

Figure 1:
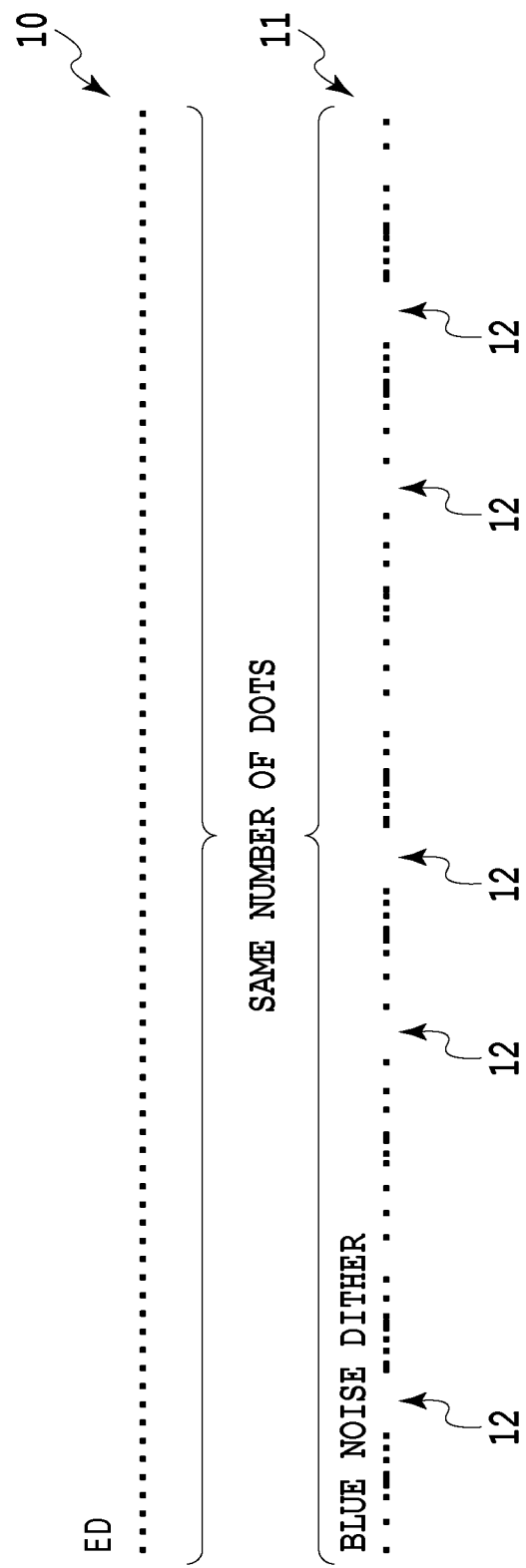
FIG. 1 is a diagram showing an example representing thin lines having been subjected to processing using the error diffusion method (ED) and the dither method, respectively.
Figures 2, 30A:
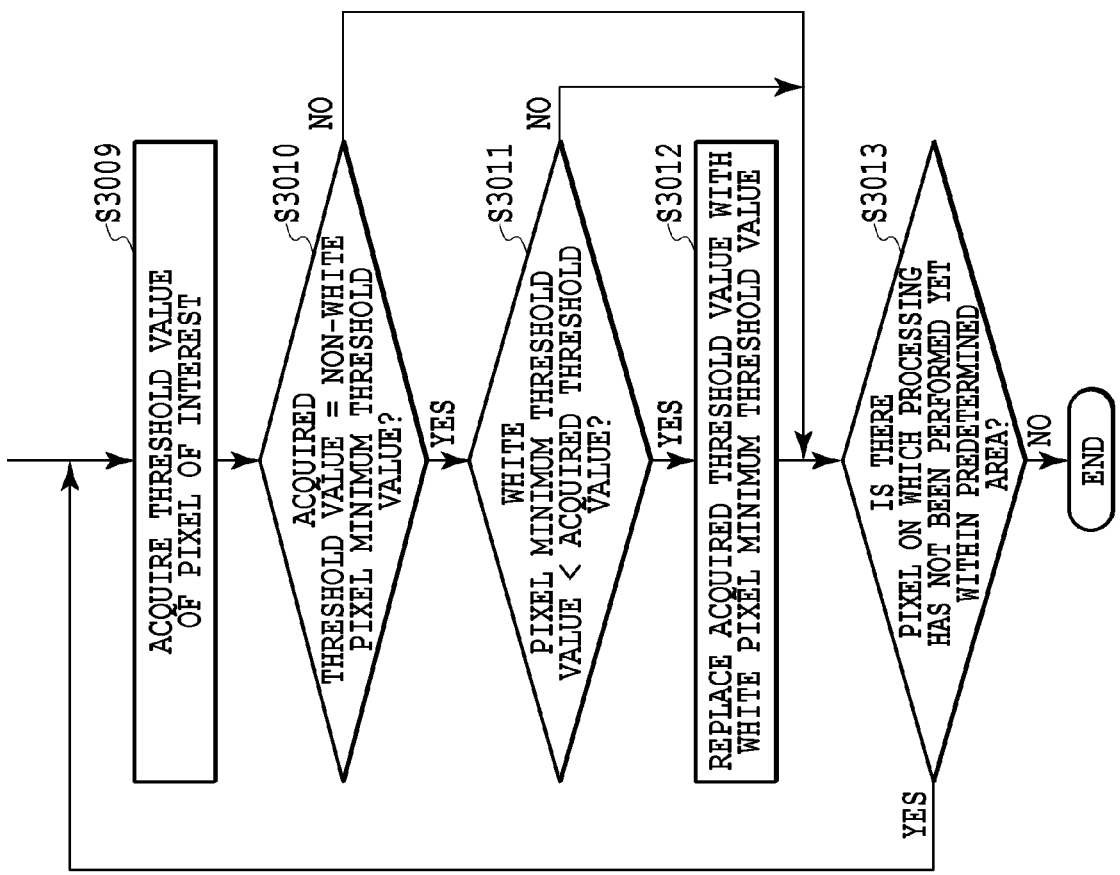
FIG. 30A is a diagram showing a relationship between FIGS. 30A-1 and 30A-2, and FIGS. 30A-1 and 30A-2 are flowcharts showing details of processing that is performed by the image processing apparatus according to the sixth embodiment.

FIGS. 30A-1 and 30A-2 are flowcharts showing details of the white pixel minimum threshold value extraction processing, the non-white pixel minimum threshold value extraction processing, and the threshold value rewriting processing among the processing that is performed by the image processing apparatus according to the present embodiment. The series of processing is performed by the CPU executing computer executable programs in which the procedures shown below are described after reading the programs from the ROM or the like onto the RAM.

At step 3001, the white pixel minimum threshold value extraction unit 2803 initializes a white pixel minimum threshold value ($MinTH_{off}$), which is a variable holding the minimum threshold value of the white pixel position. Similarly, the non-white pixel minimum threshold value extraction unit 2804 initializes a non-white pixel minimum threshold value ($MinTH_{on}$), which is a variable holding the minimum threshold value of the non-white pixel position. Specifically, the maximum value of the threshold values (or the maximum value in the range of the input pixel values) in the screen processing is set to the values of $MinTH_{off}$ and $MinTH_{on}$, respectively. These variables are held in the RAM.

At step 3002, the white pixel minimum threshold value extraction unit 2803 and the non-white pixel minimum threshold value extraction unit 2804 acquires white pixel information about the pixel of interest within the predetermined area and a threshold value corresponding to the pixel of interest.

At step 3003, based on the white pixel information acquired at step 3002, whether the pixel of interest is a white pixel is determined. In the case where the results of the determination indicate that the pixel of interest is a white pixel, the processing proceeds to step 3004. On the other hand, in the case where the pixel of interest is not a white pixel (in the case where the pixel of interest is a non-white pixel), the processing proceeds to step 3006. Here, whether the pixel of interest is a white pixel is determined based on the white pixel information, which is the determination results of the white pixel determination unit 2802, but it may also be possible to determine whether the pixel of interest is a white pixel directly from the pixel value of the pixel of interest.

At step 3004, the white pixel minimum threshold value extraction unit 2803 compares the white pixel minimum threshold value ($MinTH_{off}$) at present with the threshold value of the pixel of interest acquired at step 3002. In the case where the results of the comparison indicate that the value of $MinTH_{off}$ is greater than the threshold value of the pixel of interest, the processing proceeds to step 3005. On the other hand, in the case where the value of $MinTH_{off}$ is not greater than the threshold value of the pixel of interest, the processing proceeds to step 3008.

At step 3005, the white pixel minimum threshold value extraction unit 2803 updates the value of $MinTH_{off}$ to the threshold value acquired at step 3002.

At step 3006, the non-white pixel minimum threshold value extraction unit 2804 compares the non-white pixel minimum threshold value ($MinTH_{on}$) with the threshold value of the pixel of interest acquired at step 3002. In the case where the results of the comparison indicate that the value of $MinTH_{on}$ is greater than the threshold value of the pixel of interest, the processing proceeds to step 3007. On the other hand, in the case where the value of $MinTH_{on}$ is not greater than the threshold value of the pixel of interest, the processing proceeds to step 3008.

At step 3007, the non-white pixel minimum threshold value extraction unit 2804 updates the value of $MinTH_{on}$ to the threshold value acquired at step 3002.

At step 3008, whether the processing has been completed for all the pixels within the predetermined area is determined. In the case where the processing has been completed for all the pixels, the processing proceeds to step 3009. At the point in time the processing has proceeded to step 3009, the minimum threshold value in the white pixel position within the predetermined area is held as $MinTH_{off}$ and the minimum threshold value in the non-white pixel position is held as $MinTH_{on}$. On the other hand, in the case where there is a pixel on which the processing has not been performed yet within the predetermined area, the processing returns to step 3002, and the next pixel is taken to be the pixel of interest and the processing at each of step 3002 to step 3007 is performed.

At step 3009, the threshold value rewriting unit 2805 acquires a threshold value corresponding to the pixel of interest within the processing area.

At step 3010, the threshold value rewriting unit 2805 determines whether the threshold value acquired at step 3009 and the non-white pixel minimum threshold value ($MinTH_{on}$) are the same. In the case where both are the same value, the processing proceeds to step 3011. On the other hand, in the case where both are not the same value, the processing proceeds to step 3013.

At step 3011, the threshold value rewriting unit 2805 compares the white pixel minimum threshold value ($MinTH_{off}$) with the threshold value acquired at step 3009. At the point in time of the comparison, the threshold value acquired at step 3009 is the same value as the non-white pixel minimum threshold value ($MinTH_{on}$). Consequently, at this step, the non-white pixel minimum threshold value ($MinTH_{on}$) and the white pixel minimum threshold value ($MinTH_{off}$) are compared to determine which is greater as a result. In the case where the results of the determination indicate that the white pixel minimum threshold value is smaller than the non-white pixel minimum threshold value (acquired threshold value), the processing proceeds to step 3012. On the other hand, in the case where the white pixel minimum threshold value is not smaller than the non-white pixel minimum threshold value (acquired threshold value), the processing proceeds to step 3013.

At step 3012, the threshold value rewriting unit 2805 replaces the threshold value acquired at step 3009 with the white pixel minimum threshold value. In other words, as the threshold value corresponding to the pixel of interest, the value of the white pixel minimum threshold value ($MinTH_{off}$) is set as a result.

At step 3013, whether the processing has been completed for all the pixels within the predetermined area is determined. In the case where there is a pixel on which the processing has not been performed yet, the processing returns to step 3009, and the next pixel is taken to be the pixel of interest and the processing at step 3009 to step 3012 is repeated. On the other hand, in the case where the processing has been performed for all the pixels, the present processing is exited.

The above is the contents of the white pixel minimum threshold value extraction processing, the non-white pixel minimum threshold value extraction processing, and the threshold value rewriting processing in the present embodiment.

Due to the above, the minimum threshold value of the non-white pixel of the threshold value matrix that is used for quantization is rewritten into a threshold value with a high probability that a dot will be formed for each predetermined area.

<First Modification Example>

In the sixth embodiment described above, in the case where the threshold value of the pixel of interest is the minimum threshold value of the non-white pixel (Yes at S3010) and is greater than the white pixel minimum threshold value (Yes at S3011), the threshold value of the pixel of interest is replaced with the white pixel minimum threshold value. The purpose is to turn the pixel of interest into an on-dot. Consequently, another aspect in which an on-dot is determined briefly is explained as a first modification example.

Figures 2, 30B:
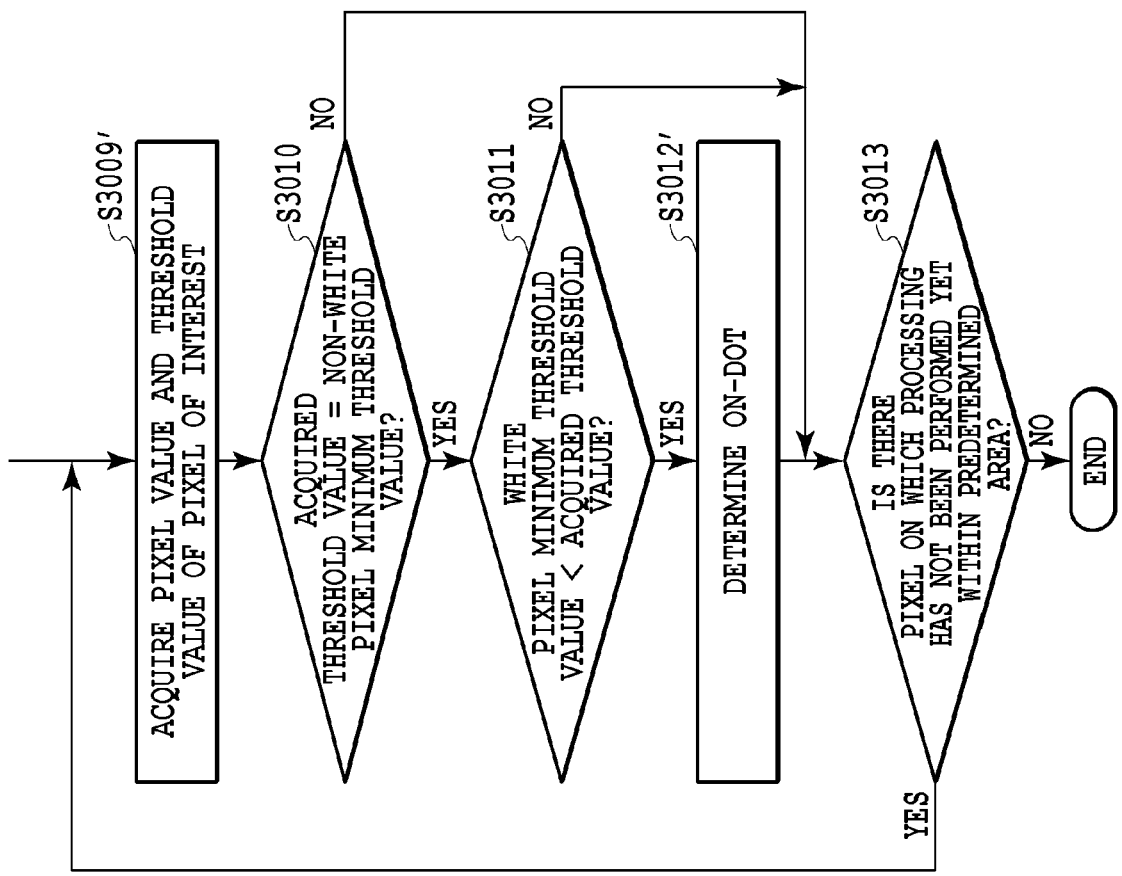
FIG. 30B is a diagram showing a relationship between FIGS. 30B-1 and 30B-2, and FIGS. 30B-1 and 30B-2 are flowcharts according to a first modification example of the sixth embodiment, corresponding to that in FIGS. 30A-1 and 30A-2.

FIGS. 30B-1 and 30B-2 are flowcharts corresponding to that in FIGS. 30A-1 and 30A-2 described above according to the first modification example. Steps 3001 to 3008, 3010, 3011, and 3013 are the same as those in FIGS. 30A-1 and 30A-2, and therefore, in the following, steps 3009' and 3012' that are different points are explained mainly.

At step 3009', the threshold value rewriting unit 2805 acquires the pixel value of the pixel of interest in addition to the threshold value corresponding to the pixel of interest within the predetermined area.

In the case where the threshold value corresponding to the acquired pixel of interest is the minimum threshold value of the non-white pixel (Yes at S3010) and is greater than the white pixel minimum threshold value (Yes at S3011), the threshold value rewriting unit 2805 determines the pixel of interest to be an on-dot at step 3012'. Specifically, the threshold value scheduled to be replaced with another (white pixel minimum threshold value) is compared with the pixel value acquired at step 3009' and in the case where the pixel value is greater, the threshold value corresponding to the pixel of interest is set to "0". Due to this, the pixel of interest turns into an on-dot without fail.

In the case where, for example, a mode to enhance a thin line is specified as the operation mode of the image processing apparatus, it may also be possible to forcibly set a predetermined number of threshold values in the non-white pixel group to "0". In this case, the "predetermined number" depends on the size of the threshold value matrix and is determined, for example, to be one for the 4×4 size, to be two for the 8×8 size, and so on. Due to this, it is made possible to reproduce a thin line without fail although the density fluctuates somewhat.

<Second Modification Example>

The sixth embodiment described above premises that the threshold value rewriting unit 2805 rewrites the threshold value matrix itself that is used for quantization and the quantization unit 2806 performs quantization by using the rewritten threshold value matrix, but the aspect is not limited to this. For example, a configuration may be accepted in which the threshold value matrix itself is held by the quantization unit 2806 and information indicating which threshold value in the threshold value matrix is rewritten into which value (hereinafter, threshold value rewriting information) is generated by the threshold value rewriting unit 2805. In this case, the threshold value rewriting information generated by the threshold value rewriting unit 2805 is sent to the quantization unit 2806 and the threshold value matrix is modified based on the threshold value rewriting information in the quantization unit 2806, and then, the quantization processing is performed.

[Seventh Embodiment]

In the sixth embodiment, in the case where the minimum threshold value of the white pixel within the predetermined area is a threshold value with a high probability that a dot will be formed, the minimum threshold value of the non-white pixel is rewritten into the same value as the minimum threshold value of the white pixel. Next, an aspect is explained as a seventh embodiment in which, in the case where the minimum threshold value of all the pixels within the predetermined area is a threshold value with a high probability that a dot will be formed, the minimum threshold value of the non-white pixel is rewritten into the same value as the minimum threshold value of all the pixels. Explanation of the portions in common to those of the sixth embodiment (including the modification examples) is omitted or simplified and in the following, different points are explained mainly.

Figure 31B:
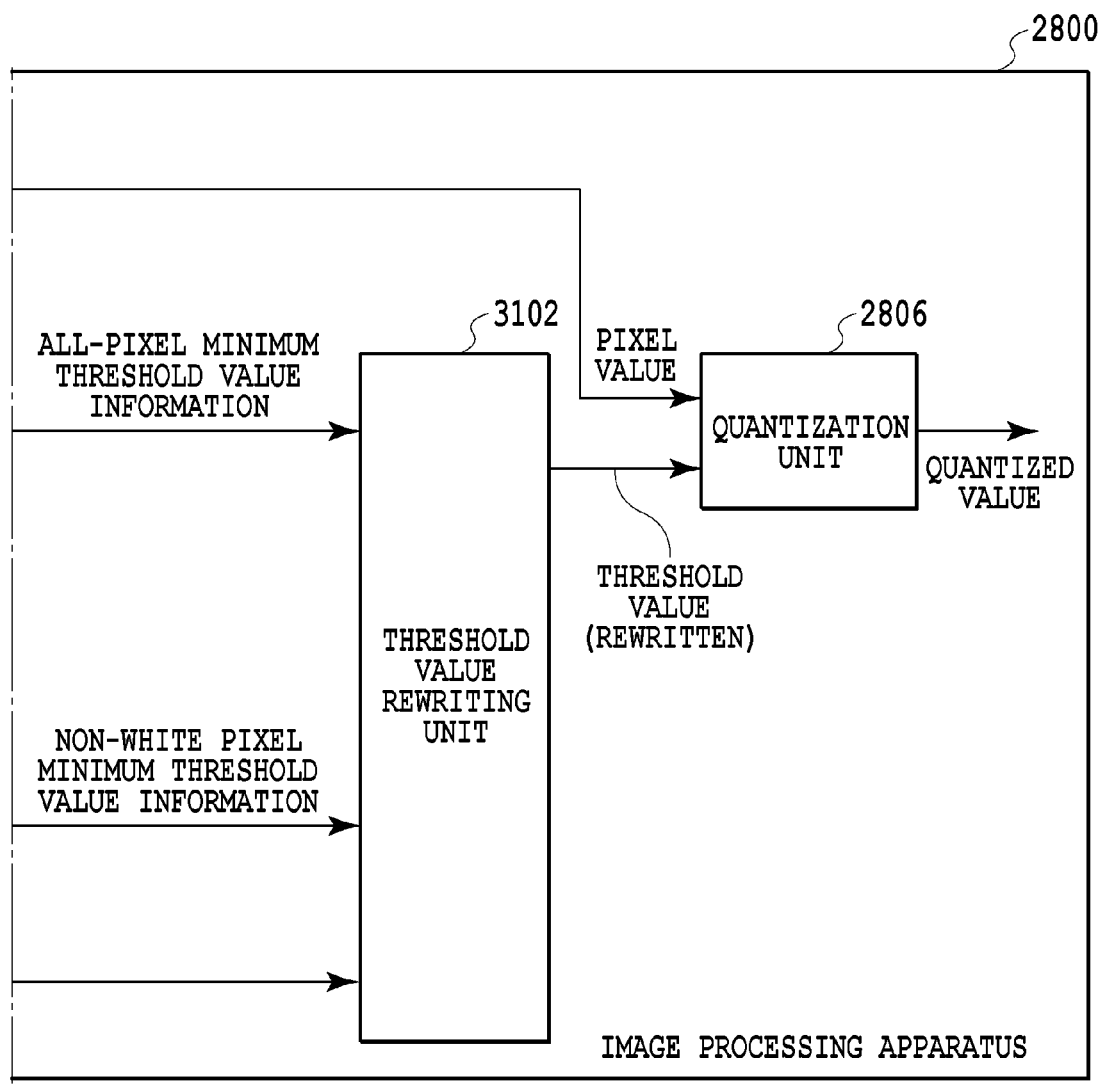
FIG. 31 is a diagram showing a relationship between FIGS. 31A and 31B, and FIGS. 31A and 31B are function block diagrams showing an internal configuration of an image processing apparatus that implements halftone processing according to a seventh embodiment.

FIGS. 31A and 31B are function block diagrams showing an internal configuration of an image processing apparatus that implements halftone processing according to the present embodiment.

The pixel value/threshold value acquisition unit 2801, the white pixel determination unit 2802, the non-white pixel minimum threshold value extraction unit 2804, and the quantization unit 2806 are the same as those of the sixth embodiment, and therefore, explanation is omitted.

An all-pixel minimum threshold value extraction unit 3101 extracts the minimum threshold value (hereinafter, all-pixel minimum threshold value) from among the threshold values corresponding to all the pixels within the predetermined area by using the threshold value received from the pixel value/threshold value acquisition unit 2801.

A threshold value rewriting unit 3102 performs processing to rewrite the non-white pixel minimum threshold value into the all-pixel minimum threshold value for the threshold value matrix corresponding to the input image. Specifically, the all-pixel minimum threshold value is compared with the non-white pixel minimum threshold value and in the case where the all-pixel minimum threshold value is the smaller value (threshold value with a high probability that a dot will be formed), the processing to replace the non-white pixel minimum threshold value with the all-pixel minimum threshold value is performed. In other words, in the rewriting processing in the present embodiment, only in the case where the minimum threshold value extracted by the all-pixel minimum threshold value extraction unit 3101 is located in the position corresponding to a white pixel, the non-white pixel minimum threshold value is replaced with the threshold value.

The processing contents themselves in the white pixel determination unit 2802 are the same as those of the sixth embodiment, but in the present embodiment, the white pixel information, which is the results of the processing, is input only to the non-white pixel minimum threshold value extraction unit 2804. The reason is that the all-pixel minimum threshold value extraction unit 3101 performs the processing on the threshold values corresponding to all the pixels within the predetermined area and the white pixel information is not necessary for the processing.

Figures 2, 32A:
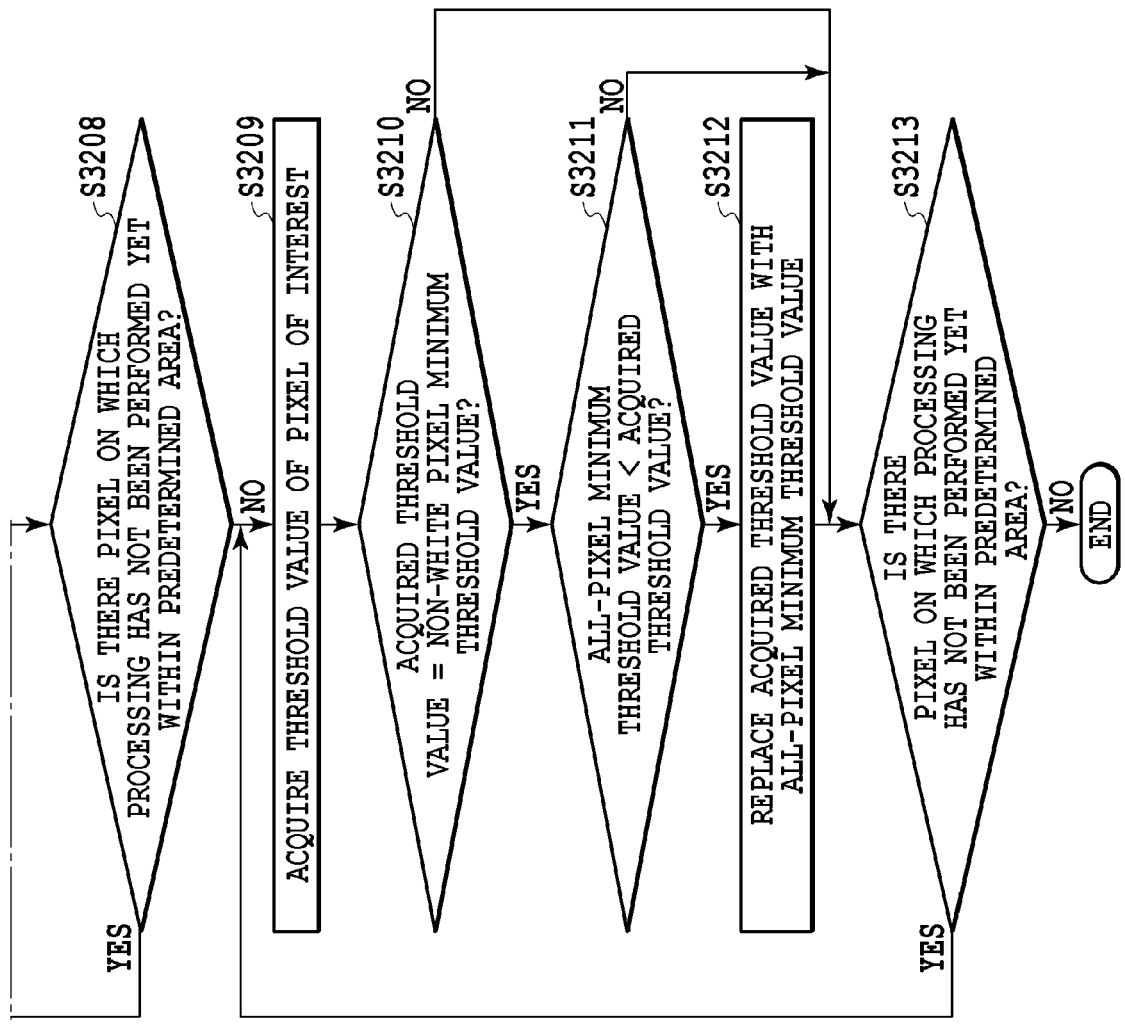
FIG. 32A is a diagram showing a relationship between FIGS. 32A-1 and 32A-2, and FIGS. 32A-1 and 32A-2 are flowcharts showing details of processing performed by the image processing apparatus according to the seventh embodiment.

FIGS. 32A-1 and 32A-2 are flowcharts showing details of the all-pixel minimum threshold value extraction processing, the non-white pixel minimum threshold value extraction processing, and the threshold value rewriting processing among the processing that is performed by the image processing apparatus according to the present embodiment.

At step 3201, the all-pixel minimum threshold value extraction unit 3101 initializes an all-pixel minimum threshold value (MinTH$_{all}$), which is a variable holding the minimum threshold value of all the pixel positions. Similarly, the non-white pixel minimum threshold value extraction unit 2804 initializes the non-white pixel minimum threshold value (MinTH$_{on}$), which is the variable holding the minimum threshold value of the non-white pixel position. Specifically, the maximum value of the threshold values (or the maximum value in the range of the input pixel values) in the screen processing is set to the values of MinTH$_{all}$ and MinTH$_{on}$, respectively. These variables are held in the RAM.

At step 3202, the all-pixel minimum threshold value extraction unit 3101 acquires the threshold value corresponding to the pixel of interest within the predetermined area. Then, the non-white pixel minimum threshold value extraction unit 2804 acquires the white pixel information about the pixel of interest and the threshold value corresponding to the pixel of interest.

At step 3203, the all-pixel minimum threshold value extraction unit 3101 compares the all-pixel minimum threshold value (MinTH$_{all}$) at present with the threshold value of the pixel of interest acquired at step 3203. In the case where the results of the comparison indicate that the value of MinTH$_{all}$ is greater than the threshold value of the pixel of interest, the processing proceeds to step 3204. On the other hand, in the case where the value of MinTH$_{all}$ is not greater than the threshold value of the pixel of interest, the processing proceeds to step 3205.

At step 3204, the all-pixel minimum threshold value extraction unit 3101 updates the value of MinTH$_{all}$ to the threshold value acquired at step 3202.

At step 3205, whether the pixel of interest is a white pixel is determined based on the white pixel information acquired at step 3202. In the case where the results of the determination indicate that the pixel of interest is a white pixel, the processing proceeds to step 3208. On the other hand, in the case where the pixel of interest is not a white pixel (in the case where the pixel of interest is a non-white pixel), the processing proceeds to step 3206.

At step 3206, the non-white pixel minimum threshold value extraction unit 2804 compares the non-white pixel minimum threshold value (MinTH$_{on}$) at present with the threshold value of the pixel of interest acquired at step 3202. In the case where the results of the comparison indicate that the value of MinTH$_{on}$ is greater than the threshold value of the pixel of interest, the processing proceeds to step 3207. On the other hand, in the case where the value of MinTH$_{on}$ is not greater than the threshold value of the pixel of interest, the processing proceeds to step 3208.

At step 3207, the non-white pixel minimum threshold value extraction unit 2804 updates the value of MinTH$_{on}$ to the threshold value acquired at step 3202.

At step 3208, whether the processing has been completed for all the pixels within the predetermined area is determined. In the case where the processing has been completed for all the pixels, the processing proceeds to step 3209. At the point in time the processing has proceeded to step 3209, the minimum threshold value in the all-pixel position within the predetermined area is held as $MinTH_{all}$ and the minimum threshold value in the non-white pixel position is held as $MinTH_{on}$. On the other hand, in the case where there is a pixel on which the processing has not been performed yet within the predetermined area, the processing returns to step 3202, and the next pixel is taken to be the pixel of interest and the processing at each of step 3202 to step 3207 is performed.

At step 3209, the threshold value rewriting unit 3102 acquires the threshold value corresponding to the pixel of interest within the predetermined area.

At step 3210, the threshold value rewriting unit 3102 determines whether the threshold value acquired at step 3209 and the non-white pixel minimum threshold value ($MinTH_{on}$) are the same. In the case where both are the same value, the processing proceeds to step 3211. On the other hand, in the case where both are not the same value, the processing proceeds to step 3213.

At step 3211, the threshold value rewriting unit 3102 compares the all-pixel minimum threshold value ($MinTH_{all}$) with the threshold value acquired at step 3209. At the point in time of the comparison, the threshold value acquired at step 3209 is the same value as the non-white pixel minimum threshold value ($MinTH_{on}$). Consequently, at this step, the non-white pixel minimum threshold value ($MinTH_{on}$) and the all-pixel minimum threshold value ($MinTH_{all}$) are compared to determine which is greater as a result. In the case where the results of the determination indicate that the all-pixel minimum threshold value is smaller than the non-white pixel minimum threshold value (acquired threshold value), the processing proceeds to step 3212. On the other hand, in the case where the all-pixel minimum threshold value is not smaller than the non-white pixel minimum threshold value (acquired threshold value), the processing proceeds to step 3213.

At step 3212, the threshold value rewriting unit 3102 replaces the threshold value acquired at step 3209 with the all-pixel minimum threshold value. In other words, as the threshold value corresponding to the pixel of interest, the value of the all-pixel minimum threshold value ($MinTH_{all}$) is set.

At step 3213, whether the processing has been completed for all the pixels within the predetermined area is determined. In the case where there is a pixel on which the processing has not been performed yet, the processing returns to step 3209, and the next pixel is taken to be the pixel of interest and the processing at step 3209 to step 3212 is repeated. On the other hand, in the case where the processing has been completed for all the pixels, the present processing is terminated.

The above is the contents of the all-pixel minimum threshold value extraction processing, the non-white pixel minimum threshold value extraction processing, and the threshold value rewriting processing in the present embodiment.

Due to the above, the threshold value that is used for quantization of the non-white pixel minimum threshold value is replaced with a threshold value with a high probability that a dot will be formed for each predetermined area.

The results obtained by the present embodiment are the same as those of the sixth embodiment, but part of the processing flow is simplified, and therefore, it is possible to expect the effect of reducing the circuit scale.

[Eighth Embodiment]

In the sixth and seventh embodiments, only one threshold value corresponding to one pixel within the predetermined area is changed. In the case where the predetermined area is small, changing of only one threshold value is sufficient, but in the case where the predetermined area is large, there is a possibility that a sufficient effect will not be obtained by changing only one threshold value. Consequently, an aspect is explained as an eighth embodiment in which a plurality of threshold values corresponding to a plurality of pixels within a predetermined area is changed. Explanation of the portions in common to those of the sixth and seventh embodiments (including the modification examples) is omitted or simplified and in the following, different points are explained mainly.

Figure 33B:
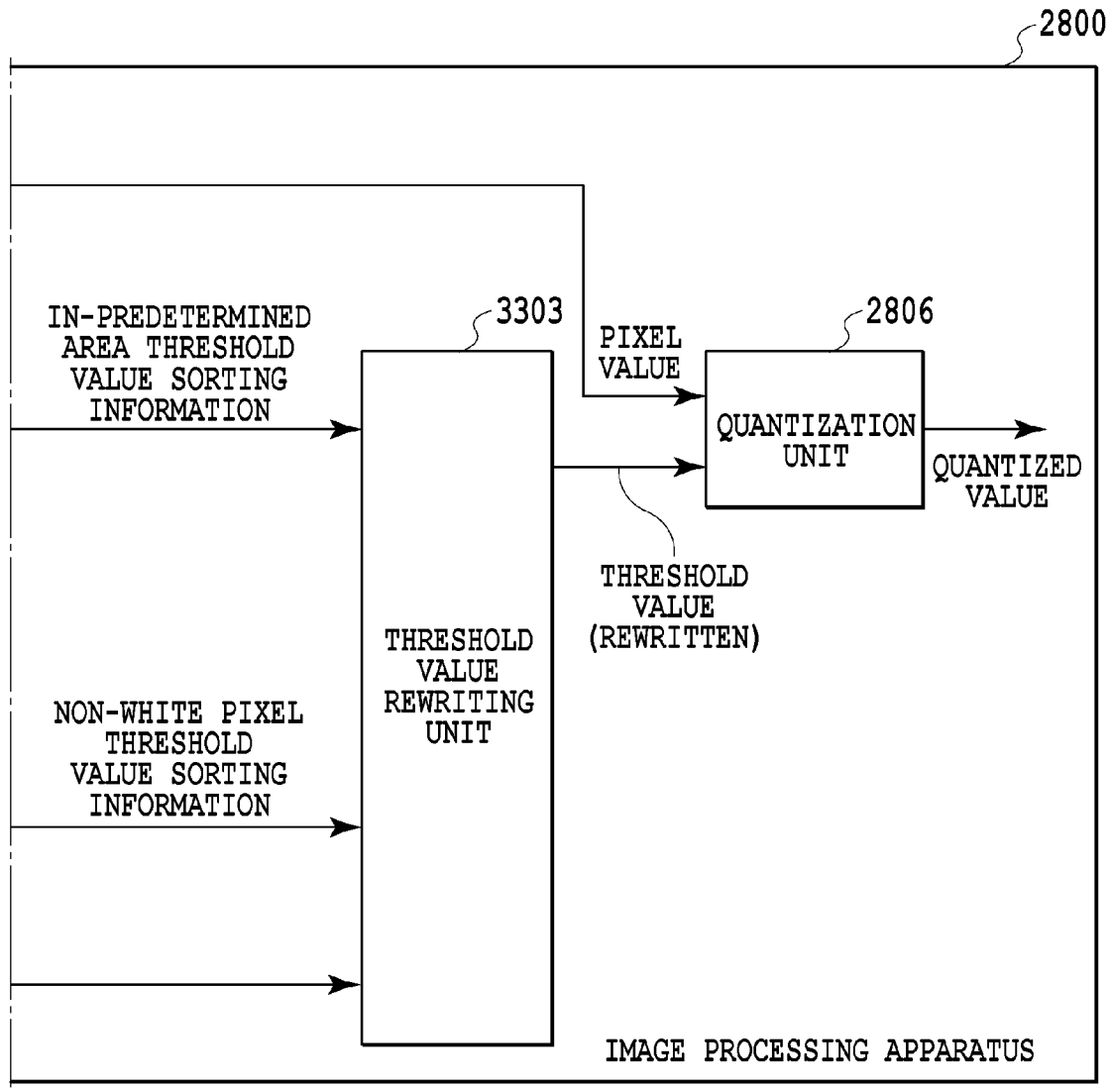
FIG. 33 is a diagram showing a relationship between FIGS. 33A and 33B, and FIGS. 33A and 33B are function block diagrams showing an internal configuration of an image processing apparatus that implements halftone processing according to an eighth embodiment.

FIGS. 33A and 33B are function block diagrams showing an internal configuration of an image processing apparatus that implements halftone processing according to the present embodiment.

The pixel value/threshold value acquisition unit 2801, the white pixel determination unit 2802, and the quantization unit 2806 are the same as those of the sixth embodiment, and therefore, explanation is omitted.

An in-predetermined area threshold value sorting unit 3301 sorts the threshold values corresponding to all the pixels within a predetermined area (e.g., a block area of 4 vertical pixels×4 horizontal pixels) in the ascending order (or descending order) by using the threshold values received from the pixel value/threshold value acquisition unit 2801. The sorting results are sent to a threshold value rewriting unit 3303 as in-predetermined area threshold value sorting information.

A non-white pixel threshold value sorting unit 3302 sorts the threshold values corresponding to the non-white pixel positions within the predetermined area in the ascending order (or descending order) by using the white pixel information received from the white pixel determination unit 2802 and the threshold values received from the pixel value/threshold value acquisition unit 2801. The sorting results are sent to the threshold value rewriting unit 3303 as non-white pixel threshold value sorting information.

The threshold value rewriting unit 3303 performs the threshold value rewriting processing based on the in-predetermined area threshold value sorting information and the non-white pixel threshold value sorting information. Specifically, as in the seventh embodiment, the threshold value within the predetermined area is compared with the threshold value of the non-white pixel in order and in the case where the threshold value within the predetermined area is smaller, the processing to replace the threshold value within the predetermined area and the threshold value of the non-white pixel is performed. However, in the present embodiment, the threshold values of a plurality of pixels are compared and replaced, not only the minimum threshold values but also the second minimum threshold values, the third minimum threshold values, and so on. Due to this, in the case where there are threshold values with a high probability that a dot will be formed in a plurality of white pixel positions within the predetermined area, the threshold values are moved to the non-white pixel positions.

Figure 34:
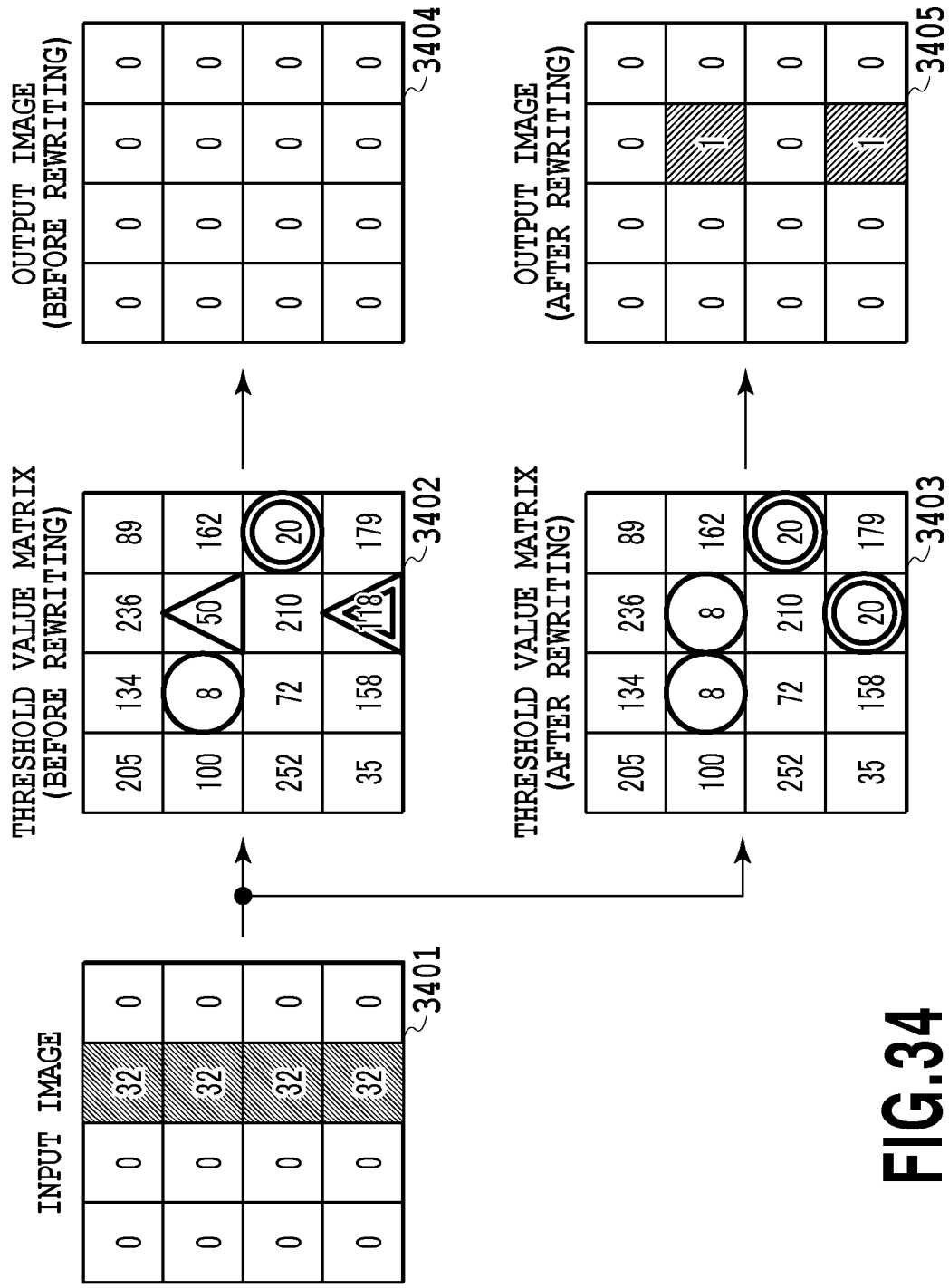
FIG. 34 is a diagram explaining a difference in an output image between the case where threshold value rewriting processing is performed and the case where threshold value rewriting processing is not performed.

FIG. 34 is a diagram explaining a difference in the output image between the case where the threshold value rewriting processing according to the present embodiment is performed and the case where the processing is not performed.

An input image 3401 having 4 vertical pixels×4 horizontal pixels is image data in which the pixel value in the third column is "32" and the pixel value in the other columns is "0". A threshold value matrix 3402 is a threshold value matrix before the threshold value rewriting processing is performed, corresponding to the input image 3401. A screen image 3404 is an output image that is obtained in the case where the input image 3401 is quantized by using the threshold value matrix 3402. While the pixel value in the third column of the input image 3401 is "32", the minimum value of the threshold values in the third column of the threshold value matrix 3402 is "50" (Δ in FIG. 34) and the second minimum threshold value is "118" (a triangle including a smaller triangle therein in FIG. 34), and therefore, no dot exists in the screen image 3404.

A threshold value matrix 3403 is a threshold value after the threshold value rewriting processing is performed, corresponding to the input image 3401. In the threshold value matrix 3403, it is known that the non-white pixel minimum threshold value "50" has been replaced with the white pixel minimum threshold value "8" (○ in FIG. 34) and the second minimum threshold value "118" of the non-white pixels has been replaced with the second minimum threshold value "20" (⊙ in FIG. 34) of the white pixels. A screen image 3405 is an output image that is obtained in the case where the input image 3401 is quantized by using the threshold value matrix 3403 after the threshold value rewriting. In the screen image 3405, it is possible to reproduce two dots that have not been present (have disappeared) in the screen image 3404.

Then, it is also known that the magnitude relationship between the original threshold values is not disturbed within the area of the non-white pixels within the predetermined area even after the threshold value rewriting is performed as described above. In other words, as to the magnitude relationship itself, the magnitude relationship of "50<118<210<236" before the rewriting and the magnitude relationship of "8<20<210<236" are the same although the values of the minimum threshold value and the second minimum threshold value are different. By maintaining the magnitude relationship as described above, it is possible increase the probability that a dot will be formed in accordance with the density without causing unnatural shifts in density to occur.

Figure 35A:
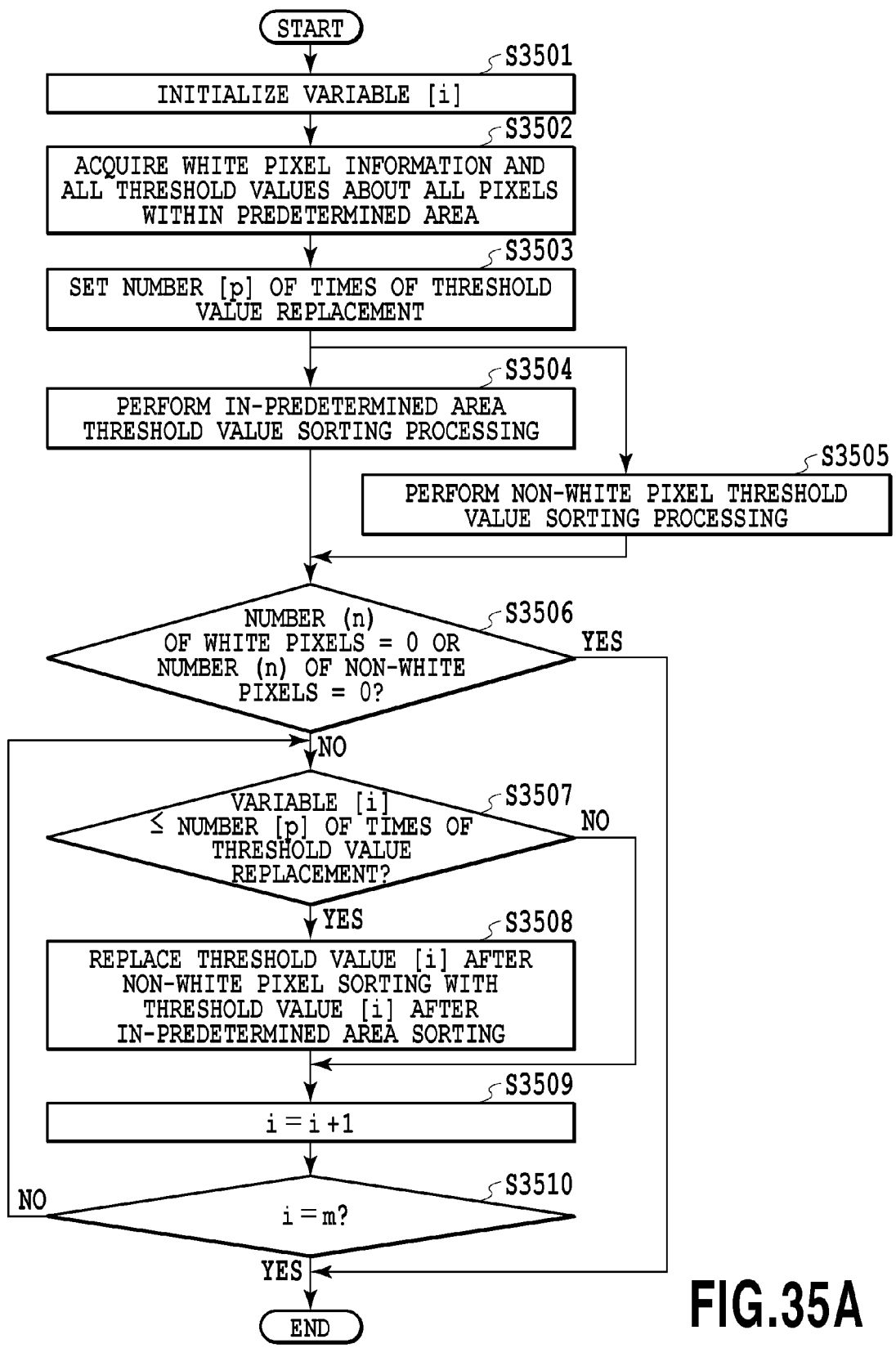
FIG. 35A is a flowchart showing details of processing performed by the image processing apparatus according to the eighth embodiment.

FIG. 35A is a flowchart showing details of the in-predetermined area threshold value sorting processing, the non-white pixel threshold value sorting processing, and the threshold value rewriting processing among the processing that is performed by the image processing apparatus according to the present embodiment.

At step 3501, first, a variable [i] is initialized. The variable [i] is held in the RAM.

At step 3502, the white pixel information about all the pixels within the predetermined area and the threshold values corresponding to all the pixels are acquired.

At step 3503, a constant (number of times of threshold value replacement) [p] that specifies the number of times threshold value replacement is performed within the predetermined area is set. In the present embodiment, it is supposed that a plurality of threshold values is changed, and therefore, usually a value equal to or greater than [2] is set to the number [p] of times of threshold value replacement.

At step 3504, the in-predetermined area threshold value sorting unit 3301 performs the processing to sort the threshold values corresponding to all the pixels within the predetermined area. Here, the threshold values corresponding to all the pixels with the predetermined area are sorted in the ascending order. The data indicating the sequence of the sorted threshold values is held in the RAM or the like as in-predetermined area threshold value sorting information. Further, the in-predetermined area threshold value sorting unit 3301 also acquires a number (n) of white pixels from the white pixel information received from the white pixel determination unit 2802. The acquired number (n) of white pixels is also held in the RAM or the like.

At step 3505, the non-white pixel threshold value sorting unit 3302 specifies non-white pixels within the predetermined area by referring to the white pixel information received from the white pixel determination unit 2802 and performs the processing to sort the threshold values corresponding to the specified non-white pixels. Here, the threshold values of the non-white pixels within the predetermined area are sorted in the ascending order. The data indicating the sequence of the sorted threshold values is held in the RAM or the like as non-white pixel threshold value sorting information. Further, the non-white pixel threshold value sorting unit 3302 also acquires a number (m) of non-white pixels by referring to the white pixel information. The acquired number (m) of non-white pixels is also held in the RAM or the like.

At step 3506, the threshold value rewriting unit 3303 determines whether either the number (n) of white pixels or the number (m) of non-white pixels is "0". In the case where the results of the determination indicate that neither the number (n) of white pixels nor the number (m) of non-white pixels is "0", the processing proceeds to step 3507. On the other hand, in the case where either the number (n) of white pixels or the number (m) of non-white pixels is "0", the present processing is exited. The reason is that in the case where n=0 (the case where all the pixels within the predetermined area are non-white pixels) or in the case where m=0 (the case where all the pixels within the predetermined area are white pixels), it is not necessary to replace threshold values.

At step 3507, the threshold value rewriting unit 3303 compares the variable [i] with the number [p] of times of threshold value replacement. In the case where the results of the comparison indicate that the variable [i] is equal to or less than the number [p] of times of threshold value replacement, the processing proceeds to step 3508. On the other hand, in the case where the variable i is greater, the processing proceeds to step 3509. For example, at the point in time immediately after the start of the processing, the variable i is "0" and the number [p] of time of threshold value replacement is equal to or greater than "2", and therefore, the processing proceeds to step 3508 as a result.

At step 3508, the threshold value rewriting unit 3303 replaces the threshold value [i] after the non-white pixel sorting with the threshold value [i] after the in-predetermined area sorting. In other words, the value of the ith threshold value from the smallest threshold value in the predetermined area is set to the ith threshold value from the smallest threshold value in the non-white pixels.

At step 3509, the variable i is incremented (+1).

At step 3510, whether the processing has been completed for all the threshold values corresponding to the non-white pixels (whether i=m) is determined. In the case where the results of the determination indicate there is a non-white pixel threshold value on which the processing has not been performed yet, the processing returns to step 3507 and the next smallest threshold values are compared. On the other hand, in the case where the processing has been completed for all the non-white pixel threshold values, the present processing is terminated.

The above is the contents of the in-predetermined area threshold value sorting processing, the non-white pixel threshold value sorting processing, and the threshold value rewriting processing in the present embodiment.

Due to the above, a plurality of threshold values corresponding to a plurality of pixels within the predetermined area is changed and it is possible to expect a sufficient effect also in the case where the predetermined area is large.

<First Modification Example>

In the present embodiment, the case is explained where all the threshold values within the predetermined area are sorted, but it may also be possible to limit the threshold values to be sorted to the smallest to the [p] th smallest threshold values. For example, the seventh embodiment can be said as an example in which the threshold values to be sorted are limited to the smallest threshold value, and it is made possible to reduce the circuit scale (processing process) by limiting the threshold values to be sorted as described above.

<Second Modification Example>

It may also be possible to sort only the white pixels rather than sorting all the pixels within the predetermined area.

Figures 2, 35B:
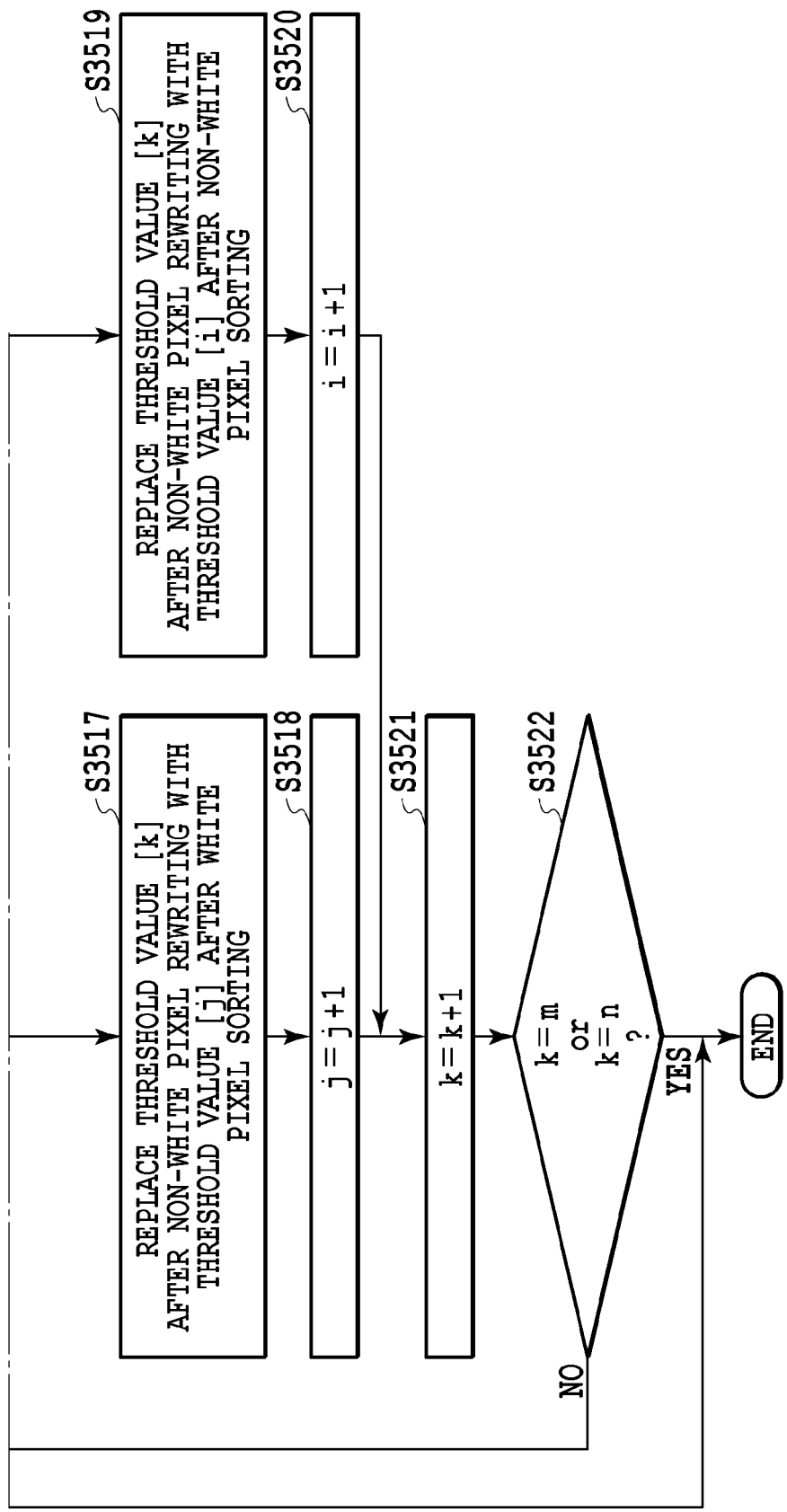
FIG. 35B is a diagram showing a relationship between FIGS. 35B-1 and 35B-2, and FIGS. 35B-1 and 35B-2 are flowcharts according to a second modification example of the eighth embodiment, corresponding to that in FIG. 35A.

FIGS. 35B-1 and 35B-2 are flowcharts showing details of the white pixel threshold value sorting processing, the non-white pixel threshold value sorting processing, and the threshold value rewriting processing according to the present embodiment.

At step 3511, first, the variable [i], and variables [j] and [k] are initialized. The variables [i], [j], and [k] are held in the RAM.

At step 3512, the white pixel information about all the pixels within the predetermined area and the threshold values corresponding to all the pixels are acquired.

At step 3513, the white pixel threshold value sorting unit (not shown) specifies white pixels within the predetermined area by referring to the white pixel information received from the white pixel determination unit 2802 and performs processing to sort the threshold values corresponding to the specified white pixels. Here, the threshold values of the white pixels within the predetermined area are sorted in the ascending order. The data indicating the sequence of the sorted threshold values is held in the RAM or the like as white pixel threshold value sorting information. Further, the white pixel threshold value sorting unit (not shown) acquires the number (n) of white pixels from the white pixel information received from the white pixel determination unit 2802. The acquired number (n) of white pixels is also held in the RAM or the like.

At step 3514, the non-white pixel threshold value sorting unit 3302 specifies non-white pixels within the predetermined area by referring to the white pixel information received from the white pixel determination unit 2802 and performs processing to sort the threshold values corresponding to the specified non-white pixels. Here, the threshold values of the non-white pixels within the predetermined area are sorted in the ascending order. The data indicating the sequence of the sorted threshold values is held in the RAM or the like as non-white pixel threshold value sorting information. Further, the non-white pixel threshold value sorting unit 3302 also acquires the number (m) of non-white pixels by referring to the white pixel information. The acquired number (m) of non-white pixels is also held in the RAM or the like.

At step 3515, the threshold value rewriting unit 3303 determines whether either the number (n) of white pixels or the number (m) of non-white pixels is "0". In the case where the results of the determination indicate that neither the number (n) of white pixels nor the number (m) of non-white pixels is "0", the processing proceeds to step 3516. On the other hand, in the case where either the number (n) of white pixels or the number (m) of non-white pixels is "0", the present processing is exited. The reason is that, in the case where n=0 (the case where all the pixels within the predetermined area are non-white pixels) or in the case where m=0 (the case where all the pixels within the predetermined area are white pixels), it is not necessary to replace threshold values.

At step 3516, the threshold value rewriting unit 3303 compares the threshold value [j] after the white pixel sorting with the threshold value [i] after the non-white pixel sorting. In the case where the results of the comparison indicate that the threshold value [j] after the white pixel sorting is smaller than the threshold value [i] after the non-white pixel sorting, the processing proceeds to step 3517. On the other hand, in the case where the threshold value [j] after the white pixel sorting is not smaller than the threshold value [i] after the non-white pixel sorting, the processing proceeds to step 3519.

At step 3517, the threshold value rewriting unit 3303 replaces the threshold value [k] after the non-white pixel rewriting with the threshold value [j] after the white pixel sorting. In other words, the kth smallest non-white pixel threshold value after the rewriting is changed into the value of the jth smallest threshold value aft the whit pixel sorting.

At step 3518, the variable [j] is incremented (+1).

At step 3519, the threshold value rewriting unit 3303 replaces the threshold value [k] after the non-white pixel rewriting with the threshold value [i] after the non-white pixel sorting. In other words, the kth smallest non-white pixel threshold value after the rewriting is changed into the value of the ith smallest threshold value after the non-white pixel sorting.

At step 3520, the variable [i] is incremented (+1).

At step 3521, the variable [k] is incremented (+1).

At step 3522, whether the value of either the number (n) of white pixels or the number (m) of non-white pixels coincides with the variable [k] is determined. In the case where the variable [k] coincides with the number (n) of white pixels (the case where the threshold values corresponding to all the white pixels are referred to), or in the case where the variable [k] coincides with the number (m) of non-white pixels (the case where the threshold values corresponding to all the non-white pixels are settled), the present processing is terminated. On the other hand, in the case where the results of the determination indicate that neither the number (n) of white pixels nor the number (m) of non-white pixels coincides with the variable [k], the processing returns to step 3516 and the processing is repeated until the value of either the number (n) of white pixels or the value of the number (m) of non-white pixels coincides with the variable [k].

The above is the contents of the white pixel threshold value sorting processing, the non-white pixel threshold value sorting processing, and the threshold value rewriting processing in the present embodiment. Due to this, it is possible to obtain the same effect as that obtained in the case where all the pixels within the predetermined area are sorted.

<Third Modification Example>

Further, it may also be possible to calculate the number of threshold values smaller than the average value of the pixel values of the non-white pixels within the predetermined area for each predetermined area, hold the threshold values of the non-white pixels corresponding to the calculated number of threshold values, and replace all the threshold values equal to or less than the threshold value with "0".

Figure 35C:
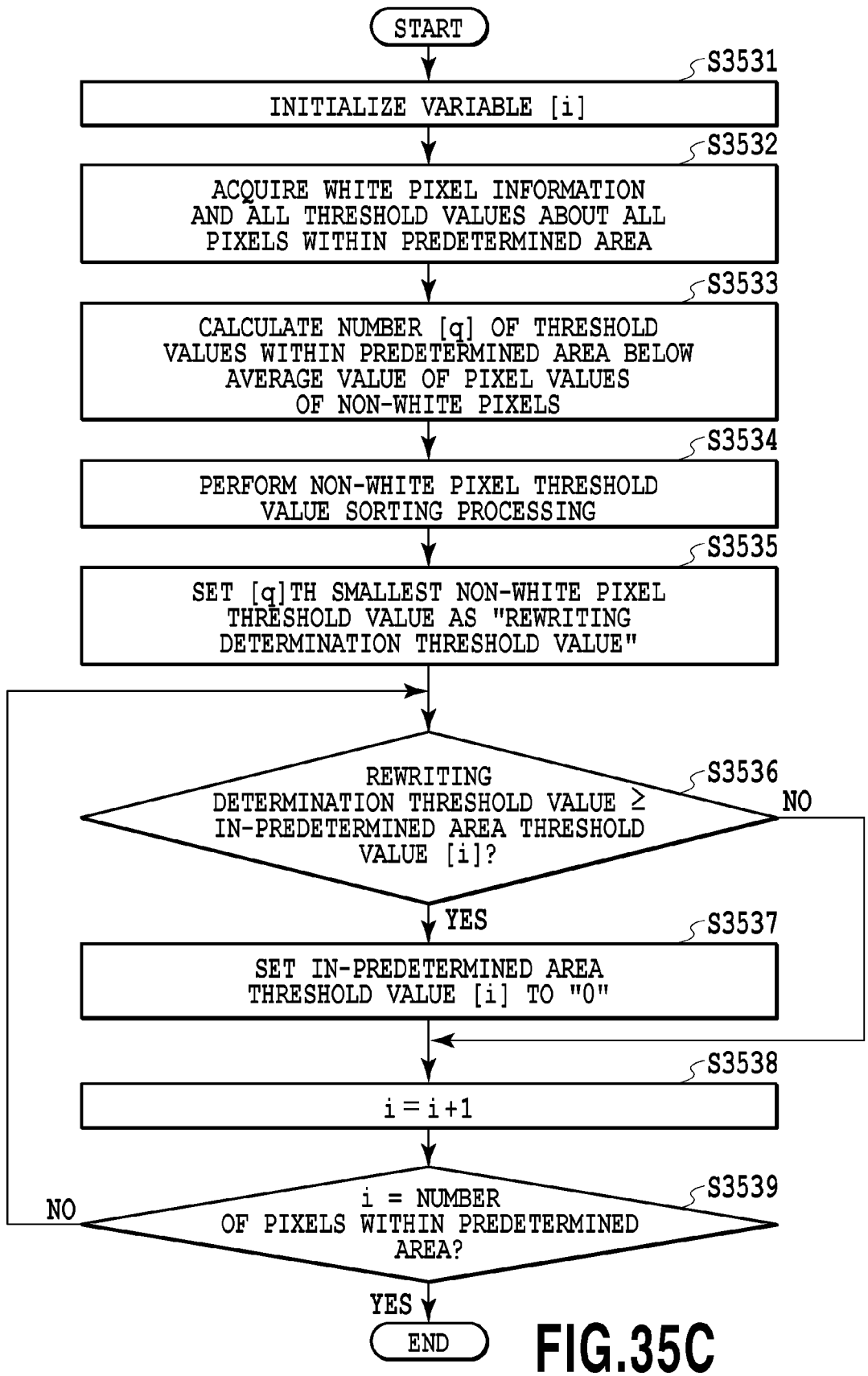
FIG. 35C is a flowchart according to a third modification example of the eighth embodiment, corresponding to that in FIG. 35A.

FIG. 35C is a flowchart showing details of processing according to the present modification example.

At step 3531, first, the variable [i] is initialized. The variable [i] is held in the RAM.

At step 3532, the white pixel information about all the pixels within the predetermined area and the threshold values corresponding to all the pixels are acquired.

At step 3533, a number [q] of threshold values smaller than the average value of the pixel values of the non-white pixels among the threshold values within the predetermined area is calculated.

At step 3534, the non-white pixel threshold value sorting unit 3302 performs processing to sort the threshold values corresponding to the non-white pixels within the predetermined area. Here, the threshold values corresponding to the non-white pixels within the predetermined area are sorted in the ascending order. The data indicating the sequence of the sorted threshold values is held in the RAM or the like as non-white pixel threshold value sorting information. Further, the non-white pixel threshold value sorting unit 3302 acquires the number (n) of white pixels from the white pixel information received from the white pixel determination unit 2802. The acquired number (n) of white pixels is also held in the RAM or the like.

At step 3535, the threshold value rewriting unit 3303 refers to the non-white pixel threshold value sorting information and sets the [q] th smallest threshold value of the sorted threshold values corresponding to the non-white pixels as a "rewriting determination threshold value". The "rewriting determination threshold value" is held in the RAM.

At step 3536, the threshold value rewriting unit 3303 compares the rewriting determination threshold value set at step 3535 with the ith threshold value (e.g., the ith threshold value in order from the top-left end of the block area) within the predetermined area. In the case where the results of the comparison indicate that the threshold value [i] within the predetermined area is equal to or less than the rewriting determination threshold value, the processing proceeds to step 3537. On the other hand, in the case where the threshold value [i] within the predetermined area is greater than the rewriting determination threshold value, the processing proceeds to step 3538.

At step 3537, the threshold value rewriting unit 3303 sets the threshold value [i] within the predetermined area to "0".

At step 3538, the variable [i] is incremented (+1).

At step 3539, whether the processing has been completed for all the threshold values corresponding to all the pixels within the predetermined area (whether i=number of pixels within the predetermined area) is determined. In the case where the results of the determination indicate that there is a threshold value on which the processing has not been performed yet, the processing returns to step 3536 and the processing is performed for the threshold value corresponding to the next pixel. On the other hand, in the case where the processing has been completed for all the threshold values corresponding to all the pixels within the predetermined area, the present processing is terminated.

The above is the contents of the processing according to the present modification example.

In the third modification example, the operation to replace threshold values (a certain threshold value is replaced with another threshold value) is not performed, and therefore, it is possible to simplify the processing and by using the "rewriting determination threshold value" as described above, it is possible to suppress shifts in density within the predetermined area.

[Ninth Embodiment]

Next, based on the seventh embodiment, an aspect is explained as a ninth embodiment in which the probability of rewriting the threshold value of the non-white pixel is made variable and the thin line reproducibility is adjusted.

Figures 2, 32B:
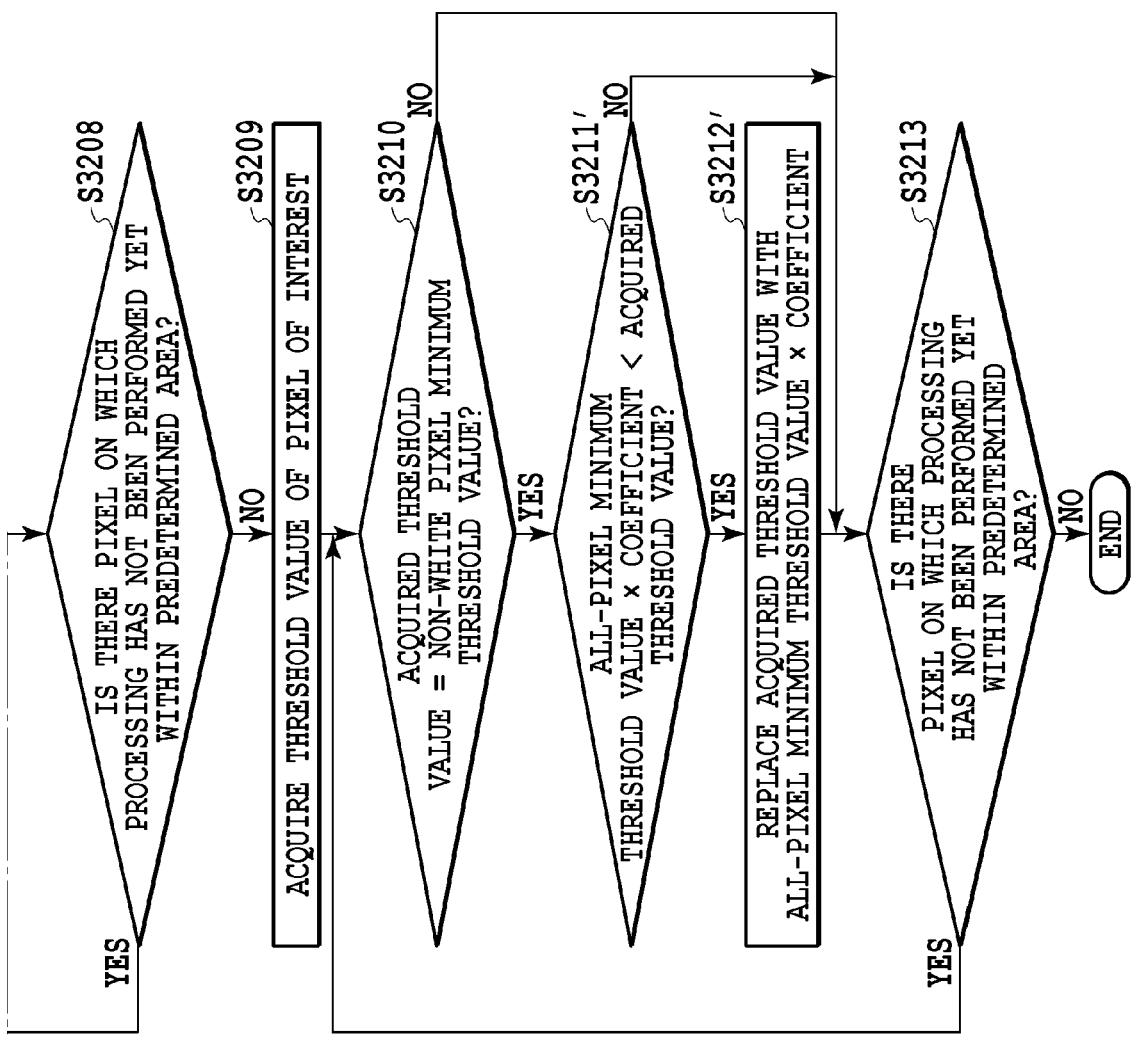
FIG. 32B is a diagram showing a relationship between FIGS. 32B-1 and 32B-2, and FIGS. 32B-1 and 32B-2 are flowcharts showing details of processing performed by an image processing apparatus according to the ninth embodiment.

FIGS. 32B-1 and 32B-2 are flowcharts showing details of processing that is performed by an image processing apparatus according to the present embodiment, corresponding to the flowchart in FIGS. 32A-1 and 32B-2 of the seventh embodiment described previously. Steps 3201 to 3210 and 3213 are the same as those of the flowchart in FIGS. 32A-1 and 32-B, and therefore, in the following, steps 3211' and 3212', which are different points, are explained.

At step 3211', the threshold value rewriting unit 3102 compares the "all-pixel minimum threshold value (MinTH$_{all}$)" multiplied by a predetermined coefficient with the "non-white pixel minimum threshold value (=threshold value of the pixel of interest)". At this time, in the case where it is desired to increase the degree of continuity of a thin line (probability of dot formation), a coefficient less than 1.0 is set and, for example, the "all-pixel minimum threshold value (MinTH$_{all}$)×0.9" is compared with the "threshold value of the pixel of interest". In the case where the density of a thin line is regarded as important, a coefficient greater than 1.0 is set and, for example, the "all-pixel minimum threshold value (MinTH$_{all}$)×1.1" is compared with the "threshold value of the pixel of interest". In the case where the results of the comparison indicate that the value of the "all-pixel minimum threshold value×coefficient" is smaller than the threshold value of the pixel of interest (=non-white pixel minimum threshold value), the processing proceeds to step 3212'. On the other hand, in the case where the value of the "all-pixel minimum threshold value×coefficient" is not smaller than the threshold value of the pixel of interest (=non-white pixel minimum threshold value), the processing proceeds to step 3213.

At step 3212', the threshold value rewriting unit 3102 replaces the threshold value of the pixel of interest acquired at step 3209 with the value of the "all-pixel minimum threshold value (MinTH$_{all}$)×coefficient".

By the processing as above, it is possible to change the probability of rewriting the non-white pixel minimum threshold value. The case where the coefficient is set to 1.0 will bring the same results as those of the seventh embodiment.

As above, according to the present embodiment, it is possible to control the thin line reproducibility in accordance with purposes.

<First Modification Example>

Similarly, based on the sixth embodiment, an aspect in which the probability of rewriting the non-white pixel threshold value is made variable is explained.

Figures 2, 30C:
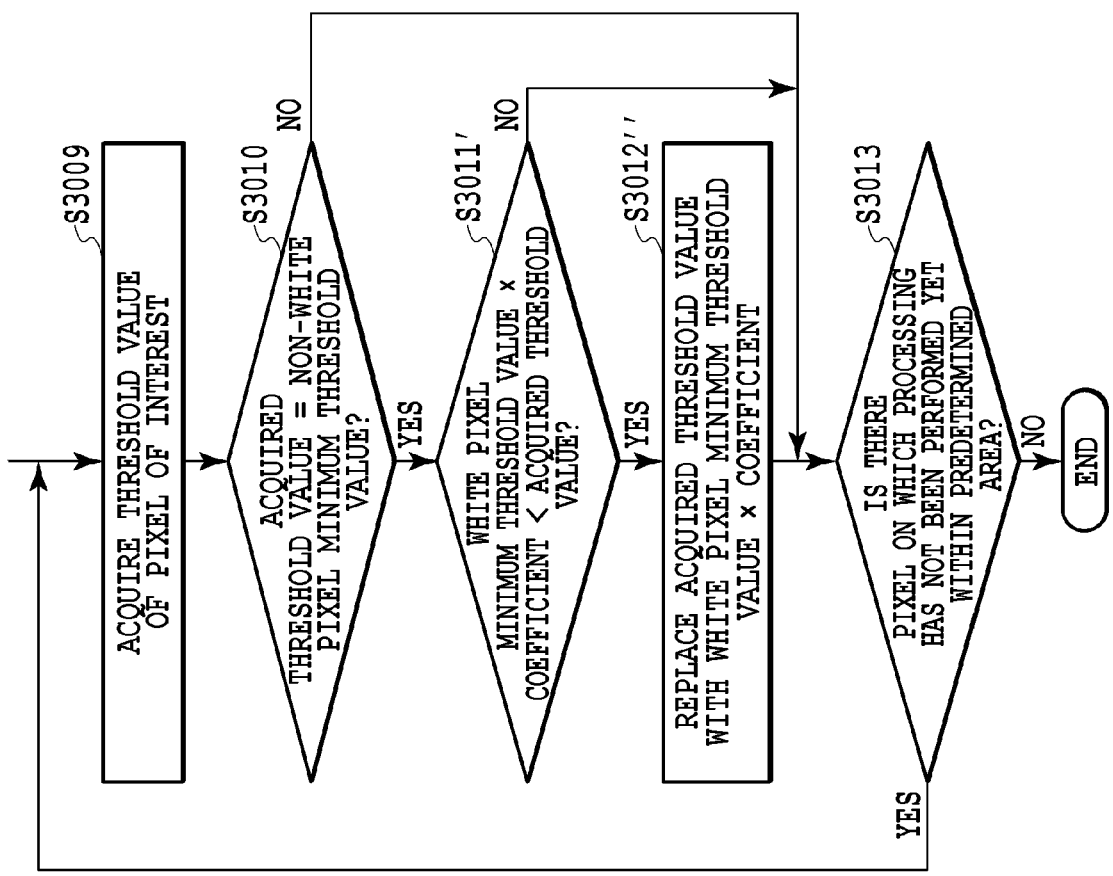
FIG. 30C is a diagram showing a relationship between FIGS. 30C-1 and 30C-2, and FIGS. 30C-1 and 30C-2 are flowcharts according to a first modification example of a ninth embodiment, corresponding to that in FIGS. 30A-1 and 30A-2.

FIGS. 30C-1 and 30C-2 are flowcharts according to the present modification example, corresponding to the flowchart in FIGS. 30A-1 and 30A-2 of the sixth embodiment described previously. Steps 3001 to 3010 and 3013 are the same as those of the flowchart in FIGS. 30A-1 and 30A-2, and therefore, in the following, steps 3011' and 3012', which are different points, are explained.

At step 3011', the threshold value rewriting unit 2805 compares the "white pixel minimum threshold value (MinTH$_{off}$)" multiplied by a predetermined coefficient with the "non-white pixel minimum threshold value (=threshold value of the pixel of interest)". In the case where the results of the comparison indicate that the value of the "white pixel minimum threshold value×coefficient" is smaller than the threshold value of the pixel of interest (=non-white pixel minimum threshold value), the processing proceeds to step 3012'. On the other hand, in the case where the value of the "white pixel minimum threshold value×coefficient" is not smaller than the threshold value of the pixel of interest (=non-white pixel minimum threshold value), the processing proceeds to step 3013.

At step 3012", the threshold value rewriting unit 2805 replaces the threshold value of the pixel of interest acquired at step 3009 with the value of the "white pixel minimum threshold value (MinTH$_{off}$)×coefficient".

By the processing as above, it is possible to change the probability of rewriting the non-white pixel minimum threshold value.

In the case of being based on the seventh embodiment (the case where the all-pixel minimum threshold value is multiplied by a coefficient, for example, less than 1.0), threshold values are replaced even on a condition that there is no white pixel within the predetermined area, and therefore, a difference from the density of the thin line is no longer detected and there is no unnaturalness at the boundary with the thin line. On the other hand, in the case of being based on the sixth embodiment (the case where the white pixel minimum threshold value is multiplied by a coefficient, for example, less than 1.0), threshold values are not replaced on a condition that there is no white pixel within the predetermined area, and therefore, shifts in density do not occur. In other words, it is possible to suppress shifts in density more in the first modification example.

Consequently, it is preferable to apply the aspect in which the "all-pixel minimum threshold value" is multiplied by a coefficient in the character/drawing area and to apply the aspect in which the "white pixel minimum threshold value" is multiplied by a coefficient in the natural image area.

[Tenth Embodiment]

The seventh embodiment is the aspect in which, in the case where the minimum threshold value among the threshold values corresponding to all the pixels within the predetermined area is a threshold value with a high probability that a dot will be formed, the non-white pixel minimum threshold value is rewritten into the same value as the minimum threshold value of all the pixels. Next, based on the seventh embodiment, an aspect is explained as a tenth embodiment in which attention is focused on a "low-density pixel" in place of a "white pixel". Explanation of the portions in common to those of the seventh embodiment (including the modification example) is omitted or simplified and in the following, different points are explained mainly.

Figure 36B:
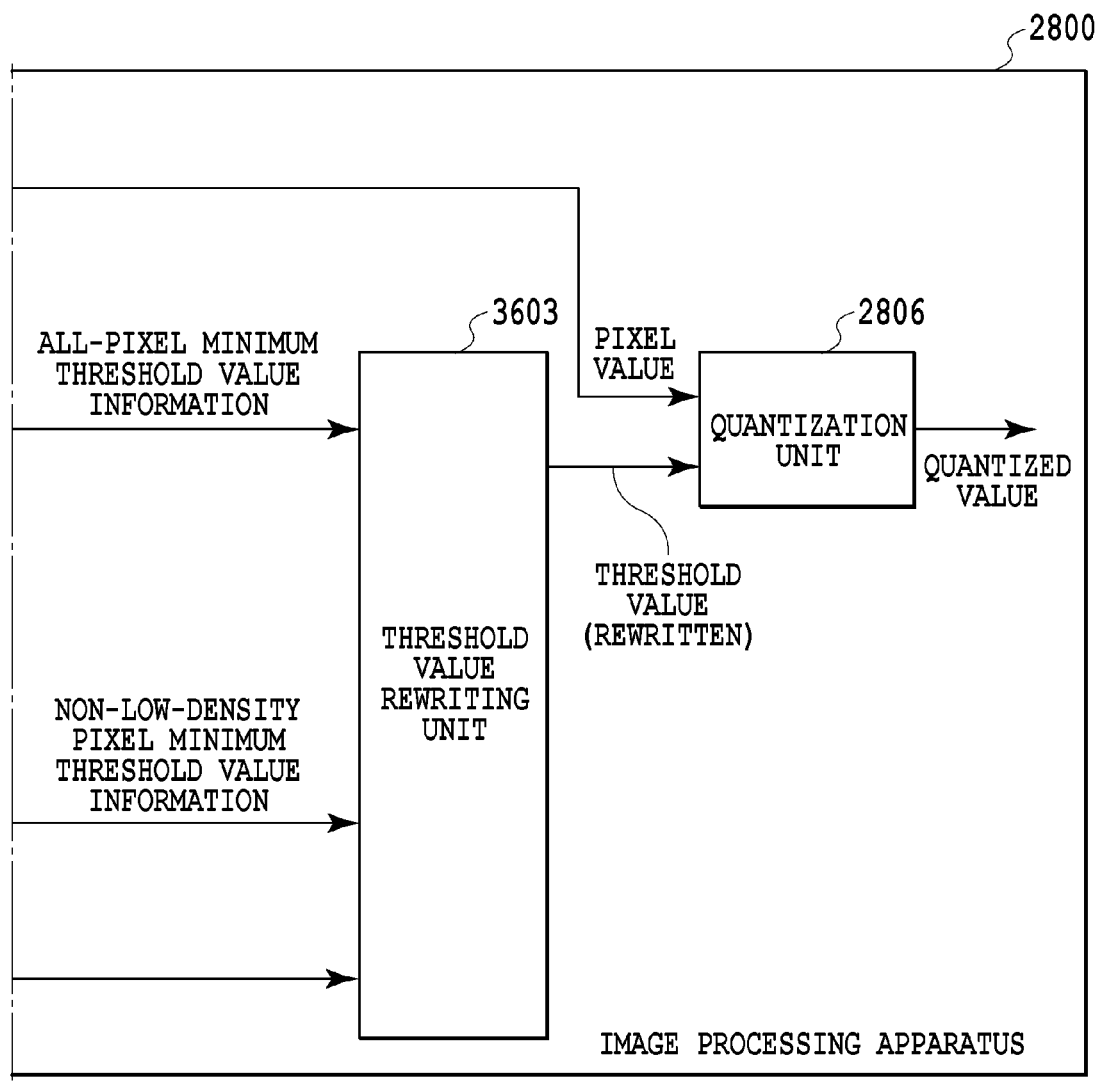
FIG. 36 is a diagram showing a relationship between FIGS. 36A and 36B, and FIGS. 36A and 36B are function block diagrams showing an internal configuration of an image processing apparatus that implements halftone processing according to a tenth embodiment.

FIGS. 36A and 36B are function block diagrams showing an internal configuration of an image processing apparatus that implements halftone processing according to the present embodiment. The pixel value/threshold value acquisition unit 2801, the all-pixel minimum threshold value extraction unit 3101, and the quantization unit 2806 are the same as those of the seventh embodiment, and therefore, explanation is omitted.

A low-density pixel determination unit 3601 determines whether each pixel in the predetermined area is a low-density pixel based on the pixel value received from the pixel value/threshold value acquisition unit 2801. Whether a pixel is a low-density pixel is determined by determining, for example, whether the input pixel value is equal to or less than a predetermined threshold value (Th$_{lowdens}$). Then, information for specifying the pixel determined to be a low-density pixel (hereinafter, low-density pixel information) is sent to a non-low-density pixel minimum threshold value extraction unit 3602. It may also be possible to use attribute information generated by the RIP (Raster Image Processor) device or the like in place of the low-density pixel determination unit 3601.

The non-low-density pixel minimum threshold value extraction unit 3602 extracts the minimum threshold value (hereinafter, non-low-density pixel minimum threshold value) from among the threshold values corresponding to the non-low-density pixels (pixels other than low-density pixels) by using the low-density pixel information from the low-density pixel determination unit 3601 and the threshold value from the pixel value/threshold value acquisition unit 2801. Information for specifying the extracted non-low-density pixel minimum threshold value (hereinafter, non-low-density pixel minimum threshold value information) is sent to a threshold value rewriting unit 3603.

The threshold value rewriting unit 3603 performs processing to replace the non-low-density pixel minimum threshold value with the all-pixel minimum threshold value for the threshold value matrix corresponding to the input image. Specifically, the all-pixel minimum threshold value is compared with the non-low-density pixel minimum threshold value and in the case where the all-pixel minimum threshold value is the smaller value (threshold value with a high probability that a dot will be formed), the processing to replace the non-low-density pixel minimum threshold value with the value of the all-pixel minimum threshold value is performed.

As to the actual processing flow, it is sufficient to similarly perform the processing in the flowcharts in FIGS. 32A-1 and 32A-2 explained in the seventh embodiment by reading the portion of the "non-white pixel minimum threshold value" as the "non-low-density pixel minimum threshold value".

In the seventh embodiment, even in the case where there is a pixel that is evaluated as substantially a white pixel (pixel having a value close to the pixel value of a white pixel and, for example, a pixel constituting the background), threshold values replacement is not performed unless the pixel is a white pixel. In contrast to this, in the present embodiment, it is possible to improve the thin line reproducibility also in, for example, the background area by handling the pixel that is other than a white pixel and which has a pixel value equal to or less than the predetermined threshold value (Th$_{lowdens}$) as a pixel equivalent to a white pixel.

In the present embodiment, the rewriting is not performed for the threshold value of a low-density pixel, and therefore, the dot arrangement in the low-density area does not change.

[Eleventh Embodiment]

Next, based on the sixth embodiment, an aspect in which attention is focused on a high-density pixel and the threshold value is rewritten is explained as an eleventh embodiment. Explanation of the portions in common to those of the sixth embodiment (including the modification examples) is omitted or simplified and in the following, different points are explained mainly.

Figure 37B:
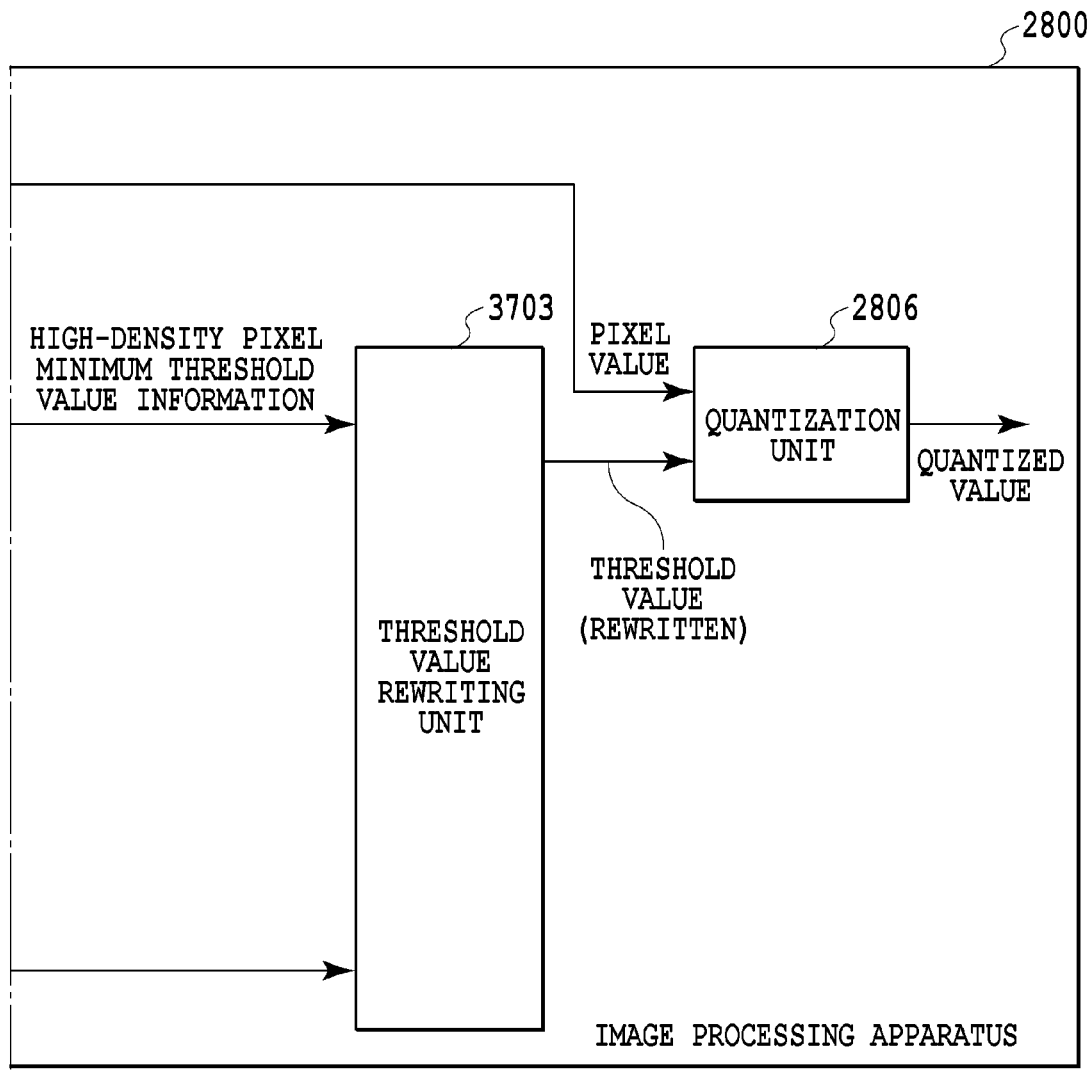
FIG. 37 is a diagram showing a relationship between FIGS. 37A and 37B, and FIGS. 37A and 37B are function block diagrams showing an internal configuration of an image processing apparatus that implements halftone processing according to an eleventh embodiment.

FIGS. 37A and 37B are function block diagrams showing in internal configuration of an image processing apparatus that implements halftone processing according to the present embodiment. The pixel value/threshold value acquisition unit 2801 and the quantization unit 2806 are the same as those of the sixth embodiment, and therefore, explanation is omitted.

A high-density pixel determination unit 3701 determines whether each pixel in the predetermined area is a high-density pixel based on the pixel value received from the pixel value/threshold value acquisition unit 2801. Whether a pixel is a high-density pixel is determined by determining, for example, whether the input pixel value is equal to or greater than a predetermined threshold value ($Th_{highdens}$). Then, information for specifying the pixel determined to be a high-density pixel (hereinafter, high-density pixel information) within the predetermined area is sent to a high-density pixel minimum threshold value extraction unit 3702. It may also be possible to use attribute information generated by the RIP (Raster Image Processor) device or the like in place of the high-density pixel determination unit 3701.

The high-density pixel minimum threshold value extraction unit 3702 extracts the minimum threshold value (hereinafter, high-density pixel minimum threshold value) from among the threshold values corresponding to the pixel positions of the high-density pixels by using the high-density pixel information received from the high-density pixel determination unit 3701 and the threshold values received from the pixel value/threshold value acquisition unit 2801. Information for specifying the extracted high-density pixel minimum threshold value (hereinafter, high-density pixel minimum threshold value information) is sent to a threshold value rewriting unit 3703.

The threshold value rewriting unit 3703 rewrites the minimum threshold value among the threshold values corresponding to the high-density pixels into another threshold value based on the high-density pixel minimum threshold value information received from the high-density pixel minimum threshold value extraction unit 3702. For example, by multiplying the high-density pixel minimum threshold value by a predetermined coefficient (less than 1.0), the high-density pixel minimum threshold value is changed into a threshold value that is more likely to cause a dot to be formed. Then, in the quantization unit 2806, quantization using the changed threshold value and the input pixel value is performed.

In the present embodiment, only the minimum threshold value among the threshold values corresponding to the high-density pixels is changed into a threshold value with a higher probability of dot formation. In other words, only one pixel of the high-density pixels within the predetermined area (e.g., 16 pixels of 4 vertical pixels×4 horizontal pixels) becomes a pixel with a high probability of dot formation. This means that the high-density area of the input image is not affected and the density in the low-density area about $\frac{1}{16}$ of the input range rises somewhat. In this case, the density of only the high-density side within the predetermined area increases, and therefore, an image in which the contrast of the highlight portion has been enhanced slightly is output as a result. Consequently, in a pale thin line, the reproducibility is improved in the case where the density of the background is lower than the density of the thin line.

[Twelfth Embodiment]

In the eleventh embodiment, the aspect is explained in which the minimum threshold value is changed into a threshold value with a higher probability of dot formation by multiplying the minimum threshold value in the high-density area within the predetermined area by a predetermined coefficient. Next, an aspect is explained as a twelfth embodiment in which a coefficient used at the time of changing the minimum threshold value in the high-density area within the predetermined area is adjusted in accordance with the input pixel value. Explanation of the portions in common to those of the eleventh embodiment is omitted or simplified and in the following, different points are explained mainly.

Figure 38B:
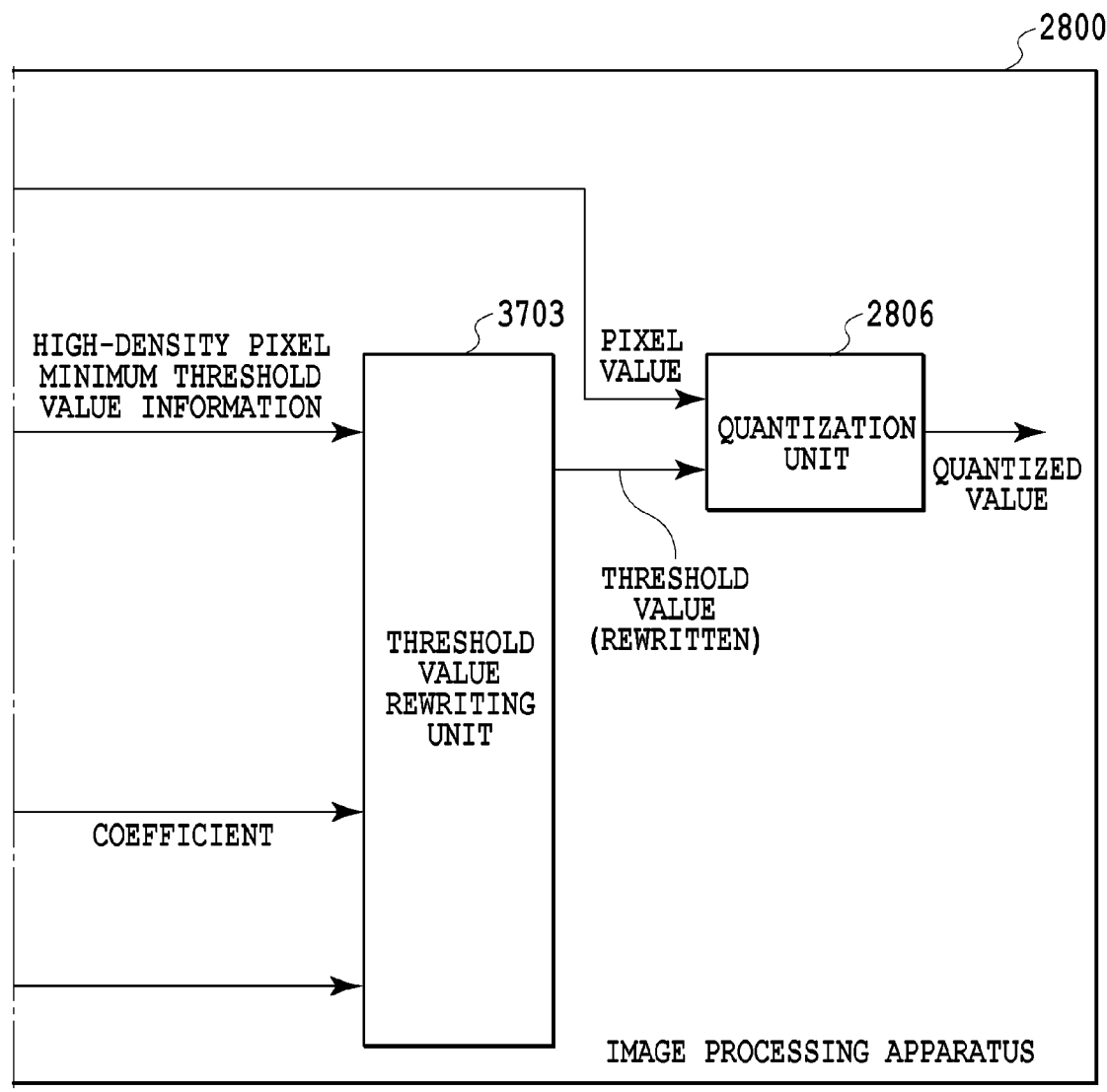
FIG. 38 is a is a diagram showing a relationship between FIGS. 38A and 38B, and FIGS. 38A and 38B are function block diagrams showing an internal configuration of an image processing apparatus that implements halftone processing according to a twelfth embodiment.

FIGS. 38A and 38B are function block diagrams showing an internal configuration of an image processing apparatus that implements halftone processing according to the present embodiment. The pixel value/threshold value acquisition unit 2801, the high-density pixel determination unit 3701, the high-density pixel minimum threshold value extraction unit 3702, the threshold value rewriting unit 3703, and the quantization unit 2806 are the same as those of the sixth embodiment, and therefore, explanation is omitted.

A coefficient determination unit 3801 determines a coefficient in accordance with the input pixel value. Specifically, the coefficient determination unit 3801 determines a coefficient in accordance with the pixel value received from the pixel value/threshold value acquisition unit 2801 by referring to an LUT (lookup table) in which coefficient values corresponding to the input values (pixel values) are stored in advance. The determined coefficient is sent to the threshold value rewriting unit 3703. Then, in the threshold value rewriting unit 3703, the high-density pixel minimum threshold value is changed into a threshold value with a higher probability of dot formation based on the determined coefficient and in the quantization unit 2806, quantization using the changed threshold value and the input pixel value is performed.

FIGS. 39A and 39B are graphs representing examples of input/output characteristics of an LUT that is referred to by the coefficient determination unit 3801 according to the present embodiment.

In FIG. 39A, a straight line 3901 represents the input/output characteristics that the output coefficient is constant (here, 0.5) regardless of the input pixel value. The case of the input/output characteristics represented by the straight line 3901 will bring the same results as those in the case where the coefficient is set to 0.5 in the eleventh embodiment.

In FIG. 39B, a zigzag line 3902 represents the input/output characteristics that the output coefficient is 0.25 in the case where the input pixel value is between 0 and 16, the output coefficient is 1.0 in the case where the input pixel value is equal to or greater than 64, and the output coefficient is changed linearly in a range between 0.25 and 1.0 in the case where the input pixel value is between 16 and 64. With the input/output characteristics as in FIG. 39B, in the case where the input pixel value is equal to or less than 16, the thin line reproducibility is regarded as important and as the input pixel value increases from 16 up to 64, the density reproducibility is regarded as more important (the thin line reproducibility is alleviated). In other words, it is possible to adjust the balance between the density reproducibility and the thin line reproducibility by appropriately setting the input/output characteristics of the LUT that is referred to by the coefficient determination unit 3801. For example, it is made possible to make the maximum the reproduction performance of a printer by changing the input/output characteristics in accordance with the printing medium, such as paper, and the color material such as ink. Further, by appropriately selecting the input/output characteristics, it is possible for a user to obtain a printout in accordance with the user's preference. Furthermore, in the case where the input pixel value is equal to or greater than a predetermined value, it is sufficient to set the coefficient to 1.0 (or a value equal to or greater than 1.0), and therefore, it is sufficient to store only coefficients corresponding to the input pixel values equal to or less than the predetermined value, and therefore, the capacity of the LUT can be reduced.

In the present embodiment, the aspect is explained in which the coefficient is determined by using the LUT, but it may also be possible to determine the coefficient by using, for example, a function. Further, it may also be possible to switch coefficients for each smaller interval by dividing the interval of the input pixel value into smaller intervals.

[Thirteenth Embodiment]

In the twelfth embodiment, the aspect is explained in which the coefficient at the time of changing the minimum threshold value in the high-density area within the predetermined area is adjusted in accordance with the input pixel value. Next, an aspect is explained as a thirteenth embodiment in which the coefficient at the time of changing the minimum threshold value in the high-density area within the predetermined area is adjusted in accordance with the contrast of the input pixel value. Explanation of the portions in common to those of the twelfth embodiment is omitted or simplified and in the following, different points are explained mainly.

Figure 40B:
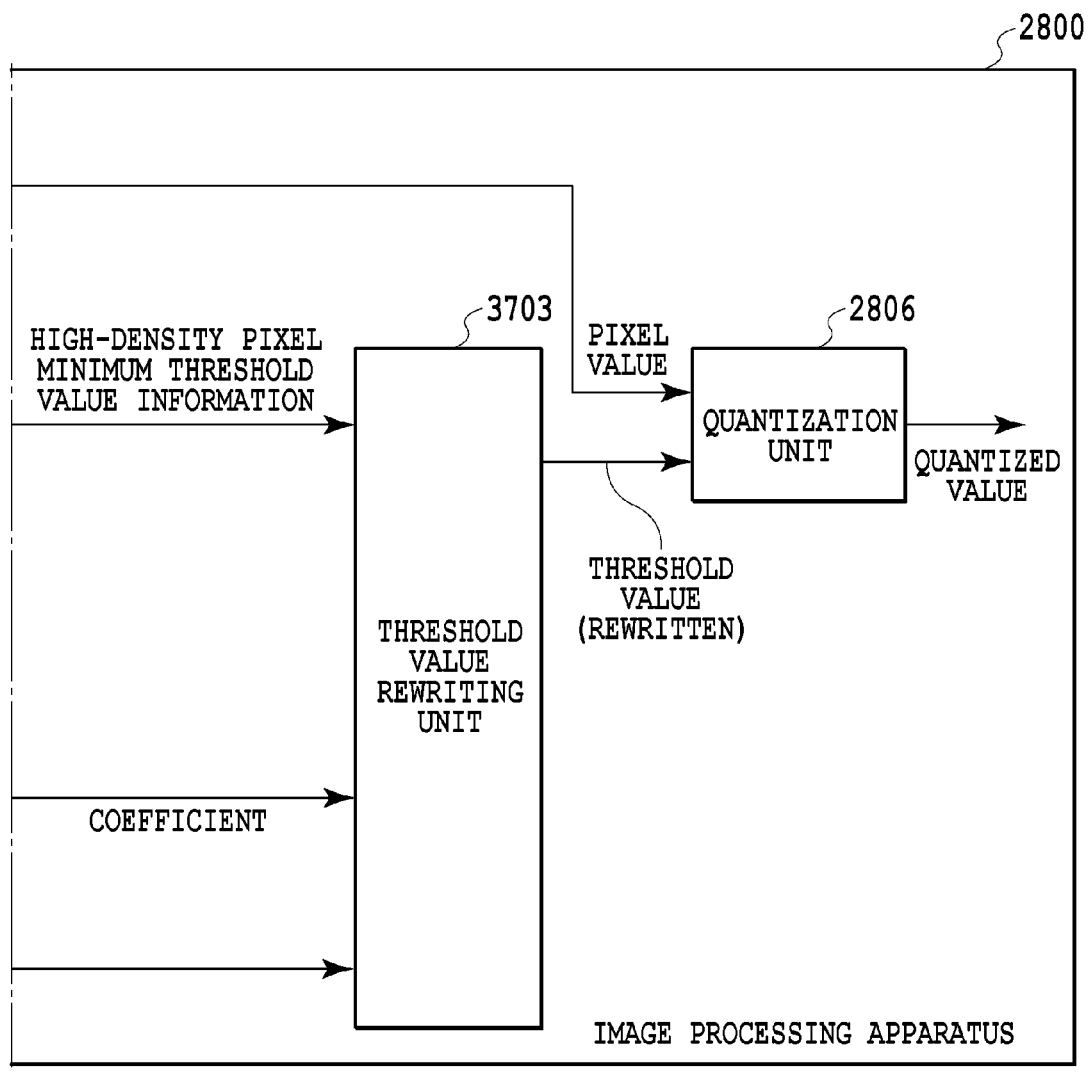
FIG. 40 is a is a diagram showing a relationship between FIGS. 40A and 40B, and FIGS. 40A and 40B are function block diagrams showing an internal configuration of an image processing apparatus that implements halftone processing according to a thirteenth embodiment.

FIGS. 40A and 40B are function block diagrams showing an internal configuration of an image processing apparatus that implements halftone processing according to the present embodiment. The pixel value/threshold value acquisition unit 2801, the high-density pixel determination unit 3701, the high-density pixel minimum threshold value extraction unit 3702, the threshold value rewriting unit 3703, and the quantization unit 2806 are the same as those of the seventh embodiment, and therefore, explanation is omitted.

A contrast derivation unit 4001 derives a contrast within a predetermined area. Specifically, for example, a difference between the maximum value and the minimum value of the input pixel value within a predetermined area is found and this difference is derived as a contrast value. Alternatively, it may also be possible to find a value by another method and derive the value as a contrast value, such as a method of finding a difference between the "average value of pixel values within a high-density area" and the "average value of pixel values in areas other than the high-density area" and deriving the difference as a contrast value. The derived contrast value is sent to a coefficient determination unit 4002.

The coefficient determination unit 4002 determines a coefficient in accordance with the input contrast value. Specifically, the coefficient determination unit 4002 refers to an LUT in which coefficient values corresponding to the input values (contrast values) are stored in advance and determines a coefficient in accordance with the contrast value input from the contrast derivation unit 4001. The determined coefficient is sent to the threshold value rewriting unit 3703. Then, in the threshold value rewriting unit 3703, the high-density pixel minimum threshold value is changed based on the determined coefficient as in the eleventh embodiment and quantization using the changed threshold value and the input pixel value is performed in the quantization unit 2806.

Figure 41:
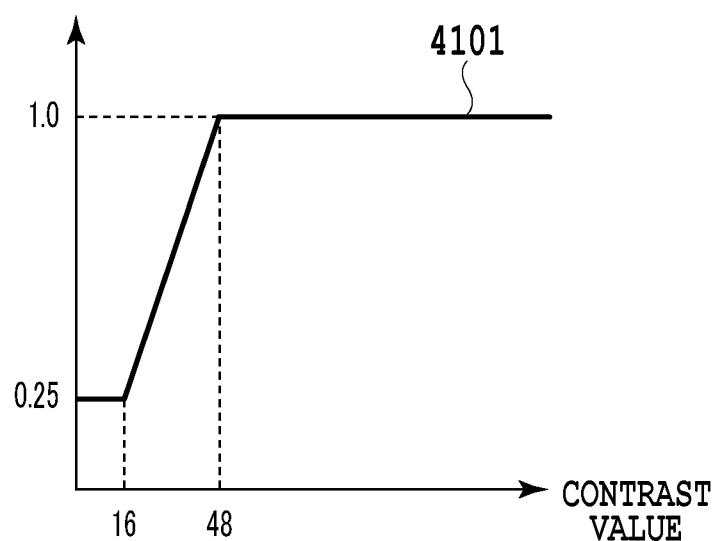
FIG. 41 is a graph representing an example of input/output characteristics of an LUT that is referred to by a coefficient determination unit according to the thirteenth embodiment.

FIG. 41 is a graph representing an example of input/output characteristics of an LUT that is referred to by the coefficient determination unit 4002 according to the present embodiment.

In FIG. 41, a zigzag line 4101 represents input/output characteristics that set the output coefficient to 0.25 in the case where the input contrast value is between 0 and 16, set the output coefficient to 1.0 in the case where the input contrast value is equal to or greater than 48, and linearly change the output coefficient in the range between 0.25 and 1.0 in the case where the input contrast value is between 16 and 48. With the input/output characteristics as shown in FIG. 41, the thin line reproducibility is regarded as important in the case where the input contrast value is equal to or less than 16 and as the input contrast value increases from 16 up to 48, the density reproducibility is regarded more important (the thin line reproducibility is alleviated). In other words, as in the twelfth embodiment, it is possible to adjust the balance between the density reproducibility and the thin line reproducibility by appropriately setting the input/output characteristics of the LUT that is referred to by the coefficient determination unit 4002.

In the present embodiment, the aspect is explained in which the coefficient is determined by using the LUT, but it may also be possible to determine the coefficient by using, for example, a function. Further, it may also be possible to switch coefficients for each smaller interval by dividing the interval of the input pixel value into smaller intervals.

[Fourteenth Embodiment]

In the eleventh embodiment, the minimum threshold value of the high-density area is changed by multiplying a predetermined coefficient. Next, as aspect is explained as a fourteenth embodiment in which the minimum threshold value of the high-density area is changed by using an LUT. Explanation of the portions in common to those of the eleventh embodiment is omitted or simplified and in the following, different points are explained mainly.

Figure 42:
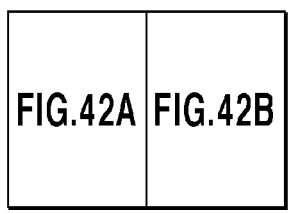
FIG. 42 is a is a diagram showing a relationship between FIGS. 42A and 42B, and FIGS. 42A and 42B are function block diagrams showing an internal configuration of an image processing apparatus that implements halftone processing according to a fourteenth embodiment.
Figure 42A:
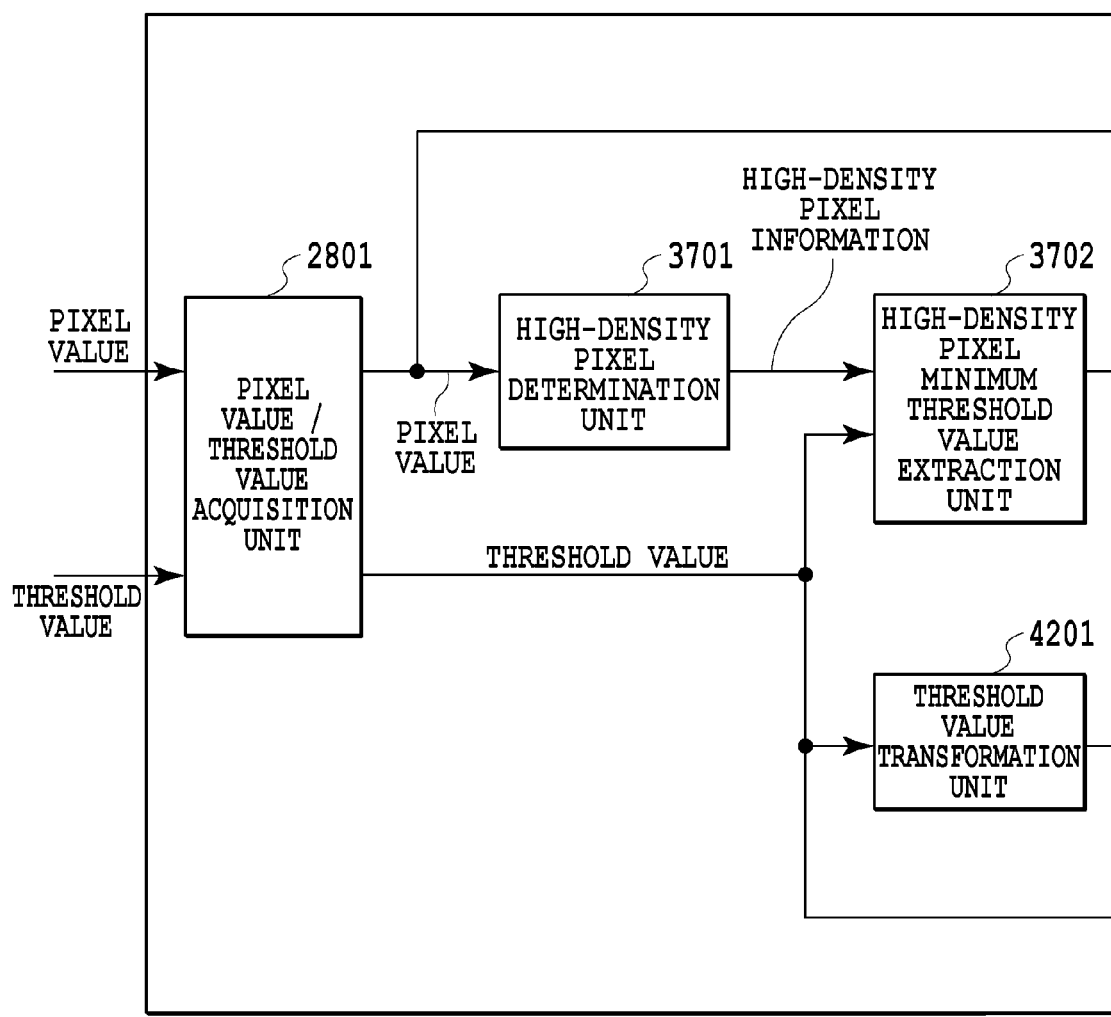
Figure 42B:
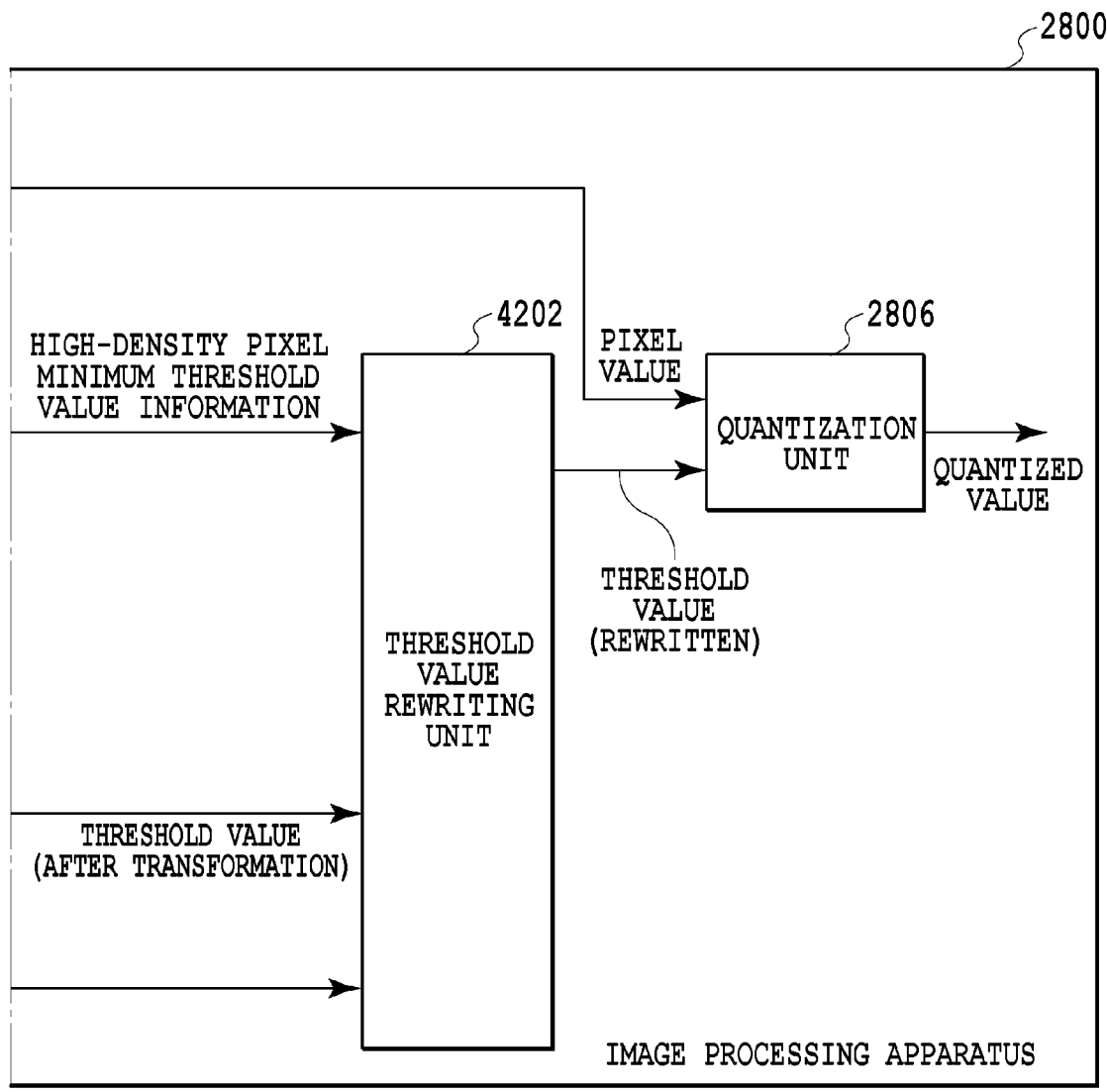

FIGS. 42A and 42B are function block diagrams showing an internal configuration of an image processing apparatus that implements halftone processing according to the present embodiment. The pixel value/threshold value acquisition unit 2801, the high-density pixel determination unit 3701, the high-density pixel minimum threshold value extraction unit 3702, and the quantization unit 2806 are the same as those of the eleventh embodiment, and therefore, explanation is omitted.

Figure 43:
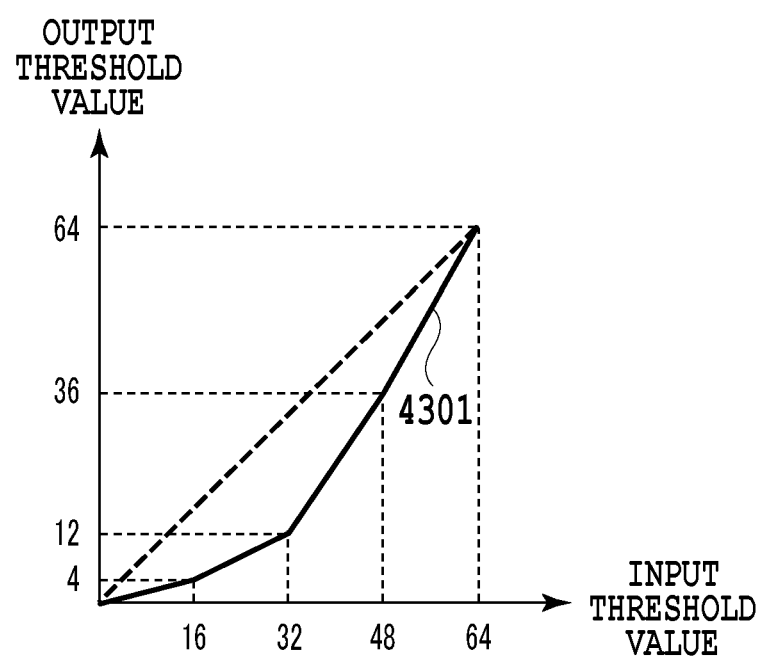
FIG. 43 is a graph representing an example of input/output characteristics of an LUT that is referred to by a threshold value transformation unit according to the fourteenth embodiment.

A threshold value transformation unit 4201 performs processing to determine an output threshold value in accordance with an input threshold value. Specifically, the threshold value transformation unit 4201 refers to an LUT in which output values (threshold values) corresponding to input values (threshold values) are stored in advance and transforms the threshold value input from the pixel value/threshold value acquisition unit 2801. FIG. 43 is a graph representing an example of input/output characteristics of the LUT that is referred to by the threshold value transformation unit 4201. In FIG. 43, a zigzag line 4301 represents input/output characteristics designed so that the slope is 1/4 in the case where the input threshold value is between 0 and 16, the slope is 1/2 in the case where the input threshold value is between 17 and 32, the slope is 3/2 in the case where the input threshold value is between 33 and 48, and the slope is 7/4 in the case where the input threshold value is between 49 and 64. Although not shown, the input/output characteristics are set so that the input threshold value is taken to be the output threshold value as it is in the case where the input threshold value is equal to or greater than 65. The threshold value (output threshold value) transformed by the LUT having the input/output characteristics represented by an arbitrary curve such as this is sent to a threshold value rewriting unit 4202.

The threshold value rewriting unit 4202 rewrites the minimum threshold value among the threshold values corresponding to high-density pixels into the transformed threshold value received from the threshold value transformation unit 4201 based on the high-density pixel minimum threshold value information received from the high-density pixel minimum threshold value extraction unit 3702. For example, in the case where the minimum threshold value indicated by the high-density pixel minimum threshold value information is "48", the minimum threshold value is changed into the transformed threshold value "32" corresponding thereto. Then, quantization using the changed threshold value and the input pixel value is performed in the quantization unit 2806.

In the present embodiment, by using the LUT having the input/output characteristics as shown in FIG. 43, the probability of dot appearance in the case where the minimum threshold value of the high-density area is between 16 and 48.

Here, there is a tendency for the minimum threshold value of the high-density area to become small in the case where the number of high-density pixels within the predetermined area is large and conversely, to become large in the case where the number of high-density pixels within the predetermined area is small, such as in the case where the pixels are located as isolated points. Consequently, by increasing the probability of dot appearance in the case where the threshold value of the high-density area is between 16 and 48, it is possible to increase the probability of dot appearance in the case where a certain number of pixels exist in the high-density area such as in a thin line. Due to this, it is made possible to suppress the generation of dots that do not need to be reproduced, such as isolated point noise. In the case where the input threshold value is equal to or greater than 64, the input value and the output value coincide with each other, and therefore, by storing only coefficients whose input threshold value is less than 64 in the LUT, it is also possible to reduce the capacity of the LUT.

In the present embodiment, the aspect in which the input threshold value is transformed by using the LUT is explained, but it may also be possible to determine the output threshold value corresponding to the input threshold value by using, for example, a function. Further, it may also be possible to generate the output threshold value by dividing the interval of the input threshold value into smaller intervals and switching the slopes for each smaller interval.

[Fifteenth Embodiment]

Next, an aspect is explained as a fifteenth embodiment in which, in the case where the threshold value of a white pixel that will not cause a dot to be formed is a threshold value with a higher probability that a dot will be formed than that of the threshold value of a non-white pixel that forms a boundary with the white pixel (hereinafter, boundary pixel), the threshold value of the boundary pixel is replaced with the threshold value of the white pixel. Explanation of the portions in common to those of the sixth embodiment (including the modification examples) is omitted or simplified and in the following, different points are explained mainly.

Figure 44B:
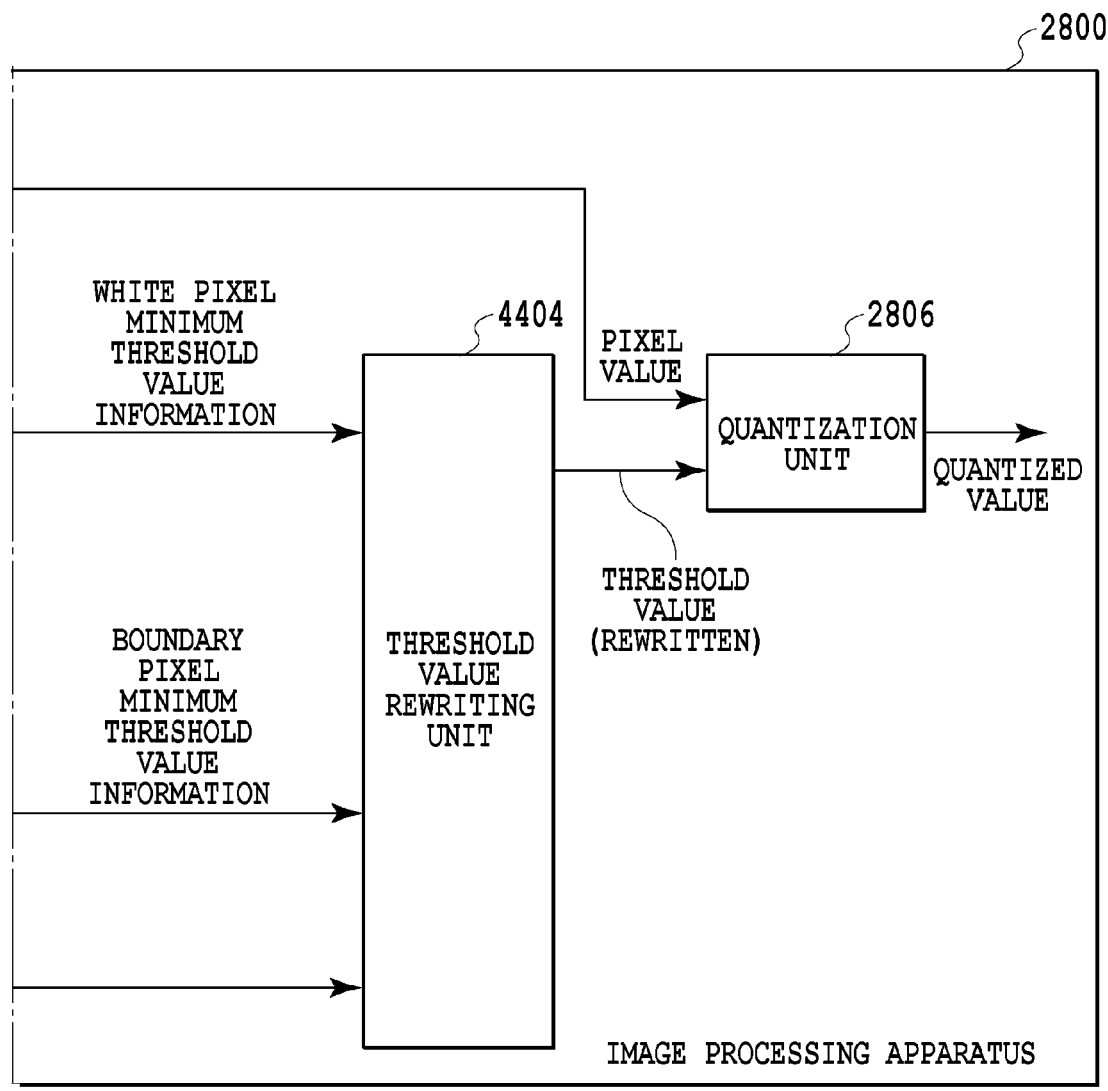
FIG. 44 is a diagram showing a relationship between FIGS. 44A and 44B, and FIGS. 44A and 44B are function block diagrams showing an internal configuration of an image processing apparatus that implements halftone processing according to a fifteenth embodiment.

FIGS. 44A and 44B are function block diagrams showing an internal configuration of an image processing apparatus that implements halftone processing according to the present embodiment. The white pixel determination unit 2802, the white pixel minimum threshold value extraction unit 2803, and the quantization unit 2806 are the same as those of the sixth embodiment, and therefore, explanation is omitted.

A pixel value/threshold value acquisition unit 4401 acquires the pixel values of the pixel of interest and adjacent pixels within a predetermined area of input image data, and the threshold values corresponding to the respective pixel positions from the RAM or the like, not shown. It is assumed that the adjacent pixels refer to eight adjacent pixels that surround the pixel of interest in the vertical, horizontal, and diagonal directions. In the present embodiment, it is also assumed that the predetermined area is a block area of 4 vertical pixels×4 horizontal pixels, but the shape and size of the predetermined area are not limited to those. The acquired pixel value of the pixel of interest and the acquired pixel values of the adjacent pixels are sent to a boundary pixel determination unit 4402. Further, the pixel value of the pixel of interest is sent to the white pixel determination unit 2802.

Furthermore, the threshold value in each pixel position is sent to the white pixel minimum threshold value extraction unit 2803, a boundary pixel minimum threshold value extraction unit 4403, and a threshold value rewriting unit 4404.

The boundary pixel determination unit 4402 determines whether the pixel of interest is a boundary pixel (whether the pixel of interest forms a boundary with a white pixel) based on the pixel value of the pixel of interest and the pixel values of the adjacent pixels received from the pixel value/threshold value acquisition unit 4401. For example, in the case where the pixel of interest is a non-white pixel and at least one white pixel exists in the adjacent pixels, the pixel of interest is determined to be a boundary pixel. Information for specifying the pixel of interest determined to be a boundary pixel (hereinafter, boundary pixel information) is sent to the boundary pixel minimum threshold value extraction unit 4403.

The boundary pixel minimum threshold value extraction unit 4403 extracts the minimum threshold value from among the threshold values corresponding to the positions of the boundary pixels within the predetermined area (hereinafter, boundary pixel minimum threshold value) by using the boundary pixel information received from the boundary pixel determination unit 4402 and the threshold values received from the pixel value/threshold value acquisition unit 4401. The information on the extracted boundary pixel minimum threshold value is sent to the threshold value rewriting unit 4404.

The threshold value rewriting unit 4404 performs processing to rewrite the boundary pixel minimum threshold value into the white pixel minimum threshold value for the threshold value matrix corresponding to the input image. Specifically, the white pixel minimum threshold value is compared with the boundary pixel minimum threshold value and in the case where the white pixel minimum threshold value is the smaller value (threshold value with a high probability that a dot will be formed), the processing to replace the boundary pixel minimum threshold value with the value of the white pixel minimum threshold value is performed.

Due to the replacement processing such as this, as in the sixth embodiment, it is possible to form a dot in the position of the boundary pixel of the input image data without changing the threshold value or the pixel value within the predetermined area defined by the area coverage modulation. The minimum threshold value of the boundary pixel is replaced with the minimum threshold value of the white pixel, but by regarding this as that the minimum threshold value of the boundary pixel and the minimum threshold value of the white pixel are exchanged, the threshold values within the predetermined area can be considered to remain the same. However, even in the case where the threshold value of the white pixel position takes any value, a dot is not generated in the position, and therefore, the replacement of the minimum threshold value of the white pixel is not performed as in the sixth embodiment.

Figure 45:
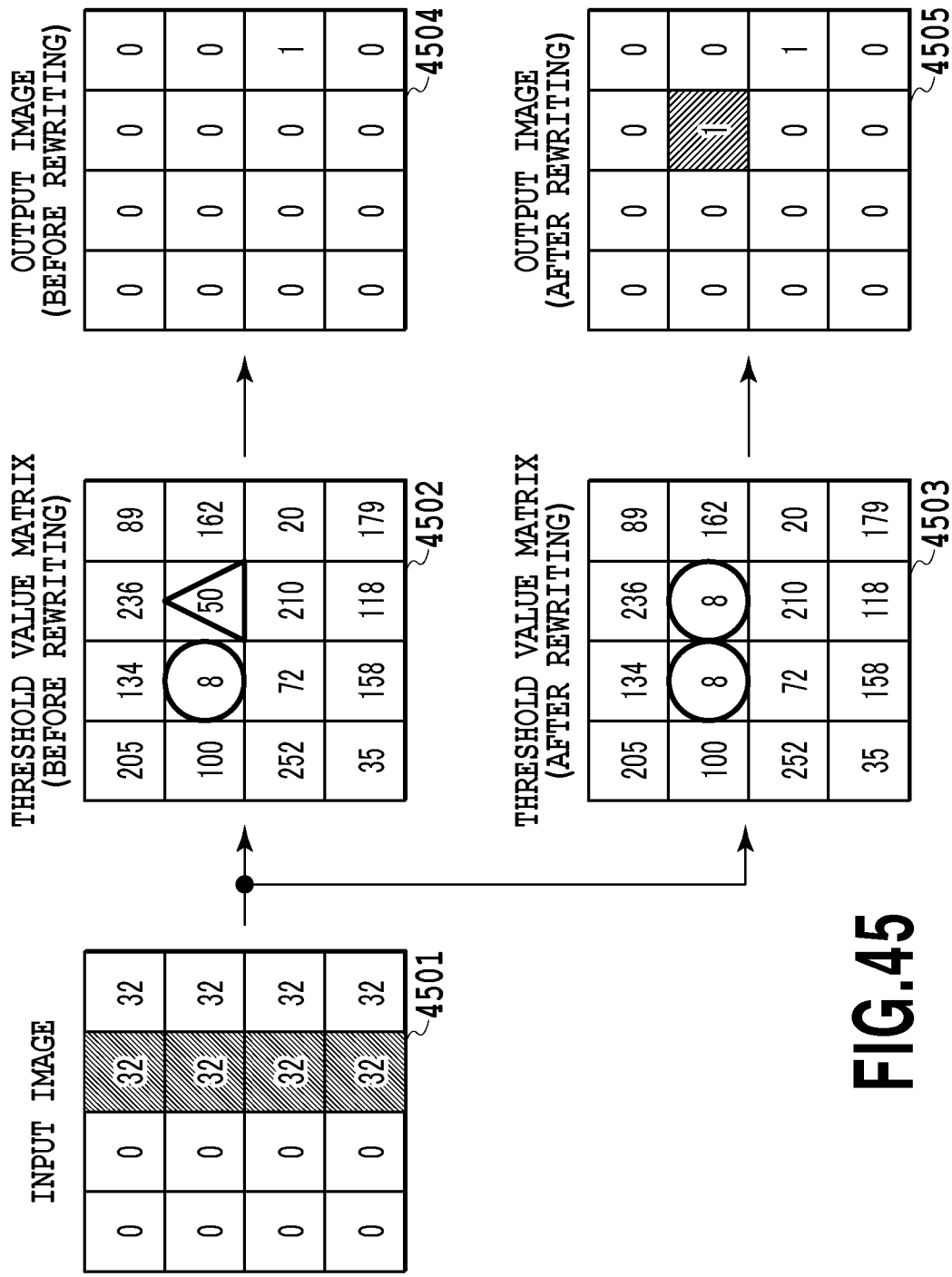
FIG. 45 is a diagram explaining a difference in an output image between the case where threshold value rewriting processing is performed and the case where threshold value rewriting processing is not performed.

FIG. 45 is a diagram explaining a difference in the output image between the case where the threshold value rewriting processing according to the present embodiment is performed and the case where the processing is not performed.

An input image 4501 having 4 vertical pixels×4 horizontal pixels is image data in which the pixel value in the third column and the fourth column is "32" and the pixel value in the other columns is "0". A threshold value matrix 4502 is a threshold value matrix before the threshold value rewriting processing is performed, corresponding to the input image

4501. A screen image 4504 is an output image that is obtained in the case where the input image 4501 is quantized by using the threshold value matrix 4502. While the pixel value in the fourth column of the input image 4501 is "32", the minimum value of the threshold values in the fourth column of the threshold value matrix 4502 is "20", and therefore, a dot exists in the fourth column of the screen image 4504. However, while the pixel value in the third column of the input image 4501 is "32", the minimum value of the threshold values in the third column of the threshold value matrix 4502 is "50", and therefore, no dot exists in the third column of the screen image 4504 (dot disappearance).

A threshold value matrix 4503 is a threshold value matrix after the threshold value rewriting processing is performed, corresponding to the input image 4501. In the threshold value matrix 4503, it is known that the boundary pixel minimum threshold value "50" (Δ in FIG. 45) is replaced with the value of the white pixel minimum threshold value "8" (○ in FIG. 45). A screen image 4505 is an output image that is obtained in the case where the input image 4501 is quantized by using the threshold value matrix 4503 after the threshold value rewriting. In the screen image 4505, the dot that has not been present (having disappeared) in the third column of the screen image 4505 can be reproduced.

Figure 46B:
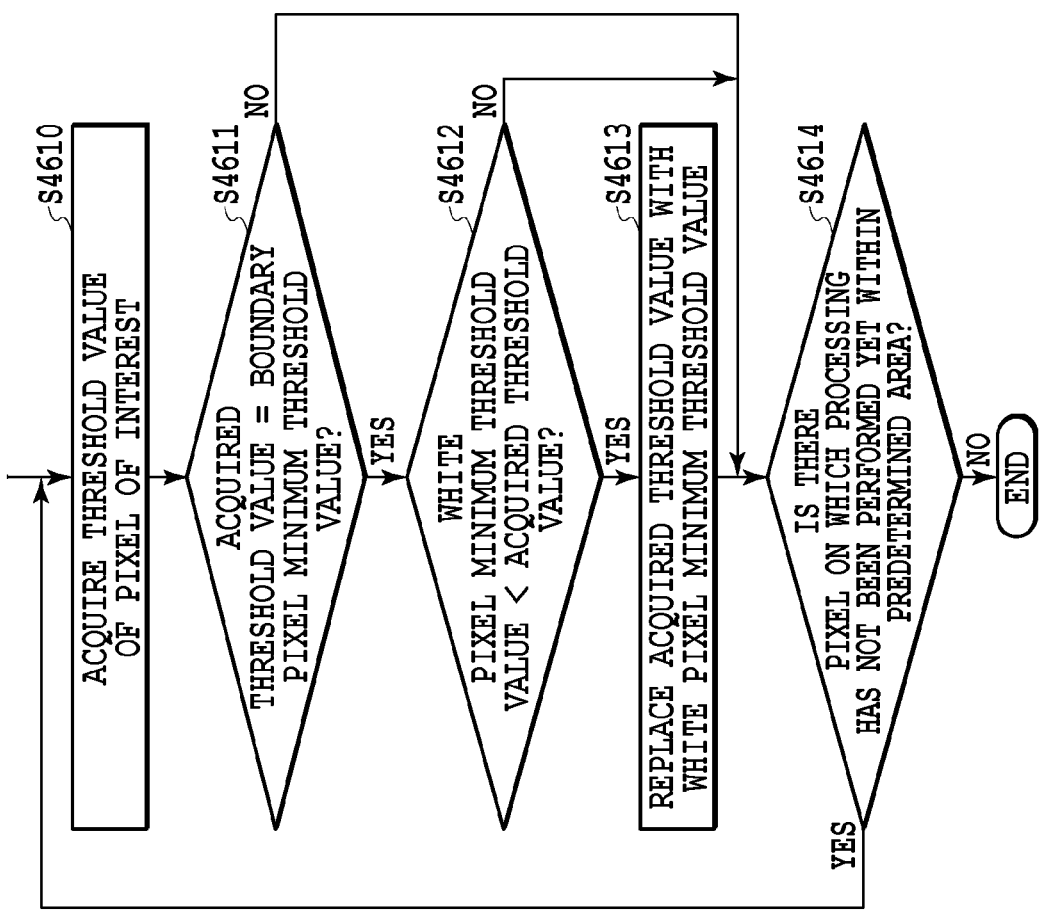
FIG. 46 is a diagram showing a relationship between FIGS. 46A and 46B, and FIGS. 46A and 46B are flowcharts showing details of processing performed by the image processing apparatus according to the fifteenth embodiment.

FIGS. 46A and 46B are flowcharts showing details of the white pixel minimum threshold value extraction processing, the boundary pixel minimum threshold value extraction processing, and the threshold value rewriting processing among the processing that is performed by the image processing apparatus according to the present embodiment.

At step 4601, the white pixel minimum threshold value extraction unit 2803 initializes the white pixel minimum threshold value ($MinTH_{off}$), which is the variable holding the minimum threshold value of the white pixel position. Similarly, the boundary pixel minimum threshold value extraction unit 4403 initializes a boundary pixel minimum threshold value ($MinTH_{adj}$), which is a variable holding the minimum threshold value of the boundary pixel position. Specifically, the maximum value of the threshold values (or the maximum value in the range of the input pixel values) in the screen processing is set to the values of $MinTH_{off}$ and $MinTH_{adj}$, respectively. These variables are held in the RAM.

At step 4602, the white pixel minimum threshold value extraction unit 2803 acquires the white pixel information about the pixel of interest within the predetermined area and the threshold value corresponding to the pixel of interest. The boundary pixel minimum threshold value extraction unit 4403 acquires the boundary pixel information about the pixel of interest within the predetermined area and the threshold value corresponding to the pixel of interest.

At step 4603, the white pixel minimum threshold value extraction unit 2803 determines whether the pixel of interest is a white pixel based on the white pixel information acquired at step 4602. In the case where the results of the determination indicate that the pixel of interest is a white pixel, the processing proceeds to step 4604. On the other hand, in the case where the pixel of interest is not a white pixel (in the case where the pixel of interest is a non-white pixel), the processing proceeds to step 4606.

At step 4604, the white pixel minimum threshold value extraction unit 2803 compares the white pixel minimum threshold value ($MinTH_{off}$) at present with the threshold value of the pixel of interest acquired at step 4602. In the case where the results of the comparison indicate that the value of $MinTH_{off}$ is greater than the threshold value of the pixel of interest, the processing proceeds to step 4605. On the other hand, in the case where the value of $MinTH_{off}$ is not greater than the threshold value of the pixel of interest, the processing proceeds to step 4609.

At step 4605, the white pixel minimum threshold value extraction unit 2803 updates the value of $MinTH_{off}$ to the threshold value acquired at step 4602.

At step 4606, the boundary pixel minimum threshold value extraction unit 4403 determines whether the pixel of interest is a boundary pixel based on the boundary pixel information acquired at step 4602. In the case where the results of the determination indicate that the pixel of interest is a boundary pixel, the processing proceeds to step 4607. On the other hand, in the case where the pixel of interest is not a boundary image (in the case where the pixel of interests is a non-white pixel not adjacent to a white pixel), the processing proceeds to step 4609.

At step 4607, the boundary pixel minimum threshold value extraction unit 4403 compares the boundary pixel minimum threshold value ($MinTH_{adj}$) at present with the threshold value of the pixel of interest acquired at step 4602. In the case where the results of the comparison indicate that the value of $MinTH_{adj}$ is greater than the threshold value of the pixel of interest, the processing proceeds to step 4608. On the other hand, in the case where the value of $MinTH_{adj}$ is not greater than the threshold value of the pixel of interest, the processing proceeds to step 4609.

At step 4608, the boundary pixel minimum threshold value extraction unit 4403 updates the value of $MinTH_{adj}$ to the threshold value acquired at step 4602.

At step 4609, whether the processing has been completed for all the pixels within the predetermined area is determined. In the case where the processing has been completed for all the pixels, the processing proceeds to step 4610. At the point in time the processing has proceeded to step 4610, the minimum threshold value in the white pixel position within the predetermined area is held as $MinTH_{off}$ and the minimum threshold value in the boundary pixel position is held as $MinTH_{adj}$. On the other hand, in the case where there is a pixel on which the processing has not been performed yet within the predetermined area, the processing returns to step 4602, and the next pixel is taken to be the pixel of interest and the processing at each of step 4602 to 4608 is performed.

At step 4610, the threshold value rewriting unit 4404 acquires the threshold value corresponding to the pixel of interest within the predetermined area.

At step 4611, the threshold value rewriting unit 4404 determines whether the threshold value acquired at step 4610 and the boundary pixel minimum threshold value ($MinTH_{adj}$) are the same. In the case where both are the same value, the processing proceeds to step 4612. On the other hand, in the case where both are not the same value, the processing proceeds to step 4614.

At step 4612, the threshold value rewriting unit 4404 compares the white pixel minimum threshold value ($MinTH_{off}$) with the threshold value acquired at step 4610. At the point in time of the comparison, the threshold value acquired at step 4610 is the same as the value of the boundary pixel minimum threshold value ($MinTH_{adj}$). Consequently, at this step, the boundary pixel minimum threshold value ($MinTH_{adj}$) and the white pixel minimum threshold value ($MinTH_{off}$) are compared to determine which is greater. In the case where the results of the determination indicate that the white pixel minimum threshold value is smaller than the boundary pixel minimum threshold value (acquired threshold value), the processing proceeds to step 4613. On the other hand, in the case where the white pixel minimum threshold value is not smaller than the boundary pixel minimum threshold value (acquired threshold value), the processing proceeds to step 4614.

At step 4613, the threshold value rewriting unit 4404 replaces the threshold value acquired at step 4610 with the white pixel minimum threshold value. In other words, the value of the white pixel minimum threshold value (MinTH$_{off}$) is set as the threshold value corresponding to the pixel of interest.

At step 4614, whether the processing has been completed for all the pixels within the predetermined area is determined. In the case where there is a pixel on which the processing has not been performed yet, the processing returns to step 4610, and the next pixel is taken to be the pixel of interest and the processing at step 4610 to step 4613 is repeated. On the other hand, in the case where the processing has been performed for all the pixels, the present processing is terminated.

The above is the contents of the white pixel minimum threshold value extraction processing, the boundary pixel minimum threshold value extraction processing, and the threshold value rewriting processing among the processing that is performed by the image processing apparatus according to the present embodiment.

Due to the above, the minimum threshold value of the boundary pixels (threshold value used for quantization) is replaced with a threshold value with a high probability that a dot will be formed for each predetermined area.

[Sixteenth Embodiment]

In the fifteenth embodiment, the case where the minimum threshold value within the predetermined area exists among the threshold values in the area of pixels other than white pixels and boundary pixels (hereinafter, "residual area") means that a pixel having the highest probability of dot formation does not exist in the white pixel area, and therefore, it is not necessary to replace the threshold value of a boundary pixel with another. Consequently, an aspect is explained as a sixteenth embodiment in which the threshold value of a boundary pixel is not replaced with another in the case where the minimum threshold value in the residual area is smaller than the white pixel minimum threshold value. Explanation of the portions in common to those of the fifteenth embodiment is omitted or simplified and in the following, different points are explained mainly.

Figure 47A:
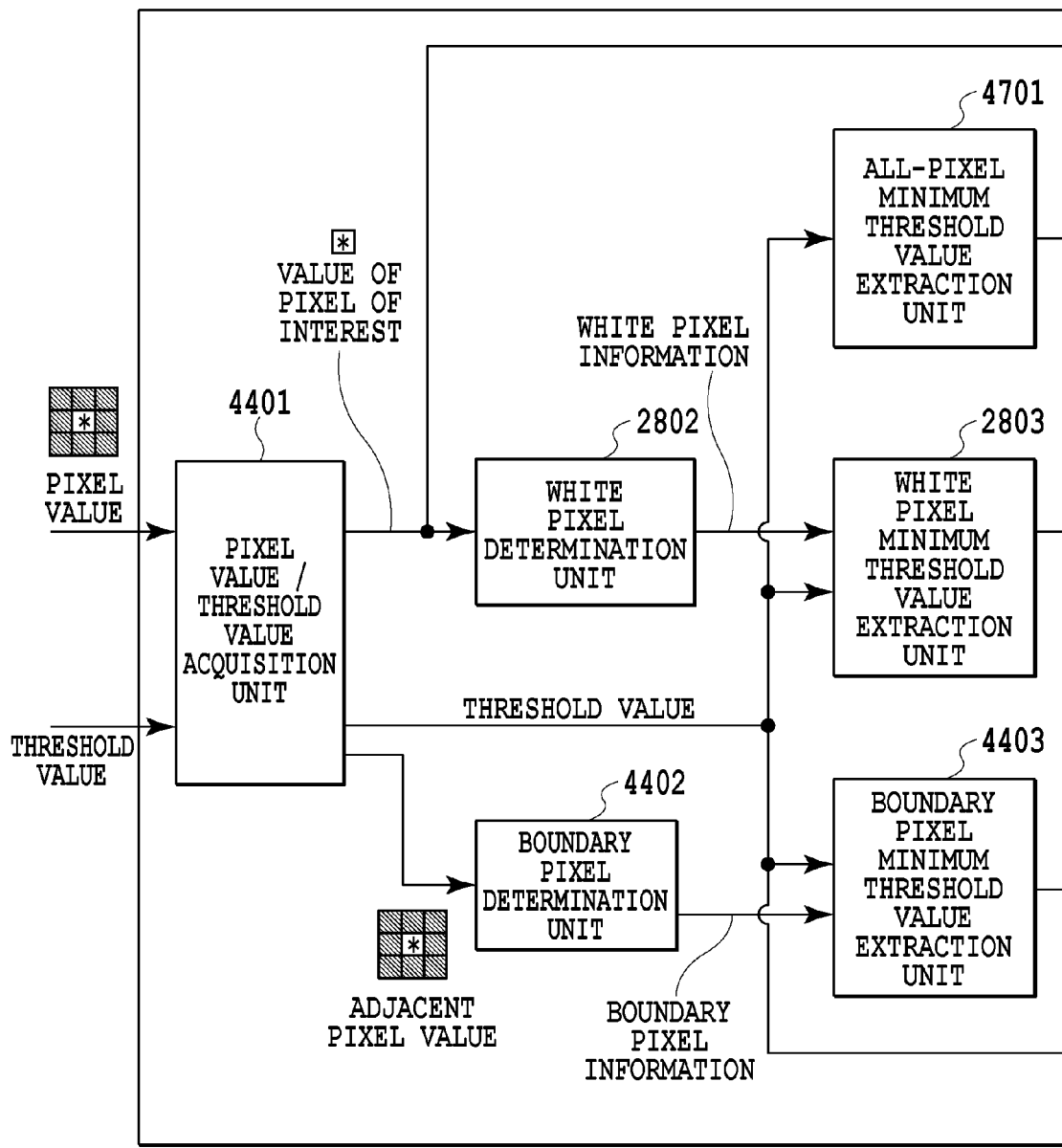
FIG. 47 is a diagram showing a relationship between FIGS. 47A and 47B, and FIGS. 47A and 47B are function block diagrams showing an internal configuration of an image processing apparatus that implements halftone processing according to a sixteenth embodiment.
Figure 47B:
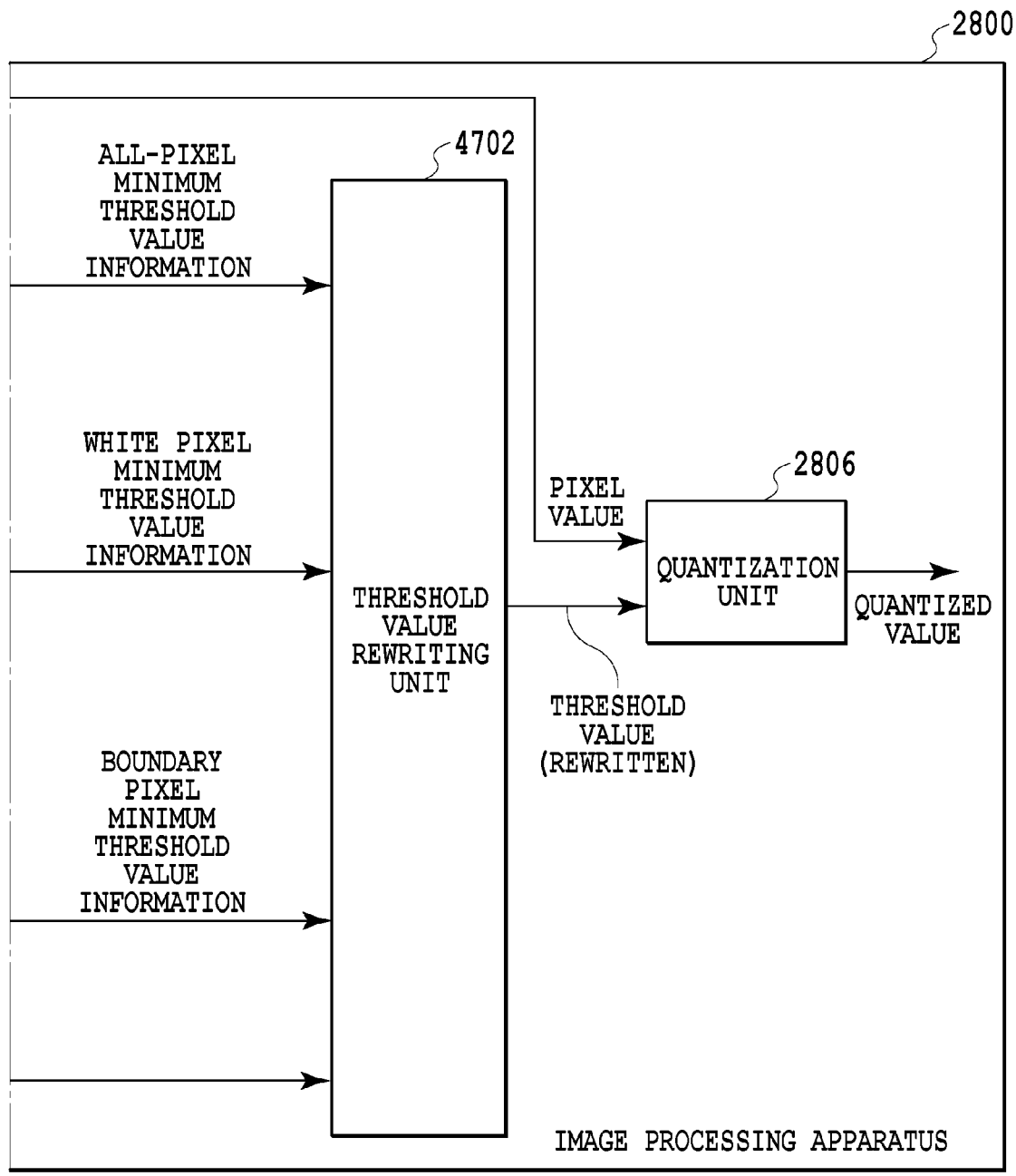

FIGS. 47A and 47B are function block diagrams showing an internal configuration of an image processing apparatus that implements halftone processing according to the present embodiment. The pixel value/threshold value acquisition unit 4401, the white pixel determination unit 2802, the boundary pixel determination unit 4402, the white pixel minimum threshold value extraction unit 2803, the boundary pixel minimum threshold value extraction unit 4403, and the quantization unit 2806 are the same as those of the fifteenth embodiment, and therefore, explanation is omitted.

An all-pixel minimum threshold value extraction unit 4701 extracts the minimum threshold value (hereinafter, all-pixel minimum threshold value) from among the threshold values corresponding to all the pixels within a predetermined area by using the threshold values received from the pixel value/threshold value acquisition unit 4401.

A threshold value rewriting unit 4702 refers to the all-pixel minimum threshold value extracted by the all-pixel minimum threshold value extraction unit 4701, the white pixel minimum threshold value extracted by the white pixel minimum threshold value extraction unit 2803, and the boundary pixel minimum threshold value extracted by the boundary pixel minimum threshold value extraction unit 4403, and performs threshold value rewriting processing only in the case where necessary. Specifically, only in the case where the white pixel minimum threshold value is the smallest (in the case where the all-pixel minimum threshold value=white pixel minimum threshold value), the boundary pixel minimum threshold value is replaced with the white pixel minimum threshold value, and in the case where the all-pixel minimum threshold value is smaller than the white pixel minimum threshold value (in the case where the all-pixel minimum threshold value ≠ the white pixel minimum threshold value), replacement is not performed.

The function itself of the pixel value/threshold value acquisition unit 4401 is the same as that of the fifteenth embodiment, but the case of the present embodiment differs from the case of the fifteenth embodiment in that the threshold value acquired by the pixel value/threshold value acquisition unit 4401 is also sent to the all-pixel minimum threshold value extraction unit 4701.

Figure 48B:
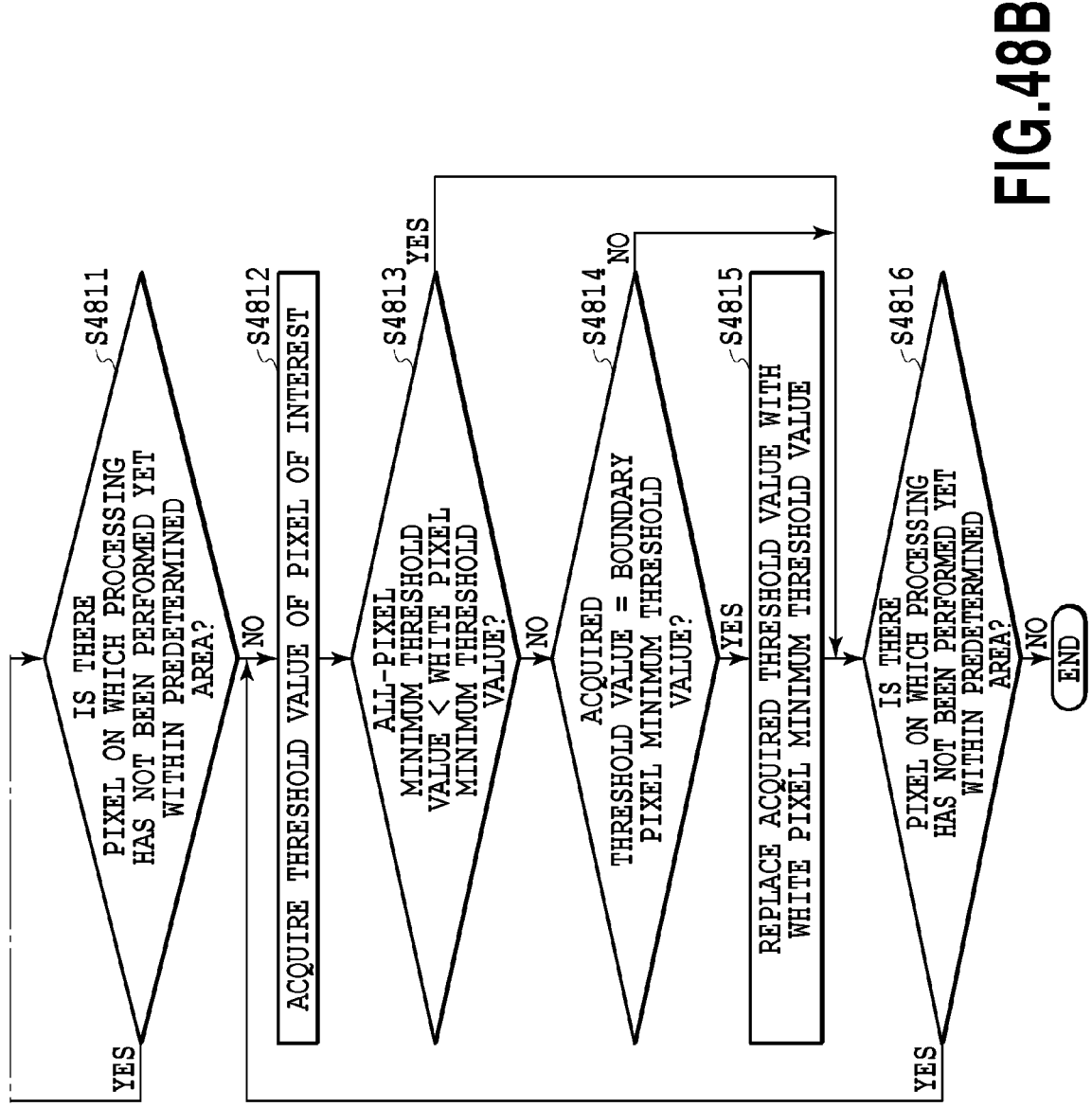
FIG. 48 is a diagram showing a relationship between FIGS. 48A and 48B, and FIGS. 48A and 48B are flowcharts showing details of processing performed by the image processing apparatus according to the sixteenth embodiment.

FIGS. 48A and 48B are flowcharts showing details of the all-pixel minimum threshold value extraction processing, the white pixel minimum threshold value extraction processing, the boundary pixel minimum threshold value extraction processing, and the threshold value rewriting processing among the processing that is performed by the image processing apparatus according to the present embodiment.

At step 4801, the all-pixel minimum threshold value extraction unit 4701 initializes the all-pixel minimum threshold value (MinTH$_{all}$), which is the variable holding the minimum threshold value in all the pixels within the predetermined area. Similarly, the white pixel minimum threshold value extraction unit 2803 initializes the white pixel minimum threshold value (MinTH$_{off}$), which is the variable holding the minimum threshold value of the white pixel position. Further, the boundary pixel minimum threshold value extraction unit 4403 initializes the boundary pixel minimum threshold value (MinTH$_{adj}$), which is the variable holding the minimum threshold value of the boundary pixel position. Specifically, the maximum value of the threshold values (or the maximum value in the range of the input pixel values) in the screen processing is set to the values of MinTH$_{all}$, MinTH$_{off}$, and MinTH$_{adj}$, respectively. These variables are held in the RAM.

At step 4802, the all-pixel minimum threshold value extraction unit 4701 acquires the threshold value corresponding to the pixel of interest within the predetermined area. The white pixel minimum threshold value extraction unit 2803 acquires the white pixel information about the pixel of interest within the predetermined area and the threshold value corresponding to the pixel of interest. The boundary pixel minimum threshold value extraction unit 4403 acquires the boundary pixel information about the pixel of interest within the predetermined area and the threshold value corresponding to the pixel of interest.

At step 4803, the all-pixel minimum threshold value extraction unit 4701 compares the all-pixel minimum threshold value (MinTH$_{all}$) at present with the threshold value of the pixel of interest acquired at step 4802. In the case where the results of the comparison indicate that the value of MinTH$_{all}$ is greater than the threshold value of the pixel of interest, the processing proceeds to step 4804. On the other hand, in the case where the value of MinTH$_{all}$ is not greater than the threshold value of the pixel of interest, the processing proceeds to step 4805.

At step 4804, the all-pixel minimum threshold value extraction unit 4701 updates the value of MinTH$_{all}$ to the threshold value acquired at step 4802.

At step 4805, the white pixel minimum threshold value extraction unit 2803 determines whether the pixel of interest is a white pixel based on the white pixel information acquired at step 4802. In the case where the results of the determination indicate that the pixel of interest is a white pixel, the processing proceeds to step 4806. On the other hand, in the case where the pixel of interest is not a white pixel (in the case where the pixel of interest is a non-white pixel), the processing proceeds to step 4808.

At step 4806, the white pixel minimum threshold value extraction unit 2803 compares the white pixel minimum threshold value (MinTH$_{off}$) at present with the threshold value of the pixel of interest acquired at step 4802. In the case where the results of the determination indicate that the value of MinTH$_{off}$ is greater than the threshold value of the pixel of interest, the processing proceeds to step 4807. On the other hand, in the case where the value of MinTH$_{off}$ is not greater than the threshold value of the pixel of interest, the processing proceeds to step 4811.

At step 4807, the white pixel minimum threshold value extraction unit 2803 updates the value of MinTH$_{off}$ to the threshold value acquired at step 4802.

At step 4808, the boundary pixel minimum threshold value extraction unit 4403 determines whether the pixel of interest is a boundary pixel based on the boundary pixel information acquired at step 4602. In the case where the results of the determination indicate that the pixel of interest is a boundary pixel, the processing proceeds to step 4809. On the other hand, in the case where the pixel of interest is not a boundary pixel (in the case where the pixel of interest is a non-white pixel not adjacent to a white pixel), the processing proceeds to step 4811.

At step 4809, the boundary pixel minimum threshold value extraction unit 4403 compares the boundary pixel minimum threshold value (MinTH$_{adj}$) at present with the threshold value of the pixel of interest acquired at step 4802. In the case where the results of the determination indicate that the value of MinTH$_{adj}$ is greater than the threshold value of the pixel of interest, the processing proceeds to step 4810. On the other hand, in the case where the value of MinTH$_{adj}$ is not greater than the threshold value of the pixel of interest, the processing proceeds to step 4811.

At step 4810, the boundary pixel minimum threshold value extraction unit 4403 updates the value of MinTH$_{adj}$ to the threshold value acquired at step 4802.

At step 4811, whether the processing has been completed for all the pixels within the predetermined area is determined. In the case where the processing has been completed for all the pixels, the processing proceeds to step 4812. At the point in time the processing has proceeded to step 4812, the minimum threshold value in all the pixels within the predetermined area is held as MinTH$_{all}$, the minimum threshold value in the white pixel position is held as MinTH$_{off}$, and the minimum threshold value in the boundary pixel position is held as MinTH$_{adj}$, respectively. On the other hand, in the case where there is a pixel on which the processing has not been performed yet within the predetermined area, the processing returns to step 4802, and the next pixel is taken to be the pixel of interest and the processing at each of step 4802 to step 4810 is performed.

At step 4812, the threshold value rewriting unit 4702 acquires the threshold value corresponding to the pixel of interest within the predetermined area.

At step 4813, the threshold value rewriting unit 4702 determines whether the all-pixel minimum threshold value (MinTH$_{all}$) is smaller than the white pixel minimum threshold value (MinTH$_{off}$). In the case where the all-pixel minimum threshold value is smaller, it is meant that the minimum threshold value in the predetermined area exists in a boundary pixel or a pixel in the residual area, and therefore, the processing proceeds to step 4816 without replacing threshold values. In the other case (in the case where the all-pixel minimum threshold value and the white pixel minimum threshold value are equal), the processing proceeds to step 4814.

At step 4814, the threshold value rewriting unit 4702 determines whether the threshold value acquired at step 4812 and the boundary pixel minimum threshold value (MinTH$_{adj}$) are the same. In the case where both are the same value, the processing proceeds to step 4815. On the other hand, in the case where both are not the same value, the processing proceeds to step 4816.

At step 4815, the threshold value rewriting unit 4702 replaces the threshold value acquired at step 4812 with the white pixel minimum threshold value. In other words, as the threshold value corresponding to the pixel of interest, the value of the white pixel minimum threshold value (MinTH$_{off}$) is set.

At step 4816, whether the processing has been completed for all the pixels within the predetermined area is determined. In the case where there is a pixel on which the processing has not been performed yet, the processing returns to step 4812, and the next pixel is taken to be the pixel of interest and the processing at step 4812 to step 4815 is repeated. On the other hand, in the case where the processing has been completed for all the pixels, the present processing is terminated.

The above is the contents of the all-pixel minimum threshold value extraction processing, the white pixel minimum threshold value extraction processing, the boundary pixel minimum threshold value extraction processing, and the threshold value rewriting processing among the processing that is performed by the image processing apparatus according to the present embodiment.

According to the present embodiment, the rewriting processing of the boundary pixel minimum threshold value for each predetermined area is limited only in the case where the rewriting processing is necessary, and therefore, it is possible to prevent the resultant density after the quantization from becoming higher than necessary.

[Seventeenth Embodiment]

In the sixteenth embodiment, the aspect is explained in which the rewriting processing is not performed in the case where the "minimum threshold value in the residual area"=the "minimum threshold value within the predetermined area". Next, an aspect is explained as a seventeenth embodiment in which the minimum threshold value in the residual area and the minimum threshold value of the boundary pixel are exchanged in the case where the minimum threshold value in the residual area is the minimum threshold value within the predetermined area. Explanation of the portions in common to those of the fifteenth and sixteenth embodiments is omitted or simplified and in the following, different points are explained mainly.

Figure 49A:
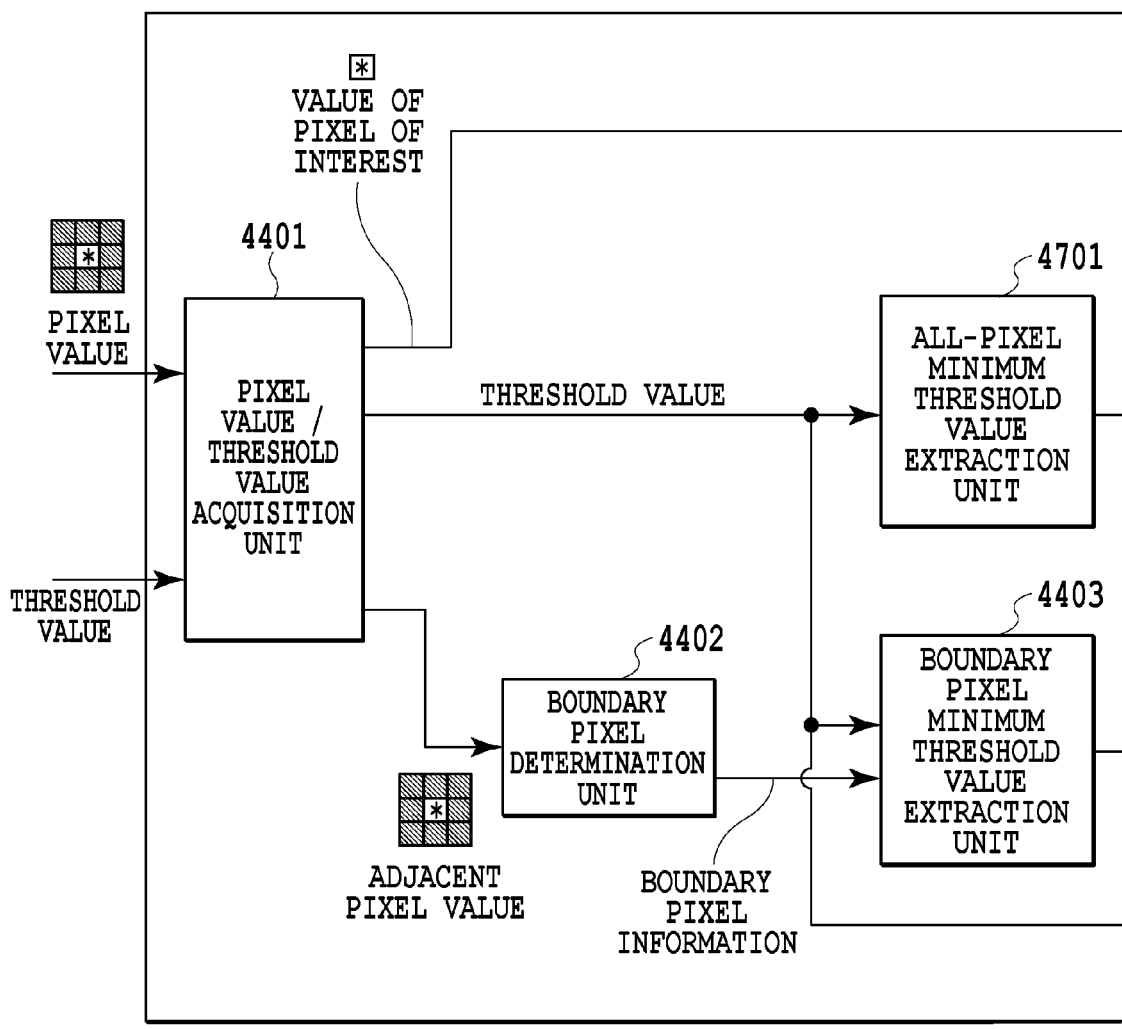
FIG. 49 is a diagram showing a relationship between FIGS. 49A and 49B, and FIGS. 49A and 49B are function block diagrams showing an internal configuration of an image processing apparatus that implements halftone processing according to a seventeenth embodiment.
Figure 49B:
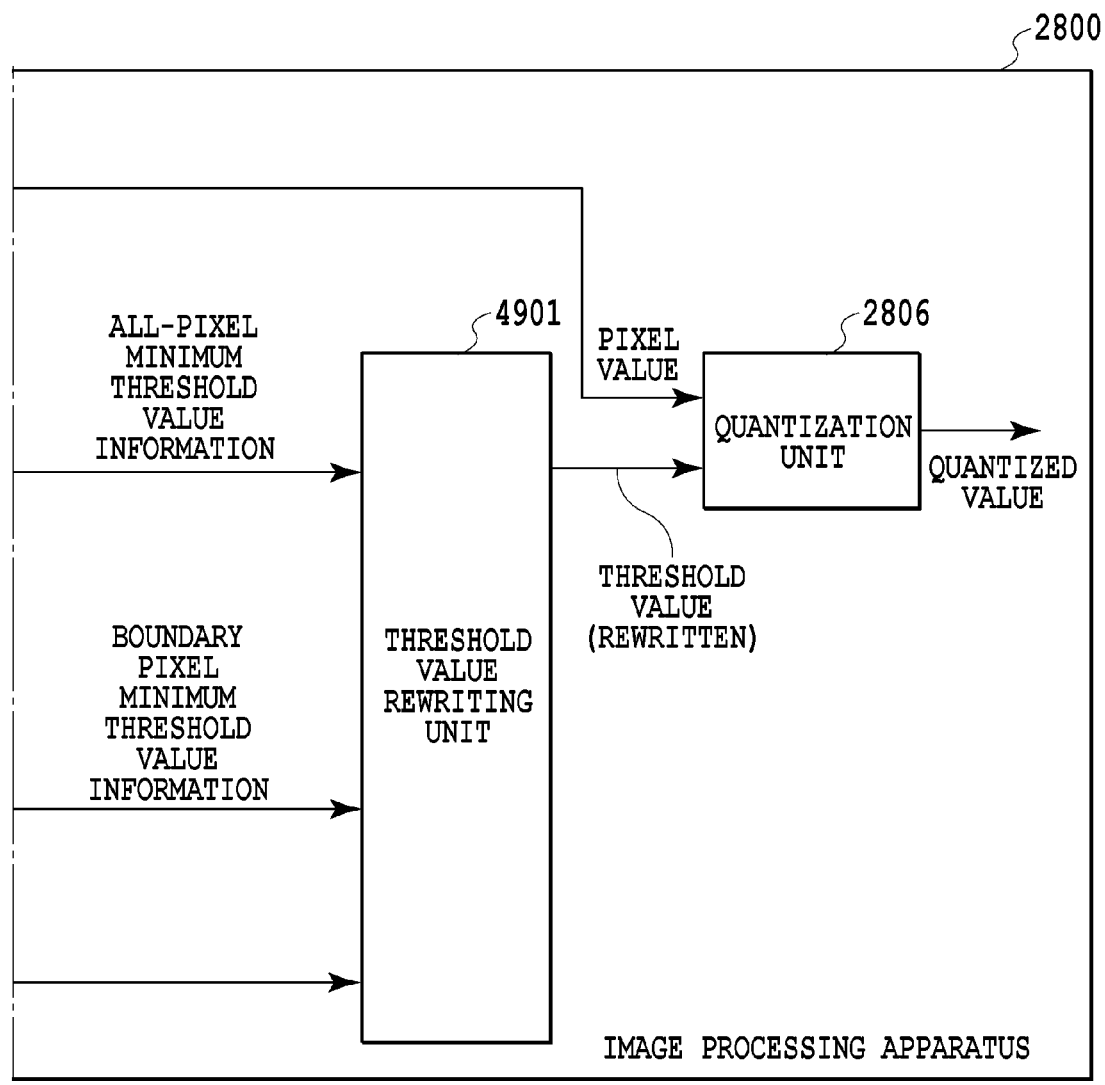

FIGS. 49A and 49B are function block diagrams showing an internal configuration of an image processing apparatus that implements halftone processing according to the present embodiment. The pixel value/threshold value acquisition unit 4401, the boundary pixel determination unit 4402, the all-pixel minimum threshold value extraction unit 4701, the boundary pixel minimum threshold value extraction unit 4403, and the quantization unit 2806 are in common to those of the fifteenth or sixteenth embodiment, and therefore, explanation is omitted.

A threshold value rewriting unit 4901 performs threshold value rewriting processing by exchanging the all-pixel minimum threshold value and the white pixel minimum threshold value for the threshold value matrix corresponding to the input image. Specifically, the all-pixel minimum threshold value is compared with the boundary pixel minimum threshold value and in the case where the all-pixel minimum threshold value is a threshold value (threshold value with a high probability that a dot will be formed) smaller than the boundary pixel minimum threshold value, both the threshold values are exchanged.

The function itself of the pixel value/threshold value acquisition unit 4401 is the same as that of the fifteenth embodiment, but the case of the present embodiment differs from the case of the fifteenth embodiment in that the threshold value acquired by the pixel value/threshold value acquisition unit 4401 is sent to the all-pixel minimum threshold value extraction unit 4701 and the boundary pixel minimum threshold value extraction unit 4403.

Figure 50B:
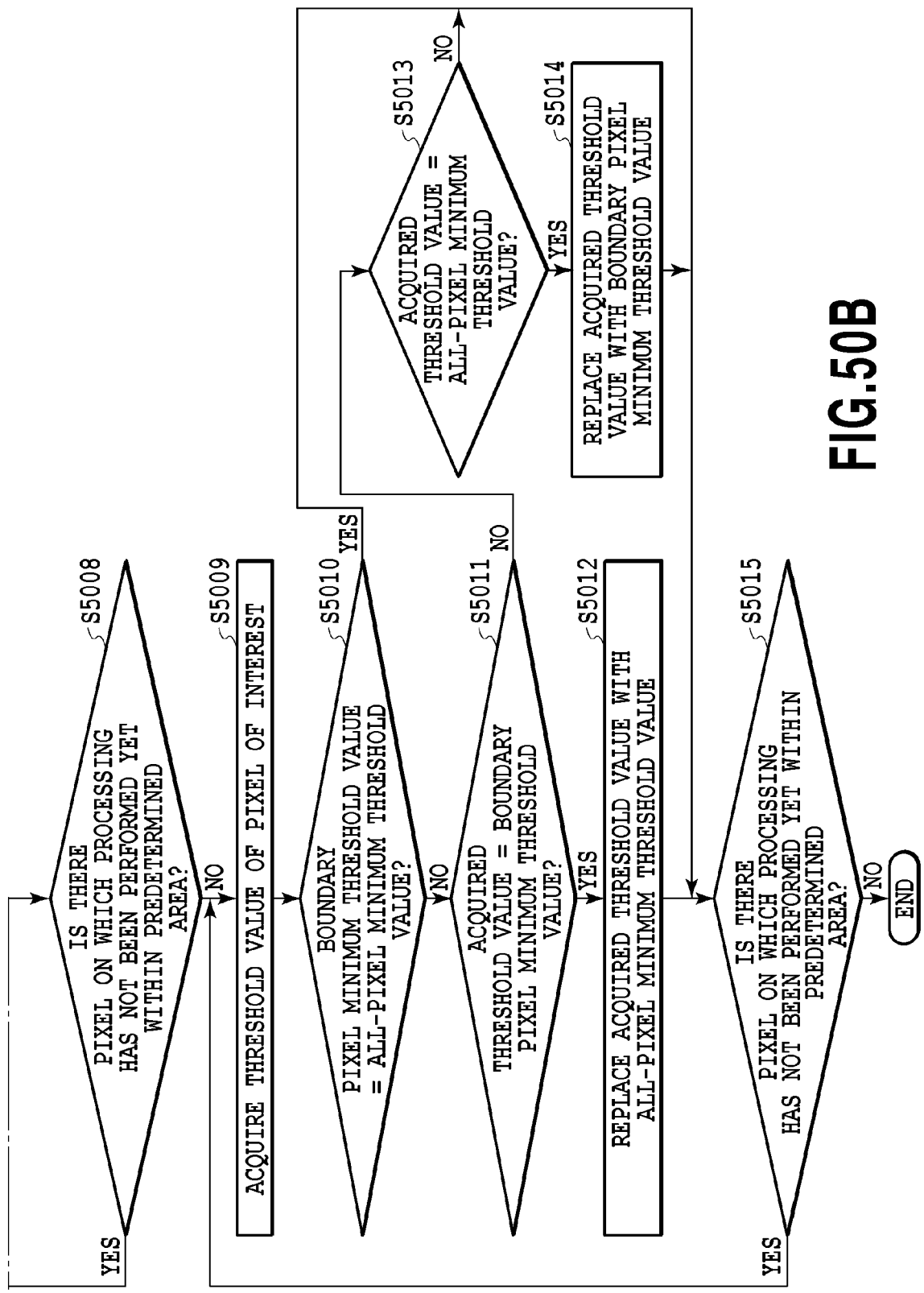
FIG. 50 is a diagram showing a relationship between FIGS. 50A and 50B, and FIGS. 50A and 50B are flowcharts showing details of processing performed by the image processing apparatus according to the seventeenth embodiment.

FIGS. 50A and 50B are flowcharts showing details of the all-pixel minimum threshold value extraction processing, the boundary pixel minimum threshold value extraction processing, and the threshold value rewriting processing among the processing that is performed by the image processing apparatus according to the present embodiment.

At step 5001, the all-pixel minimum threshold value extraction unit 4701 initializes the all-pixel minimum threshold value ($MinTH_{all}$), which is the variable holding the minimum threshold value in all the pixels within the predetermined area. Similarly, the boundary pixel minimum threshold value extraction unit 4403 initializes the boundary pixel minimum threshold value ($MinTH_{adj}$), which is the variable holding the minimum threshold value of the boundary pixel position. Specifically, the maximum value of the threshold values (or the maximum value in the range of the input pixel values) in the screen processing is set to the values of $MinTH_{all}$ and $MinTH_{adj}$, respectively. These variables are held in the RAM.

At step 5002, the all-pixel minimum threshold value extraction unit 4701 acquires the threshold value corresponding to the pixel of interest within the predetermined area. The boundary pixel minimum threshold value extraction unit 4403 acquires the boundary pixel information about the pixel of interest within the predetermined area and the threshold value corresponding to the pixel of interest.

At step 5003, the all-pixel minimum threshold value extraction unit 4701 compares the all-pixel minimum threshold value ($MinTH_{all}$) at present with the threshold value of the pixel of interest acquired at step 5002. In the case where the results of the comparison indicate that the value of $MinTH_{all}$ is greater than the threshold value of the pixel of interest, the processing proceeds to step 5004. On the other hand, in the case where the value of $MinTH_{all}$ is not greater than the threshold value of the pixel of interest, the processing proceeds to step 5005.

At step 5004, the all-pixel minimum threshold value extraction unit 4701 updates the value of $MinTH_{all}$ to the threshold value acquired at step 5002.

At step 5005, the boundary pixel minimum threshold value extraction unit 4403 determines whether the pixel of interest is a boundary pixel based on the boundary pixel information acquired at step 5002. In the case where the results of the determination indicate that the pixel of interest is a boundary pixel, the processing proceeds to step 5006. On the other hand, in the case where the pixel of interest is not a boundary pixel (in the case where the pixel of interest is a non-white pixel not adjacent to a white pixel), the processing proceeds to step 5008.

At step 5006, the boundary pixel minimum threshold value extraction unit 4403 compares the boundary pixel minimum threshold value ($MinTH_{adj}$) at present with the threshold value of the pixel of interest acquired at step 5002. In the case where the results of the comparison indicate that the value of $MinTH_{adj}$ is greater than the threshold value of the pixel of interest, the processing proceeds to step 5007. On the other hand, in the case where the value of $MinTH_{adj}$ is not greater than the threshold value of the pixel of interest, the processing proceeds to step 5008.

At step 5007, the boundary pixel minimum threshold value extraction unit 4403 updates the value of $MinTH_{adj}$ to the threshold value acquired at step 5002.

At step 5008, whether the processing has been completed for all the pixels within the predetermined area is determined. In the case where the processing has been completed for all the pixels, the processing proceeds to step 5009. At the point in time the processing has proceeded to step 5009, the minimum threshold value in all the pixels within the predetermined area is held as $MinTH_{all}$ and the minimum threshold value in the boundary pixel position is held as $MinTH_{adj}$, respectively. On the other hand, in the case where there is a pixel on which the processing has not been performed yet within the predetermined area, the processing returns to step 5002, and the next pixel is taken to be the pixel of interest and the processing at each of step 5002 to 5007 is performed.

At step 5009, the threshold value rewriting unit 4901 acquires the threshold value corresponding to the pixel of interest within the predetermined area.

At step 5010, the threshold value rewriting unit 4901 determines whether the boundary pixel minimum threshold value ($MinTH_{adj}$) and the all-pixel minimum threshold value ($MinTH_{all}$) are the same. In the case where the all-pixel minimum threshold value is the same as the boundary pixel minimum threshold value, it is not necessary to exchange the threshold values, and therefore, the processing proceeds to step 5015. In the case where the all-pixel minimum threshold value is not the same as the boundary pixel minimum threshold value, the processing proceeds to step 5011.

At step 5011, the threshold value rewriting unit 4901 determines whether the threshold value acquired at step 5009 and the boundary pixel minimum threshold value ($MinTH_{adj}$) are the same. In the case where both are the same value, the processing proceeds to step 5012. On the other hand, in the case where both are not the same value, the processing proceeds to step 5013.

At step 5012, the threshold value rewriting unit 4901 replaces the threshold value acquired at step 5009 with the all-pixel minimum threshold value. In other words, as the threshold value corresponding to the pixel of interest, the value of the all-pixel minimum threshold value ($MinTH_{all}$) is set.

At step 5013, the threshold value rewriting unit 4901 determines whether the threshold value acquired at step 5009 and the all-pixel minimum threshold value ($MinTH_{all}$) are the same. In the case where both are the same value, the processing proceeds to step 5014. On the other hand, in the case where both are not the same value, the processing proceeds to step 5015.

At step 5014, the threshold value rewriting unit 4901 replaces the threshold value acquired at step 5009 with the boundary pixel minimum threshold value. In other words, as the threshold value corresponding to the pixel of interest, the value of the boundary pixel minimum threshold value (MinTH$_{adj}$) is set.

At step 5015, whether the processing has been completed for all the pixels within the predetermined area is determined. In the case where there is a pixel on which the processing has not been performed yet, the processing returns to step 5009, and the next pixel is taken to be the pixel of interest and the processing at step 5009 to 5014 is repeated. On the other hand, in the case where the processing has been completed for all the pixels, the present processing is terminated.

The above is the contents of the all-pixel minimum threshold value extraction processing, the boundary pixel minimum threshold value extraction processing, and the threshold value rewriting processing among the processing that is performed by the image processing apparatus according to the present embodiment.

According to the present embodiment, it is possible to improve the thin line reproducibility of boundary pixels and to obtain the edge enhancement effect while preventing the resultant density after quantization from becoming higher than necessary.

<First Modification Example>

In order to simplify the circuit configuration, it may also be possible to exchange the threshold value of the white pixel position with the boundary pixel minimum threshold value in the case where the threshold value of the white pixel position is the in-predetermined area minimum threshold value. Even in the case where the threshold value of the white pixel position takes any value, a dot is not formed, and therefore, exchange will not bring a problem of such as unnatural shifts in density.

[Eighteenth Embodiment]

Next, an aspect is explained as an eighteenth embodiment in which the minimum threshold value in the white pixel, the minimum threshold value in the boundary pixel, and the minimum threshold value in the residual area are extracted and permuted so that the magnitude relationship of "boundary pixel minimum threshold value"<"residual area minimum threshold value"<"white pixel minimum threshold value" will result. Explanation of the portions in common to those of the fifteenth embodiment is omitted or simplified and in the following, different points are explained mainly.

Figure 51B:
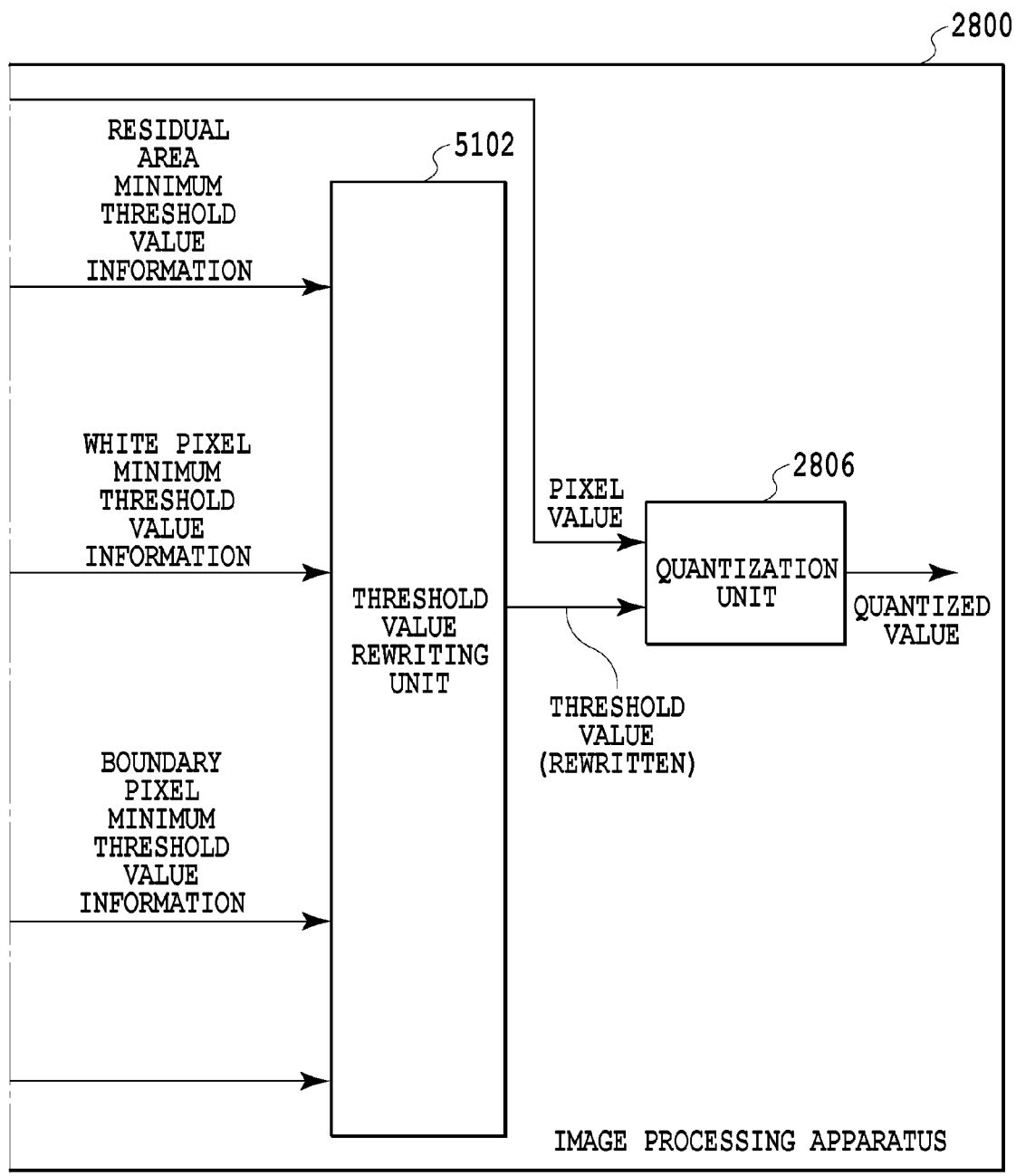
FIG. 51 is a diagram showing a relationship between FIGS. 51A and 51B, and FIGS. 51A and 51B are function block diagrams showing an internal configuration of an image processing apparatus that implements halftone processing according to an eighteenth embodiment.

FIGS. 51A and 51B are function block diagrams showing an internal configuration of an image processing apparatus that implements halftone processing according to the present embodiment. The pixel value/threshold value acquisition unit 4401, the white pixel determination unit 2802, the boundary pixel determination unit 4402, the white pixel minimum threshold value extraction unit 2803, the boundary pixel minimum threshold value extraction unit 4403, and the quantization unit 2806 are the same as those of the fifteenth embodiment, and therefore, explanation is omitted.

A residual area minimum threshold value extraction unit 5101 extracts the minimum threshold value from among the threshold values in the area of pixels other than white pixels and boundary pixels (hereinafter, residual area minimum threshold value) by using the white pixel information and the boundary pixel information.

A threshold value rewriting unit 5102 refers to the residual area minimum threshold value extracted by the residual area minimum threshold value extraction unit 5101, the white pixel minimum threshold value extracted by the white pixel minimum threshold value extraction unit 2803, and the boundary pixel minimum threshold value extracted by the boundary pixel minimum threshold value extraction unit 4403, and rewrites the threshold values. In other words, the threshold values of the threshold value matrix are permuted so that the magnitude relationship of "boundary pixel minimum threshold value"<"residual area minimum threshold value"<"white pixel minimum threshold value" will result.

The function itself of the pixel value/threshold value acquisition unit 4401 is the same as that of the fifteenth embodiment, but the case of the present embodiment differs from the case of the fifteenth embodiment in that the threshold value acquired by the pixel value/threshold value acquisition unit 4401 is also sent to the residual area minimum threshold value extraction unit 5101.

Figure 52B:
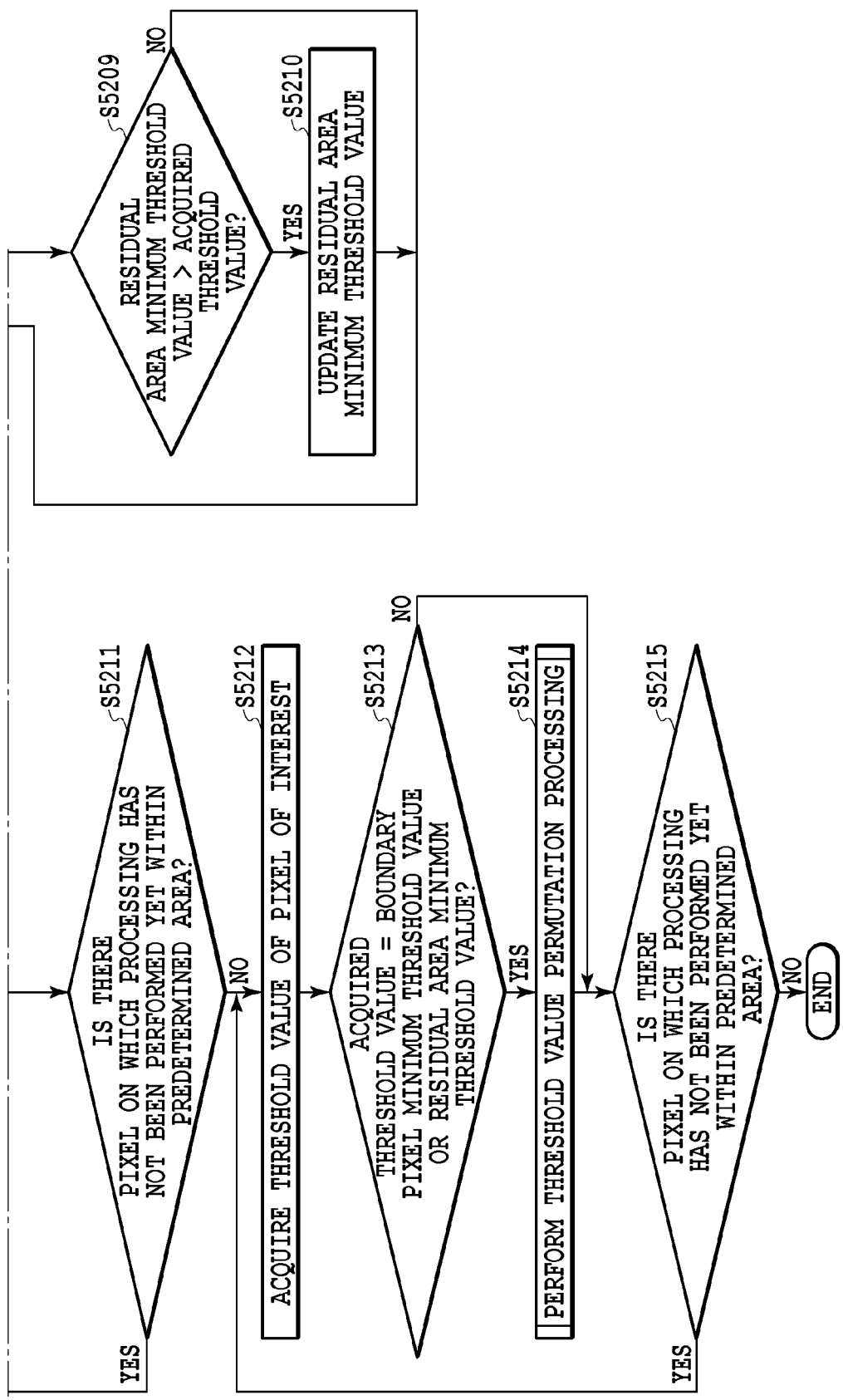
FIG. 52 is a diagram showing a relationship between FIGS. 52A and 52B, and FIGS. 52A and 52B are flowcharts showing details of processing performed by the image processing apparatus according to the eighteenth embodiment.

FIGS. 52A and 52B are flowcharts showing details of the white pixel minimum threshold value extraction processing, the boundary pixel minimum threshold value extraction processing, the residual area minimum threshold value extraction processing, and the threshold value rewriting processing among the processing that is performed by the image processing apparatus according to the present embodiment.

At step S201, the residual area minimum threshold value extraction unit 5101 initializes a residual area minimum threshold value (MinTH$_{rem}$), which is a variable holding the minimum threshold value in the residual area (area of pixels other than white pixels and boundary pixels) within the predetermined area. Similarly, the white pixel minimum threshold value extraction unit 2803 initializes the white pixel minimum threshold value (MinTH$_{off}$), which is the variable holding the minimum threshold value of the white pixel position. Further, the boundary pixel minimum threshold value extraction unit 4403 initializes the boundary pixel minimum threshold value (MinTH$_{adj}$), which is the variable holding the minimum threshold value of the boundary pixel position. Specifically, the maximum value of the threshold values (or the maximum value in the range of the input pixel values) in the screen processing is set to the values of MinTH$_{rem}$, MinTH$_{off}$, and MinTH$_{adj}$, respectively. These variables are held in the RAM.

At step 5202, the residual area minimum threshold value extraction unit 5101 acquires the white pixel information about the pixel of interest within the predetermined area and the threshold value corresponding to the pixel of interest. The white pixel minimum threshold value extraction unit 2803 acquires the white pixel information about the pixel of interest within the predetermined area and the threshold value corresponding to the pixel of interest. The boundary pixel minimum threshold value extraction unit 4403 acquires the boundary pixel information about the pixel of interest within the predetermined area and the threshold value corresponding to the pixel of interest.

At step 5203, the white pixel minimum threshold value extraction unit 2803 determines whether the pixel of interest is a white pixel based on the white pixel information acquired at step 5202. In the case where the results of the determination indicate that the pixel of interest is a white pixel, the processing proceeds to step 5204. On the other hand, in the case where the pixel of interest is not a white pixel (in the case where the pixel of interest is a non-white pixel), the processing proceeds to step 5206.

At step 5204, the white pixel minimum threshold value extraction unit 2803 compares the white pixel minimum threshold value (MinTH$_{off}$) at present with the threshold value of the pixel of interest acquired at step 5202. In the case where the results of the comparison indicate that the value of MinTH$_{off}$ is greater than the threshold value of the pixel of interest, the processing proceeds to step 5205. On the other hand, in the case where the value of $MinTH_{off}$ is not greater than the threshold value of the pixel of interest, the processing proceeds to step 5211.

At step 5205, the white pixel minimum threshold value extraction unit 2803 updates the value of $MinTH_{off}$ to the threshold value acquired at step 5202.

At step 5206, the boundary pixel minimum threshold value extraction unit 4403 determines whether the pixel of interest is a boundary pixel based on the boundary pixel information acquired at step 5202. In the case where the results of the determination indicate that the pixel of the interest is a boundary pixel, the processing proceeds to step 5207. On the other hand, in the case where the pixel of interest is not a boundary pixel (in the case where the pixel of interest is a non-white pixel not adjacent to a white pixel), the processing proceeds to step 5209.

At step 5207, the boundary pixel minimum threshold value extraction unit 4403 compares the boundary pixel minimum threshold value ($MinTH_{adj}$) at present with the threshold value of the pixel of interest acquired at step 5202. In the case where the results of the comparison indicate that the value of $MinTH_{adj}$ is greater than the threshold value of the pixel of interest, the processing proceeds to step 5208. On the other hand, in the case where the value of $MinTH_{adj}$ is not greater than the threshold value of the pixel of interest, the processing proceeds to step 5211.

At step 5208, the boundary pixel minimum threshold value extraction unit 4403 updates the value of $MinTH_{adj}$ to the threshold value acquired at step 5202.

At step 5209, the residual area minimum threshold value extraction unit 5101 compares the residual area minimum threshold value ($MinTH_{rem}$) at present with the threshold value of the pixel of interest acquired at step 5202. In the case where the results of the comparison indicate that the value of $MinTH_{rem}$ is greater than the threshold value of the pixel of interest, the processing proceeds to step 5210. On the other hand, in the case where the value of $MinTH_{rem}$ is not greater than the threshold value of the pixel of interest, the processing proceeds to step 5211.

At step 5210, the residual area minimum threshold value extraction unit 5101 updates the value of $MinTH_{rem}$ to the threshold value acquired at step 5202.

At step 5211, whether the processing has been completed for all the pixels within the predetermined area is determined. In the case where the processing has been completed for all the pixels, the processing proceeds to step 5212. At the point in time the processing has proceeded to step 5212, the minimum threshold value in the residual area within the predetermined area is held as $MinTH_{rem}$, the minimum threshold value in the white pixel position within the predetermined area is held as $MinTH_{off}$, and the minimum threshold value in the boundary pixel position is held as $MinTH_{adj}$, respectively. On the other hand, in the case where there is a pixel on which the processing has not been performed yet within the predetermined area, the processing returns to step 5202, and the next pixel is taken to be the pixel of interest and the processing at each of step 5202 to step 5210 is performed.

At step 5212, the threshold value rewriting unit 5102 acquires the threshold value corresponding to the pixel of interest within the predetermined area.

At step 5213, the threshold value rewriting unit 5102 determines whether the threshold value acquired at step 5212 is the same as the boundary pixel minimum threshold value ($MinTH_{adj}$) or the residual area minimum threshold value ($MinTH_{rem}$). In the case where the acquired threshold value is the same as the value of either $MinTH_{adj}$ or $MinTH_{rem}$, the processing proceeds to step 5214. On the other hand, in the case where the acquired threshold value is different from the values of $MinTH_{adj}$ and $MinTH_{rem}$, the processing proceeds to step 5215.

At step 5214, the threshold value rewriting unit 5102 compares the white pixel minimum threshold value, the boundary pixel minimum threshold value, and the residual area minimum threshold value and performs processing to permute the threshold values. However, here, it is assumed that the white pixel minimum threshold value is not changed for simplification and the threshold values are permuted in accordance with the following conditions.

1) In the case where "boundary pixel minimum threshold value"<"residual area minimum threshold value"<"white pixel minimum threshold value", the threshold value of the pixel of interest is not changed, 2) in the case where "boundary pixel minimum threshold value"<"white pixel minimum threshold value"<"residual area minimum threshold value" and, on a condition that the threshold value of the pixel of interest is the same as the boundary pixel minimum threshold value, the threshold value of the pixel of interest is not changed, and on a condition that the threshold value of the pixel of interest is the same as the residual area minimum threshold value, the threshold value of the pixel of interest is replaced with the white pixel minimum threshold value, 3) in the case where "residual area minimum threshold value"<"boundary pixel minimum threshold value"<"white pixel minimum threshold value" and, on a condition that the threshold value of the pixel of interest is the same as the boundary pixel minimum threshold value, the threshold value of the pixel of interest is replaced with the residual area minimum threshold value, and on a condition that the threshold value of the pixel of interest is the same as the residual area minimum threshold value, the threshold value of the pixel of interest is replaced with the boundary pixel minimum threshold value, 4) in the case where "residual area minimum threshold value"<"white pixel minimum threshold value"<"boundary pixel minimum threshold value" and, on a condition that the threshold value of the pixel of interest is the same as the boundary pixel minimum threshold value, the threshold value of the pixel of interest is replaced with the residual area minimum threshold value, and on a condition that the threshold value of the pixel of interest is the same as the residual area minimum threshold value, the threshold value of the pixel of interest is replaced with the white pixel minimum threshold value, 5) in the case where "white pixel minimum threshold value"<"boundary pixel minimum threshold value"<"residual area minimum threshold value" and, on a condition that the threshold value of the pixel of interest is the same as the boundary pixel minimum threshold value, the threshold value of the pixel of interest is replaced with the white pixel minimum threshold value, and on a condition that the threshold value of the pixel of interest is the same as the residual area minimum threshold value, the threshold value of the pixel of interest is replaced with the boundary pixel minimum threshold value, and 6) in the case where "white pixel minimum threshold value"<"residual area minimum threshold value"<"boundary pixel minimum threshold value" and,
- on a condition that the threshold value of the pixel of interest is the same as the boundary pixel minimum threshold value, the threshold value of the pixel of interest is replaced with the white pixel minimum threshold value, and
- on a condition that the threshold value of the pixel of interest is the same as the residual area minimum threshold value, the threshold value of the pixel of interest is not changed.

Figure 53B:
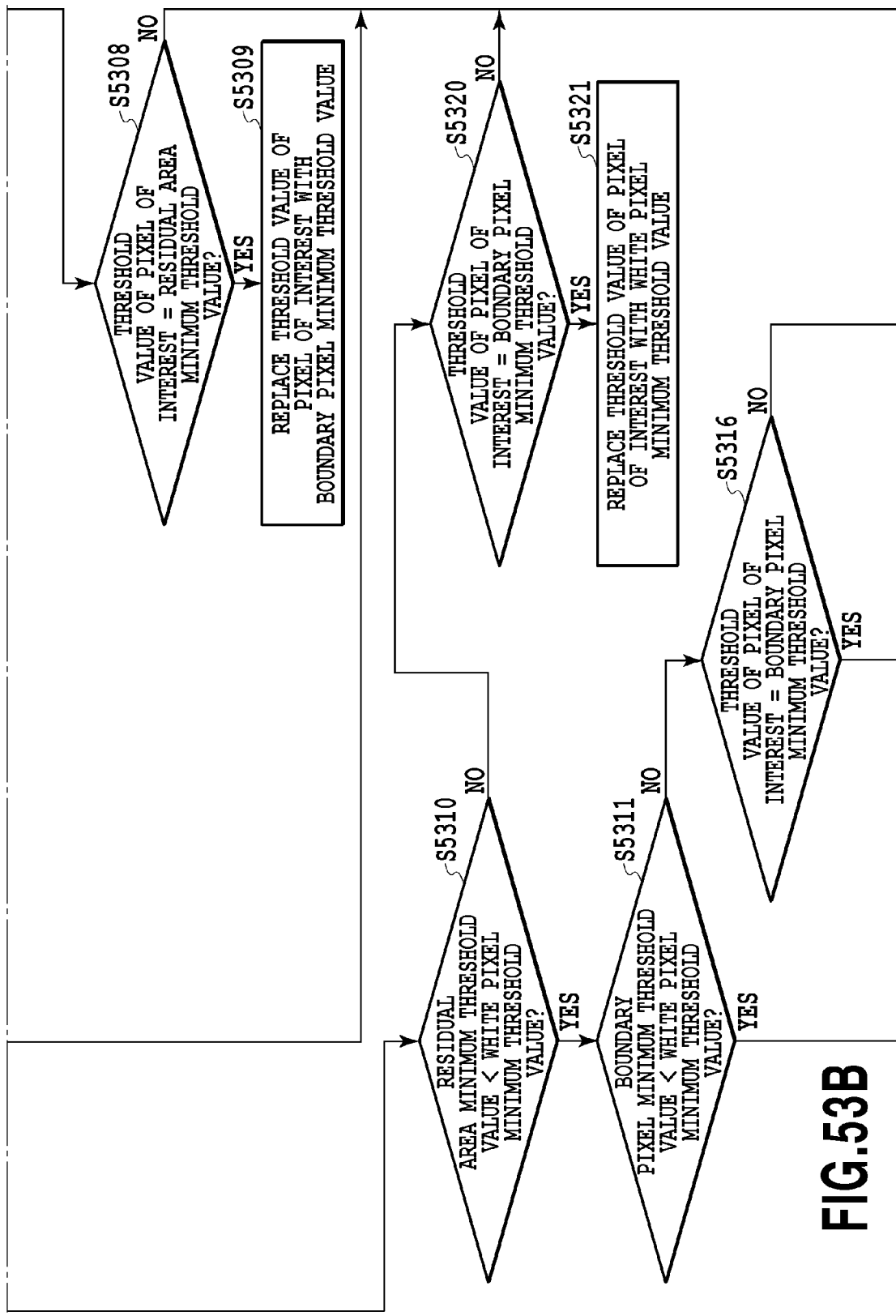
FIG. 53 is a diagram showing a relationship between FIGS. 53A, 53B and 53C, and FIGS. 53A, 53B and 53C are flowcharts showing a flow of threshold value permutation processing according to the eighteenth embodiment.
Figure 53C:
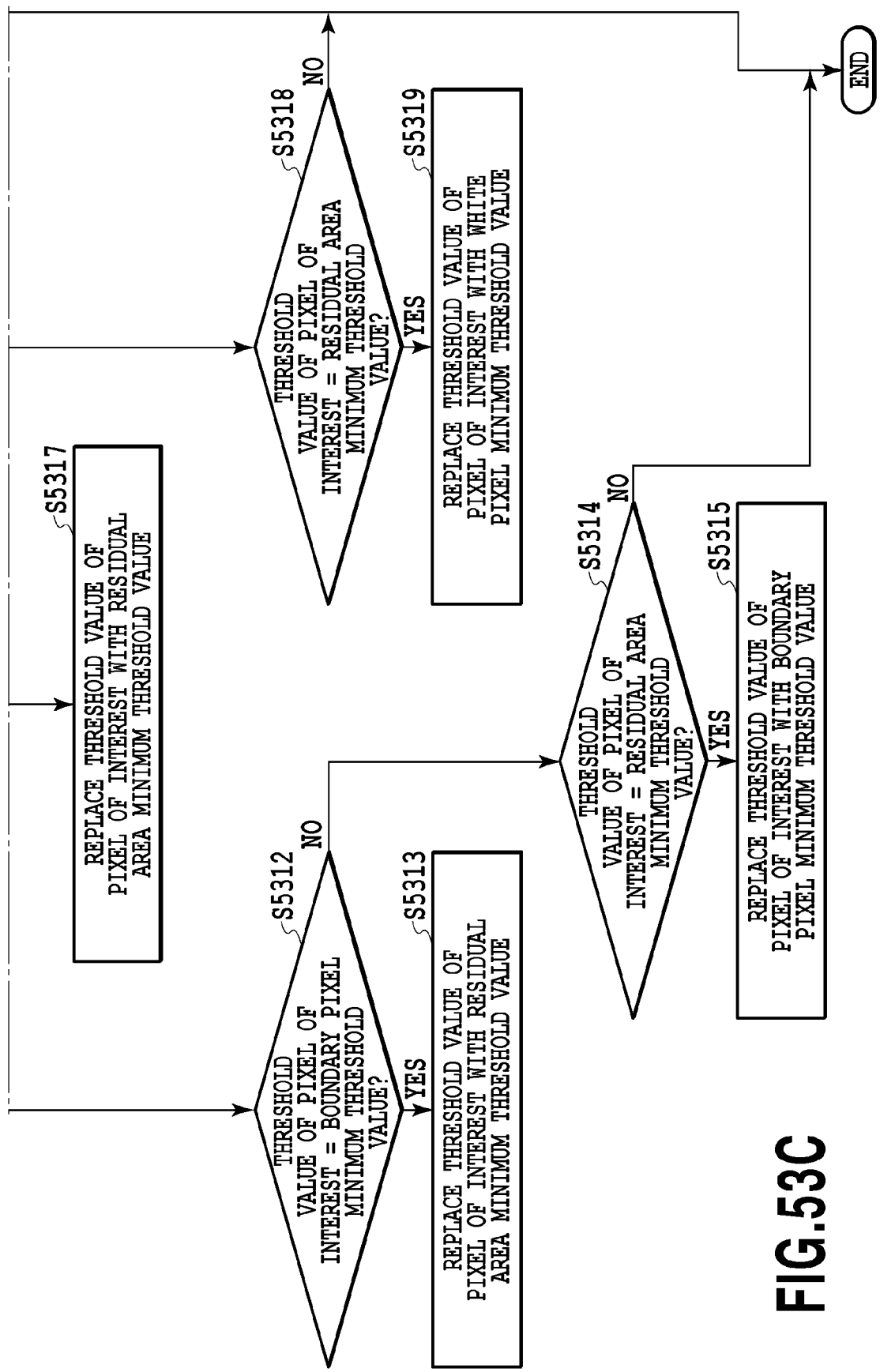

FIGS. 53A to 53C are diagrams in which the flow of the permutation of the threshold values in accordance with the above-described conditions is represented by a flowchart.

At step 5301, the threshold value rewriting unit 5102 determines whether the boundary pixel minimum threshold value ($MinTH_{adj}$) is smaller than the residual area minimum threshold value ($MinTH_{rem}$). In the case where the value of $MinTH_{adj}$ is smaller than the value of $MinTH_{rem}$, the processing proceeds to step 5302. On the other hand, in the case where the value of $MinTH_{adj}$ is not smaller than the value of $MinTH_{rem}$, the processing proceeds to step 5310.

At step 5302, the threshold value rewriting unit 5102 determines whether the residual area minimum threshold value ($MinTH_{rem}$) is smaller than the white pixel minimum threshold value ($MinTH_{off}$). In the case where the value of $MinTH_{rem}$ is smaller than the value of $MinTH_{off}$, the present processing is exited without performing the threshold value replacement processing. On the other hand, in the case where the value of $MinTH_{rem}$, is not smaller than the value of $MinTH_{off}$, the processing proceeds to step 5303.

At step 5303, the threshold value rewriting unit 5102 determines whether the boundary pixel minimum threshold value ($MinTH_{adj}$) is smaller than the white pixel minimum threshold value ($MinTH_{off}$). In the case where the value of $MinTH_{adj}$ is smaller than the value of $MinTH_{off}$, the processing proceeds to step 5304. On the other hand, in the case where the value of $MinTH_{adj}$ is not smaller than the value of $MinTH_{off}$, the processing proceeds to step 5306.

At step 5304, the threshold value rewriting unit 5102 determines whether the threshold value of the pixel of interest acquired at step 5212 is the same as the residual area minimum threshold value ($MinTH_{rem}$). In the case where the threshold value of the pixel of interest is the same as the value of $MinTH_{rem}$, the processing proceeds to step 5305. On the other hand, in the case where the threshold value of the pixel of interest is not the same as the value of $MinTH_{rem}$, the present processing is exited without performing the threshold value replacement processing.

At step 5305, the threshold value rewriting unit 5102 replaces the threshold value of the pixel of interest with the value of the white pixel minimum threshold value ($MinTH_{off}$).

At step 5306, the threshold value rewriting unit 5102 determines whether the threshold value of the pixel of interest acquired at step 5212 is the same as the boundary pixel minimum threshold value ($MinTH_{adj}$). In the case where the threshold value of the pixel of interest is the same as the value of $MinTH_{adj}$, the processing proceeds to step 5307. On the other hand, in the case where the threshold value of the pixel of interest is not the same as the value of $MinTH_{adj}$, the processing proceeds to step 5308.

At step 5307, the threshold value rewriting unit 5102 replaces the threshold value of the pixel of interest with the value of the white pixel minimum threshold value ($MinTH_{off}$).

At step 5308, the threshold value rewriting unit 5102 determines whether the threshold value of the pixel of interest acquired at step 5212 is the same as the residual area minimum threshold value ($MinTH_{rem}$). In the case where the threshold value of the pixel of interest is the same as the value of $MinTH_{rem}$, the processing proceeds to step 5309. On the other hand, in the case where the threshold value of the pixel of interest is not the same as the value of $MinTH_{rem}$, the present processing is exited without performing the threshold value replacement processing.

At step 5309, the threshold value rewriting unit 5102 replaces the threshold value of the pixel of interest with the value of the boundary pixel minimum threshold value ($MinTH_{rem}$).

At step 5310, the threshold value rewriting unit 5102 determines whether the residual area minimum threshold value ($MinTH_{rem}$) is smaller than the white pixel minimum threshold value ($MinTH_{off}$). In the case where the value of $MinTH_{rem}$ is smaller than the value of $MinTH_{off}$, the processing proceeds to step 5311. On the other hand, in the case where the value of $MinTH_{rem}$ is not smaller than the value of $MinTH_{off}$, the processing proceeds to step 5320.

At step 5311, the threshold value rewriting unit 5102 determines whether the boundary pixel minimum threshold value ($MinTH_{adj}$) is smaller than the white pixel minimum threshold value ($MinTH_{off}$). In the case where the value of $MinTH_{adj}$ is smaller than the value of $MinTH_{off}$, the processing proceeds to step 5312. On the other hand, in the case where the value of $MinTH_{adj}$ is not smaller than the value of $MinTH_{off}$, the processing proceeds to step 5316.

At step 5312, the threshold value rewriting unit 5102 determines whether the threshold value of the pixel of interest acquired at step 5212 is the same as the boundary pixel minimum threshold value ($MinTH_{adj}$). In the case where the threshold value of the pixel of interest is the same as the value of $MinTH_{adj}$, the processing proceeds to step 5313. On the other hand, in the case where the threshold value of the pixel of interest is not the same as the value of $MinTH_{adj}$, the processing proceeds to step 5314.

At step 5313, the threshold value rewriting unit 5102 replaces the threshold value of the pixel of interest with the value of the residual area minimum threshold value ($MinTH_{rem}$).

At step 5314, the threshold value rewriting unit 5102 determines whether the threshold value of the pixel of interest acquired at step 5212 is the same as the residual area minimum threshold value ($MinTH_{rem}$). In the case where the threshold value of the pixel of interest is the same as the value of $MinTH_{rem}$, the processing proceeds to step 5315. On the other hand, in the case where the threshold value of the pixel of interest is not the same as the value of $MinTH_{rem}$, the present processing is exited without performing the threshold value replacement processing.

At step 5315, the threshold value rewriting unit 5102 replaces the threshold value of the pixel of interest with the value of the boundary pixel minimum threshold value ($MinTH_{adj}$)

At step 5316, the threshold value rewriting unit 5102 determines whether the threshold value of the pixel of interest acquired at step 5212 is the same as the boundary pixel minimum threshold value ($MinTH_{adj}$). In the case where the threshold value of the pixel of interest is the same as the value of $MinTH_{adj}$, the processing proceeds to step 5317. On the other hand, in the case where the threshold value of the pixel of interest is not the same as the value of $MinTH_{adj}$, the processing proceeds to step 5318.

At step 5317, the threshold value rewriting unit 5102 replaces the threshold value of the pixel of interest with the value of the residual area minimum threshold value (MinTH$_{rem}$).

At step 5318, the threshold value rewriting unit 5102 determines whether the threshold value of the pixel of interest acquired at step 5212 is the same as the residual area minimum threshold value (MinTH$_{rem}$). In the case where the threshold value of the pixel of interest is the same as the value of MinTH$_{rem}$, the processing proceeds to step 5319. On the other hand, in the case where the threshold value of the pixel of interest is not the same as the value of MinTH$_{rem}$, the present processing is exited without performing the threshold value replacement processing.

At step 5319, the threshold value rewriting unit 5102 replaces the threshold value of the pixel of interest with the value of the white pixel minimum threshold value (MinTH$_{off}$).

At step 5320, the threshold value rewriting unit 5102 determines whether the threshold value of the pixel of interest acquired at step 5212 is the same as the boundary pixel minimum threshold value (MinTH$_{adj}$). In the case where the threshold value of the pixel of interest is the same as the value of MinTH$_{adj}$, the processing proceeds to step 5321. On the other hand, in the case where the threshold value of the pixel of interest is not the same as the value of MinTH$_{adj}$, the present processing is exited without performing the threshold value replacement processing.

At step 5321, the threshold value rewriting unit 5102 replaces the threshold value of the pixel of interest with the value of the white pixel minimum threshold value (MinTH$_{off}$).

The above is the contents of the threshold value permutation processing in the present embodiment.

Explanation is returned to the flowchart in FIG. 52B.

At step 5215, whether the processing has been completed for all the pixel within the predetermined area is determined. In the case where there is a pixel on which the processing has not been performed yet, the processing returns to step 5212, and the next pixel is taken to be the pixel of interest and the processing at step 5212 to step 5214 is repeated. On the other hand, in the case where the processing has been completed for all the pixels, the present processing is terminated.

The above is the contents of the residual area minimum threshold value extraction processing, the white pixel minimum threshold value extraction processing, the boundary pixel minimum threshold value extraction processing, and the threshold value rewriting processing among the processing that is performed by the image processing apparatus according to the present embodiment.

According to the present embodiment, dots are generated in order from the boundary pixels, and therefore, the sharpness of the boundary pixel area is improved.

[Nineteenth Embodiment]

In each embodiment described above, explanation is given on the assumption that the size of the predetermined area is smaller than the size of the threshold value matrix, which is the threshold value repetition unit of the screen processing. However, for example, as shown in FIG. 54, in the case where a threshold value matrix 5402 (3×3 threshold value matrix having threshold values a to i) indicated by a thin frame is smaller than a predetermined area 5401 (4×4 predetermined area) indicated by a thick frame, a plurality of threshold values c to g exits within the predetermined area 5401. In this case, in each embodiment explained above, the threshold value rewriting is performed a plurality of times, and therefore, there may occur such a problem that the resultant density after the quantization becomes too high.

Consequently, for example, in the case of the fifteenth embodiment described previously, a flag indicating whether the threshold value rewriting has been performed by the threshold value rewriting unit 4404 is set to each threshold value within the predetermined area. Then, it is sufficient to reset the flag at the beginning of the processing of the predetermined area, and set the flag after the first rewriting is performed (e.g., set "1" as a flag value), and prohibit rewriting in the subsequent processing in the case where the flag is set.

Similarly, in the case of the seventeenth embodiment described previously, a flag indicating whether the boundary pixel minimum threshold value has been rewritten into the all-pixel minimum threshold value or whether the all-pixel minimum threshold value has been rewritten into the boundary pixel minimum threshold value by the threshold value rewriting unit 4901 is set to each threshold value within the predetermined area. Then, it is sufficient to reset the flag at the beginning of the processing of the predetermined area, and set the flag after the first replacement is performed (e.g., set "1" as a flag value), and prohibit replacement in the subsequent processing in the case where the flag is set.

Similarly, in the case of the eighteenth embodiment described previously, a flag indicating whether the rewriting of the boundary pixel minimum threshold value, the residual area minimum threshold value, and the white pixel minimum threshold value has been performed by the threshold value rewriting unit 5102 is set to each threshold value within the predetermined area. Then, it is sufficient to reset the flag at the beginning of the processing of the predetermined area, and set the flag after the first rewriting is performed (e.g., set "1" as a flag value), and prohibit rewriting in the subsequent processing in the case where the flag is set.

By performing the processing such as the above, it is possible to prevent the resultant density after the quantization from becoming too high by preventing the rewriting of the same threshold value from being performed a plurality of times within the predetermined area.

[Twentieth Embodiment]

As described previously, for a flat portion where the change in tone level in the input image data is small, a preferable image is obtained in the case where mesh points in the same shape are formed at uniform intervals. Then, in the sixteenth embodiment, in the case where the minimum threshold value of the white pixel within the predetermined area is a threshold value with a high probability that a dot will be formed, the minimum threshold value of the non-white pixel is rewritten into the same value as the minimum threshold value of the white pixel. As a result of this, there is a possibility that the number of dots that are formed for each predetermined area will change, but in the sixteenth embodiment, in the case where no white pixel exists within the predetermined area, the threshold value rewriting is not performed, and therefore, as to the flat portion including no white pixel, the number of dots does not change and it is possible to form mesh points in the same shape at uniform intervals.

However, even in the flat portion in which the change in tone level is small (e.g., a natural image, such as cloud), in the case where a white pixel exists within the predetermined area, there is a possibility that the number of dots that are formed for each predetermined area will be increased by one, and therefore, it is not possible to form mesh points in the same shape at uniform intervals.

Consequently, an aspect is explained as a twentieth embodiment in which suppression of shifts in density and thin line reproducibility are improved while obtaining a favorable image even from input image data in which the change in tone level is small and a white pixel exists within the predetermined area. Explanation of the portions in common to those of the sixth embodiment (including the modification examples) is omitted or simplified and in the following, different points are explained mainly.

Figure 55B:
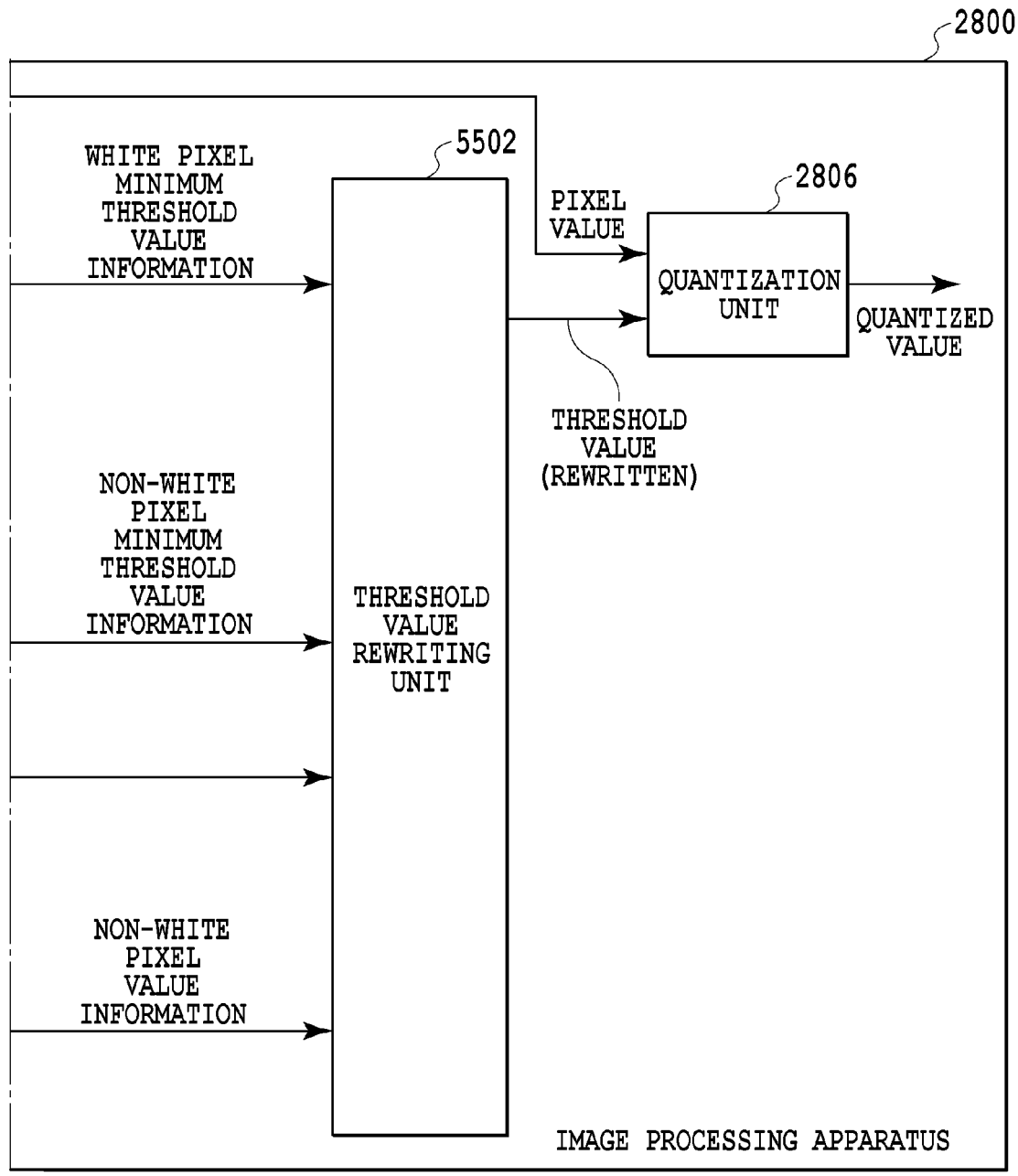
FIG. 55 is a diagram showing a relationship between FIGS. 55A and 55B, and FIGS. 55A and 55B are function block diagrams showing an internal configuration of an image processing apparatus that implements halftone processing according to a twentieth embodiment.

FIGS. 55A and 55B are function block diagrams showing an internal configuration of an image processing apparatus that implements halftone processing according to the present embodiment. The pixel value/threshold value acquisition unit 2801, the white pixel determination unit 2802, the white pixel minimum threshold value extraction unit 2803, the non-white pixel minimum threshold value extraction unit 2804, and the quantization unit 2806 are the same as those of the sixth embodiment, and therefore, explanation is omitted.

A non-white pixel value determination unit 5501 determines whether all the pixel values of the non-white pixels within the predetermined area are the same value or different values based on the pixel values received from the pixel value/threshold value acquisition unit 2801 and the white pixel information received from the white pixel determination unit 2802. The results of the determination are sent to a threshold value rewriting unit 5502 as non-white pixel value information (in the present embodiment, 1-bit information indicated by "1" in the case where all the pixel values of the non-white pixels within the predetermined area are the same value or "0" in the case where all the pixel values are not the same value).

The threshold value rewriting unit 5502 performs processing to replace the non-white pixel minimum threshold value with the white pixel minimum threshold value for the threshold value matrix corresponding to the predetermined area of the input image based on the non-white pixel value information input from the non-white pixel value determination unit 5501. Specifically, the white pixel minimum threshold value is compared with the non-white pixel minimum threshold value, and only in the case where the value of the white pixel minimum threshold value is the smaller value (threshold value with a high probability that a dot will be formed) and all the pixel values of the non-white pixels within the predetermined area are the same, the non-white pixel minimum threshold value is replaced with the white pixel minimum threshold value. By doing so, the threshold value rewriting is not performed in the predetermined area in which all the pixel values of the non-white pixels are not the same value, and therefore, even in the flat portion in which a white pixel is included and the change in tone level is small, mesh points in the same shape are formed at uniform intervals and a preferable image is obtained.

Figure 56B:
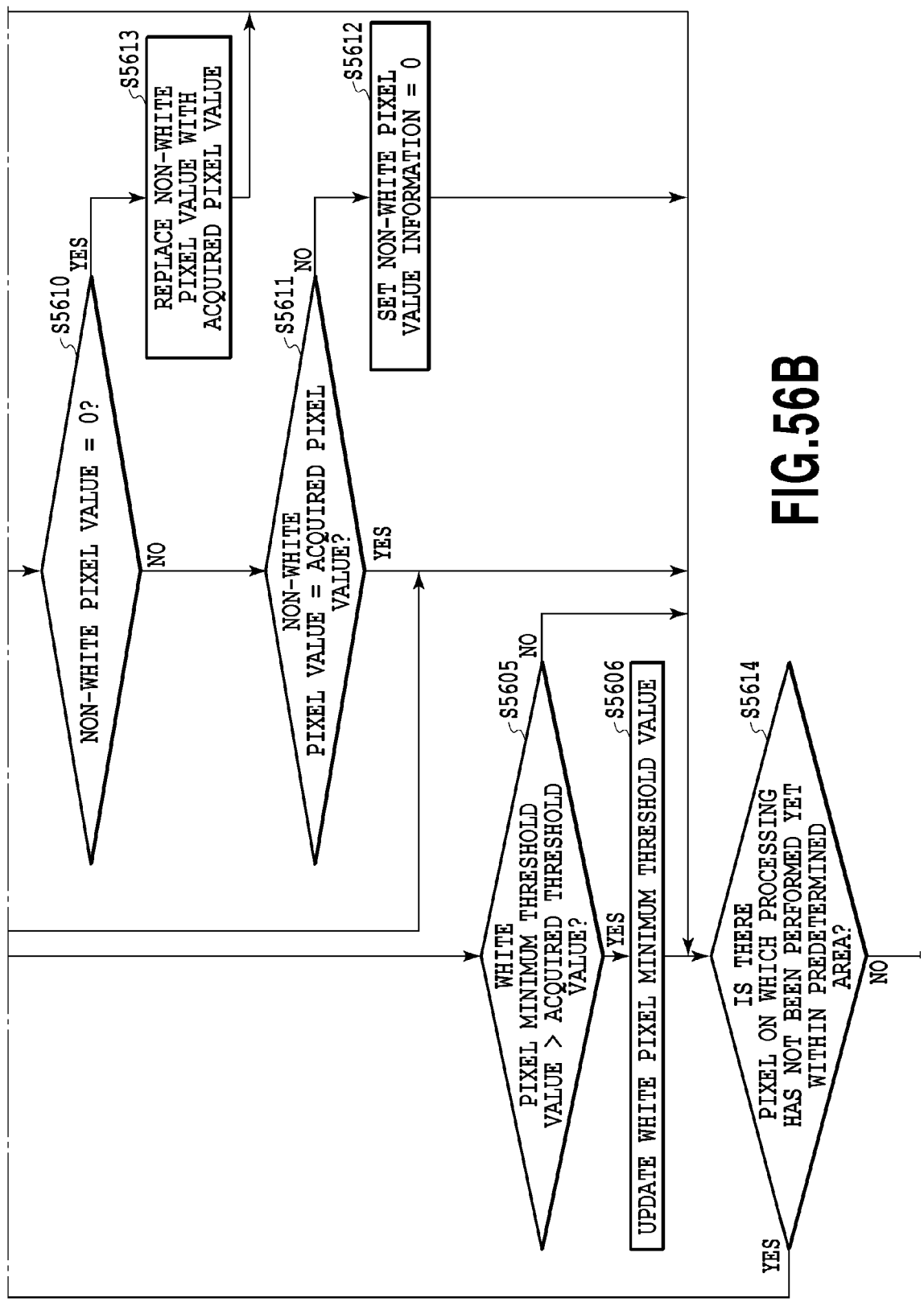
FIG. 56 is a diagram showing a relationship between FIGS. 56A, 56B and 56C, and FIGS. 56A, 56B and 56C are flowcharts showing details of processing performed by the image processing apparatus according to the twentieth embodiment.

FIGS. 56A to 56C are flowcharts showing details of the white pixel minimum threshold value extraction processing, the non-white pixel minimum threshold value extraction processing, the non-white pixel value determination processing, and the threshold value rewriting processing among the processing that is performed by the image processing apparatus according to the present embodiment. The series of processing is performed by the CPU executing computer executable programs in which circuits or procedures shown below are described after reading the programs from the ROM or the like onto the RAM.

At step 5601, the white pixel minimum threshold value extraction unit 2803 initializes the white pixel minimum threshold value (MinTH$_{off}$), which is the variable holding the minimum threshold value of the white pixel position. Similarly, the non-white pixel minimum threshold value extraction unit 2804 initializes the non-white pixel minimum threshold value (MinTH$_{on}$), which is the variable holding the minimum threshold value of the non-white pixel position.

At step 5602, the non-white pixel value determination unit 5501 initializes the non-white pixel value information of the predetermined area to the state indicating that all the pixel values of the non-white pixels are the same value (in the present embodiment, "1"). Further, the non-white pixel value determination unit 5501 initializes the non-white pixel value, which is the variable holding the pixel value of the non-white pixel within the predetermined area to the white pixel value (in the present embodiment, "0").

At step 5603, the white pixel minimum threshold value extraction unit 2803 and the non-white pixel minimum threshold value extraction unit 2804 acquire the white pixel information about the pixel of interest within the predetermined area and the threshold value corresponding to the pixel of interest. The non-white pixel value determination unit 5501 acquires the white pixel information about the pixel of interest within the predetermined area and the pixel value of the pixel of interest.

At step 5604, whether the pixel of interest is a white pixel is determined based on the white pixel information acquired at step 5603. In the case where the results of the determination indicate that the pixel of interest is a white pixel, the processing proceeds to step 5605. On the other hand, in the case where the pixel of interest is not a white pixel (in the case where the pixel of interest is a non-white pixel), the processing proceeds to step 5607 and step 5609. Here, whether the pixel of interest is a white pixel is determined based on the white pixel information, which is the determination results of the white pixel determination unit 2802, but it may also be possible to determine whether the pixel of interest is a white pixel directly from the pixel value of the pixel of interest.

At step 5605, the white pixel minimum threshold value extraction unit 2803 compares the white pixel minimum threshold value (MinTH$_{off}$) at present with the threshold value of the pixel of interest acquired at step 5603. In the case where the results of the comparison indicate that the value of MinTH$_{off}$ is greater than the threshold value of the pixel of interest, the processing proceeds to step 5606. On the other hand, in the case where the value of MinTH$_{off}$ is not greater than the threshold value of the pixel of interest, the processing proceeds to step 5614.

At step 5606, the white pixel minimum threshold value extraction unit 2803 updates the value of MinTH$_{off}$ to the threshold value acquired at step 5603.

At step 5607, the non-white pixel minimum threshold value extraction unit 2804 compares the non-white pixel minimum threshold value (MinTH$_{on}$) with the threshold value of the pixel of interest acquired at step 5603. In the case where the results of the comparison indicate that the value of MinTH$_{on}$ is greater than the threshold value of the pixel of interest, the processing proceeds to step 5608. On the other hand, in the case where the value of MinTH$_{on}$ is not greater than the threshold value of the pixel of interest, the processing proceeds to step 5614.

At step 5608, the non-white pixel minimum threshold value extraction unit 2804 updates the value of MinTH$_{on}$ to the threshold value acquired at step 5603.

At step 5609, the non-white pixel value determination unit 5501 determines whether the non-white pixel value information at present is in the state indicating that all the pixel values of the non-white pixels are the same value. In the case where the results of the determination indicate that the information is in the state indicating that all the pixel values are the same value (i.e., "1"), the processing proceeds to step 5610. On the other hand, in the case where the information is not in the state indicating that all the pixel values are the same value (i.e., "0"), the processing proceeds to step 5614.

At step 5610, the non-white pixel value determination unit 5501 determines whether the non-white pixel value at present is a white pixel value (in the present embodiment, "0"). In the case where the results of the determination indicate that the non-white pixel value is a white pixel value, the processing proceeds to step 5613. On the other hand, in the case where the non-white pixel value is not a white pixel value, the processing proceeds to step 5611.

At step 5611, the non-white pixel value determination unit 5501 compares the pixel value of the pixel of interest acquired at step 5603 with the non-white pixel value at present. In the case where both values are the same value, the processing proceeds to step 5614 while the non-white pixel value information at present is being maintained. On the other hand, in the case where both values are not the same value, the processing proceeds to step 5612.

At step 5612, the non-white pixel value determination unit 5501 sets the non-white pixel value information to the state indicating that all the pixel values of the non-white pixels are not the same (i.e., "0").

At step 5613, the non-white pixel value is replaced with the pixel value of the pixel of interest acquired at step 5603.

At step 5614, whether the processing has been completed for all the pixels within the predetermined area is determined. In the case where the processing has been completed for all the pixels, the processing proceeds to step 5615. At the point in time the processing has proceeded to step 5615, the minimum threshold value in the white pixel position within the predetermined area is held as $MinTH_{off}$ and the minimum threshold value in the non-white pixel position is held as $MinTH_{on}$. On the other hand, in the case where there is a pixel on which the processing has not been performed yet within the predetermined area, the processing returns to step 5603, and the next pixel is taken to be the pixel of interest and the processing at each of step 5603 to step 5613 is performed.

At step 5615, the threshold value rewriting unit 5502 determines whether all the pixel values of the non-white pixels within the predetermined area are the same based on the non-white pixel value information. In the case where all the pixel values of the non-white pixels within the predetermined area are the same, the processing proceeds to step 5616. On the other hand, in the case where all the pixel values of the non-white pixels within the predetermined area are not the same, the processing is terminated without performing the threshold value replacement.

Step 5616 to step 5620 correspond to step 3009 to step 3013 in the sixth embodiment, respectively, and are the same, and therefore, explanation is omitted.

The above is the contents of the white pixel minimum threshold value extraction processing, the non-white pixel minimum threshold value extraction processing, the non-white pixel value determination processing, and the threshold value rewriting processing in the present embodiment. Due to this, only in the case where all the pixel values of the non-white pixels within the predetermined area are the same value, the minimum threshold value of the threshold value corresponding to the non-white pixel of the threshold value matrix that is used for quantization is rewritten into a threshold value with a high probability that a dot will be formed for each predetermined area.

As to the modification examples of the sixth embodiment, it is possible to similarly implement the above by adding each piece of the processing in relation to the non-white pixel value information and the non-white pixel value.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to reduce breaks of a thin line while suppressing the load to the system. Further, it is possible to improve thin line reproducibility while suppressing shifts in density.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-136278, filed Jul. 1, 2014, and No. 2014-136281, filed Jul. 1, 2014, which are hereby incorporated by reference wherein in their entirety.

What is claimed is:

1. An image processing apparatus that generates a halftone image of an input image by performing quantization, comprising:
a processor; and
a memory having stored thereon instructions that, when executed by the processor, cause the processor to:
hold a threshold value matrix in which threshold values, corresponding to a plurality of pixels in the input image, are arranged;
determine a candidate of a pixel position whose threshold value is to be rewritten based on each pixel value of a plurality of pixels included in a predetermined area of the input image;
determine the threshold value of the pixel position determined to be the candidate by using at least one threshold value of a plurality of threshold values corresponding to the plurality pixels in the predetermined area; and generate the halftone image of the input image based on the determined threshold value.

2. The image processing apparatus according to claim 1, the memory further having stored thereon instructions that, when executed by the processor, cause the processor to:
rewrite the threshold value of the pixel position determined to be the candidate in the threshold value matrix using a threshold value corresponding to a pixel other than the pixel position determined to be the candidate.

3. The image processing apparatus according to claim 1, wherein the candidate of the pixel position whose threshold value is to be rewritten is chosen from among pixels, in the predetermined area, having a pixel value greater than a predetermined value.

4. The image processing apparatus according to claim 1, the memory further having stored thereon instructions that, when executed by the processor, cause the processor to:
determine whether each pixel in the predetermined area is a pixel that can provide a threshold value to be allocated to another pixel based on the pixel value of each pixel in the predetermined area.

5. The image processing apparatus according to claim 4, the memory further having stored thereon instructions that, when executed by the processor, cause the processor to:
determine a pixel whose pixel value is equal to 0.

6. The image processing apparatus according to claim 1, wherein the threshold value of the pixel position determined to be the candidate is determined using a threshold value of a pixel determined to be a pixel that can provide a threshold value to be the threshold value of the pixel position determined to be the candidate, in a case where the threshold value of the pixel determined to be a pixel that can provide a threshold value is smaller than the threshold value of the pixel position determined to be the candidate.

7. The image processing apparatus according to claim 1, the memory further having stored thereon instructions that, when executed by the processor, cause the processor to:
determine a threshold value of a pixel determined to be a pixel that can provide a threshold value; and
multiply the threshold value of the pixel determined to be a pixel that can provide a threshold value by a coefficient to create a new threshold value,
wherein the threshold value of the pixel position determined to be the candidate, in a case where the threshold value of the pixel determined to be a pixel that can provide a threshold value is smaller than the threshold value of the pixel position determined to be the candidate, and is determined to be the new threshold value.

8. The image processing apparatus according to claim 1, the memory further having stored thereon instructions that, when executed by the processor, cause the processor to:
determine a new threshold value of the pixel position determined to be the candidate in a case where the pixel of the pixel position determined to be the candidate is a pixel constituting a line within the input image.

9. The image processing apparatus according to claim 8, the memory further having stored thereon instructions that, when executed by the processor, cause the processor to acquire information indicating whether or not each pixel of the input image is a pixel constituting at least a portion of a line,
wherein the candidate of the pixel position whose threshold value is to be rewritten is determined to be a pixel constituting at least a portion of a line.

10. The image processing apparatus according to claim 1, the memory further has stored thereon instructions that, when executed by the processor, cause the processor to:
set an arbitrary value from among multiple quantization output values; and
determine the threshold value of the pixel position determined to be the candidate to be a new threshold value in a case where the pixel of the pixel position determined to be the candidate is a pixel whose value is equal to or less than the set arbitrary value.

11. The image processing apparatus according to claim 1, wherein
the threshold value matrix is a threshold value matrix created by using a sub matrix smaller than the threshold value matrix.

12. The image processing apparatus according to claim 11, wherein
a size of the sub matrix is the same as a size of the predetermined area.

13. The image processing apparatus according to claim 1, wherein
the predetermined area is set so that pixels do not belong to a plurality of predetermined areas.

14. The image processing apparatus according to claim 1, wherein
the threshold value matrix has blue noise characteristics.

15. The image processing apparatus according to claim 1, the memory further having stored thereon instructions that, when executed by the processor, cause the processor to:
determine the candidate of the pixel position whose threshold value is to be rewritten from among non-white pixels in the predetermined area based on a corresponding threshold value;
extract a minimum threshold value from a threshold value corresponding to a white pixel in the predetermined area; and
compare the minimum threshold value corresponding to the white pixel within the predetermined area with the threshold value corresponding to the candidate of the pixel position and rewrite the threshold value corresponding to the candidate of the pixel position based on the minimum threshold value in accordance with the comparison results.

16. The image processing apparatus according to claim 15, the memory further having stored thereon instructions that, when executed by the processor, cause the processor to:
rewrite the threshold value corresponding to the candidate of the pixel position into 0 in accordance with the comparison results.

17. An image processing method in an image processing apparatus that includes a holding unit configured to hold a threshold value matrix, in which threshold values, corresponding to a plurality of pixels in the input image, are arranged, and generates a halftone image by quantizing an input image, the method comprising:
determining a candidate of a pixel position whose threshold value is to be rewritten based on each pixel value of a plurality of pixels including in a predetermined area for the predetermined area in the input image;
determining a threshold value of the pixel position determined to be the candidate in the pixel position determination step by using at least one threshold value among a plurality of threshold values corresponding to the predetermined area; and
generate the halftone image of the input image based on the determined threshold value.

18. A non-transitory computer readable storage medium storing a program for causing a computer to perform an image processing method in an image processing apparatus that holds a threshold value matrix, in which threshold values, corresponding to a plurality of pixels in an input image, are arranged, and generates a halftone image by quantizing the input image based on a threshold value, the method comprising:
  determining a candidate of a pixel position whose threshold value is to be rewritten based on each pixel value of a plurality of pixels included in a predetermined area of the input image; and
  determining the threshold value of the pixel position determined to be the candidate in the pixel position determination step using at least one threshold value among a plurality of threshold values corresponding to the plurality pixels in the predetermined area.

19. An image processing apparatus that generates a halftone image of an input image based on a threshold value by performing quantization, comprising:
  one or more circuits that cause the image processing apparatus to function as:
  a holding unit configured to hold a threshold value matrix in which threshold values, corresponding to a plurality of pixels in the input image, are arranged;
  a pixel position determination unit configured to determine a candidate of a pixel position whose threshold value is to be rewritten based on each pixel value of a plurality of pixels included in a predetermined area of the input image; and
  a threshold value determination unit configured to determine the threshold value of the pixel position determined to be the candidate by using at least one threshold value of a plurality of threshold values corresponding to the plurality of pixels in the predetermined area.

20. The image processing apparatus according to claim 19, wherein the threshold value determination unit is configured to rewrite the threshold value of the pixel position determined to be the candidate in the threshold value matrix using a threshold value corresponding to a pixel other than the pixel position determined to be the candidate.

21. The image processing apparatus according to claim 19, wherein the pixel position determination unit is configured to determine whether each pixel in the predetermined area is a pixel that can provide a threshold value to be allocated to another pixel based on the pixel value of each pixel in the predetermined area, and
  wherein the pixel position determination unit is configured to determine a pixel whose pixel value is equal to 0.

22. The image processing apparatus according to claim 19, wherein the threshold value of the pixel position determined to be the candidate is determined using a threshold value of a pixel determined to be a pixel that can provide a threshold value to be the threshold value of the pixel position determined to be the candidate, in a case where the threshold value of the pixel determined to be a pixel that can provide a threshold value is smaller than the threshold value of the pixel position determined to be the candidate.

23. The image processing apparatus according to claim 19, wherein the pixel position determination unit is configured to determine the candidate of the pixel position whose threshold value is to be rewritten from among non-white pixels in the predetermined area based on a corresponding threshold value, and
  wherein the one or more circuits further cause the image processing apparatus to function as:
  a threshold value extraction unit configured to extract a minimum threshold value from a threshold value corresponding to a white pixel in the predetermined area; and
  a threshold value comparison unit configured to compare the minimum threshold value corresponding to the white pixel within the predetermined area with the threshold value corresponding to the candidate of the pixel position and rewrite the threshold value corresponding to the candidate of the pixel position based on the minimum threshold value in accordance with the comparison results.

24. An image processing apparatus that generates a halftone image of an input image based on a threshold value by performing quantization, comprising:
  a processor; and
  a memory having stored thereon instructions that, when executed by the processor, cause the processor to:
  acquire, with respect to a predetermined area in an input image, threshold values corresponding to the predetermined area;
  detect a pixel whose pixel value is a predetermined value from among a plurality of pixels included in the predetermined area;
  select at least one pixel from among pixels other than the pixels detected by the detecting based on each of a plurality of pixel values included in the predetermined area; and
  determine a quantization value of the selected pixel based on a threshold value corresponding to the selected pixel and threshold values corresponding to the detected pixels.

25. The image processing apparatus according to claim 24, wherein the instructions, when executed by the processor, cause the processor to detect a pixel having the predetermined value of 0 in the detecting.

26. The image processing apparatus according to claim 24, wherein the instructions, when executed by the processor, cause the processor to determine, in the determining, a quantization value using a minimum threshold value for the selected pixel in a case where the minimum threshold value among the threshold values corresponding to the detected pixels is compared with the threshold value corresponding to the selected pixel to find that the minimum threshold value is smaller.

27. The image processing apparatus according to claim 24, wherein the instructions, when executed by the processor, cause the processor to specify, in the selecting, pixels that are not the pixel value of the predetermined value and select a pixel having a minimum threshold value from among the threshold values corresponding to respective specified pixels.

28. The image processing apparatus according to claim 24, wherein the instructions, when executed by the processor, cause the processor to determine, in the determining, a quantization value indicating an on-dot as a quantization value of the selected pixel in a case where the minimum threshold value from among the threshold values corresponding to the detected pixels is compared with the threshold value corresponding to the selected pixel to find that the minimum threshold value is smaller than the threshold value corresponding to the selected pixel and that the minimum threshold value is smaller than the pixel value of the selected pixel.

29. An image processing apparatus that generates a halftone image of an input image based on a threshold value by performing quantization, comprising:
one or more circuits that cause the image processing apparatus to function as:
an acquiring unit configured to, with respect to a predetermined area in an input image, acquire threshold values corresponding to the predetermined area;
a detecting unit configured to detect a pixel whose pixel value is a predetermined value from among a plurality of pixels included in the predetermined area;
a selecting unit configured to select at least one pixel from among pixels other than the pixels detected by the detecting unit based on each of the plurality of pixel values included in the predetermined area; and
a determining unit configured to determine a quantization value of the selected pixel based on a threshold value corresponding to the selected pixel and threshold values corresponding to the detected pixels.

30. The image processing apparatus according to claim 29, wherein the detecting unit detects a pixel having the predetermined value of 0.

31. The image processing apparatus according to claim 29, wherein the determining unit determines a quantization value using a minimum threshold value for the selected pixel in a case where the minimum threshold value among the threshold values corresponding to the detected pixels is compared with the threshold value corresponding to the selected pixel to find that the minimum threshold value.

32. The image processing apparatus according to claim 29, wherein the selecting unit specifies pixels that are not the pixel value of the predetermined value and selects a pixel having a minimum threshold value among the threshold values corresponding to respective specified pixels.

33. The image processing apparatus according to claim 29, wherein the determining unit determines a quantization value indicating an on-dot as a quantization value of the selected pixel in a case where a minimum threshold value among the threshold values corresponding to the detected pixels is compared with the threshold value corresponding to the selected pixel to find that the minimum threshold value is smaller than the threshold value corresponding to the selected pixel and that the minimum threshold value is smaller than the pixel value of the selected pixel.

34. An image processing method in an image processing apparatus that generates a halftone image of an input image based on a threshold value by performing quantization, the method comprising:
acquiring, with respect to a predetermined area in an input image, threshold values corresponding to the predetermined area;
detecting a pixel whose pixel value is a predetermined value from among a plurality of pixels included in the predetermined area;
selecting at least one pixel from among pixels other than the pixels detected by the detecting based on each of a plurality of pixel values included in the predetermined area; and
determining a quantization value of the selected pixel based on a threshold value corresponding to the selected pixel and threshold values corresponding to the detected pixels.

35. A non-transitory computer readable storage medium storing a program for causing a computer to perform an image processing method in an image processing apparatus that generates a halftone image of an input image based on a threshold value by performing quantization, the method comprising:
acquiring, with respect to a predetermined area in an input image, threshold values corresponding to the predetermined area;
detecting a pixel whose pixel value is a predetermined value from among a plurality of pixels included in the predetermined area;
selecting at least one pixel from among pixels other than the pixels detected by the detecting based on each of a plurality of pixel values included in the predetermined area; and
determining a quantization value of the selected pixel based on a threshold value corresponding to the selected pixel and threshold values corresponding to the detected pixels.

* * * * *